(12) United States Patent
Hammad et al.

(10) Patent No.: US 11,288,661 B2
(45) Date of Patent: Mar. 29, 2022

(54) SNAP MOBILE PAYMENT APPARATUSES, METHODS AND SYSTEMS

(71) Applicant: VISA INTERNATIONAL SERVICE ASSOCIATION, San Francisco, CA (US)

(72) Inventors: Ayman Hammad, Pleasanton, CA (US); Igor Karpenko, Sunnyvale, CA (US); Miroslav Gavrilov, Santa Clara, CA (US); Abhinav Shrivastava, Redmond, WA (US); Mark Carlson, San Francisco, CA (US); Prakash Hariramani, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 65 days.

(21) Appl. No.: 16/017,241

(22) Filed: Jun. 25, 2018

(65) Prior Publication Data

US 2019/0034921 A1    Jan. 31, 2019

Related U.S. Application Data

(63) Continuation of application No. 13/398,817, filed on Feb. 16, 2012, now abandoned.
(Continued)

(51) Int. Cl.
*G06Q 30/06* (2012.01)
*G06Q 20/36* (2012.01)
(Continued)

(52) U.S. Cl.
CPC ......... *G06Q 20/3674* (2013.01); *G06Q 20/20* (2013.01); *G06Q 20/204* (2013.01); *G06Q 20/3276* (2013.01); *G06Q 30/06* (2013.01)

(58) Field of Classification Search
CPC ........ H04W 4/02; H04W 4/023; G06Q 20/32; G06Q 20/3274
See application file for complete search history.

(56) References Cited

U.S. PATENT DOCUMENTS

| | | | |
|---|---|---|---|
| 789,106 | A | 5/1905 | Seymour |
| 4,896,363 | A | 1/1990 | Taylor |

(Continued)

FOREIGN PATENT DOCUMENTS

| | | |
|---|---|---|
| CN | 1841425 A | 10/2006 |
| CN | 1922623 A | 2/2007 |

(Continued)

OTHER PUBLICATIONS

Notice of Allowance dated Apr. 12, 2019 for U.S. Appl. No. 16/182,288 (pp. 1-8).
(Continued)

*Primary Examiner* — Daniel S Felten
(74) *Attorney, Agent, or Firm* — Loeb & Loeb LLP

(57) ABSTRACT

The SNAP MOBILE PAYMENT APPARATUSES, METHODS AND SYSTEMS ("SNAP") transform real-time-generated merchant-product Quick Response codes via SNAP components into virtual wallet card-based transaction purchase notifications. In one embodiment, the SNAP obtains a snapshot of a QR code presented on a display screen of a point-of-sale device from a mobile device. The SNAP decodes the QR code to obtain product information included in a checkout request of the user, and merchant information for processing a user purchase transaction with a merchant providing the QR code. The SNAP accesses a user virtual wallet to obtain user account information to process the user purchase transaction with the merchant. Using the product information, merchant information and user account information, the SNAP generates a card authorization request, and which the SNAP provides to a payment network for
(Continued)

transaction processing. Also, the SNAP obtains a purchase receipt confirming processing of the user purchase transaction.

10 Claims, 53 Drawing Sheets

Related U.S. Application Data

(60) Provisional application No. 61/527,576, filed on Aug. 25, 2011, provisional application No. 61/522,213, filed on Aug. 10, 2011, provisional application No. 61/512,248, filed on Jul. 27, 2011, provisional application No. 61/443,624, filed on Feb. 16, 2011.

(51) Int. Cl.
   *G06Q 20/20* (2012.01)
   *G06Q 20/32* (2012.01)

(56) References Cited

U.S. PATENT DOCUMENTS

| | | | |
|---|---|---|---|
| 5,177,342 A | 1/1993 | Adams | |
| 5,221,838 A | 6/1993 | Gutman | |
| 5,237,164 A | 8/1993 | Takada | |
| 5,311,594 A | 5/1994 | Penzias | |
| 5,383,113 A | 1/1995 | Kight | |
| 5,384,449 A | 1/1995 | Peirce | |
| 5,446,890 A | 8/1995 | Renslo | |
| 5,459,656 A | 10/1995 | Fields | |
| 5,500,513 A | 3/1996 | Langhans | |
| 5,510,777 A | 4/1996 | Pilc | |
| 5,521,362 A | 5/1996 | Powers | |
| 5,526,409 A | 6/1996 | Conrow | |
| 5,530,438 A | 6/1996 | Bickham | |
| 5,536,045 A | 7/1996 | Adams | |
| 5,590,038 A | 12/1996 | Pitroda | |
| 5,613,012 A | 3/1997 | Hoffman | |
| 5,615,110 A | 3/1997 | Wong | |
| 5,615,264 A | 3/1997 | Kazmierczak | |
| 5,621,201 A | 4/1997 | Langhans | |
| 5,640,193 A * | 6/1997 | Wellner | H04N 7/15 |
| | | | 348/E7.071 |
| 5,649,118 A | 7/1997 | Carlisle | |
| 5,655,007 A | 8/1997 | McAllister | |
| 5,748,737 A | 5/1998 | Daggar | |
| 5,781,438 A | 7/1998 | Lee | |
| 5,796,832 A | 8/1998 | Kawan | |
| 5,815,657 A | 9/1998 | Williams | |
| 5,850,446 A | 12/1998 | Berger | |
| 5,878,337 A | 3/1999 | Joao | |
| 5,883,810 A | 3/1999 | Franklin | |
| 5,884,271 A | 3/1999 | Pitroda | |
| 5,892,838 A | 4/1999 | Brady | |
| 5,903,830 A | 5/1999 | Joao | |
| 5,914,472 A | 6/1999 | Foladare | |
| 5,943,624 A | 8/1999 | Fox | |
| 5,953,710 A | 9/1999 | Fleming | |
| 5,956,699 A | 9/1999 | Wong | |
| 5,963,924 A | 10/1999 | Williams | |
| 6,000,832 A | 12/1999 | Franklin | |
| 6,006,200 A | 12/1999 | Boies | |
| 6,014,635 A | 1/2000 | Harris | |
| 6,044,360 A | 3/2000 | Picciallo | |
| 6,052,675 A | 4/2000 | Checchio | |
| 6,058,127 A | 5/2000 | Joannopoulos | |
| 6,064,990 A | 5/2000 | Goldsmith | |
| 6,092,053 A | 7/2000 | Boesch | |
| 6,160,903 A | 12/2000 | Hamid | |
| 6,161,130 A | 12/2000 | Horvitz | |
| 6,163,771 A | 12/2000 | Walker | |
| 6,164,533 A | 12/2000 | Barton | |
| 6,182,894 B1 | 2/2001 | Hackett | |
| 6,193,155 B1 | 2/2001 | Walker | |
| 6,195,447 B1 | 2/2001 | Ross | |
| 6,202,052 B1 | 3/2001 | Miller | |
| 6,202,933 B1 | 3/2001 | Poore | |
| 6,226,624 B1 | 5/2001 | Watson | |
| 6,227,447 B1 | 5/2001 | Campisano | |
| 6,236,981 B1 | 5/2001 | Hill | |
| 6,243,688 B1 | 6/2001 | Kalina | |
| 6,263,447 B1 | 7/2001 | French | |
| 6,267,292 B1 | 7/2001 | Walker | |
| 6,327,578 B1 | 12/2001 | Linehan | |
| 6,336,099 B1 | 1/2002 | Barnett | |
| 6,339,766 B1 | 1/2002 | Gephart | |
| 6,341,724 B2 | 1/2002 | Campisano | |
| 6,381,584 B1 | 4/2002 | Ogram | |
| 6,385,596 B1 | 5/2002 | Wiser | |
| 6,385,655 B1 | 5/2002 | Smith | |
| 6,422,462 B1 | 7/2002 | Cohen | |
| 6,425,523 B1 | 7/2002 | Shem-Ur | |
| 6,439,345 B1 * | 8/2002 | Recktenwald | A47F 9/046 |
| | | | 186/55 |
| 6,456,984 B1 | 9/2002 | Demoff | |
| 6,468,823 B1 | 10/2002 | Scherer | |
| 6,473,500 B1 | 10/2002 | Risafi | |
| 6,529,725 B1 | 3/2003 | Joao | |
| 6,535,855 B1 | 3/2003 | Cahill | |
| 6,560,581 B1 | 5/2003 | Fox | |
| 6,592,044 B1 | 7/2003 | Wong | |
| 6,601,761 B1 | 8/2003 | Katis | |
| 6,636,833 B1 | 10/2003 | Flitcroft | |
| 6,735,572 B2 | 5/2004 | Landesmann | |
| 6,748,367 B1 | 6/2004 | Lee | |
| 6,805,287 B2 | 10/2004 | Bishop | |
| 6,853,982 B2 | 2/2005 | Smith | |
| 6,857,073 B2 | 2/2005 | French | |
| 6,865,522 B1 | 3/2005 | Gastiger | |
| 6,873,974 B1 | 3/2005 | Schutzer | |
| 6,879,965 B2 | 4/2005 | Fung | |
| 6,891,953 B1 | 5/2005 | DeMello | |
| 6,898,598 B2 | 5/2005 | Himmel | |
| 6,901,387 B2 | 5/2005 | Wells | |
| 6,925,439 B1 | 8/2005 | Pitroda | |
| 6,931,382 B2 | 8/2005 | Laage | |
| 6,934,528 B2 | 8/2005 | Loureiro | |
| 6,938,019 B1 | 8/2005 | Uzo | |
| 6,941,285 B2 | 9/2005 | Sarcanin | |
| 6,944,595 B1 | 9/2005 | Graser | |
| 6,980,670 B1 | 12/2005 | Hoffman | |
| 6,990,470 B2 | 1/2006 | Hogan | |
| 6,991,157 B2 | 1/2006 | Bishop | |
| 6,999,943 B1 | 2/2006 | Johnson | |
| 7,024,383 B1 | 4/2006 | Mancini | |
| 7,028,052 B2 | 4/2006 | Chapman | |
| 7,047,041 B2 | 5/2006 | Vanska | |
| 7,051,002 B2 | 5/2006 | Keresman, III | |
| 7,051,929 B2 | 5/2006 | Li | |
| 7,069,249 B2 | 6/2006 | Stolfo | |
| 7,089,208 B1 | 8/2006 | Levchin | |
| 7,096,003 B2 | 8/2006 | Joao | |
| 7,103,576 B2 | 9/2006 | Mann | |
| 7,111,789 B2 | 9/2006 | Rajasekaran | |
| 7,113,930 B2 | 9/2006 | Eccles | |
| 7,117,172 B1 | 10/2006 | Black | |
| 7,136,835 B1 | 11/2006 | Flitcroft | |
| 7,155,411 B1 | 12/2006 | Blinn | |
| 7,156,311 B2 * | 1/2007 | Attia | G06K 7/10722 |
| | | | 235/462.46 |
| 7,167,903 B2 | 1/2007 | Percival | |
| 7,177,835 B1 | 2/2007 | Walker | |
| 7,177,848 B2 | 2/2007 | Hogan | |
| 7,180,457 B2 | 2/2007 | Trott | |
| 7,194,437 B1 | 3/2007 | Britto | |
| 7,206,847 B1 | 4/2007 | Alberth | |
| 7,209,561 B1 | 4/2007 | Shankar | |
| 7,212,979 B1 | 5/2007 | Matz | |
| 7,228,011 B1 | 6/2007 | Queeno | |
| RE39,736 E | 7/2007 | Morrill | |
| 7,264,154 B2 | 9/2007 | Harris | |
| 7,266,557 B2 | 9/2007 | Aschen | |

(56) References Cited

U.S. PATENT DOCUMENTS

| | | |
|---|---|---|
| 7,268,667 B2 | 9/2007 | Beenau |
| 7,268,668 B2 | 9/2007 | Beenau |
| 7,287,692 B1 | 10/2007 | Patel |
| 7,290,704 B1 | 11/2007 | Ball |
| 7,292,999 B2 | 11/2007 | Hobson |
| 7,313,546 B2 | 12/2007 | Alarcon-Luther |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,350,230 B2 | 3/2008 | Forrest |
| 7,353,382 B2 | 4/2008 | Labrou |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,379,919 B2 | 5/2008 | Hogan |
| 7,392,222 B1 | 6/2008 | Hamilton |
| RE40,444 E | 7/2008 | Linehan |
| 7,395,242 B2 | 7/2008 | Blinn |
| 7,398,250 B2 | 7/2008 | Blinn |
| 7,413,113 B1 | 8/2008 | Zhu |
| 7,415,443 B2 | 8/2008 | Hobson |
| 7,415,469 B2 | 8/2008 | Singh |
| 7,427,021 B2 | 9/2008 | Kemper |
| 7,444,676 B1 | 10/2008 | Asghari-Kamrani |
| 7,450,966 B2 | 11/2008 | Vanska |
| 7,469,151 B2 | 12/2008 | Khan |
| 7,477,780 B2 | 1/2009 | Boncyk |
| 7,499,889 B2 | 3/2009 | Golan |
| 7,500,607 B2 | 3/2009 | Williams |
| 7,505,935 B2 | 3/2009 | Mendiola |
| 7,533,064 B1 | 5/2009 | Boesch |
| 7,536,318 B1 | 5/2009 | Wolfe |
| 7,536,335 B1 | 5/2009 | Weston |
| 7,536,360 B2 | 5/2009 | Stolfo |
| 7,540,012 B1 * | 5/2009 | Herzberg ............ H04N 21/2405 209/212 |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,140 B2 | 8/2009 | Weichert |
| 7,571,142 B1 | 8/2009 | Flitcroft |
| 7,580,898 B2 | 8/2009 | Brown |
| 7,584,153 B2 | 9/2009 | Brown |
| 7,593,858 B2 | 9/2009 | Matz |
| 7,593,896 B1 | 9/2009 | Flitcroft |
| 7,603,311 B1 | 10/2009 | Yadav-ranjan |
| 7,606,560 B2 | 10/2009 | Labrou |
| 7,627,531 B2 | 12/2009 | Breck |
| 7,627,895 B2 | 12/2009 | Gifford |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,650,314 B1 | 1/2010 | Saunders |
| 7,660,749 B2 | 2/2010 | Koski |
| 7,664,733 B2 | 2/2010 | Erol |
| 7,668,754 B1 | 2/2010 | Bridgelall |
| 7,669,760 B1 | 3/2010 | Zettner |
| 7,676,434 B2 | 3/2010 | Evans |
| 7,685,037 B2 | 3/2010 | Reiners |
| 7,685,067 B1 | 3/2010 | Britto |
| 7,698,221 B2 | 4/2010 | Blinn |
| 7,702,578 B2 | 4/2010 | Fung |
| 7,707,113 B1 | 4/2010 | Dimartino |
| 7,707,120 B2 | 4/2010 | Dominguez |
| 7,708,194 B2 | 5/2010 | Vawter |
| 7,708,198 B2 | 5/2010 | Gangi |
| 7,712,655 B2 | 5/2010 | Wong |
| 7,712,658 B2 | 5/2010 | Gangi |
| 7,720,436 B2 | 5/2010 | Hamynen |
| 7,734,527 B2 | 6/2010 | Uzo |
| 7,739,194 B2 | 6/2010 | Blinn |
| 7,742,984 B2 | 6/2010 | Mohsenzadeh |
| 7,753,265 B2 | 7/2010 | Harris |
| 7,770,789 B2 | 8/2010 | Oder |
| 7,774,076 B2 | 8/2010 | Skowronek |
| 7,783,569 B2 | 8/2010 | Abel |
| 7,784,684 B2 | 8/2010 | Labrou |
| 7,784,685 B1 | 8/2010 | Hopkins |
| 7,793,851 B2 | 9/2010 | Mullen |
| 7,797,215 B1 | 9/2010 | Zerenner |
| 7,801,826 B2 | 9/2010 | Labrou |
| 7,801,829 B2 | 9/2010 | Gray |
| 7,802,719 B2 | 9/2010 | Johnson |
| 7,805,376 B2 | 9/2010 | Smith |
| 7,805,378 B2 | 9/2010 | Berardi |
| 7,810,720 B2 | 10/2010 | Lovett |
| 7,818,264 B2 | 10/2010 | Hammad |
| 7,819,307 B2 | 10/2010 | Lyons |
| 7,827,288 B2 | 11/2010 | Da |
| 7,828,206 B2 | 11/2010 | Hessburg |
| 7,828,220 B2 | 11/2010 | Mullen |
| 7,828,992 B2 | 11/2010 | Kilickiran |
| 7,835,960 B2 | 11/2010 | Breck |
| 7,837,125 B2 | 11/2010 | Biskupski |
| 7,841,523 B2 | 11/2010 | Oder |
| 7,841,539 B2 | 11/2010 | Hewton |
| 7,844,530 B2 | 11/2010 | Ziade |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,870,027 B1 | 1/2011 | Tannenbaum |
| 7,873,579 B2 | 1/2011 | Hobson |
| 7,873,580 B2 | 1/2011 | Hobson |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,891,563 B2 | 2/2011 | Oder |
| 7,895,119 B2 | 2/2011 | Praisner |
| 7,896,238 B2 | 3/2011 | Fein |
| 7,899,744 B2 | 3/2011 | Bishop |
| 7,904,360 B2 | 3/2011 | Evans |
| 7,908,216 B1 | 3/2011 | Davis |
| 7,908,227 B2 | 3/2011 | Zizzimopoulos |
| 7,922,082 B2 | 4/2011 | Muscato |
| 7,926,714 B1 | 4/2011 | Zhu |
| 7,931,195 B2 | 4/2011 | Mullen |
| 7,933,779 B2 | 4/2011 | Rooks |
| 7,937,324 B2 | 5/2011 | Patterson |
| 7,938,318 B2 | 5/2011 | Fein |
| 7,942,337 B2 | 5/2011 | Jain |
| 7,954,705 B2 | 6/2011 | Mullen |
| 7,959,076 B1 | 6/2011 | Hopkins |
| 7,962,418 B1 | 6/2011 | Wei |
| 7,963,441 B2 * | 6/2011 | Emmons ............ G06Q 20/3276 235/383 |
| 7,967,196 B1 | 6/2011 | Bierbaum |
| 7,971,782 B1 | 7/2011 | Shams |
| 7,996,259 B1 | 8/2011 | Distefano, III |
| 7,996,288 B1 | 8/2011 | Stolfo |
| 8,016,192 B2 | 9/2011 | Messerges |
| 8,020,763 B1 | 9/2011 | Kowalchyk |
| 8,024,260 B1 | 9/2011 | Hogl |
| 8,025,223 B2 | 9/2011 | Saunders |
| 8,028,041 B2 | 9/2011 | Olliphant |
| 8,032,438 B1 | 10/2011 | Barton |
| 8,041,338 B2 | 10/2011 | Chen |
| 8,046,256 B2 | 10/2011 | Chien |
| 8,050,997 B1 | 11/2011 | Nosek |
| 8,060,413 B2 | 11/2011 | Castell |
| 8,060,448 B2 | 11/2011 | Jones |
| 8,060,449 B1 | 11/2011 | Zhu |
| 8,073,565 B2 | 12/2011 | Johnson |

(56) References Cited

U.S. PATENT DOCUMENTS

| | | |
|---|---|---|
| 8,074,876 B2 | 12/2011 | Foss |
| 8,074,877 B2 | 12/2011 | Mullen |
| 8,074,879 B2 | 12/2011 | Harris |
| 8,082,210 B2 | 12/2011 | Hansen |
| 8,090,351 B2 | 1/2012 | Klein |
| 8,095,113 B2 | 1/2012 | Kean |
| 8,095,602 B1 | 1/2012 | Orbach |
| 8,104,679 B2 | 1/2012 | Brown |
| 8,108,261 B2 | 1/2012 | Carlier |
| RE43,157 E | 2/2012 | Bishop |
| 8,109,436 B1 | 2/2012 | Hopkins |
| 8,117,127 B1 | 2/2012 | Sanders |
| 8,121,942 B2 | 2/2012 | Carlson |
| 8,121,956 B2 | 2/2012 | Carlson |
| 8,126,449 B2 | 2/2012 | Beenau |
| 8,127,982 B1 | 3/2012 | Casey |
| 8,131,666 B2 | 3/2012 | OBrien |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B1 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,171,525 B1 | 5/2012 | Pelly |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,973 B2 | 5/2012 | Davis |
| 8,175,975 B2 | 5/2012 | Cai |
| 8,175,979 B2 | 5/2012 | Baentsch |
| 8,176,416 B1 | 5/2012 | Williams |
| 8,176,554 B1 | 5/2012 | Kennedy |
| 8,179,563 B2 | 5/2012 | King |
| 8,180,289 B1 | 5/2012 | Glickman |
| 8,180,705 B2 | 5/2012 | Kowalchyk |
| 8,180,804 B1 | 5/2012 | Narayanan |
| 8,190,513 B2 | 5/2012 | Felger |
| 8,190,523 B2 | 5/2012 | Patterson |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,196,813 B2 | 6/2012 | Vadhri |
| 8,200,582 B1 | 6/2012 | Zhu |
| 8,200,868 B1 | 6/2012 | Maarten |
| 8,204,774 B2 | 6/2012 | Chwast |
| 8,204,829 B2 | 6/2012 | Alvarez |
| 8,205,791 B2 | 6/2012 | Randazza |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,489 B2 | 7/2012 | Patterson |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,385 B2 | 7/2012 | Chow |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,852 B2 | 7/2012 | Carlson |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,245,139 B2 | 8/2012 | Michelman |
| 8,249,925 B2 | 8/2012 | Broms |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,265,993 B2 | 9/2012 | Chien |
| 8,275,704 B2 | 9/2012 | Bishop |
| 8,280,777 B2 | 10/2012 | Mengerink |
| 8,281,991 B2 | 10/2012 | Wentker |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,321,364 B1 | 11/2012 | Gharpure |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,328,095 B2 | 12/2012 | Oder |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,336,088 B2 | 12/2012 | Raj |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |

(56) References Cited

U.S. PATENT DOCUMENTS

| | | |
|---|---|---|
| 8,346,666 B2 | 1/2013 | Lindelsee |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,376,225 B1 | 2/2013 | Hopkins |
| 8,380,177 B2 | 2/2013 | Laracey |
| 8,380,349 B1 | 2/2013 | Hickman |
| 8,386,078 B1 | 2/2013 | Hickman |
| 8,387,873 B2 | 3/2013 | Saunders |
| 8,396,750 B1 | 3/2013 | Hariharan |
| 8,396,810 B1 | 3/2013 | Cook |
| 8,401,539 B2 | 3/2013 | Beenau |
| 8,401,898 B2 | 3/2013 | Chien |
| 8,401,904 B1 | 3/2013 | Simakov |
| 8,402,555 B2 | 3/2013 | Grecia |
| 8,403,211 B2 | 3/2013 | Brooks |
| 8,412,586 B1 | 4/2013 | Foulser |
| 8,412,623 B2 | 4/2013 | Moon |
| 8,412,630 B2 | 4/2013 | Ross |
| 8,412,837 B1 | 4/2013 | Emigh |
| 8,417,633 B1 | 4/2013 | Chmara |
| 8,417,642 B2 | 4/2013 | Oren |
| 8,423,462 B1 | 4/2013 | Amacker |
| 8,429,521 B2 | 4/2013 | Lloyd |
| 8,437,633 B2 | 4/2013 | Chmara |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand |
| 8,504,478 B2 | 8/2013 | Saunders |
| 8,510,816 B2 | 8/2013 | Quach |
| 8,433,116 B2 | 9/2013 | Davis |
| 8,527,360 B2 | 9/2013 | Groat |
| 8,533,860 B1 | 9/2013 | Grecia |
| 8,538,845 B2 | 9/2013 | Liberty |
| 8,555,079 B2 | 10/2013 | Shablygin |
| 8,560,004 B1 | 10/2013 | Tsvetkov |
| 8,566,168 B1 | 10/2013 | Bierbaum |
| 8,567,670 B2 | 10/2013 | Stanfield |
| 8,571,937 B2 | 10/2013 | Rose |
| 8,571,939 B2 | 10/2013 | Lindsey |
| 8,577,336 B2 | 11/2013 | Mechaley |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,060 B2 | 12/2013 | Hamann |
| 8,606,638 B2 | 12/2013 | Dragt |
| 8,606,700 B2 | 12/2013 | Carlson |
| 8,606,720 B1 | 12/2013 | Baker |
| 8,612,325 B2 | 12/2013 | Stacy |
| 8,615,468 B2 | 12/2013 | Varadarajan |
| 8,620,754 B2 | 12/2013 | Fisher |
| 8,627,420 B2 | 1/2014 | Furlan |
| 8,635,157 B2 | 1/2014 | Smith |
| 8,639,621 B1 | 1/2014 | Ellis |
| 8,646,059 B1 | 2/2014 | von Behren |
| 8,651,374 B2 | 2/2014 | Brabson |
| 8,656,180 B2 | 2/2014 | Shablygin |
| 8,661,495 B2 | 2/2014 | Reisman |
| 8,662,384 B2 * | 3/2014 | Dodin ............... G06Q 20/40 235/379 |
| 8,739,016 B1 | 5/2014 | Goldman |
| 8,751,391 B2 | 6/2014 | Freund |
| 8,762,263 B2 | 6/2014 | Gauthier |
| 8,793,186 B2 | 7/2014 | Patterson |
| 8,838,982 B2 | 9/2014 | Carlson |
| 8,856,539 B2 | 10/2014 | Weiss |
| 8,887,308 B2 | 11/2014 | Grecia |
| 8,893,009 B2 | 11/2014 | Raleigh |
| 9,008,616 B2 | 4/2015 | Wall |
| 9,065,643 B2 | 6/2015 | Hurry |
| 9,070,129 B2 | 6/2015 | Sheets |
| 9,082,119 B2 | 7/2015 | Ortiz |
| 9,100,826 B2 | 8/2015 | Weiss |
| 9,105,050 B2 | 8/2015 | Tietzen |
| 9,160,741 B2 | 10/2015 | Wentker |
| 9,195,750 B2 | 11/2015 | Hayden |
| 9,229,964 B2 | 1/2016 | Stevelinck |
| 9,245,267 B2 | 1/2016 | Singh |
| 9,249,241 B2 | 2/2016 | Dai |
| 9,256,871 B2 | 2/2016 | Anderson |
| 9,280,765 B2 | 3/2016 | Hammad |
| 9,307,342 B2 | 4/2016 | Sojoodi |
| 9,324,098 B1 | 4/2016 | Agrawal |
| 9,355,393 B2 | 5/2016 | Purves |
| 9,448,972 B2 | 9/2016 | Greenberg |
| 9,524,089 B1 | 12/2016 | Ghosh |
| 9,530,137 B2 | 12/2016 | Weiss |
| 9,582,598 B2 | 2/2017 | Kalgi |
| 9,626,351 B2 | 4/2017 | Davis |
| 9,710,807 B2 | 7/2017 | Theurer |
| 9,772,987 B2 | 9/2017 | Davis |
| 9,804,834 B1 | 10/2017 | Lopyrev |
| 9,830,590 B2 | 11/2017 | Grigg |
| 9,846,863 B2 * | 12/2017 | Grossi ............... G06Q 20/209 |
| 9,904,537 B2 | 2/2018 | Lopyrev |
| 10,360,561 B2 * | 7/2019 | Poon ............... H04W 12/1006 |
| 10,699,290 B1 * | 6/2020 | Varadarajan ....... G06Q 30/0238 |
| 11,144,905 B1 * | 10/2021 | Wilkinson ........... G06Q 20/202 |
| 2001/0037297 A1 | 3/2001 | McNair |
| 2001/0029485 A1 | 10/2001 | Brody |
| 2001/0034720 A1 | 10/2001 | Armes |
| 2001/0049635 A1 | 12/2001 | Chung |
| 2001/0054003 A1 | 12/2001 | Chien |
| 2001/0056359 A1 | 12/2001 | Abreu |
| 2001/0056409 A1 | 12/2001 | Bellovin |
| 2002/0002522 A1 | 1/2002 | Clift |
| 2002/0004783 A1 | 1/2002 | Paltenghe |
| 2002/0007320 A1 | 1/2002 | Hogan |
| 2002/0016749 A1 | 2/2002 | Borecki |
| 2002/0026575 A1 | 2/2002 | Wheeler |
| 2002/0029193 A1 | 3/2002 | Ranjan |
| 2002/0035548 A1 | 3/2002 | Hogan |
| 2002/0040325 A1 | 4/2002 | Takae |
| 2002/0046184 A1 * | 4/2002 | Villaret ............... G06Q 20/327 705/64 |
| 2002/0048422 A1 | 4/2002 | Cotteverte |
| 2002/0052778 A1 | 5/2002 | Murphy |
| 2002/0069122 A1 | 6/2002 | Yun |
| 2002/0073045 A1 | 6/2002 | Rubin |
| 2002/0077976 A1 | 6/2002 | Meyer |
| 2002/0077978 A1 | 6/2002 | OLeary |
| 2002/0087894 A1 | 7/2002 | Foley |
| 2002/0099642 A1 | 7/2002 | Schwankl |
| 2002/0099647 A1 | 7/2002 | Howorka |
| 2002/0099656 A1 | 7/2002 | Poh Wong |
| 2002/0107755 A1 | 8/2002 | Steed |
| 2002/0111919 A1 | 8/2002 | Weller |
| 2002/0112014 A1 | 8/2002 | Bennett |
| 2002/0116271 A1 | 8/2002 | Mankoff |
| 2002/0116341 A1 | 8/2002 | Hogan |
| 2002/0120864 A1 | 8/2002 | Wu |
| 2002/0128977 A1 | 9/2002 | Nambiar |
| 2002/0133467 A1 | 9/2002 | Hobson |
| 2002/0138290 A1 | 9/2002 | Metcalfe |

(56) References Cited

U.S. PATENT DOCUMENTS

| | | |
|---|---|---|
| 2002/0138445 A1 | 9/2002 | Laage |
| 2002/0141575 A1 | 10/2002 | Hird |
| 2002/0143614 A1 | 10/2002 | MacLean |
| 2002/0147913 A1 | 10/2002 | Lun Yip |
| 2002/0174030 A1 | 11/2002 | Praisner |
| 2002/0178370 A1 | 11/2002 | Gurevich |
| 2002/0194081 A1 | 12/2002 | Perkowski |
| 2003/0014307 A1 | 1/2003 | Heng |
| 2003/0018524 A1 | 1/2003 | Fishman |
| 2003/0026404 A1 | 2/2003 | Joyce |
| 2003/0028451 A1 | 2/2003 | Ananian |
| 2003/0028481 A1 | 2/2003 | Flitcroft |
| 2003/0055785 A1 | 3/2003 | Lahiri |
| 2003/0080185 A1 | 5/2003 | Werther |
| 2003/0097318 A1 | 5/2003 | Yu |
| 2003/0101134 A1 | 5/2003 | Liu |
| 2003/0126076 A1 | 7/2003 | Kwok |
| 2003/0130955 A1 | 7/2003 | Hawthorne |
| 2003/0144935 A1 | 7/2003 | Sobek |
| 2003/0174823 A1 | 9/2003 | Justice |
| 2003/0177361 A1 | 9/2003 | Wheeler |
| 2003/0179230 A1 | 9/2003 | Seidman |
| 2003/0191709 A1 | 10/2003 | Elston |
| 2003/0191711 A1 | 10/2003 | Jamison |
| 2003/0191945 A1 | 10/2003 | Keech |
| 2003/0195659 A1 | 10/2003 | Kasuga |
| 2003/0200142 A1 | 10/2003 | Hicks |
| 2003/0200184 A1 | 10/2003 | Dominguez |
| 2003/0212589 A1 | 11/2003 | Kish |
| 2003/0212642 A1 | 11/2003 | Weller |
| 2003/0216996 A1 | 11/2003 | Cummings |
| 2003/0220835 A1 | 11/2003 | Barnes |
| 2004/0010462 A1 | 1/2004 | Moon |
| 2004/0030601 A1 * | 2/2004 | Pond .............. G06Q 20/322 705/16 |
| 2004/0050928 A1 | 3/2004 | Bishop |
| 2004/0059682 A1 | 3/2004 | Hasumi |
| 2004/0068443 A1 | 4/2004 | Hopson |
| 2004/0078332 A1 | 4/2004 | Ferguson |
| 2004/0093281 A1 | 5/2004 | Silverstein |
| 2004/0103037 A1 | 5/2004 | Wetmore |
| 2004/0103063 A1 | 5/2004 | Takayama |
| 2004/0111698 A1 | 6/2004 | Soong |
| 2004/0128197 A1 | 7/2004 | Bam |
| 2004/0138999 A1 | 7/2004 | Friedman |
| 2004/0139008 A1 | 7/2004 | Mascavage |
| 2004/0143532 A1 | 7/2004 | Lee |
| 2004/0148255 A1 | 7/2004 | Beck |
| 2004/0158532 A1 | 8/2004 | Breck |
| 2004/0204128 A1 | 10/2004 | Zakharia |
| 2004/0210449 A1 | 10/2004 | Breck |
| 2004/0210498 A1 | 10/2004 | Freund |
| 2004/0215560 A1 | 10/2004 | Amalraj |
| 2004/0215963 A1 | 10/2004 | Kaplan |
| 2004/0230536 A1 | 11/2004 | Fung |
| 2004/0232225 A1 | 11/2004 | Bishop |
| 2004/0236646 A1 | 11/2004 | Wu |
| 2004/0236819 A1 | 11/2004 | Anati |
| 2004/0243520 A1 | 12/2004 | Bishop |
| 2004/0254891 A1 | 12/2004 | Blinn |
| 2004/0260646 A1 | 12/2004 | Berardi |
| 2004/0267608 A1 | 12/2004 | Mansfield |
| 2004/0267655 A1 | 12/2004 | Davidowitz |
| 2004/0267878 A1 | 12/2004 | Osias |
| 2005/0010483 A1 | 1/2005 | Ling |
| 2005/0037735 A1 | 2/2005 | Courts |
| 2005/0038724 A1 | 2/2005 | Roever |
| 2005/0065819 A1 | 3/2005 | Pamela |
| 2005/0080730 A1 | 4/2005 | Sorrentino |
| 2005/0080732 A1 | 4/2005 | Warin |
| 2005/0080747 A1 | 4/2005 | Anderson |
| 2005/0080821 A1 | 4/2005 | Breil |
| 2005/0097320 A1 | 5/2005 | Golan |
| 2005/0101309 A1 | 5/2005 | Croome |
| 2005/0102188 A1 | 5/2005 | Hutchison |
| 2005/0108178 A1 | 5/2005 | York |
| 2005/0114784 A1 | 5/2005 | Spring |
| 2005/0137969 A1 | 6/2005 | Shah |
| 2005/0144082 A1 | 6/2005 | Coolman |
| 2005/0171894 A1 | 8/2005 | Traynor |
| 2005/0171898 A1 | 8/2005 | Bishop |
| 2005/0184145 A1 | 8/2005 | Law |
| 2005/0187873 A1 | 8/2005 | Labrou |
| 2005/0192893 A1 | 9/2005 | Keeling |
| 2005/0192895 A1 | 9/2005 | Rogers |
| 2005/0199709 A1 | 9/2005 | Linlor |
| 2005/0201660 A1 | 9/2005 | Grot |
| 2005/0220326 A1 | 10/2005 | Sim |
| 2005/0234817 A1 | 10/2005 | VanFleet |
| 2005/0246278 A1 | 11/2005 | Gerber |
| 2005/0246293 A1 | 11/2005 | Ong |
| 2005/0251446 A1 | 11/2005 | Jiang |
| 2005/0254714 A1 | 11/2005 | Anne |
| 2005/0256802 A1 | 11/2005 | Ammermann |
| 2005/0261967 A1 | 11/2005 | Barry |
| 2005/0269401 A1 | 12/2005 | Spitzer |
| 2005/0269402 A1 | 12/2005 | Spitzer |
| 2005/0273462 A1 | 12/2005 | Reed |
| 2006/0002607 A1 | 1/2006 | Boncyk |
| 2006/0020542 A1 | 1/2006 | Litle |
| 2006/0053056 A1 | 3/2006 | Alspach-Goss |
| 2006/0059277 A1 | 3/2006 | Zito |
| 2006/0069619 A1 | 3/2006 | Walker |
| 2006/0075235 A1 | 4/2006 | Renkis |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178918 A1 | 8/2006 | Mikurak |
| 2006/0178986 A1 | 8/2006 | Giordano |
| 2006/0178994 A1 | 8/2006 | Stolfo |
| 2006/0190347 A1 | 8/2006 | Cuervo |
| 2006/0195598 A1 | 8/2006 | Fujita |
| 2006/0208060 A1 | 9/2006 | Mendelevich |
| 2006/0212434 A1 | 9/2006 | Crawford |
| 2006/0226216 A1 | 10/2006 | Keithley |
| 2006/0235795 A1 | 10/2006 | Johnson |
| 2006/0237528 A1 | 10/2006 | Bishop |
| 2006/0247982 A1 | 11/2006 | Stolfo |
| 2006/0277143 A1 | 12/2006 | Almonte |
| 2006/0278704 A1 | 12/2006 | Saunders |
| 2006/0280396 A1 | 12/2006 | Wu |
| 2006/0282332 A1 | 12/2006 | Pfleging |
| 2006/0293947 A1 | 12/2006 | Nicholson |
| 2007/0011025 A1 | 1/2007 | Cracchiolo |
| 2007/0016523 A1 | 1/2007 | Blair |
| 2007/0022007 A1 | 1/2007 | Lawe |
| 2007/0038515 A1 | 2/2007 | Postrel |
| 2007/0038516 A1 | 2/2007 | Apple |
| 2007/0055571 A1 | 3/2007 | Fox |
| 2007/0067215 A1 | 3/2007 | Agarwal |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106504 A1 | 5/2007 | Deng |
| 2007/0106607 A1 | 5/2007 | Seib |
| 2007/0106627 A1 | 5/2007 | Srivastava |
| 2007/0107044 A1 | 5/2007 | Yuen |
| 2007/0113289 A1 | 5/2007 | Blumenau |
| 2007/0125840 A1 | 6/2007 | Law |
| 2007/0129955 A1 | 6/2007 | Dalmia |
| 2007/0136193 A1 | 6/2007 | Starr |
| 2007/0136211 A1 | 6/2007 | Brown |
| 2007/0143204 A1 | 6/2007 | Claus |
| 2007/0150413 A1 | 6/2007 | Morgenstern |
| 2007/0156726 A1 | 7/2007 | Levy |
| 2007/0162350 A1 * | 7/2007 | Friedman .......... G06Q 30/0212 705/346 |
| 2007/0170247 A1 | 7/2007 | Friedman |
| 2007/0179885 A1 | 8/2007 | Bird |
| 2007/0180119 A1 | 8/2007 | Khivesara |
| 2007/0198435 A1 | 8/2007 | Siegal |

(56) References Cited

U.S. PATENT DOCUMENTS

| | | |
|---|---|---|
| 2007/0198587 A1 | 8/2007 | Kobayasfii |
| 2007/0208662 A1 | 9/2007 | Jeronimus |
| 2007/0208671 A1 | 9/2007 | Brown |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0233615 A1 | 10/2007 | Tumminaro |
| 2007/0239502 A1 | 10/2007 | Babu |
| 2007/0245414 A1 | 10/2007 | Chan |
| 2007/0276765 A1 | 11/2007 | Hazel |
| 2007/0288377 A1 | 12/2007 | Shaked |
| 2007/0291995 A1 | 12/2007 | Rivera |
| 2008/0004116 A1 | 1/2008 | Van |
| 2008/0004952 A1 | 1/2008 | Koli |
| 2008/0010096 A1 | 1/2008 | Patterson |
| 2008/0013335 A1 | 1/2008 | Tsutsumi |
| 2008/0015988 A1 | 1/2008 | Brown |
| 2008/0021829 A1 | 1/2008 | Kranzley |
| 2008/0027218 A1 | 1/2008 | Daugs |
| 2008/0027850 A1 | 1/2008 | Brittan |
| 2008/0029607 A1 | 2/2008 | Mullen |
| 2008/0035738 A1 | 2/2008 | Mullen |
| 2008/0048022 A1 | 2/2008 | Vawter |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0059370 A1 | 3/2008 | Sada |
| 2008/0065554 A1 | 3/2008 | Hogan |
| 2008/0065555 A1 | 3/2008 | Mullen |
| 2008/0077489 A1 | 3/2008 | Gilley |
| 2008/0082424 A1* | 4/2008 | Walton .................. G06Q 30/02 705/26.1 |
| 2008/0086365 A1 | 4/2008 | Zollino |
| 2008/0090513 A1 | 4/2008 | Collins |
| 2008/0091553 A1 | 4/2008 | Koski |
| 2008/0091616 A1 | 4/2008 | Helwin |
| 2008/0097856 A1 | 4/2008 | Blagg |
| 2008/0103795 A1 | 5/2008 | Jakubowski |
| 2008/0114639 A1 | 5/2008 | Meek |
| 2008/0114737 A1 | 5/2008 | Neely |
| 2008/0126145 A1 | 5/2008 | Racklet, III |
| 2008/0133351 A1 | 6/2008 | White |
| 2008/0133403 A1* | 6/2008 | Hamzeh ................. G06Q 20/10 705/39 |
| 2008/0140568 A1 | 6/2008 | Henry |
| 2008/0140684 A1 | 6/2008 | OReilly |
| 2008/0147883 A1 | 6/2008 | Philyaw |
| 2008/0154623 A1 | 6/2008 | Derker |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0201232 A1 | 8/2008 | Walker |
| 2008/0201264 A1 | 8/2008 | Brown |
| 2008/0201265 A1 | 8/2008 | Hewton |
| 2008/0221945 A1 | 9/2008 | Pace |
| 2008/0223918 A1 | 9/2008 | Williams |
| 2008/0228646 A1 | 9/2008 | Myers |
| 2008/0229217 A1 | 9/2008 | Kembel |
| 2008/0235261 A1 | 9/2008 | Malek |
| 2008/0024561 A1 | 10/2008 | Fein |
| 2008/0243305 A1 | 10/2008 | Lee |
| 2008/0243702 A1 | 10/2008 | Hart |
| 2008/0245855 A1 | 10/2008 | Fein |
| 2008/0245861 A1 | 10/2008 | Fein |
| 2008/0270300 A1 | 10/2008 | Jones |
| 2008/0272188 A1 | 11/2008 | Keithley |
| 2008/0283591 A1 | 11/2008 | Oder |
| 2008/0288376 A1 | 11/2008 | Panthaki |
| 2008/0288889 A1 | 11/2008 | Hunt |
| 2008/0300980 A1 | 12/2008 | Benjamin |
| 2008/0301055 A1 | 12/2008 | Borgs |
| 2008/0302869 A1 | 12/2008 | Mullen |
| 2008/0302876 A1 | 12/2008 | Mullen |
| 2008/0313264 A1 | 12/2008 | Pestoni |
| 2008/0319905 A1 | 12/2008 | Carlson |
| 2009/0006181 A1 | 1/2009 | Ghosh |
| 2009/0006262 A1 | 1/2009 | Brown |
| 2009/0010488 A1 | 1/2009 | Matsuoka |
| 2009/0013266 A1 | 1/2009 | Gandhi |
| 2009/0018895 A1 | 1/2009 | Weinblatt |
| 2009/0024527 A1 | 1/2009 | Sellen |
| 2009/0024636 A1 | 1/2009 | Shiloh |
| 2009/0037255 A1 | 2/2009 | Chiu |
| 2009/0037326 A1 | 2/2009 | Chitti |
| 2009/0037333 A1 | 2/2009 | Flitcroft |
| 2009/0037388 A1 | 2/2009 | Cooper |
| 2009/0043702 A1 | 2/2009 | Bennett |
| 2009/0048934 A1 | 2/2009 | Haddad |
| 2009/0048971 A1 | 2/2009 | Hathaway |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0083065 A1 | 3/2009 | Unland |
| 2009/0089176 A1 | 4/2009 | Mccabe |
| 2009/0089193 A1 | 4/2009 | Paintin |
| 2009/0104888 A1 | 4/2009 | Cox |
| 2009/0106112 A1 | 4/2009 | Dalmia |
| 2009/0106151 A1 | 4/2009 | Nelsen |
| 2009/0106160 A1 | 4/2009 | Skowronek |
| 2009/0106234 A1 | 4/2009 | Siedlecki |
| 2009/0108080 A1 | 4/2009 | Meyer |
| 2009/0112775 A1 | 4/2009 | Chiulli |
| 2009/0119176 A1 | 5/2009 | Johnson |
| 2009/0119190 A1 | 5/2009 | Realini |
| 2009/0119211 A1 | 5/2009 | Johnson |
| 2009/0125429 A1 | 5/2009 | Takayama |
| 2009/0132347 A1 | 5/2009 | Anderson |
| 2009/0132366 A1 | 5/2009 | Lam |
| 2009/0132395 A1 | 5/2009 | Lam |
| 2009/0134217 A1 | 5/2009 | Flitcroft |
| 2009/0144104 A1 | 6/2009 | Johnson |
| 2009/0144201 A1 | 6/2009 | Gierkink |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0164344 A1 | 6/2009 | Shiftan |
| 2009/0170608 A1 | 7/2009 | Herrmann |
| 2009/0171778 A1 | 7/2009 | Powell |
| 2009/0173782 A1 | 7/2009 | Muscato |
| 2009/0182664 A1 | 7/2009 | Trombley |
| 2009/0187492 A1 | 7/2009 | Hammad |
| 2009/0200371 A1 | 8/2009 | Kean |
| 2009/0210300 A1 | 8/2009 | Cansler |
| 2009/0216910 A1 | 8/2009 | Duchesneau |
| 2009/0222347 A1 | 9/2009 | Whitten |
| 2009/0228211 A1 | 9/2009 | Rasanen |
| 2009/0233579 A1 | 9/2009 | Castell |
| 2009/0234751 A1 | 9/2009 | Chan |
| 2009/0238528 A1 | 9/2009 | Spillane |
| 2009/0240620 A1 | 9/2009 | Kendrick |
| 2009/0241159 A1 | 9/2009 | Campagna |
| 2009/0248583 A1 | 10/2009 | Chhabra |
| 2009/0248738 A1 | 10/2009 | Martinez |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271246 A1 | 10/2009 | Alvarez |
| 2009/0271265 A1 | 10/2009 | Lay |
| 2009/0271635 A1 | 10/2009 | Liu |
| 2009/0276347 A1 | 11/2009 | Kargman |
| 2009/0281948 A1 | 11/2009 | Carlson |
| 2009/0288012 A1 | 11/2009 | Hertel |
| 2009/0294527 A1 | 12/2009 | Brabson |
| 2009/0307060 A1 | 12/2009 | Merz |
| 2009/0307135 A1 | 12/2009 | Gupta |

(56) References Cited

U.S. PATENT DOCUMENTS

| | | |
|---|---|---|
| 2009/0307139 A1 | 12/2009 | Mardikar |
| 2009/0308921 A1 | 12/2009 | Mullen |
| 2009/0313132 A1 | 12/2009 | McKenna |
| 2009/0319638 A1 | 12/2009 | Faith |
| 2009/0327045 A1 | 12/2009 | Olives |
| 2009/0327088 A1 | 12/2009 | Puthupparambil |
| 2009/0327131 A1 | 12/2009 | Beenau |
| 2010/0004989 A1 | 1/2010 | Bonalle |
| 2010/0005025 A1 | 1/2010 | Kumar |
| 2010/0008535 A1 | 1/2010 | Abulafia |
| 2010/0009663 A1 | 1/2010 | Chang |
| 2010/0010964 A1 | 1/2010 | Skowronek |
| 2010/0012728 A1 | 1/2010 | Rosset |
| 2010/0021149 A1 | 1/2010 | Mulder |
| 2010/0023386 A1 | 1/2010 | Avisar |
| 2010/0023455 A1 | 1/2010 | Dispensa |
| 2010/0023457 A1 | 1/2010 | Riviere |
| 2010/0036741 A1 | 2/2010 | Cleven |
| 2010/0036775 A1 | 2/2010 | Edens |
| 2010/0036884 A1 | 2/2010 | Brown |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0057548 A1 | 3/2010 | Edwards |
| 2010/0063903 A1 | 3/2010 | Whipple |
| 2010/0070359 A1 | 3/2010 | Heasley |
| 2010/0076873 A1 | 3/2010 | Taylor |
| 2010/0076890 A1 | 3/2010 | Low |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0088237 A1 | 4/2010 | Wankmueller |
| 2010/0094730 A1 | 4/2010 | Koski |
| 2010/0094755 A1 | 4/2010 | Kloster |
| 2010/0094878 A1 | 4/2010 | Soroca |
| 2010/0100480 A1 | 4/2010 | Altman |
| 2010/0106602 A1 | 4/2010 | Fuzell-Casey |
| 2010/0106644 A1 | 4/2010 | Annan |
| 2010/0114664 A1 | 5/2010 | Jobin |
| 2010/0120408 A1 | 5/2010 | Beenau |
| 2010/0121707 A1 | 5/2010 | Goeldi |
| 2010/0125492 A1 | 5/2010 | Lin |
| 2010/0125495 A1 | 5/2010 | Smith |
| 2010/0125509 A1 | 5/2010 | Kranzley |
| 2010/0125803 A1 | 5/2010 | Johnson |
| 2010/0131347 A1 | 5/2010 | Sarptipi |
| 2010/0131415 A1 | 5/2010 | Sartipi |
| 2010/0133334 A1 | 6/2010 | Vadhri |
| 2010/0133339 A1 | 6/2010 | Gibson |
| 2010/0138026 A1 | 6/2010 | Kaushal |
| 2010/0138347 A1 | 6/2010 | Chen |
| 2010/0145860 A1 | 6/2010 | Pelegero |
| 2010/0153865 A1 | 6/2010 | Barnes |
| 2010/0155470 A1 | 6/2010 | Woronec |
| 2010/0161433 A1 | 6/2010 | White |
| 2010/0162126 A1 | 6/2010 | Donaldson |
| 2010/0174599 A1 | 7/2010 | Rosenblatt |
| 2010/0179855 A1 | 7/2010 | Chen |
| 2010/0185505 A1 | 7/2010 | Sprogoe |
| 2010/0185531 A1 | 7/2010 | Van |
| 2010/0185545 A1 | 7/2010 | Royyuru |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D'Angelo et al. |
| 2010/0211469 A1 | 8/2010 | Salmon |
| 2010/0211499 A1 | 8/2010 | Zanzot |
| 2010/0211505 A1 | 8/2010 | Saunders |
| 2010/0217613 A1 | 8/2010 | Kelly |
| 2010/0217682 A1 | 8/2010 | Chan |
| 2010/0223186 A1 | 9/2010 | Hogan |
| 2010/0228668 A1 | 9/2010 | Hogan |
| 2010/0235284 A1 | 9/2010 | Moore |
| 2010/0243728 A1 | 9/2010 | Wiesman |
| 2010/0250351 A1 | 9/2010 | Gillenson |
| 2010/0256976 A1 | 10/2010 | Atsmon |
| 2010/0258620 A1 | 10/2010 | Torreyson |
| 2010/0268645 A1 | 10/2010 | Martino |
| 2010/0276484 A1 | 11/2010 | Banerjee |
| 2010/0287048 A1 | 11/2010 | Ramer |
| 2010/0287229 A1 | 11/2010 | Hauser |
| 2010/0291904 A1 | 11/2010 | Musfeldt |
| 2010/0293032 A1 | 11/2010 | Engelsma |
| 2010/0299267 A1 | 11/2010 | Faith |
| 2010/0299292 A1 | 11/2010 | Collazo |
| 2010/0305848 A1 | 12/2010 | Stallman |
| 2010/0306075 A1 | 12/2010 | Drance |
| 2010/0306076 A1 | 12/2010 | Taveau |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0312724 A1 | 12/2010 | Pinckney |
| 2010/0325041 A1 | 12/2010 | Berardi |
| 2010/0332262 A1 | 12/2010 | Horvitz |
| 2010/0332283 A1 | 12/2010 | Ng |
| 2011/0004498 A1 | 1/2011 | Readshaw |
| 2011/0010292 A1 | 1/2011 | Giordano |
| 2011/0016047 A1 | 1/2011 | Wu |
| 2011/0016320 A1 | 1/2011 | Bergsten |
| 2011/0035273 A1 | 2/2011 | Parikh |
| 2011/0040640 A1 | 2/2011 | Erikson |
| 2011/0040655 A1 | 2/2011 | Hendrickson |
| 2011/0047017 A1 | 2/2011 | Lieblang |
| 2011/0047075 A1 | 2/2011 | Fourez |
| 2011/0047076 A1 | 2/2011 | Carlson |
| 2011/0078082 A1 | 3/2011 | Gupta |
| 2011/0082789 A1 | 4/2011 | Boyd |
| 2011/0083018 A1 | 4/2011 | Kesanupalli |
| 2011/0087596 A1 | 4/2011 | Dorsey |
| 2011/0087726 A1 | 4/2011 | Shim |
| 2011/0093335 A1 | 4/2011 | Fordyce |
| 2011/0093397 A1 | 4/2011 | Carlson |
| 2011/0099057 A1 | 4/2011 | Tenyer |
| 2011/0105183 A1 | 5/2011 | Hsiao |
| 2011/0106698 A1 | 5/2011 | Issacson |
| 2011/0109737 A1 | 5/2011 | Aben |
| 2011/0119300 A1 | 5/2011 | Marcade |
| 2011/0125597 A1 | 5/2011 | Oder |
| 2011/0137740 A1 | 6/2011 | Bhattacharya |
| 2011/0137742 A1 | 6/2011 | Parikh |
| 2011/0153437 A1 | 6/2011 | Archer |
| 2011/0153498 A1 | 6/2011 | Makhotin |
| 2011/0154466 A1 | 6/2011 | Harper |
| 2011/0161233 A1 | 6/2011 | Tieken |
| 2011/0178896 A1 | 7/2011 | Nakajima |
| 2011/0178926 A1 | 7/2011 | Lindelsee |
| 2011/0180598 A1 | 7/2011 | Morgan |
| 2011/0184827 A1 | 7/2011 | Hubert |
| 2011/0191244 A1 | 8/2011 | Dai |
| 2011/0208418 A1 | 8/2011 | Looney |
| 2011/0215146 A1 | 9/2011 | Shams |
| 2011/0218870 A1 | 9/2011 | Shams |
| 2011/0221692 A1 | 9/2011 | Seydoux |
| 2011/0238474 A1 | 9/2011 | Carr |
| 2011/0238511 A1 | 9/2011 | Park |
| 2011/0238573 A1 | 9/2011 | Varadarajan |
| 2011/0246290 A1 | 10/2011 | Howard |
| 2011/0246317 A1 | 10/2011 | Coppinger |
| 2011/0251892 A1* | 10/2011 | Laracey .......... G06Q 30/0253 705/14.51 |
| 2011/0258049 A1 | 10/2011 | Ramer |
| 2011/0258111 A1 | 10/2011 | Raj |

(56) References Cited

U.S. PATENT DOCUMENTS

| | | |
|---|---|---|
| 2011/0258123 A1 | 10/2011 | Dawkins |
| 2011/0270665 A1 | 11/2011 | Kim |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0282780 A1 | 11/2011 | French |
| 2011/0288684 A1 | 11/2011 | Farlow |
| 2011/0295745 A1 | 12/2011 | White |
| 2011/0296508 A1 | 12/2011 | Os |
| 2011/0302081 A1 | 12/2011 | Saunders |
| 2011/0312423 A1 | 12/2011 | Mosites |
| 2011/0320344 A1 | 12/2011 | Faith |
| 2011/0320345 A1 | 12/2011 | Taveau |
| 2012/0005026 A1 | 1/2012 | Khan |
| 2012/0011009 A1 | 1/2012 | Lindsey |
| 2012/0011063 A1 | 1/2012 | Killian |
| 2012/0016731 A1 | 1/2012 | Smith |
| 2012/0022943 A1 | 1/2012 | Howard |
| 2012/0023026 A1 | 1/2012 | Chen |
| 2012/0023417 A1 | 1/2012 | Nesladek |
| 2012/0023567 A1 | 1/2012 | Hammad |
| 2012/0028609 A1 | 2/2012 | Hruska |
| 2012/0030047 A1 | 2/2012 | Fuentes |
| 2012/0030101 A1 | 2/2012 | Boyd |
| 2012/0035998 A1 | 2/2012 | Chien |
| 2012/0036071 A1 | 2/2012 | Fulton |
| 2012/0041881 A1 | 2/2012 | Basu |
| 2012/0047237 A1 | 2/2012 | Arvidsson |
| 2012/0066065 A1 | 3/2012 | Switzer |
| 2012/0066078 A1 | 3/2012 | Kingston |
| 2012/0072311 A1 | 3/2012 | Khan |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0084132 A1 | 4/2012 | Khan |
| 2012/0084204 A1 | 4/2012 | Castell |
| 2012/0095852 A1 | 4/2012 | Bauer |
| 2012/0095865 A1 | 4/2012 | Doherty |
| 2012/0095895 A1 | 4/2012 | Aston |
| 2012/0101881 A1 | 4/2012 | Taylor |
| 2012/0110044 A1 | 5/2012 | Nagpal |
| 2012/0116902 A1 | 5/2012 | Cardina |
| 2012/0116966 A1 | 5/2012 | Tan |
| 2012/0118950 A1 | 5/2012 | Belk |
| 2012/0123838 A1 | 5/2012 | Sparks |
| 2012/0123882 A1 | 5/2012 | Carlson |
| 2012/0123924 A1 | 5/2012 | Rose |
| 2012/0123940 A1 | 5/2012 | Killian |
| 2012/0124496 A1 | 5/2012 | Rose |
| 2012/0129514 A1 | 5/2012 | Beenau |
| 2012/0130794 A1 | 5/2012 | Strieder |
| 2012/0136780 A1 | 5/2012 | El-Awady |
| 2012/0143706 A1* | 6/2012 | Crake .................. G06Q 20/206 705/18 |
| 2012/0143767 A1 | 6/2012 | Abadir |
| 2012/0143772 A1 | 6/2012 | Abadir |
| 2012/0150750 A1* | 6/2012 | Law .................. G06Q 20/3229 705/76 |
| 2012/0158580 A1 | 6/2012 | Eram |
| 2012/0158589 A1 | 6/2012 | Katzin |
| 2012/0158593 A1 | 6/2012 | Garfinkle |
| 2012/0158792 A1 | 6/2012 | MacLaurin |
| 2012/0158893 A1 | 6/2012 | Boyns |
| 2012/0159163 A1 | 6/2012 | von Behren |
| 2012/0165978 A1 | 6/2012 | Li |
| 2012/0166333 A1 | 6/2012 | von Behren |
| 2012/0166655 A1 | 6/2012 | Maddali |
| 2012/0173431 A1 | 7/2012 | Ritchie |
| 2012/0173962 A1 | 7/2012 | Oh |
| 2012/0185386 A1 | 7/2012 | Salama |
| 2012/0190386 A1 | 7/2012 | Anderson |
| 2012/0197691 A1 | 8/2012 | Grigg |
| 2012/0197794 A1 | 8/2012 | Grigg |
| 2012/0197807 A1 | 8/2012 | Schlesser |
| 2012/0203662 A1 | 8/2012 | Morgan |
| 2012/0203664 A1 | 8/2012 | Torossian |
| 2012/0203665 A1 | 8/2012 | Morgan |
| 2012/0203666 A1 | 8/2012 | Torossian |
| 2012/0203673 A1 | 8/2012 | Morgan |
| 2012/0209735 A1 | 8/2012 | Subramanian |
| 2012/0209749 A1* | 8/2012 | Hammad .................. G06Q 20/20 705/27.1 |
| 2012/0209773 A1* | 8/2012 | Ranganathan ..... G06Q 20/3224 705/44 |
| 2012/0215640 A1 | 8/2012 | Ramer |
| 2012/0215648 A1 | 8/2012 | Rose |
| 2012/0215650 A1 | 8/2012 | Oba |
| 2012/0215684 A1 | 8/2012 | Kidron |
| 2012/0215688 A1 | 8/2012 | Musser |
| 2012/0215696 A1 | 8/2012 | Salonen |
| 2012/0221421 A1 | 8/2012 | Hammad |
| 2012/0221502 A1 | 8/2012 | Jerram |
| 2012/0226582 A1 | 9/2012 | Hammad |
| 2012/0231844 A1 | 9/2012 | Coppinger |
| 2012/0233004 A1 | 9/2012 | Bercaw |
| 2012/0233170 A1 | 9/2012 | Musgrove |
| 2012/0239417 A1 | 9/2012 | Pourfallah |
| 2012/0239556 A1 | 9/2012 | Magruder |
| 2012/0239560 A1 | 9/2012 | Pourfallah |
| 2012/0246070 A1 | 9/2012 | Vadhri |
| 2012/0246071 A1 | 9/2012 | Jain |
| 2012/0246079 A1 | 9/2012 | Wilson |
| 2012/0254108 A1 | 10/2012 | Wedewer |
| 2012/0259763 A1 | 10/2012 | Pessin |
| 2012/0265631 A1 | 10/2012 | Cronic |
| 2012/0265685 A1 | 10/2012 | Brudnicki |
| 2012/0271770 A1 | 10/2012 | Harris |
| 2012/0284035 A1 | 11/2012 | Gillin |
| 2012/0290472 A1* | 11/2012 | Mullen .................. G06Q 10/00 705/39 |
| 2012/0297446 A1 | 11/2012 | Webb |
| 2012/0300932 A1 | 11/2012 | Cambridge |
| 2012/0303425 A1 | 11/2012 | Katzin |
| 2012/0303503 A1 | 11/2012 | Cambridge |
| 2012/0303736 A1 | 11/2012 | Novotny |
| 2012/0303961 A1 | 11/2012 | Kean |
| 2012/0304273 A1 | 11/2012 | Bailey |
| 2012/0310725 A1 | 12/2012 | Chien |
| 2012/0310826 A1 | 12/2012 | Chatterjee |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317149 A1 | 12/2012 | Jagota |
| 2012/0323664 A1 | 12/2012 | Klems |
| 2012/0330874 A1 | 12/2012 | Jerram |
| 2013/0013499 A1 | 1/2013 | Kalgi |
| 2013/0017784 A1 | 1/2013 | Fisher |
| 2013/0018757 A1 | 1/2013 | Anderson |
| 2013/0019098 A1 | 1/2013 | Gupta |
| 2013/0024364 A1 | 1/2013 | Shrivastava |
| 2013/0024371 A1 | 1/2013 | Hariramani |
| 2013/0024916 A1 | 1/2013 | Evans |
| 2013/0030828 A1 | 1/2013 | Pourfallah |
| 2013/0030964 A1* | 1/2013 | Nuzzi .................. G06Q 30/04 705/30 |
| 2013/0031006 A1 | 1/2013 | McCullagh |
| 2013/0054337 A1 | 2/2013 | Brendell |
| 2013/0054454 A1 | 2/2013 | Purves |
| 2013/0054466 A1 | 2/2013 | Muscato |
| 2013/0054470 A1 | 2/2013 | Campos |
| 2013/0054474 A1 | 2/2013 | Yeager |
| 2013/0080238 A1 | 3/2013 | Kelly |
| 2013/0081122 A1 | 3/2013 | Svigals |
| 2013/0085877 A1 | 4/2013 | Ruehrig |
| 2013/0090750 A1 | 4/2013 | Herrman |
| 2013/0091028 A1 | 4/2013 | Oder |
| 2013/0103574 A1 | 4/2013 | Conrad |
| 2013/0110658 A1 | 5/2013 | Lyman |

(56) References Cited

U.S. PATENT DOCUMENTS

| | | | |
|---|---|---|---|
| 2013/0110678 A1* | 5/2013 | Vigier | G06Q 20/20 |
| | | | 705/26.61 |
| 2013/0111599 A1 | 5/2013 | Gargiulo | |
| 2013/0117170 A1 | 5/2013 | Coppinger | |
| 2013/0117185 A1 | 5/2013 | Collison | |
| 2013/0124290 A1 | 5/2013 | Fisher | |
| 2013/0124291 A1 | 5/2013 | Fisher | |
| 2013/0124364 A1 | 5/2013 | Mittal | |
| 2013/0138525 A1 | 5/2013 | Bercaw | |
| 2013/0144785 A1 | 6/2013 | Karpenko | |
| 2013/0144888 A1 | 6/2013 | Faith | |
| 2013/0144957 A1 | 6/2013 | Sherman | |
| 2013/0145148 A1 | 6/2013 | Shablygin | |
| 2013/0145172 A1 | 6/2013 | Shablygin | |
| 2013/0151417 A1 | 6/2013 | Gupta | |
| 2013/0159081 A1 | 6/2013 | Shastry | |
| 2013/0159112 A1 | 6/2013 | Schultz | |
| 2013/0159154 A1 | 6/2013 | Purves | |
| 2013/0159178 A1 | 6/2013 | Colon | |
| 2013/0159184 A1 | 6/2013 | Thaw | |
| 2013/0159196 A1* | 6/2013 | DiZoglio | G06Q 20/20 |
| | | | 705/72 |
| 2013/0166332 A1* | 6/2013 | Hammad | G06Q 20/12 |
| | | | 705/5 |
| 2013/0166402 A1 | 6/2013 | Parento | |
| 2013/0166456 A1 | 6/2013 | Zhang | |
| 2013/0166621 A1 | 6/2013 | Zhu | |
| 2013/0173404 A1* | 7/2013 | Scipioni | G06Q 30/0282 |
| | | | 705/16 |
| 2013/0173736 A1 | 7/2013 | Krzeminski | |
| 2013/0179340 A1 | 7/2013 | Alba | |
| 2013/0185202 A1 | 7/2013 | Goldthwaite | |
| 2013/0191286 A1 | 7/2013 | Cronic | |
| 2013/0191289 A1 | 7/2013 | Cronic | |
| 2013/0198071 A1 | 8/2013 | Jurss | |
| 2013/0198080 A1 | 8/2013 | Anderson | |
| 2013/0200146 A1 | 8/2013 | Moghadam | |
| 2013/0204776 A1* | 8/2013 | King | G06Q 40/02 |
| | | | 705/39 |
| 2013/0204787 A1 | 8/2013 | Dubois | |
| 2013/0204793 A1 | 8/2013 | Kerridge | |
| 2013/0212007 A1 | 8/2013 | Mattsson | |
| 2013/0212017 A1 | 8/2013 | Bangia | |
| 2013/0212019 A1 | 8/2013 | Mattsson | |
| 2013/0212024 A1 | 8/2013 | Mattsson | |
| 2013/0212026 A1 | 8/2013 | Powell | |
| 2013/0212666 A1 | 8/2013 | Mattsson | |
| 2013/0218640 A1 | 8/2013 | Kidder | |
| 2013/0218657 A1 | 8/2013 | Salmon | |
| 2013/0218698 A1 | 8/2013 | Moon | |
| 2013/0218721 A1 | 8/2013 | Borhan | |
| 2013/0218765 A1* | 8/2013 | Hammad | G06Q 20/384 |
| | | | 705/41 |
| 2013/0218769 A1 | 8/2013 | Pourfallah | |
| 2013/0226799 A1 | 8/2013 | Raj | |
| 2013/0226813 A1 | 8/2013 | Voltz | |
| 2013/0246199 A1 | 9/2013 | Carlson | |
| 2013/0246202 A1 | 9/2013 | Tobin | |
| 2013/0246203 A1 | 9/2013 | Laracey | |
| 2013/0246258 A1 | 9/2013 | Dessert | |
| 2013/0246259 A1 | 9/2013 | Dessert | |
| 2013/0246261 A1 | 9/2013 | Purves | |
| 2013/0246267 A1 | 9/2013 | Tobin | |
| 2013/0254028 A1 | 9/2013 | Salel | |
| 2013/0254052 A1 | 9/2013 | Royyuru | |
| 2013/0254102 A1 | 9/2013 | Royyuru | |
| 2013/0254117 A1 | 9/2013 | von Mueller | |
| 2013/0262296 A1 | 10/2013 | Thomas | |
| 2013/0262302 A1 | 10/2013 | Lettow | |
| 2013/0262315 A1 | 10/2013 | Hruska | |
| 2013/0262316 A1 | 10/2013 | Hruska | |
| 2013/0262317 A1 | 10/2013 | Collinge | |
| 2013/0268437 A1 | 10/2013 | Desai | |
| 2013/0275300 A1 | 10/2013 | Killian | |
| 2013/0275307 A1 | 10/2013 | Khan | |
| 2013/0275308 A1 | 10/2013 | Paraskeva | |
| 2013/0282502 A1 | 10/2013 | Jooste | |
| 2013/0282575 A1 | 10/2013 | Mullen | |
| 2013/0282588 A1 | 10/2013 | Hruska | |
| 2013/0297501 A1 | 11/2013 | Monk | |
| 2013/0297504 A1 | 11/2013 | Nwokolo | |
| 2013/0297508 A1 | 11/2013 | Belamant | |
| 2013/0304649 A1 | 11/2013 | Cronic | |
| 2013/0308778 A1 | 11/2013 | Fosmark | |
| 2013/0311382 A1 | 11/2013 | Fosmark | |
| 2013/0317982 A1 | 11/2013 | Mengerink | |
| 2013/0325579 A1 | 12/2013 | Salmon | |
| 2013/0332344 A1 | 12/2013 | Weber | |
| 2013/0339240 A1 | 12/2013 | Anderson | |
| 2013/0339253 A1 | 12/2013 | Sincai | |
| 2013/0346302 A1 | 12/2013 | Purves | |
| 2013/0346305 A1 | 12/2013 | Mendes | |
| 2013/0346314 A1 | 12/2013 | Mogollon | |
| 2014/0006195 A1* | 1/2014 | Wilson | G06Q 20/3274 |
| | | | 705/21 |
| 2014/0006198 A1 | 1/2014 | Daly | |
| 2014/0006277 A1 | 1/2014 | Rao | |
| 2014/0006283 A1 | 1/2014 | Hogg | |
| 2014/0007213 A1 | 1/2014 | Sanin | |
| 2014/0013106 A1 | 1/2014 | Path | |
| 2014/0013114 A1 | 1/2014 | Path | |
| 2014/0013452 A1 | 1/2014 | Aissi | |
| 2014/0019352 A1 | 1/2014 | Shrivastava | |
| 2014/0020068 A1 | 1/2014 | Desai | |
| 2014/0025581 A1 | 1/2014 | Caiman | |
| 2014/0025585 A1 | 1/2014 | Caiman | |
| 2014/0025958 A1 | 1/2014 | Caiman | |
| 2014/0032417 A1 | 1/2014 | Mattsson | |
| 2014/0032418 A1 | 1/2014 | Weber | |
| 2014/0040001 A1* | 2/2014 | Harvey | G06Q 10/00 |
| | | | 705/14.26 |
| 2014/0040127 A1 | 2/2014 | Chatterjee | |
| 2014/0040137 A1 | 2/2014 | Carlson | |
| 2014/0040139 A1 | 2/2014 | Brudnicki | |
| 2014/0040144 A1 | 2/2014 | Plomske | |
| 2014/0040145 A1 | 2/2014 | Ozvat | |
| 2014/0040148 A1 | 2/2014 | Ozvat | |
| 2014/0040628 A1 | 2/2014 | Fort | |
| 2014/0041018 A1 | 2/2014 | Bomar | |
| 2014/0046853 A1 | 2/2014 | Spies | |
| 2014/0047517 A1 | 2/2014 | Ding | |
| 2014/0047551 A1 | 2/2014 | Nagasundaram | |
| 2014/0052532 A1 | 2/2014 | Tsai | |
| 2014/0052620 A1 | 2/2014 | Rogers | |
| 2014/0052637 A1 | 2/2014 | Jooste | |
| 2014/0068706 A1 | 3/2014 | Aissi | |
| 2014/0074637 A1 | 3/2014 | Hammad | |
| 2014/0095589 A1 | 4/2014 | Johnson | |
| 2014/0108172 A1 | 4/2014 | Weber | |
| 2014/0108197 A1 | 4/2014 | Smith | |
| 2014/0114857 A1 | 4/2014 | Griggs | |
| 2014/0136945 A1 | 5/2014 | Ligman | |
| 2014/0143137 A1 | 5/2014 | Carlson | |
| 2014/0164176 A1 | 6/2014 | Kitlyar | |
| 2014/0164243 A1 | 6/2014 | Aabye | |
| 2014/0188586 A1 | 7/2014 | Carpenter | |
| 2014/0294701 A1 | 10/2014 | Dai | |
| 2014/0297534 A1 | 10/2014 | Patterson | |
| 2014/0310080 A1 | 10/2014 | Salmon | |
| 2014/0310183 A1 | 10/2014 | Weber | |
| 2014/0330721 A1 | 11/2014 | Wang | |
| 2014/0330722 A1 | 11/2014 | Laxminarayanan | |
| 2014/0331265 A1 | 11/2014 | Mozell | |
| 2014/0337175 A1 | 11/2014 | Katzin | |
| 2014/0337236 A1 | 11/2014 | Wong | |
| 2014/0344153 A1 | 11/2014 | Raj | |
| 2014/0365295 A1 | 12/2014 | Postrel | |
| 2014/0372308 A1 | 12/2014 | Sheets | |
| 2015/0019443 A1 | 1/2015 | Sheets | |
| 2015/0019944 A1 | 1/2015 | Kalgi | |
| 2015/0026049 A1 | 1/2015 | Theurer | |
| 2015/0032625 A1 | 1/2015 | Dill | |
| 2015/0032626 A1 | 1/2015 | Dill | |

(56) References Cited

U.S. PATENT DOCUMENTS

| | | |
|---|---|---|
| 2015/0032627 A1 | 1/2015 | Dill |
| 2015/0046338 A1 | 2/2015 | Laxminarayanan |
| 2015/0046339 A1 | 2/2015 | Wong |
| 2015/0052064 A1 | 2/2015 | Karpenko |
| 2015/0088756 A1 | 3/2015 | Makhotin |
| 2015/0089350 A1 | 3/2015 | Davis |
| 2015/0106239 A1 | 4/2015 | Gaddam |
| 2015/0112870 A1 | 4/2015 | Nagasundaram |
| 2015/0112871 A1 | 4/2015 | Kumnick |
| 2015/0120472 A1 | 4/2015 | Aabye |
| 2015/0127529 A1 | 5/2015 | Makhotin |
| 2015/0127547 A1 | 5/2015 | Powell |
| 2015/0140960 A1 | 5/2015 | Powell |
| 2015/0142673 A1 | 5/2015 | Nelsen |
| 2015/0154588 A1 | 6/2015 | Purves |
| 2015/0161597 A1 | 6/2015 | Subramanian |
| 2015/0178724 A1 | 6/2015 | Ngo |
| 2015/0180836 A1 | 6/2015 | Wong |
| 2015/0186864 A1 | 7/2015 | Jones |
| 2015/0193222 A1 | 7/2015 | Pirzadeh |
| 2015/0195133 A1 | 7/2015 | Sheets |
| 2015/0199679 A1 | 7/2015 | Palanisamy |
| 2015/0199689 A1 | 7/2015 | Kumnick |
| 2015/0220917 A1 | 8/2015 | Aabye |
| 2015/0248664 A1* | 9/2015 | Makhdumi ........ G06Q 20/3276 235/380 |
| 2015/0269566 A1 | 9/2015 | Gaddam |
| 2015/0302453 A1 | 10/2015 | Tietzen |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339767 A1 | 11/2015 | Chen |
| 2015/0356560 A1 | 12/2015 | Shastry |
| 2016/0028550 A1 | 1/2016 | Gaddam |
| 2016/0042263 A1 | 2/2016 | Gaddam |
| 2016/0065370 A1 | 3/2016 | Le Saint |
| 2016/0092696 A1 | 3/2016 | Guglani |
| 2016/0092872 A1 | 3/2016 | Prakash |
| 2016/0103675 A1 | 4/2016 | Aabye |
| 2016/0119296 A1 | 4/2016 | Laxminarayanan |
| 2016/0224976 A1 | 8/2016 | Basu |
| 2016/0291920 A1 | 10/2016 | Sirpal |
| 2016/0379192 A1 | 12/2016 | Purves |
| 2017/0046696 A1 | 2/2017 | Powell |
| 2017/0103387 A1 | 4/2017 | Weber |
| 2017/0134479 A1 | 5/2017 | Kalgi |
| 2017/0220818 A1 | 8/2017 | Nagasundaram |
| 2017/0228723 A1 | 8/2017 | Taylor |
| 2017/0300314 A1 | 10/2017 | Lopyrev |
| 2017/0346876 A1 | 11/2017 | Lim |
| 2018/0075081 A1 | 3/2018 | Chipman |
| 2019/0266604 A1 | 8/2019 | Desai |
| 2019/0385146 A1 | 12/2019 | Priest |

FOREIGN PATENT DOCUMENTS

| | | | |
|---|---|---|---|
| CN | 1928907 A | 3/2007 | |
| CN | 101025806 A | 8/2007 | |
| CN | 101075316 A | 11/2007 | |
| CN | 101231727 A | 7/2008 | |
| CN | 101334876 A | 12/2008 | |
| CN | 101388125 A | 3/2009 | |
| CN | 101719255 A | 6/2010 | |
| CN | 101840550 A | 9/2010 | |
| CN | 101924690 A | 12/2010 | |
| CN | 101945127 A | 1/2011 | |
| CN | 101958025 A | 1/2011 | |
| CN | 102143290 A | 8/2011 | |
| CN | 102779304 | 11/2012 | |
| CN | 102947847 | 2/2013 | |
| CN | 103635920 * | 12/2014 | ............ G06Q 30/00 |
| CN | 105027153 * | 11/2015 | ............ G06Q 20/36 |
| EP | 0745961 A2 | 12/1996 | |
| EP | 0855659 A1 | 7/1998 | |
| EP | 1921578 A1 | 5/2008 | |
| EP | 2156397 A1 | 2/2010 | |
| EP | 2503496 * | 9/2012 | ............ G06Q 20/16 |
| JP | 2001344544 A | 12/2001 | |
| JP | 2005004621 A | 1/2005 | |
| JP | 2007328549 | 12/2007 | |
| JP | 2008527495 A | 7/2008 | |
| JP | 200854521 | 12/2008 | |
| JP | 2009151730 A | 7/2009 | |
| JP | 2009176259 | 8/2009 | |
| JP | 2011186660 | 9/2011 | |
| JP | 2012027824 A | 2/2012 | |
| KR | 20000058839 A | 10/2000 | |
| KR | 20010055426 | 7/2001 | |
| KR | 100432430 B1 | 5/2004 | |
| KR | 20060117177 A | 11/2006 | |
| KR | 20070104087 A | 10/2007 | |
| SG | 2013069539 | 10/2013 | |
| WO | 2000046769 A1 | 8/2000 | |
| WO | 2001035304 A1 | 5/2001 | |
| WO | 0165502 A2 | 9/2001 | |
| WO | 2003001866 A1 | 1/2003 | |
| WO | 03023674 A1 | 3/2003 | |
| WO | 2003046697 A2 | 6/2003 | |
| WO | 2003071386 A2 | 8/2003 | |
| WO | 2003083737 A1 | 10/2003 | |
| WO | 2004042536 A2 | 5/2004 | |
| WO | 2005079254 A2 | 9/2005 | |
| WO | 2006113834 A2 | 10/2006 | |
| WO | 2009032523 A1 | 3/2009 | |
| WO | 2010078522 A1 | 7/2010 | |
| WO | 2010148704 A1 | 12/2010 | |
| WO | 2010148737 A1 | 12/2010 | |
| WO | 2012068078 A2 | 5/2012 | |
| WO | 2012098556 A1 | 7/2012 | |
| WO | 2012112822 A2 | 8/2012 | |
| WO | 2012142370 A2 | 10/2012 | |
| WO | 2012167941 A1 | 12/2012 | |
| WO | 2013048538 A1 | 4/2013 | |
| WO | 2013056104 A1 | 4/2013 | |
| WO | 2013119914 A1 | 8/2013 | |
| WO | 2013179271 A2 | 12/2013 | |
| WO | WO 201505136 * | 4/2015 | ............ G06Q 20/32 |

OTHER PUBLICATIONS

Indian Examination Report for Application No. 8894/DELNP/2015, dated Oct. 21, 2019, 7 pages.
Notice of Allowance dated Nov. 8, 2019 for U.S. Appl. No. 14/698,317 (pp. 1-10).
Office Action dated Oct. 29, 2019 for U.S. Appl. No. 14/216,382 (pp. 1-8).
Office Action dated Oct. 31, 2019 for U.S. Appl. No. 15/627,085 (pp. 1-9).
Office Action dated Dec. 12, 2019 for U.S. Appl. No. 14/935,122 (pp. 1-12).
Office Action dated Jan. 17, 2019 for U.S. Appl. No. 14/216,382 (pp. 1-7).
Ex Parte Quayle Action dated Jan. 18, 2019 for U.S. Appl. No. 16/182,288 (pp. 1-5).
Chinese Office Action (with English language translation) dated Jan. 30, 2019 for Application No. 201280019629.X, 10 pages.
Chinese Office Action (with English language translation) for Application No. 201480023694.9 dated Dec. 3, 2018, 17 pages.
Notice of Allowance dated Feb. 27, 2019 for U.S. Appl. No. 15/839,493 (pp. 1-9).
Office Action dated Mar. 1, 2019 for U.S. Appl. No. 14/698,317 (pp. 1-11).
Notice of Allowance dated May 30, 2019 for U.S. Appl. No. 13/758,472 (pp. 1-10).
Office Action dated May 14, 2019 for U.S. Appl. No. 14/935,122 (pp. 1-11).
Office Action dated Jun. 27, 2019 for U.S. Appl. No. 13/629,006 (pp. 1-7).
Office Action dated Jul. 10, 2019 for U.S. Appl. No. 13/398,817 (pp. 1-8).

(56) References Cited

OTHER PUBLICATIONS

Chinese Office Action (with English language translation) for Application No. 201480023694.9, dated Jun. 26, 2019, 7 pages.
David Breitkopf, "ACS to Take Over Mich. WC Distribution Program", American Banker, New York, NY: Jul. 20, 2006, vol. 171. Issue 138, p. 6.
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.
Gopalan, NP & Selvan, B Siva. TCP/IP Illustrated. Prentice-Hall. 2008. pp. 101-102, 175-176 and 235. 7 pages.
Shadrach, D.C. "A Weighted Metric Based Adaptive Algorithm for Web Server Load Balancing." 2009 Third International Symposium on Intelligent Information Technology Application, http://ieeexplore.IEEE.org/xpl/articleDetails.jsp?amumber=5369384, pp. 449-452.
International Search Report for PCT/US09/54921 dated Oct. 21, 2009. (2 pages).
International Search Report and Written Opinion for PCT/US2010/ 048344 dated Nov. 15, 2010. (7 pages).
International Search Report and Written Opinion for PCT/US2010/ 041860 dated Feb. 1, 2011. (8 pages).
International Search Report and Written Opinion for PCT/US12/ 41437 dated Aug. 24, 2012. (20 pages).
International Search Report for PCT/US11/49393 dated Dec. 5, 2011. (2 pages).
International Search Report and Written Opinion for PCT/US11/ 57179 dated Jan. 5, 2012. (7 pages).
International Search Report and Written Opinion for PCT/US11/ 57173 dated Mar. 15, 2012. (11 pages).
International Search Report and Written Opinion for PCT/US2012/ 026205, dated May 29, 2012. 2 pages.
International Search Report for PCT/US11/65305 dated Apr. 16, 2012. 2 pages.
International Search Report for PCT/US12/23856 dated Jun. 6, 2012. 3 pages.
International Search Report for PCT/US 12/24772 dated Jul. 24, 2012. 3 pages.
International Search Report for PCT/US12/25530 dated Aug. 7, 2012. 4 pages.
International Search Report PCT/US12/27620 dated Aug. 10, 2012. 3 pages.
International Search Report for PCT/US12/39638 dated Sep. 24, 2012. 4 pages.
International Search Report for PCT/US12/45875 dated Nov. 16, 2012. 4 pages.
International Search Report and Written Opinion for PCT/US12/ 47092 dated Nov. 26, 2012. 11 pages.
International Search Report for PCT/US12/57577 dated Nov. 29, 2012. 2 pages.
International Search Report and Written Opinion for PCT/US12/ 57528 dated Dec. 17, 2012. 8 pages.
International Search Report and Written Opinion for PCT/US12/ 66898 dated Feb. 11, 2013. 14 pages.
International Search Report and Written Opinion for PCT/US12/ 56759 dated Feb. 25, 2013. 12 pages.
International Search Report and Written Opinion for PCT/US2013/ 020411 dated May 21, 2013. 18 pages.
Written Opinion for PCT/US12/27620 dated Aug. 10, 2012. 5 pages.
International Search Report and Written Opinion for PCT/US2010/ 033861 dated Dec. 9, 2010 (7 pages).
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report and Written Opinion for PCT/US2011/ 024941 dated Apr. 19, 2011 (6 pages).
International Search Report and Written Opinion for PCT/US2010/ 046833 dated Apr. 26, 2011 (8 pages).
International Search Report and Written Opinion for PCT/US2011/ 26734 dated Apr. 29, 2011 (7 pages).
International Search Report and Written Opinion for PCT/US2011/ 29790 dated May 19, 2011 (6 pages).
International Search Report for PCT/US2011/035268 dated Aug. 5, 2011 (3 pages).
International Search Report and Written Opinion for PCT/US2011/ 032093 dated Aug. 24, 2011 (11 pages).
International Search Report and Written Opinion for PCT/US12/ 37597 dated Sep. 21, 2012 (11 pages).
International Search Report and Written Opinion for PCT/US2012/ 045601 dated Feb. 1, 2013. 11 pages.
International Search Report and Written Opinion for PCT/US12/ 65738 dated Apr. 19, 2013. 9 pages.
U.S. Appl. No. 61/250,440, filed Oct. 9, 2009, entitled "Systems and Methods To Provide Loyalty Programs".
Australian Patent Office, Patent Examination Report No. 2 in Australian Patent Application No. 2012217606, dated Jun. 15, 2016, 6 pages.
Cash et al., U.S. Appl. No. 15/041,495 (unpublished), Peer Forward Authorization of Digital Requests filed Feb. 11, 2016.
Dizaj, Mohammad Vahid Alizadeh, Moghaddam, Rexa Askari, Momenebellah, Samad, New Mobile Payment Protocol: Mobile Pay Center Protocol 2 (MPCP2) By Using New Key Agreement Protocol: VAM, 3d International Conference on Electronics Computer Technology, vol. 2, Apr. 2011, pp. 12-18.
State Intellectual Property Office of the People's Republic of China, First Office Action in Chinese Application No. 201280018719.7, dated Jul. 4, 2016, 15 pages.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Gaddam et al., U.S. Appl. No. 62/053,736 (unpublished), Completing Transactions Without a User Payment Device, filed Sep. 22, 2014.
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
International Search Report and Written Opinion for PCT/US2014/ 030517, dated Aug. 18, 2014. (9 pages).
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.
Le Saint et al., U.S. Appl. No. 15/008,388 (unpublished), Methods for Secure Credential Provisioning, filed Jan. 27, 2016.
Mcguire, U.S. Appl. No. 14/600,523 (unpublished), Secure Payment Processing Usnig Authorization Request, filed Jan. 20, 2015.
Patterson, U.S. Appl. No. 15/019,157 (unpublished), Token Processing Utilizing Multiple Authorizations, filed Feb. 9, 2016.
Patterson, U.S. Appl. No. 62/054,346 (unpublished), Mirrored Token Vault, filed Sep. 23, 2014.
Hoverson et al., U.S. Appl. No. 62/038,174 (unpublished), Customized Payment Gateway, filed Aug. 15, 2014.
Stubbs et al., U.S. Appl. No. 62/103,522 (unpublished), Methods and Systems for Wallet Provider Provisioning filed Jan. 14, 2015.
Prakash et al., U.S. Appl. No. 14/955,716 (unpublished), Provisioning Platform for Machine-To-Machine Devices, filed Dec. 1, 2015.
Prakash et al., U.S. Appl. No. 62/037,033 (unpublished), Sharing Payment Token, filed Aug. 13, 2014.
Galland et al., U.S. Appl. No. 62/128,709 (unpublished), Tokenizing Transaction Amounts, filed Mar. 5, 2015.
IP Australia, Patent Examination Report No. 1, Australian Application No. 2012220669, dated Sep. 8, 2014, 6 pages.

(56) References Cited

OTHER PUBLICATIONS

State Intellectual Property of the People's Republic of China, First Office Action in Chinese Application No. 201280019629.X, dated Aug. 1, 2016, 15 pages.
Smartphone e-payment and Google AD send blog, 'Google Wallet on Smartphone', <http://stockpedia.blogspot.kr/2011/06/google-wallet.html> Jun. 10, 2011, pp. 1-3.
Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Wong et al., U.S. Appl. No. 14/966,948 (unpublished), Automated Access Data Provisioning filed Dec. 11, 2015.
Wong et al., U.S. Appl. No. 61/879,362 (unpublished), Systemsand Methods for Managing Mobile Cardholder Verification Methods filed Sep. 18, 2013.
European Patent Office, Supplementary European Search Report and European Search Opinion, in EP Application No. 12749451.6, dated Apr. 20, 2015, 7 pages.
International Search Report and Written Opinion for PCT/US13/46875, dated Oct. 24, 2013, 14 pages.
IP Australia, Patent Examination Report No. 2, Australian Application No. 2012220669, dated Jun. 8, 2016, 4 pages.
International Search Report and Writtten Opinion for PCT/US2011/039178 dated Sep. 16, 2011 (7 pages).
International Search Report and Written Opinion for PCT/US11/57180 dated Mar. 15, 2012 (11 pages).
International Search Report and Written Opinion for PCT/US12/55636 dated Nov. 30, 2012. 2 pages.
Powell, U.S. Appl. No. 61/892,407 (unpublished), Issuer Over-The-Air Update Method and System filed Oct. 17, 2013.
Dimmick, U.S. Appl. No. 14/952,444 (unpublished), Tokenization Request Via Access Device, filed Nov. 25, 2015.
Dimmick, U.S. Appl. No. 14/952,514 (unpublished), Systems Communications With Non-Sensitive Identifiers, filed Nov. 25, 2015.
International Preliminary Report on Patentability dated Jan. 14, 2014 cited in related/corresponding International PCT Appl. No. PCT/US2012/045875 filed Jul. 7, 2012. (11 pages).
Vitt, Elizabeth et al. Data Integration Solutions for Master Data Management (Feb. 2006). https://technet.microsoft.com/en-US/library/aa964123(v=sql.90).aspx (19 pages).
Vitt, Elizabeth, et al. "Microsoft SQL Server 2005 Analysis Services Performance Guide." White Paper, White Paper (2007). (116 pages).
Stack Exchange, Why aren't there automated translators from one programming language to another, 2010 (5 pages).
McCarney et al., "Tapas: Design, Implementation, and Usability Evaluation of a Password Manager," Copyright 2012, ACM 978 1-4503-1312-4/12/12, (10 pages).
International Search Report for PCT/US2010/033229 dated Dec. 29, 2010, 8 pages.
International Search Report for PCT/US12/21000 dated May 15, 2012. 2 pages.
International Search Report and Written Opinion for PCT/US2012/027043 dated Jul. 13, 2012. 15 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.

Powell, U.S. Appl. No. 61/926,236 (unpublished), Methods and Systems for Provisioning Mobile Devices With Payment Credentials and Payment Token Identifiers filed Jan. 10, 2014.
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
International Search Report and Written Opinion for PCT/US2010/033229 dated Dec. 29, 2010. (8 pages).
International Search Report and Written Opinion for PCT/US2012/069557 dated Feb. 22, 2013. 8 pages.
International Search Report and Written Opinion for PCT/US2012/057528, dated May 29, 2012. (8 pages).
U.S. Appl. No. 12/940,664 (unpublished), entitled "System and Method for Determining Transaction Distance" filed Nov. 5, 2010.
International Search Report and Written Opinion issued in connection with PCT/US11/42062 dated Sep. 29, 2011 (8 pages).
International Search Report and Written Opinion for PCT/US2013/031084, dated Jun. 4, 2013. 9 pages.
ShopSawy Blog. Feb. 2012. Retrieved from https://web.archive.org/web/20120212104611/http://shopsawy.com/blog. pp. 1-13 (Year: 2012).
Chipman, et al., U.S. Appl. No. 15/265,282 (Unpublished), Self-Cleaning Token Vault, filed Sep. 14, 2016.
U.S. Appl. No. 15/462,658 (Unpublished), Replacing Token on a Multi-Token User Device, filed Mar. 17, 2017.
Sabba et al., U.S. Appl. No. 15/011,366 (unpublished), Token Check Offline, filed Jan. 29, 2016.
Sharma et al., U.S. Appl. No. 62/003,717 (unpublished), Mobile Merchant Application filed May 28, 2014.
International Preliminary Report on Patentability dated Jan. 16, 2014 in related/corresponding PCT Patent Appl. No. PCT/US2012/045601 filed Jul. 5, 2012. (7 pages).
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Petition for Inter Partes Review of U.S. Pat. No. 8,402,555 Challenging Claims 1 -26 Under 35 U.S.C. 312 and 37 C.F.R. 42.104, dated Mar. 22, 2016, before the USPTO Patent Trial and Appeal Board, IPR 2016-00789, 65 pages.
Office Action dated Feb. 28, 2018 for U.S. Appl. No. 14/242,403 (pp. 1-11).
Office Action dated Apr. 12, 2018 for U.S. Appl. No. 13/520,481 (pp. 1-8).
International Search Report and Written Opinion for PCT/US2013/024538, dated May 31, 2013. 15 pages.
Charland et al., Mobile Application Development: Web vs. Native, Apr. 2011, 9 pages.
Lee et al., osgGap: scene graph library for mobile based on hybrid web app framework, Nov. 2013, 4 pages.
Immaneni et al., Hybrid retrieval from the unified web, Mar. 2007, 5 pages.
Gao et al., "A 2D Barcode-Based Mobile Payment System", (2009), XP031561633 (10 pages).
Australian Examination Report for AU2017203295 dated Apr. 19, 2018, 4 pages.
Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Office Action dated May 22, 2018 for U.S. Appl. No. 14/216,382 (pp. 1-8).
Chinese Office Action dated Oct. 10, 2017 for CN Application No. 201280019629.X, 7 pages.
Pan Kexian "Development of the Location-Based Service LBS Application of Intelligent Mobile Phone", Information Technologies, Oct. 25, 2009, pp. 134-137, cited on Oct. 10, 2017 in CN201280019629.
Yang Jingjing "Help Web: Life Search Forerunner" Scientific and Technological Information, Aug. 5, 2010, pp. 36-37, cited on Oct. 10, 2017 in CN201280019629.

(56) References Cited

OTHER PUBLICATIONS

Wang Lepeng et al. "Discuss of Foursquare Pattern and Its Deelopment Strategies in China" Scientific and Technological Information, Aug. 5, 2010, pp. 90-91, cited on Oct. 10, 2017 in CN201280019629.
Chinese Office Action dated Nov. 6, 2017 for CN Application No. 201280018719.7, 24 pages.
Notice of Allowance dated Jun. 27, 2018 for U.S. Appl. No. 13/542,443 (pp. 1-13).
Office Action dated Jun. 22, 2018 for U.S. Appl. No. 13/629,006 (pp. 1-8).
Office Action dated Jun. 21, 2018 for U.S. Appl. No. 14/216,351 (pp. 1-12).
Office Action dated Jun. 27, 2018 for U.S. Appl. No. 15/717,409 (pp. 1-7).
Nunnenkamp, A., et al., "Cooling and squeezing via quadratic optomechanical coupling," Physical Review, vol. A 82, pp. 021806-1-021806-4 (2010).
Olivero, J.J., and Longbothum, R.L., "Empirical fits to the Voigt line width: A brief review," Journal of Quantitative Spectroscopy and Radiative Transfer, vol. 17, Issue 2, pp. 233-236, Feb. 1977.
Perahia, R., et al., "Electrostatically tunable optomechanical "zipper" cavity laser," Applied Physics Letters, vol. 97, No. 19, pp. 191112-1-191112-3 (2010).
Regal, C.A., "Measuring nanomechanical motion with a microwave cavity interferometer," Nature Physics, vol. 4, No. 7, pp. 555-560 (2008).
Rosenberg, J., et al., "Static and dynamic wavelength routing via the gradient optical force," Nature Photonics, vol. 3, No. 8, pp. 478-483 (2009).
Safavi-Naeini, A. H., "Electromagnetically induced transparency and slow light with optomechanics," Nature, vol. 472, No. 7341, pp. 69-73 (2011).
Safavi-Naeini, A.H., and Painter, O., et al., "Proposal for an optomechanical travelling wave phononphoton translator," New Journal Physics, vol. 13, No. 013017, pp. 1-30 (2011).
Safavi-Naeini, A.H., et al., "Optomechanics in an ultrahigh-Q two dimensional photonic crystal cavity," Applied Physics Letter, vol. 97 No. 18, pp. 181106-1-181106-3 (2010).
Schliesser, A., "Highsensitivity monitoring of micromechanical vibration using optical whispering gallery moderesonators," New Journal of Physics, vol. 10, No. 095015, pp. 1-19 (2008).
Serafini, A., et al., "Generation of continuous variable squeezing and entanglement of trapped ions in time-varying potentials," Quantum Information Processing, vol. 8, pp. 619-630, Apr. 2009.
Song, B-S., et al., "Ultra-high-Q photonic double-heterostructure nanocavity," Nature Materials, vol. 4, No. 3, pp. 207-210 (2010).
Sridaran, S., and Bhave, S.A., "Electrostatic acuation of silicon optomechanical resonators," Optics Express, vol. 19, No. 10, pp. 7 (2011).
Stowe, T.D., et al., "Attonewton force detection using ultrathin silicon cantilevers," Applied Physics Letters, vol. 71, Issue 2, pp. 288-290 (1997).
Sun, X., "A superhigh-frequency optoelectromechanical system based on a slotted photonic crystal cavity," Applied Physics Letters, vol. 101, Issue 22, pp. 221116-1-221116-5, American Institute of Physics (2012).
Tadigadapa, S., and Mateti, K., Piezoelectric MEMS sensors: state-of-the-art and perspectives Measurement Science and Technology, vol. 20, No. 9, p. 092001 (2009).
Teufel, J. D., "Sideband cooling of micromechanical motion to the quantum ground state," Nature, vol. 475, No. 7356, pp. 359-363 (2011).
Teufel, J.D., "Circuit cavity electromechanics in the strong-coupling regime," Nature, vol. 471, No. 7337, pp. 204-208 (2011).
Thompson, J.D., et al., "Strong dispersive coupling of a high-finesse cavity to micromechnical membrane," Nature, vol. 452, pp. 72-75 (2008).
Thourhout, D.V., and Roels, J., "Optomechanical device actuation through the optical gradient force," Nature Photonics, vol. 4, pp. 211-217 Macmillan Publishers Limited (2010).
Weis, S., et al., "Optomechanically Induced Transparency," Science, vol. 330, No. 6010, pp. 1520-1523 (2010).
Winger, M., et al., "A chip-scale integrated cavity-electro-optomechanics platform," Optics Express, vol. 19, No. 25, pp. 17 (2011).
Woolley, M.J., et al., "Nanomechanical squeezing with detection via a microwave cavity," Physical Review, vol. 78, No. 06, pp. 062303-1-062303-12 (2008).
Wu, J., et al., "A Low-Noise Low-Offset Capacitive Sensing Amplifier for a 50-.mu.g Hz Monolithic CMOS MEMS Accelerometer," IEEE Journal of Solid-State Circuits, vol. 39, No. 5, pp. 722-730 (2004).
Yazdi, N., and Najafi, K., et al., "Performance limits of a closed-loop micro-g silicon accelerometer with deposited rigid electrodes," Proceedings of the 12th International Conference on Microelectronics, pp. 313-316 (2000).
Yazdi, N., et al., "A high-sensitivity silicon accelerometer with a folded-electrode structure," Journal of Microelectromechanical Systems, vol. 12, Issue 4, pp. 479-486 (2003).
Yazdi, N., et al., "Micromachined inertial sensors," Proceeding of the IEEE, vol. 86, No. 8, pp. 1640-1659 (1998).
Yazdi, N., et al., "Precision readout circuits for capacitive microaccelerometers," Proceedings of IEEE Sensors, vol. 1, pp. 28-31 (2004).
Yin, L., et al., "A low-noise CMOS interface circuit for closed-loop accelerometer," 4th IEEE International Conference on Nano/Micro Engineered and Molecular Systems, pp. 502-505 (2009).
Zwahlen, P., et al., "Navigation grade MEMS accelerometer," IEEE 23rd International Conference on Micro Electro Mechanical Systems (MEMS), pp. 631-634 (2010).
"Cavity opto-mechanics," Wikipedia, accessed at http://web.archive.org/web/20131102145212/http://en.wikipedia.org/wiki/Cavity_opto-mechanics, last modified on Oct. 16, 2013. (6 pages).
"RF MEMS," Wikipedia, accessed at http://web.archive.org/web/20100726064442/http://en.wikipedia.org/wiki/RF_MEMS, last modified Jul. 22, 2010. (8 pages).
Albrecht, T.R., et al., "Frequency modulation detection using high-Q cantilevers for enhanced force microscope sensitivity," Journal of Applied Physics, vol. 69, No. 2, pp. 668-673 (1991).
Alegre, T.P.M, et al., "Optomechanical zipper cavity lasers: theoretical analysis of tuning range and stability," Optic Express, vol. 18, No. 8, pp. 7872-7885 (2010).
Arcizet, O., et al., "Radiation-pressure cooling and optomechanical instability of a micro-mirror," Nature, vol. 444, No. 7115, pp. 71-74 (2006).
Arlett, J.L., et al., "Self-Sensing Micro- and Nanocantilevers with Attonewton-Scale Force Resolution," Nano Letter, vol. 6, No. 5, pp. 1000-1006, American Chemical Society (2006).
Ashkin, A., "Acceleration and Trapping of Particles by Radiation Pressure," Physical Review Letter, vol. 24, No. 4, pp. 156-159 (1970).
Barclay, P.E, et al., "Nonlinear response of silicon photonic crystal microresonators excited via an integrated waveguide and fiber taper," Optic Express, vol. 13, No. 3, pp. 801-820 (2005).
Binnig, G., and Quale, C.F., "Atomic Force Microscope," Physical Review Letter, vol. 56, No. 9, pp. 930-933 (1986).
Braginsky, V.B., et al., "Quantum nondemolition measurements," Science, vol. 209, No. 4456, pp. 547-557 (1980).
Chan, J., et al., "Laser cooling of a nanomechanical oscillator into its quantum ground state," Nature, vol. 478, pp. 89-92 (2011).
Cooper, E.B., et al., "High-resolution micromachined interferometric accelerometer," Applied Physics Letters, vol. 76, No. 22, pp. 3316-3318 (2000).
Eichenfield, M., et al., "A picogram- and nanometre-scale photonic-crystal optomechanical cavity," Nature, vol. 459, No. 7246, pp. 550-556 (2009).
Eichenfield, M., et al., "Optomechanical crystals," Nature, vol. 462, No. 7269, pp. 78-82 (2009).
Ekinci, K.L., and Roukes, M.L., "Nanoelectromechanical systems," Review of Scientific Instrument, vol. 76, pp. 061101-1-061101-12 (2005).

(56) References Cited

OTHER PUBLICATIONS

Favero, I., and Karrai, K., "Optomechanics of deformable optical cavities," Nature Photonics, vol. 3, No. 4, pp. 201-205, Macmillan Publishers Limited (2009).
Fleming, W.J., "New Automotive Sensors—A Review," IEEE Sensors Journal, vol. 8, Issue 11, pp. 1900-1921 (2008).
Frank, I.W., et al., "Programmable photonic crystal nanobeam cavities," Optics Express, vol. 18, No. 8, pp. 8705-8712 (2010).
Gabrielson, T. B., "Mechanical-thermal noise in micromachined acoustic and vibration sensors," IEEE Transaction on Electron Devices, vol. 40, Issue 5, pp. 903-909, May 1993.
Gavartin, E., et al., "Optomechanical coupling in a two-dimensional photonic crystan defect cavity," Physical Review Letter, vol. 106, No. 20, pp. 203902-1-203902-4, American Physical Society (2011).
Gigan, S., et al., "Self-cooling of a micro-mirror by radiation pressure," Nature, vol. 444, No. 7115, pp. 67-70 (2006).
Gong, Y., et al., "Low power resonant optical excitation of an optomechanical cavity," Optics Express, vol. 19, No. 2, pp. 12 (2011).
Groblacher, S., "Demonstration of an ultracold micro-optomechanical oscillator in a cryogenic cavity," Nature Physics, vol. 5, No. 7, pp. 485-488 (2009).
Jiang, Y.G., et al., "Fabrication of piezoresistive nanocantilevers for ultra-sensitive force detection", Measurement Science and Technology, vol. 19, No. 8, p. 084011 (2008).
Johnson, S.G., et al., "Perturbation theory for Maxwell's eguations with shifting material boundaries," Physical Review E, vol. 65, pp. 066611-1-066611-4 (2002).
Kenny, T., "Nanometer-Scale Force Sensing with MEMS Devices," IEEE Sensors Journal, vol. 1, Issue 2, pp. 148-157, Aug. 2001.
Kippenberg, T. J., "Analysis of Radiation-Pressure Induced Mechanical Oscillation of an Optical Microcavity," Physical Review Letter, vol. 95, No. 3, pp. 033901-1-033901-4 (2005).
Kippenberg, T. J., and Vahala, K. J., "Cavity Opto-Mechanics," Optical Society of America, pp. 1-21 (2007).
Kippenberg, T. J., and Vahala, K. J., "Cavity Optomechanics: Back-Action at the Mesoscale," Science, vol. 321, No. 5893, pp. 1172-1176 (2008).
Kippenberg, T., "Cavity Optomechanics: Back-action Cooling of Mechanical Oscillators," p. 1-1 (Abstract).
Kleckner, D., and Bouwmeester, D., "Sub-kelvin optical cooling of a micromechanical resonator," Nature, vol. 444, No. 7115, pp. 75-78 (2006).
Krause, A.G., et al., "A high-resolution microchip optomechanical accelerometer," Nature Photonics, vol. 6, pp. 768-772 (2012).
Krishnan, G., et al., "Micromachined High-Resolution Accelerometers," Journal of the Indian Institute of Science, vol. 87, No. 3, pp. 333-361 (2007).
Kulah, H., et al., "Noise analysis and characterization of a sigma-delta capacitive microaccelerometer", IEEE J. Sol-Stat. Circ. 41, 352 (2006).
Lee, K. H., et al., "Cooling and Control of a Cavity Opto-electromechanical System," Phys. Rev. Lett. vol. 104, No. 12, pp. 123604-1-123604-4, Feb. 2010.
Li, Y., et al., "Design of dispersive optomechanical coupling and cooling in ultrahigh-Q/V slot-type photonic crystal cavities," Optics Express, vol. 18, No. 23, pp. 13 (2010).
Lin, Q., et al., "Mechanical Oscillation and Cooling Actuated by the Optical Gradient Force," Physical Review Letter, vol. 103, pp. 1103601-1-1103601-4 (2009).
Liu, C-H., and Kenny, T.W., "A high-precision, wide-bandwidth micromachined tunneling accelerometer," Journal of Microelectromechanical Systems, vol. 10, Issue 3, pp. 425-433, Sep. 2001.
Loh, N.C., et al., "Sub-10 cm3 Interferometric Accelerometer with Nano-g Resolution," Journal of Microelectromechanical Systems, vol. 11, No. 3, pp. 182-187 (2002).
Lopez, D., et al., "MEMS-based force sensor: Design and applications," Bell Lab Technical Journal, vol. 10, No. 3, pp. 61-80, Jan. 2005.

Mamin, H.J., and Rugar, D., et al., "Sub-attonewton force detection at millikelvin temperature," Applied Physics Letters, vol. 79, Issue 20, pp. 3358-3360, Nov. 2001.
Mari, A., and Eisert, J., "Gently modulating optomechanical systems," Phys. Rev. Lett., vol. 103, No. 213603, pp. 1-7 (2009).
Marquardt, F., and Girvin, S.M., "Optomechanics," Physics, vol. 2, No. 40, pp. 7 (2009).
Marquardt, F., et al., "Quantum theory of Cavity-Assisted Sideband Cooling of Mechanical Motion," Physical. Review Letter, vol. 99, pp. 093902-1-093902-4 (2007).
Michael, C.P., et al., "An optical fiber-taper probe for wafer-scale microphotonic device characterization," Optic Express, vol. 15, No. 8, pp. 4745-4752 (2010).
Midolo, L., "Electromechanical wavelength tuning of double-membrane photonic crystal cavities," Applied Physics Letters, vol. 98, No. 21, pp. 9 (2011).
Mohd-Yasin, F., et al., "Noise in MEMS," Measurement Science Technology, vol. 21, No. 1, pp. 1-22 (2010).
Muller, D.J., and Dufr ne, Y.F., "Atomic force microscopy as a multifunctional molecule toolbox in nanobiotechnology," Nature Nanotech, vol. 3, pp. 261-269 (2008).
Murch, K.W, et al., "Observation of quantum-measurement backaction with an ultracold atomic gas," Nature Physics, vol. 4, pp. 561-564 (2008).
Jiang Hao, "Research on the discovery mechanism of relay node in the middle of the peer network", the full-text database of excellent Master's degree thesis in China, (May 15, 2009).
Xing Changyou, etc.; "Network distance prediction technology", Journal of Software , (Sep. 30, 2009), vol. 20, No. 9, p. 2470-2482.
Office Action dated Jul. 16, 2018 for U.S. Appl. No. 14/698,317 (pp. 1-13).
I. Malavolta, Web-based hybrid mobile apps: state of the practice and research opportunities, 2 pages (Year: 2016).
Notice of Allowance dated Jul. 23, 2018 for U.S. Appl. No. 15/406,325 (pp. 1-9).
Office Action dated Sep. 21, 2018 for U.S. Appl. No. 15/839,493 (pp. 1-21).
Office Action dated Oct. 4, 2018 for U.S. Appl. No. 13/758,472 (pp. 1-22).
Notice of Allowance dated Oct. 11, 2018 for U.S. Appl. No. 13/520,481 (pp. 1-9).
Brick-and-mortar retailers snatching customers away from E-tailers. (Feb. 16, 2012). PR Newswire Retrieved from https://dialog.proguest.com/professional/docview/1346330115?accountid=142257 (Year: 2012) 3 pages.
Notice of Allowance dated Oct. 10, 2018 for U.S. Appl. No. 14/242,403 (pp. 1-11).
Office Action dated Nov. 2, 2018 for U.S. Appl. No. 13/624,779 (pp. 1-18).
Office Action dated Dec. 3, 2018 for U.S. Appl. No. 14/935,122 (pp. 1-13).
Notice of Allowance dated Nov. 30, 2018 for U.S. Appl. No. 15/717,409 (pp. 1-8).
Office Action dated Dec. 27, 2018 for U.S. Appl. No. 13/398,817 (pp. 1-10).
Chinese Office Action (with English language translation) for Application No. CN201480023694.9, dated Jan. 21, 2020, 12 pages.
Liang, J., Shi, R., Liang, F., & Gao, Z. H. (2001). WAP clients & SET protocol. Dr.Dobb's Journal, 26(6), 85-91. Retrieved from http://dialog.proquest.conn/professional/docview/202692023?accountid=131444 (Year: 2001).
Office Action dated Apr. 1, 2020 for U.S. Appl. No. 16/140,879 (pp. 1-17).
Office Action dated Feb. 4, 2020 for U.S. Appl. No. 13/629,006 (pp. 1-7).
Office Action dated Mar. 13, 2020 for U.S. Appl. No. 15/494,294 (pp. 1-8).
Office Action dated Mar. 6, 2020 for U.S. Appl. No. 16/440,486 (pp. 1-8).
Chinese Office Action (with English language translation) for Application No. CN201710037081.6, dated Mar. 17, 2020, 23 pages.

(56) References Cited

OTHER PUBLICATIONS

Chandra, Shalini; Srivastava, Shirish C.; and Theng, Yin-Leng (2010) "Evaluating the Role of Trust in Consumer Adoption of Mobile Payment Systems: An Empirical Analysis," Communications of the Association for Information Systems: vol. 27, Article 29. http://aisel.aisnet.org/cais/vol27/iss1/29 (Year: 2010) 30 pages.
Chinese Office Action (including English translation) for Application No. CN201710037081.6, dated Feb. 5, 2021,7 pages.
Chinese Office Action (with English language translation) for Application No. CN201710037081.6, dated Oct. 21, 2020, 11 pages.
Notice of Allowance dated Feb. 10, 2021 for U.S. Appl. No. 15/627,085 (pp. 1-15).
Notice of Allowance dated Jan. 14, 2021 for U.S. Appl. No. 16/140,879 (pp. 1-9).
Notice of Allowance dated Jan. 19, 2021 for U.S. Appl. No. 16/283,251 (pp. 1-5).
Notice of Allowance dated Jan. 22, 2021 for U.S. Appl. No. 16/532,095 (pp. 1-10).
Notice of Allowance dated Jan. 27, 2021 for U.S. Appl. No. 16/273,976 (pp. 1-9).
Notice of Allowance dated Jan. 29, 2021 for U.S. Appl. No. 15/988,485 (pp. 1-7).
Notice of Allowance dated Jun. 10, 2020 for U.S. Appl. No. 15/494,294 (pp. 1-10).
Notice of Allowance dated Jun. 15, 2020 for U.S. Appl. No. 16/440,486 (pp. 1-8).
Notice of Allowance dated Mar. 31, 2021 for U.S. Appl. No. 16/294,676 (pp. 1-9).
Office Action dated Aug. 21, 2020 for U.S. Appl. No. 15/988,485 (pp. 1-10).
Office Action dated Jan. 7, 2021 for U.S. Appl. No. 16/245,777 (pp. 1-10).
Office Action dated May 19, 2020 for U.S. Appl. No. 15/627,085 (pp. 1-11).
Office Action dated Nov. 12, 2020 for U.S. Appl. No. 16/273,976 (pp. 1-9).
Office Action dated Oct. 22, 2020 for U.S. Appl. No. 14/244,488 (pp. 1-13).
Office Action dated Oct. 27, 2020 for U.S. Appl. No. 16/294,676 (pp. 1-9).
Office Action dated Oct. 6, 2020 for U.S. Appl. No. 16/532,095 (pp. 1-13).
Office Action dated Oct. 9, 2020 for U.S. Appl. No. 16/283,251 (pp. 1-6).
Office Action dated Sep. 4, 2020 for U.S. Appl. No. 15/627,085 (pp. 1-10).
Office Action dated Jul. 23, 2021 for U.S. Appl. No. 16/245,777 (pp. 1-12).

\* cited by examiner

Example(s): Snap Mobile Payment

Health records authentication and snap payment 140

Snap QR code to authenticate User for health records release + doctor snap payment 142

User 141
Doctor's Terminal 144
Doctor 143

Profile page (e.g., Public) 151
$0 QR code 152

Pre-filed/modifiable snap payment 150

Example(s): Snap Mobile Payment

Example(s): Snap Mobile Payment

Example: Snap Mobile Payment Web Interface

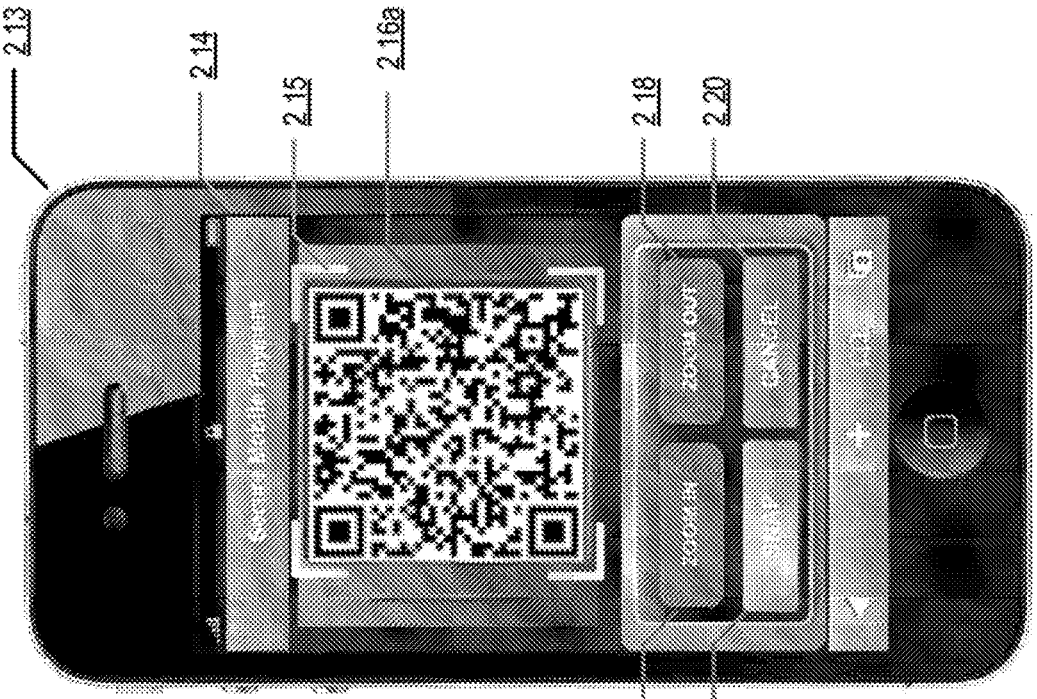

Example: Snap Mobile App Payment User Interface

Example QR code data content 2.16b

```
<data>
  <merchant_id>AE783</merchant_id>
  <merchant_name>Acme, Inc.</merchant_name>
  <store_id>88234</store_id>
  <store_url>www.shop.acme.com</store_url>
  <terminal_id>userdevice1</terminal_id>
  <transaction_id>AFE1213344</transaction_id>
  <timestamp>2011-04-01 23:59:59</timestamp>
  <transaction_amount>$660.89</transaction_amount>
  <digital_sign>
    45e2085fa20496c91df574dc5652e145
  </digital_sign>
</data>
```

FIGURE 2D

Example: Snap Mobile App Payment Web Receipt

Example: One-Tap Mobile App: Barcode Capture

Example: Virtual Wallet Mobile App - Shopping Mode

Example: Virtual Wallet Mobile App - Shopping Mode

Example: Virtual Wallet Mobile App - SocialPay Mode

Example: Virtual Wallet Mobile App - Shopping Mode

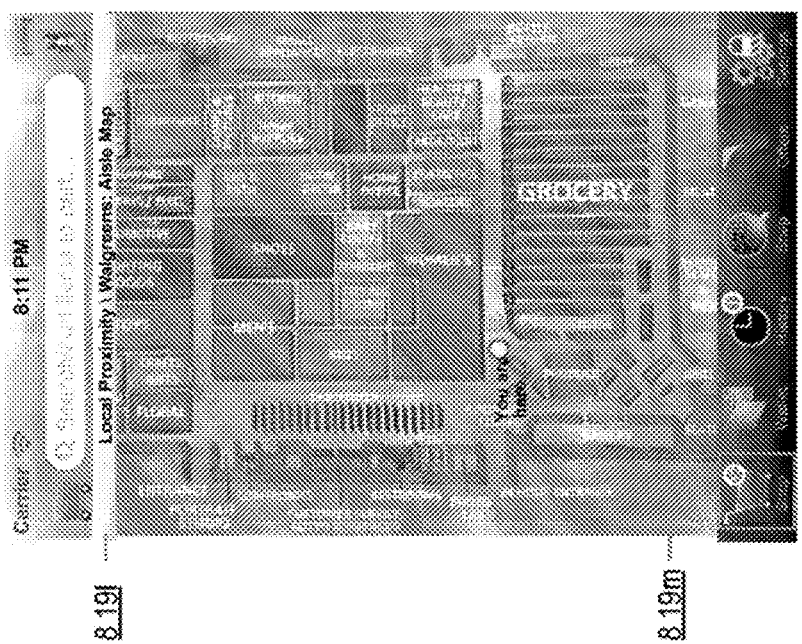
FIGURE 8G          Example: Virtual Wallet Mobile App - Shopping Mode Example: Virtual Wallet Mobile App

SNAP MOBILE PAYMENT APPARATUSES, METHODS AND SYSTEMS

PRIORITY CLAIM

This patent application is a continuation of U.S. patent application Ser. No. 13/398,817, filed on Feb. 16, 2012, which claims priority under 35 USC § 119 to: U.S. provisional patent application Ser. No. 61/443,624 filed Feb. 16, 2011; U.S. provisional patent application Ser. No. 61/512,248 filed Jul. 27, 2011; U.S. provisional patent application Ser. No. 61/522,213 filed Aug. 10, 2011; and U.S. provisional patent application Ser. No. 61/527,576 filed Aug. 25, 2011. The entire contents of the aforementioned applications are expressly incorporated by reference herein.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present inventions are directed generally to apparatuses, methods, and systems for electronic purchase transactions, and more particularly, to SNAP MOBILE PAYMENT APPARATUSES, METHODS AND SYSTEMS ("SNAP").

BACKGROUND

Consumer transactions typically require a customer to select a product from a store shelf or website, and then to check the out at a checkout counter or webpage. Product information is typically selected from a webpage catalog or entered into a point-of-sale terminal device, or the information is automatically entered by scanning an item barcode with an integrated barcode scanner, and the customer is usually provided with a number of payment options, such as cash, check, credit card or debit card. Once payment is made and approved, the point-of-sale terminal memorializes the transaction in the merchant's computer system, and a receipt is generated indicating the satisfactory consummation of the transaction.

BRIEF DESCRIPTION OF THE DRAWINGS

The accompanying appendices and/or drawings illustrate various non-limiting, example, inventive aspects in accordance with the present disclosure:

FIGS. 2A-F shows application user interface diagrams illustrating example features of a snap mobile payment app facilitating snap mobile payment in some embodiments of the SNAP;

FIGS. 8A-G show user interface diagrams illustrating example features of virtual wallet applications in a shopping mode, in some embodiments of the SNAP;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Snap Mobile Payment (SNAP)

Figure 1A:
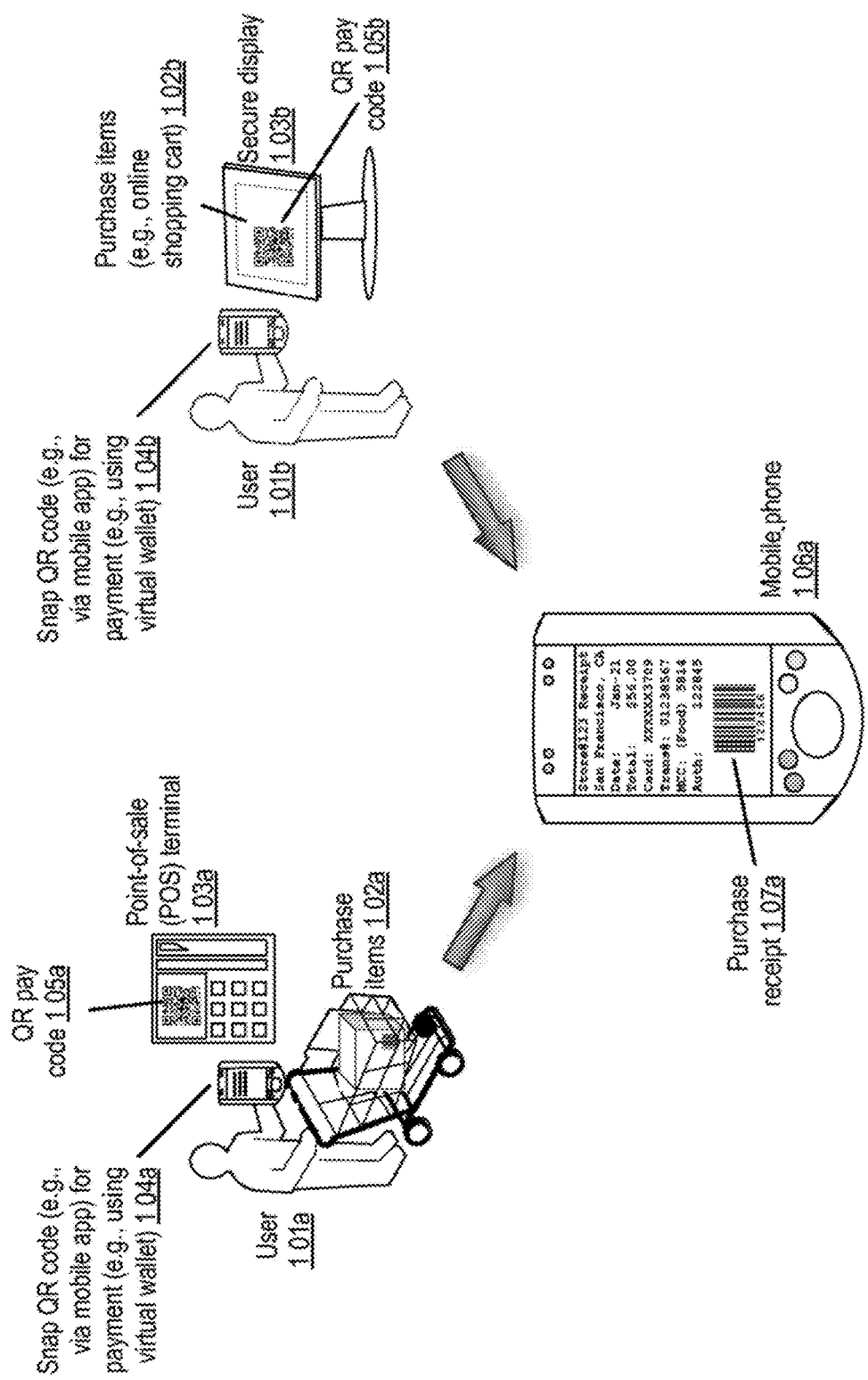
FIGS. 1A-F show block diagrams illustrating example aspects of a snap mobile payment-based purchase transaction in some embodiments of the SNAP.

The SNAP MOBILE PAYMENT APPARATUSES, METHODS AND SYSTEMS (hereinafter "SNAP") transform real-time-generated merchant-product Quick Response codes, via SNAP components, into virtual wallet card-based transaction purchase notifications. FIGS. 1A-F show block diagrams illustrating example aspects of a snap mobile payment-based purchase transaction in some embodiments of the SNAP. With reference to FIG. 1A, in some implementations, a user, e.g., 101*a-b*, may wish to purchase products at a merchant store, e.g., 103*a*, or at a merchant website, e.g., 103*b*. For example, at a merchant store, the user may scan barcodes for a number of products, e.g., 102*a*, at a point-of-sale ("POS") terminal in the store, e.g., 103*a*, and then indicate that the user wishes to checkout the scanned items. In some implementations, the POS terminal may generate a Quick Response ("QR") code, e.g., 105*a*, including information on the scanned product items, as well as merchant information for processing the purchase transaction via a payment network. The user may capture an image of the QR code generated by the POS terminal using a user device, such as a smartphone. For example, the user device may have executing on it an app for snapping the merchant-product QR code. The user device may utilize the information extracted from the QR code, along with information on a virtual wallet tied to the user device to initiate a purchase transaction. For example, the user device may utilize the product and merchant information extracted from the QR code, and financial payment information from the virtual wallet, to create a purchase transaction request, and submit the request to a payment network (e.g., credit card processing network).

In some implementations, the user device may utilize methods alternative to capture of a QR code to obtain information from the POS terminal. For example, the POS terminal may communicate the information required for submitting a purchase transaction request to a payment network to user device via Bluetooth™, Wi-Fi, SMS, text message, electronic mail, and/or other communication methods.

In some implementations, a user 101*b* may wish to checkout items stored in a virtual shopping cart on an online shopping website, e.g., 102*b*. For example, the user maybe viewing the website using a secure display (e.g., that is part of a trusted computing device of the user). Upon indicating that the user wishes to checkout the items in the virtual shopping cart, the website may provide a QR code including information on the products in the virtual shopping cart and merchant information. For example, in the scenario where the user utilizes a secure display, the QR code may be displayed at a random position within the secure display for security purposes. The user may capture a snapshot of the displayed QR code, and utilize payment information from the virtual wallet associated with the user device to create a purchase transaction request for processing by the payment network. Upon completion of the purchase transaction, the payment network may provide a purchase receipt, e.g., 107 directly to the user device 106, the POS terminal in the store and/or the secure display (for the secure online shopping scenario) as confirmation of completion of transaction processing. Thus, in some implementations, the merchant may be shielded from obtaining personal and/or private information of the user while processing the purchase transaction, while ensuring integrity of the user's virtual wallet using a secure display for presenting the merchant-product QR code.

In various implementations, such payment processing may be utilized for a wide variety of transactions. For example, a user dining at a restaurant may obtain a bill including a QR pay code including detail on the dining charges included in the bill, and a merchant ID for the restaurant. The user may take a snapshot of the restaurant bill using the user's smartphone, and utilize the user's virtual wallet to pay for the restaurant bill, without revealing any financial or personal information about the user to the restaurant.

Figure 1B:
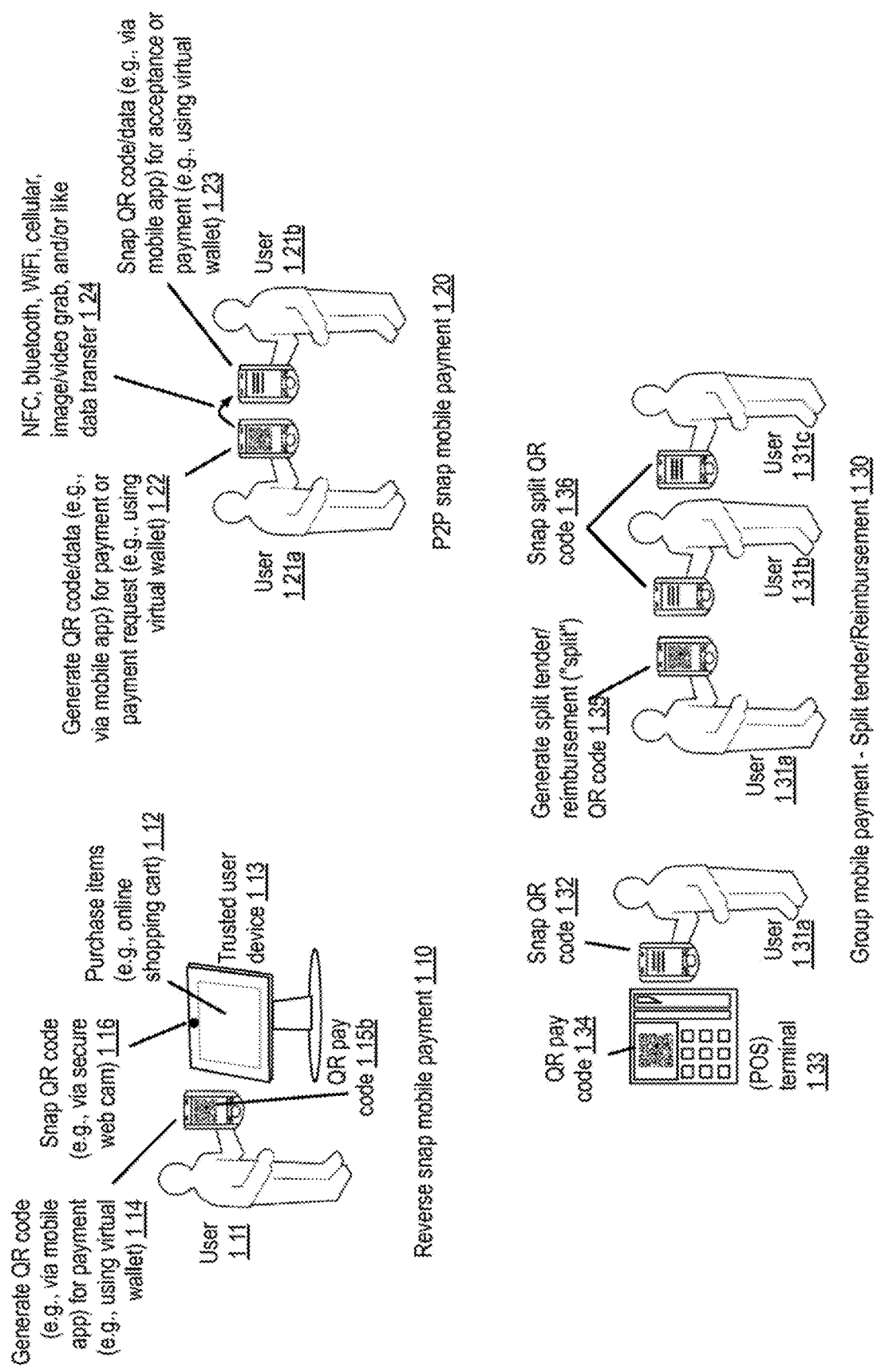

With reference to FIG. 1B, in some implementations, e.g., 110, a user 111 may wish to checkout items stored in a (virtual) shopping cart in a (online) shopping store, e.g., 112, using a reverse snap mobile payment procedure. For example, the user may be viewing the website using a secure display that is part of a trusted computing device of the user, e.g., 113, or via a POS terminal in a brick-and-mortar store. Upon indicating that the user wishes to checkout the items in the virtual shopping cart, the user may generate, e.g., 114, a QR code 115*b* via a mobile app on the user's mobile device including information on the user payment methods, offers, rewards, and/or other aspects connected to the user's virtual wallet. The user may provide the QR code displayed on the user's mobile device to a webcam (or other QR code capture device and/or mechanism) installed on the trusted computing device (or POS terminal). The user's trusted computing device or POS terminal may obtain a snapshot of the QR code generated by the user's mobile device, e.g., 116, and utilize payment information from QR code generated by the user to create a purchase transaction request for processing by the payment network. Upon completion of the purchase transaction, the payment network may provide a purchase receipt directly to the user mobile device, the POS terminal in the store and/or the secure display (for the online shopping scenario) as confirmation of completion of transaction processing. Thus, in some implementations, the user may be able to utilize a QR code generated by the user's mobile device as a replacement for a plastic payment card (e.g., credit, debit, prepaid card), or as a substitute for other financial information transport mechanisms such as near-field communications, Bluetooth®, etc. In some implementations, the QR code maybe representative of a one-time anonymized credit card number (e.g., see the description associated with FIG. 3B).

In some implementations, a first user 121*b* may desire to pay a second user 121*a* an amount of money (or a value equivalent, e.g., virtual currency, alternate real currency, rewards, miles, points, etc.), e.g., P2P snap mobile payment 120. The second user 121*a* may generate a limited-time-validity QR code, e.g., 122, including information on the amount of money to be transferred, as well as a privacy token/alias linked to a financial account of the second user. The second user may display the QR code generated to the first user (e.g., by holding the second user's mobile phone displaying the QR code to the first user; sending the QR code by email, social network message, tweet, etc.). The first user may take a snapshot of the QR code using the first user's mobile phone, e.g., 123, and utilize the amount of money, the second user's privacy token/alias linking to a financial account, and the first user's virtual wallet linked to the first user's mobile phone, to generate a purchase transaction request for processing by the payment network. Upon completion of the transaction, the payment network may provide transaction notification receipts to the users who are parties to the transaction. In alternate implementations, the two users may share the data encoded in the QR code via methods alternate to the QR code, including but not limited to: near-field communications (NFC), Wi-Fi™, Bluetooth™, cellular network, SMS, email, text messages and/or the other communication protocols.

In general, it is to be understood that such tokens, alias and/or handles may be advantageously utilized in various implementations of snap mobile payment. For example, a user wishing to engage in reverse snap mobile payment procedure (see, e.g., FIG. 1B, element 110) may generate a QR code embodying information on a handle pointing to financial payment information stored on a server of a payment network system. For example, some implementations of snap mobile payment may utilize, to generate and/or process handles, a payment tokenization procedure similar to that described in U.S. application Ser. No. 13/153,301, titled "Payment tokenization apparatuses, methods and systems," the entire contents of which are expressly incorporated by reference herein. Further, in some implementations, the handle may encode information according to a compact messaging protocol, such as described in U.S. Pat. No. 6,837,425, titled "Compact protocol and solution for substantially offline messaging between portable consumer device and based device," the entire contents of which are expressly incorporated by reference herein. In some reverse snap mobile implementations, the user may provide the QR code embodying the handle and displayed on the user's mobile device to a webcam (or other QR code capture device and/or mechanism) installed on the trusted computing device (or POS terminal). The user's trusted computing device or POS terminal may obtain a snapshot of the QR code generated by the user's mobile device, e.g., 116, and provide the handle extracted from the QR code to a merchant server for purchase transaction request processing by the payment network. The merchant server may generate a card authorization request (such as described further below in the discussion with reference to FIG. 4A) for processing the purchase transaction using the handle, and may provide the card authorization request to a payment network. Upon completion of the purchase transaction, the payment network may provide a purchase receipt directly to the user mobile device, the POS terminal in the store, and/or the secure display (e.g., for the online shopping scenario) as confirmation of completion of transaction processing using the handle.

In some implementations, a user alert mechanism may be built into the snap mobile payment purchase transaction process flow. For example, in some implementations, a merchant server may embed a URL specific to the transaction into the card authorization request. For example, in some implementations, a POS terminal, remote device and/or desktop computer may embed the URL into optional level 3 data in the card authorization request. The URL may point to a webpage stored on the merchant's server dedicated to the transaction that is the subject of the card authorization request. For example, the webpage pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some implementations, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like.

In some implementations, a number of users may engage in group pay via snap mobile payment to split a tender, e.g., 130. In some implementations, one of the users 131a may obtain a snapshot, e.g., 132, of a QR pay code, e.g., 134, generated at a POS terminal (or, e.g., presented on paper such as a dining bill), e.g., 133. The user may in turn generate a QR split pay code, embodying information on the amounts that the tender has been split into. The user 131a may present the split tender QR code 135 to the other users 131b-c, who may obtain snapshots of the split tender QR code, e.g., 136. In some implementations, the users 131b-c may be reimbursing the user 131a for payment of the original QR code via the payment network, or the users 131b-c may be making direct payments via the split tender QR code to the merchant (e.g., when the user 131a took a snapshot of the merchant's QR code, no payment processing occurred immediately). In some implementations, the merchant may directly provide a split tender QR code for the users 131a-c.

In some implementations, group mobile payment may be implemented, instead of utilizing QR codes, via use of an alternate communication mechanism. For example, in some implementations, the POS terminal 133 may utilize a communication protocol such as Bluetooth™ to communicate with the users 131a-c. The POS terminal may, serially or in parallel, establish separate communication sessions with each of the users. Via the separate communication sessions that POS terminal may transmit the product and/or merchant data required by the users' devices to generate individual purchase transaction processing requests. Thus, via the separate communication sessions, the POS terminal may split the group tender associated with the users 131a-c into individual payment amounts.

Figure 1C:
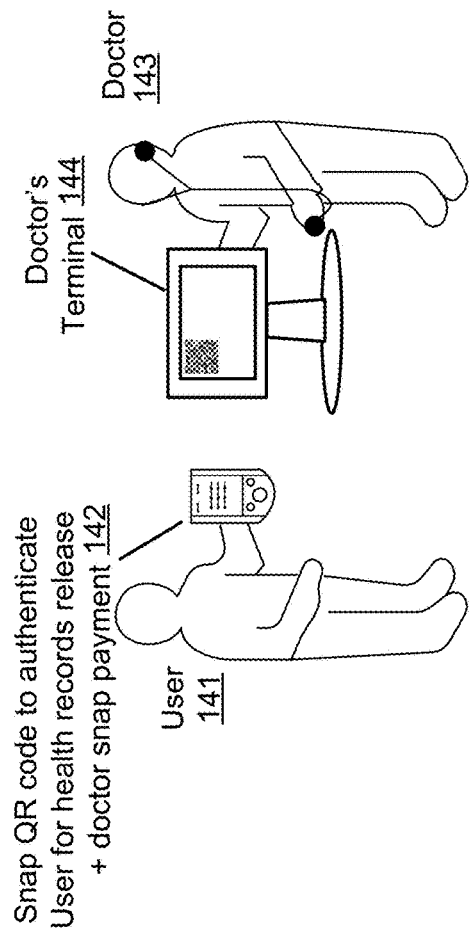
Figure 1C:
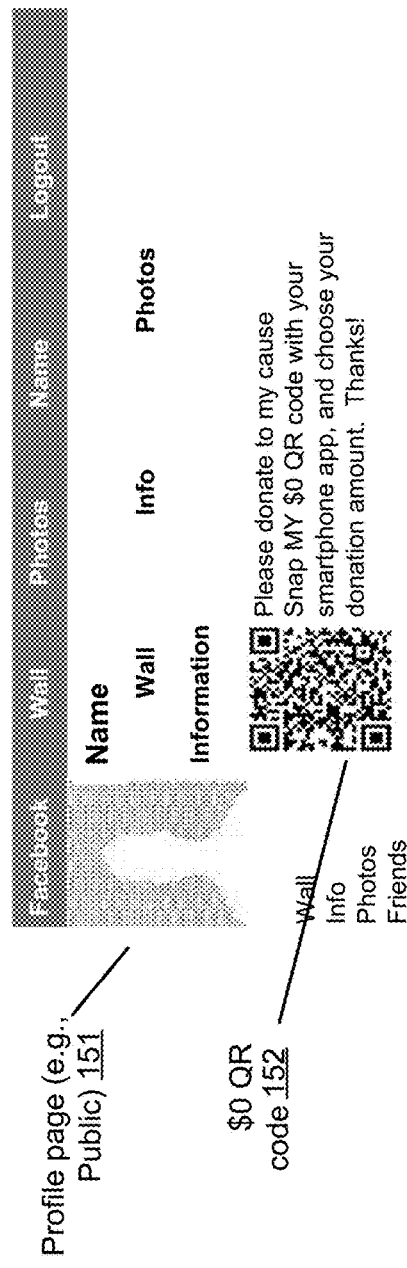
Figure 1D:
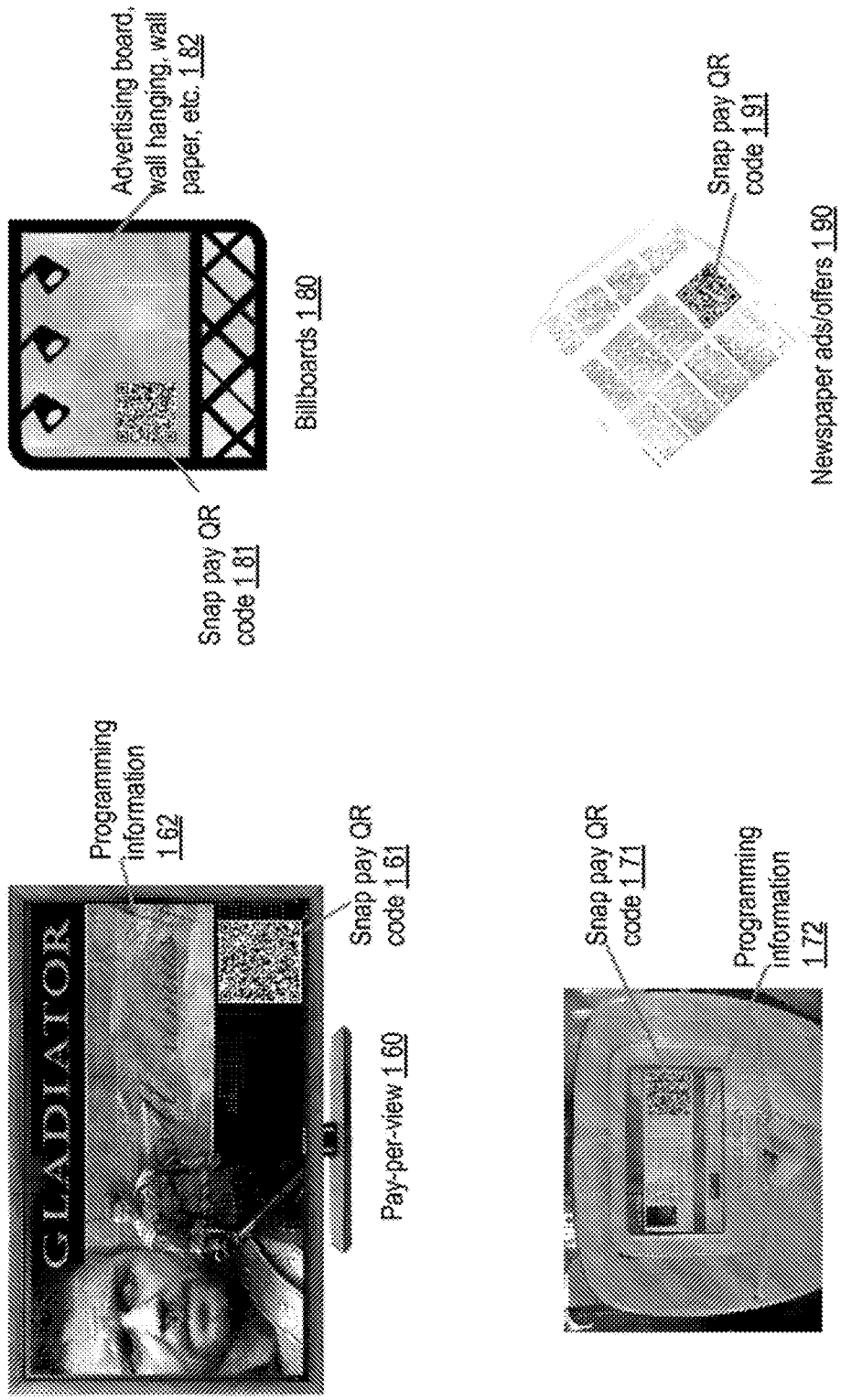

With reference to FIG. 1C, in some implementations, snap mobile payment methods may be utilized for authentication/verification purposes, and for providing digital consent for disclosure of personal and/or private information. For example, a user 142 visiting his/her doctor 143 may be required to provide informed consent to disclosing personal information (e.g., medical records) to the doctor. The doctor's terminal may generate a QR code embodying the doctor's digital certificate as well as information on the type/content of medical records of the user that are requested, e.g., 144. The user may snap the QR code via the user's mobile device. The user's mobile device may generate a request for records release according to the QR code, and also serve as verification that the request is obtained from a personal trusted device (e.g., the user's mobile device). In alternate implementations, the user maybe able to select the personal information that the user would like to reveal to the healthcare provider, and the user's mobile device may generate a QR code for the doctor's terminal to obtain a snapshot for retrieving the user's medical information. In some implementations, the QR code may also include payment information (e.g., the user's pay account information, or the doctor's acquirer information) along with the information on controlled release of personal information.

In some implementations, the SNAP may facilitate P2P transactions via pre-filled, modifiable QR payment codes, e.g., 150. For example, a first user having a public profile page, e.g., 151, may place an image of a QR code in the public profile, e.g., 152. For example, the QR code may include a predetermined payment amount for a purchase transaction initiated by capturing a snapshot of the QR code. In some implementations, the predetermined amount may be $0 (e.g., a $0 QR pay code). A second user may capture a snapshot of the QR pay code using a mobile device, and may set an amount that the second user would like to pay the first user via the second user's mobile device. The second user's mobile device may provide the information encoded within the QR code along with the second-user-chosen payment amount to a payment network for transaction processing.

It is to be understood that the various aspects described herein of snap mobile payment may be utilized for any controlled exchange of information and/or payment. For example, with reference to FIG. 1D, in some implementations, a user may obtain pay-per-view programming via snap mobile payment, e.g., 160. For example, a television display may provide an advertisement including programming information, e.g., 162, as well as a QR pay code for obtain the programming content, e.g., 161. The QR code may include information identifying the programming information, as well as information identifying the television subscriber account information, television machine address, and/or the like. The user may obtain a snapshot of the QR code, and provide the information embodied in the QR code along with information fro the user's mobile device (e.g., subscriber account number linked to the user's virtual wallet, pay account information, and/or the like). Upon processing of the payment information by the payment network, the payment network may provide an indication to the television-programming provider of the payment completion, and the television-programming provider may stream the programming content to the user's television. As another example, a similar flow may be utilized for in-flight entertainment, e.g., 170, wherein an in-flight screen may provide programming information 172, as well as a QR pay code 171 for the user to snap for in-flight entertainment initiation. As another example, a billboard, wall hanging, poster, in-store advertisement, hoarding, etc., e.g., 180, may include an offer for a product/service, and a QR code including merchant information and product information identifying a purchase amount, and/or the like. The user may snap the QR code with the user's mobile device linked to the user's virtual wallet to purchase the product and/or service, and, if applicable, the product may be directly shipped to the user's address as specified by the purchase information exchanged with the payment network as part of the purchase request sent by the user's mobile device. As another example, newspapers, e.g., 185, may include offers, advertisements, job postings, and/or the like including QR codes, e.g., 186, embodying the information necessary for the user to initiate a purchase transaction with the payment network. It is to be understood that any aspects of implementing snap mobile payment discussed in any of the implementations herein, and/or their equivalents, may be utilized in any other implementations discussed herein, and/or their equivalents.

Figure 1E:
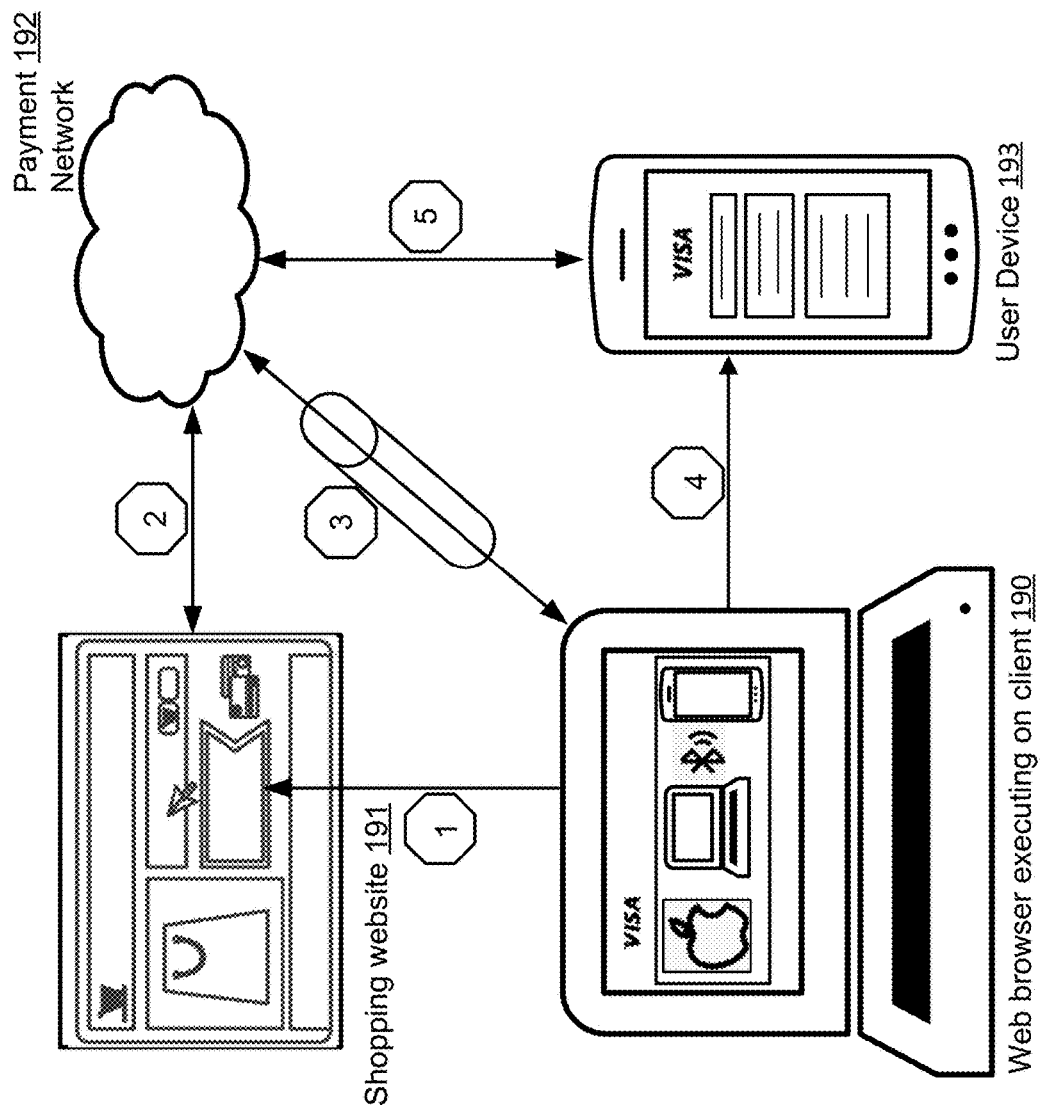
Figure 1F:
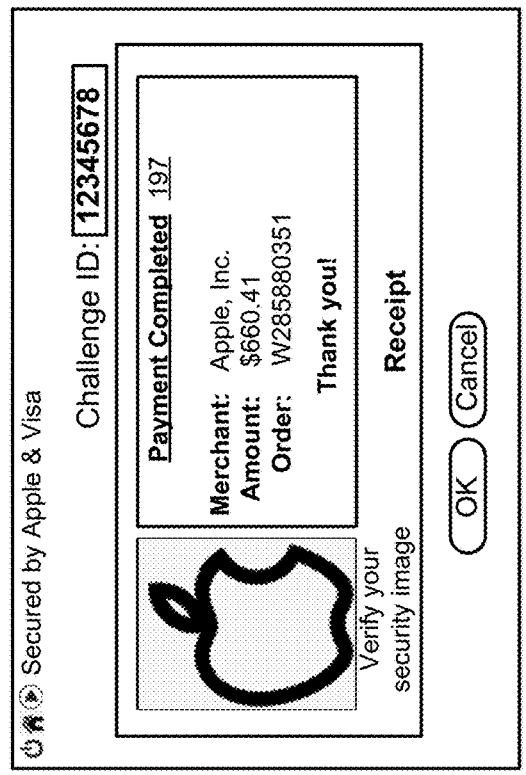
Figure 1F:
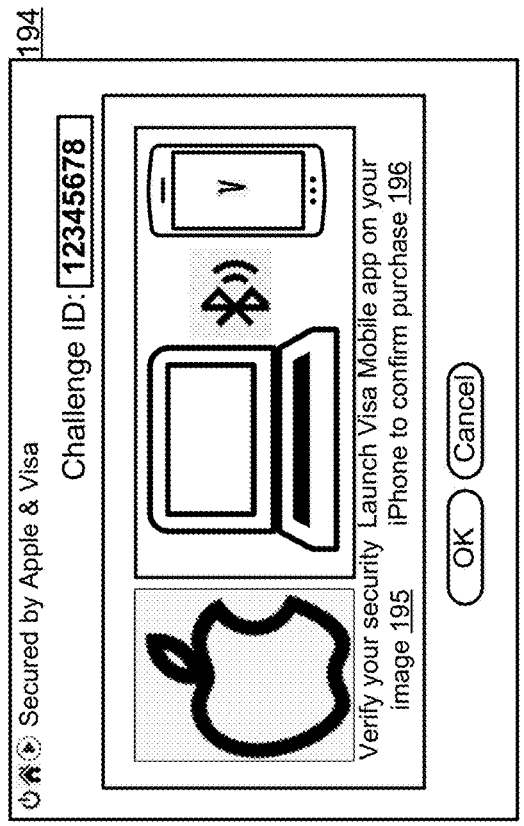

With references to FIGS. 1E-F, in some implementations, the data required for processing a purchase transaction may be provided via methods alternate to a QR code including, but not limited to: near-field communications (NFC), Wi-Fi™, Bluetooth™, cellular network, SMS, email, text messages and/or the other communication protocols. For example, in some implementations, a user shopping online via a web browser executing on a client device, e.g., 190, may desire to pay for a purchase of items from an online shopping website, e.g., 191. The website may include a user interface element that the user may activate to initiate shopping checkout and payment. Upon the user activating the user element, the client displaying the online shopping website may provide a message to a server of the merchant to initiate secure purchase transaction processing. The server of the merchant operating the online shopping website may establish a secure connection (e.g., a Secure Sockets Layer connection) to a pay network server of a payment network, e.g., 192. Also, the pay network server may establish a secure connection to the client. For example, the client may include a secure I/O chip that only allows secure connections to be established by the client with pay network servers of the payment network. Via the secure connection, the pay network server may provide an instruction to the client to request the user to launch a virtual wallet mobile app on the user device of the user, see e.g., FIG. 1F, 196. The client may accordingly provide a request to the user to launch a virtual wallet mobile app on the user device, e.g., 193, of the user. Upon the user launching the virtual wallet mobile app on the user device, the user device and the client may establish a secure connection with each other (e.g., via Bluetooth™, Wi-Fi, cellular, etc.) In some implementations, the client and user device may be preconfigured to rapidly establish the secure communication channel with each other. Via the secure communication channel, the client may provide data to the user's mobile device, or vice versa, to facilitate initiation of the purchase transaction. The virtual wallet app on the user's mobile device (or the client) may then generate a purchase transaction initiation message and provide it to the pay network server for processing the purchase transaction. Upon completion of transaction processing, the pay network server may provide a notification of payment completion to the client, e.g., FIG. 1F, 197, or to the user device.

Figure 2A:
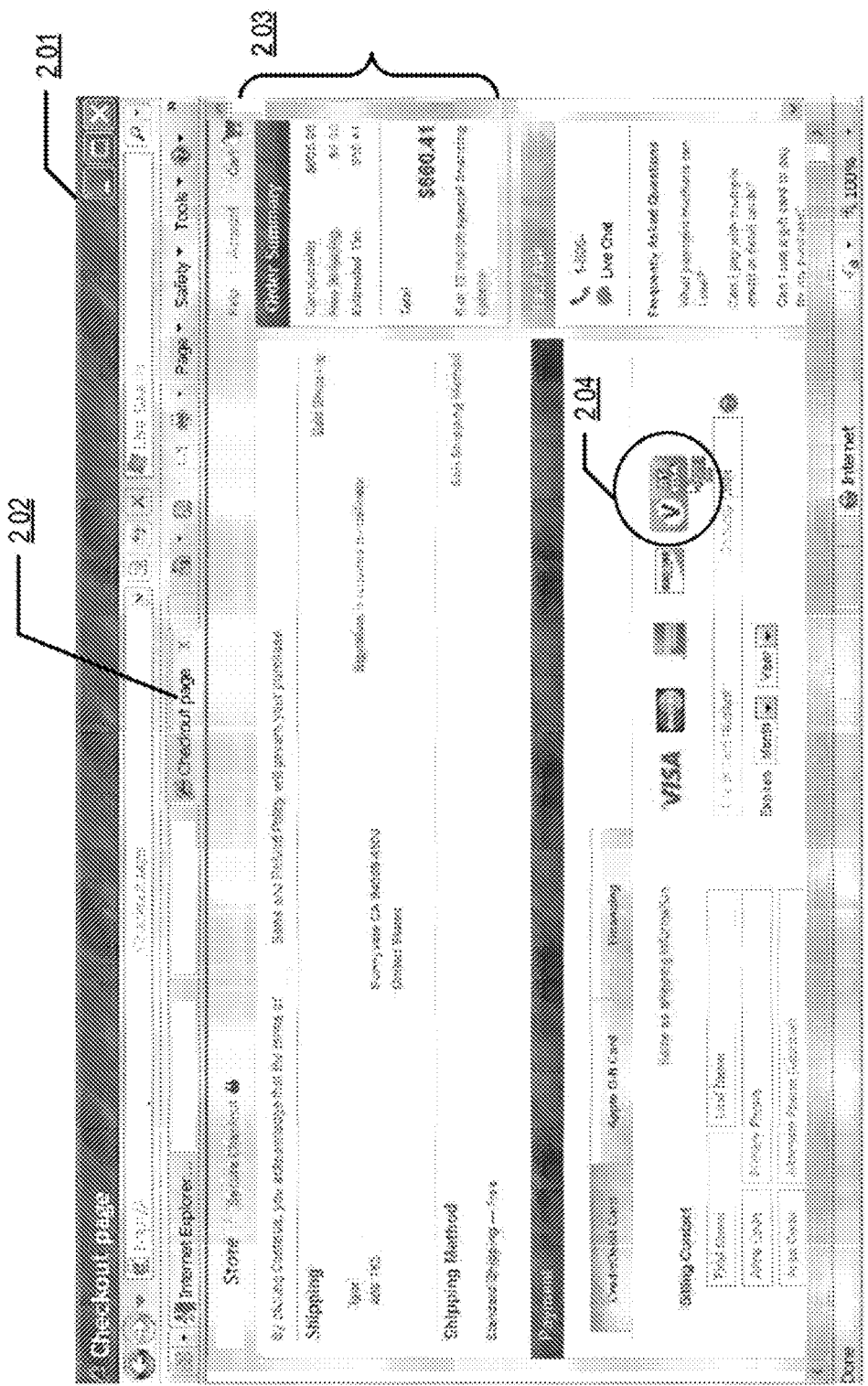

FIGS. 2A-F show application user interface diagrams illustrating example features of a snap mobile payment app facilitating snap mobile payment in some embodiments of the SNAP. With reference to FIG. 2A, in some implementations, a user may desire to checkout one or items stored in a virtual shopping cart of an online merchant website. For example, the user may be utilizing a browser application, e.g., 201, to visualize a checkout page of the merchant website, e.g., 202. The checkout webpage may depict details of the checkout order, e.g., 203, and may provide one or more options for the user to provide payment for the purchase of the store items. In some implementations, the checkout webpage may include an option to pay for the purchase using a snap mobile payment procedure, e.g., 204.

Figure 2B:
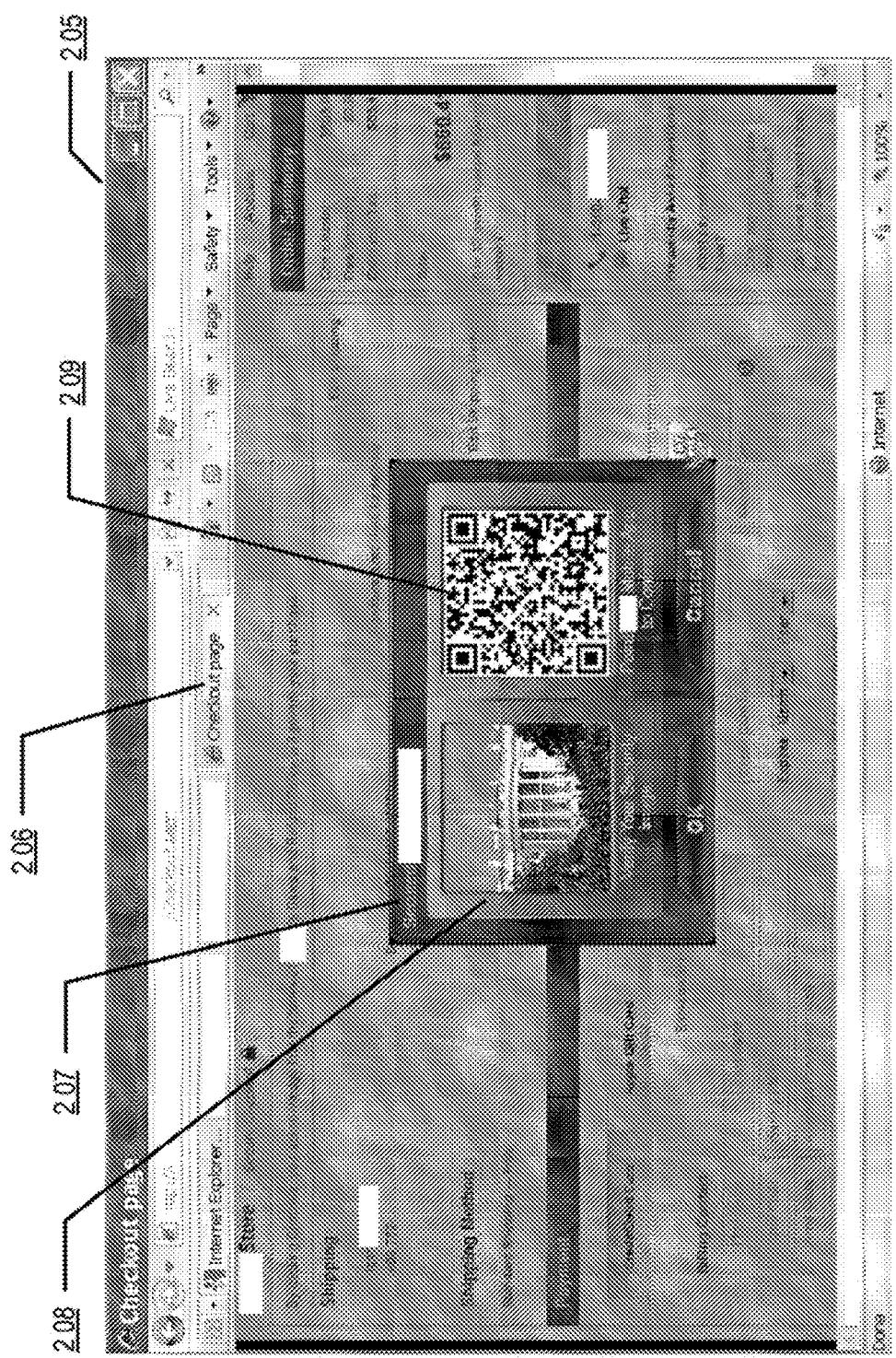

With reference to FIG. 2B, in some implementations, upon selecting the option to utilize the snap mobile payment procedure, the merchant checkout webpage, e.g., 206, may provide via the browser application 205, a QR code, e.g., 209, including information on the items in the virtual shopping cart as well as merchant information for the payment network to process the purchase transaction (e.g., a privacy token/alias linked to an acquirer financial account of the merchant). In some implementations, the webpage may be displayed via a secure display of a trusted computing device of the user. For example, as a security measure, the position of the QR code frame, e.g., 207, within the display may be randomly varied to prevent a snapshot of the QR code from being obtained by fraudulent means (e.g., tampering with the trusted computing device). In some implementations, a security image, e.g., 208, pre-selected by the user may be displayed on the screen so that the user may verify as being accurate. In some implementations, the image may be encrypted by the SNAP before providing it to the trusted computing device. In some implementations, the trusted computing device may be the only device to hold a decryption key required to decrypt and successfully display the image on the secure display to the user.

Figure 2C:
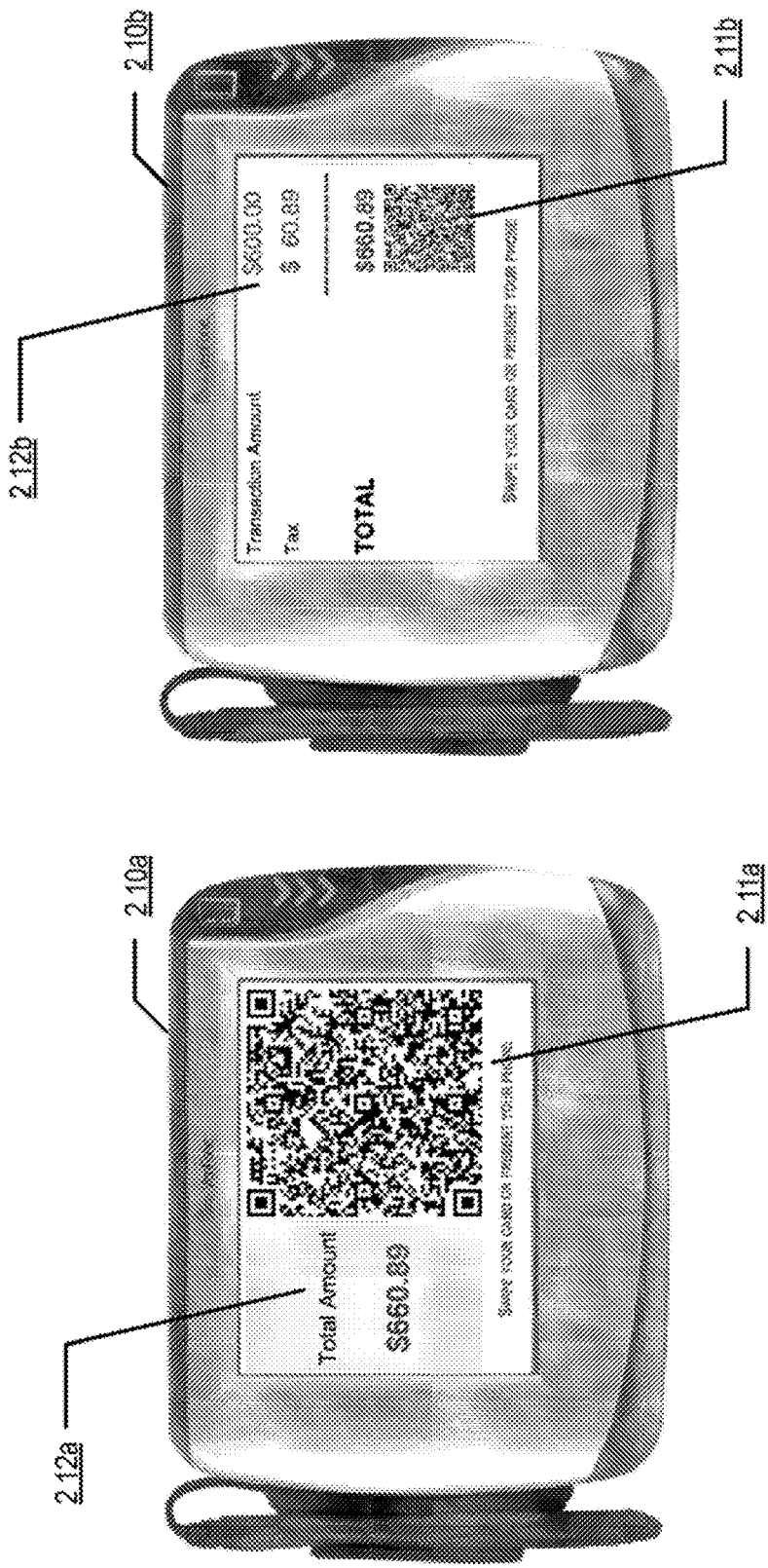

With reference to FIG. 2C, in some implementations, such merchant-product information embodying QR codes may be utilized by a point-of-sale ("POS") terminal, e.g., 210*a-b*. For example, in a brick-and-mortar store, the POS terminal may display a QR code, e.g., 211*a-b*, that includes the purchase payment amount, e.g., 212*a-b*, upon the user indicating that the user wishes to checkout the items in the user's physical shopping cart. For example, the QR code may include data formatted according to the extensible Markup Language ("XML"), such as the example data structure below:

```
<QR_data>
    <order_ID>4NFU4RG94</order_ID>
    <timestamp>2011-02-22 15:22:43</timestamp>
    <expiry_lapse>00:00:30</expiry_lapse>
    <transaction_cost>$34.78</transaction_cost>
```

```xml
<user_ID>john.q.public@gmail.com</user_ID>
<client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
</client_details>
<secure_element>www.merchant.com/securedyn/0394733/123.png</secure_element>
<purchase_details>
    <num_products>1</num_products>
    <product>
        <product_type>book</product_type>
        <product_params>
            <product_title>XML for dummies</product_title>
            <ISBN>938-2-14-168710-0</ISBN>
            <edition>2nd ed.</edition>
            <cover>hardbound</cover>
            <seller>bestbuybooks</seller>
        </product_params>
        <quantity>1</quantity>
    </product>
</purchase_details>
<merchant_params>
    <merchant_id>3FBCR4INC</merchant_id>
    <merchant_name>Books & Things, Inc.</merchant_name>
    <merchant_auth_key>1NNF484MCP59CHB27365</merchant_auth_key>
</merchant_params>
<QR_data>
```

With reference to FIG. 2D, in some implementations, the user may obtain a snapshot of the QR code displayed on the screen of the secure display or the POS terminal using a smartphone, e.g., 213. For example, the user's smartphone may have an app, e.g., 214, executing on it to detect and capture QR codes, e.g., 216a. For example, the user may utilize registration features, e.g., 215, to align the QR code within the display of the smartphone. The app may, in some implementations, provide the user with the ability to zoom in, e.g., 217, or zoom out, e.g., 218, of the QR code to ensure that the image of the QR code fits within the dimensions of the screen of the smartphone. Upon aligning the QR code within the display of the smartphone, the user may be able to obtain a snapshot of the QR code using a user interface element, e.g., 219. The user may cancel the snap mobile payment procedure using a user interface element 220 on the display of the smartphone.

Figure 2E:
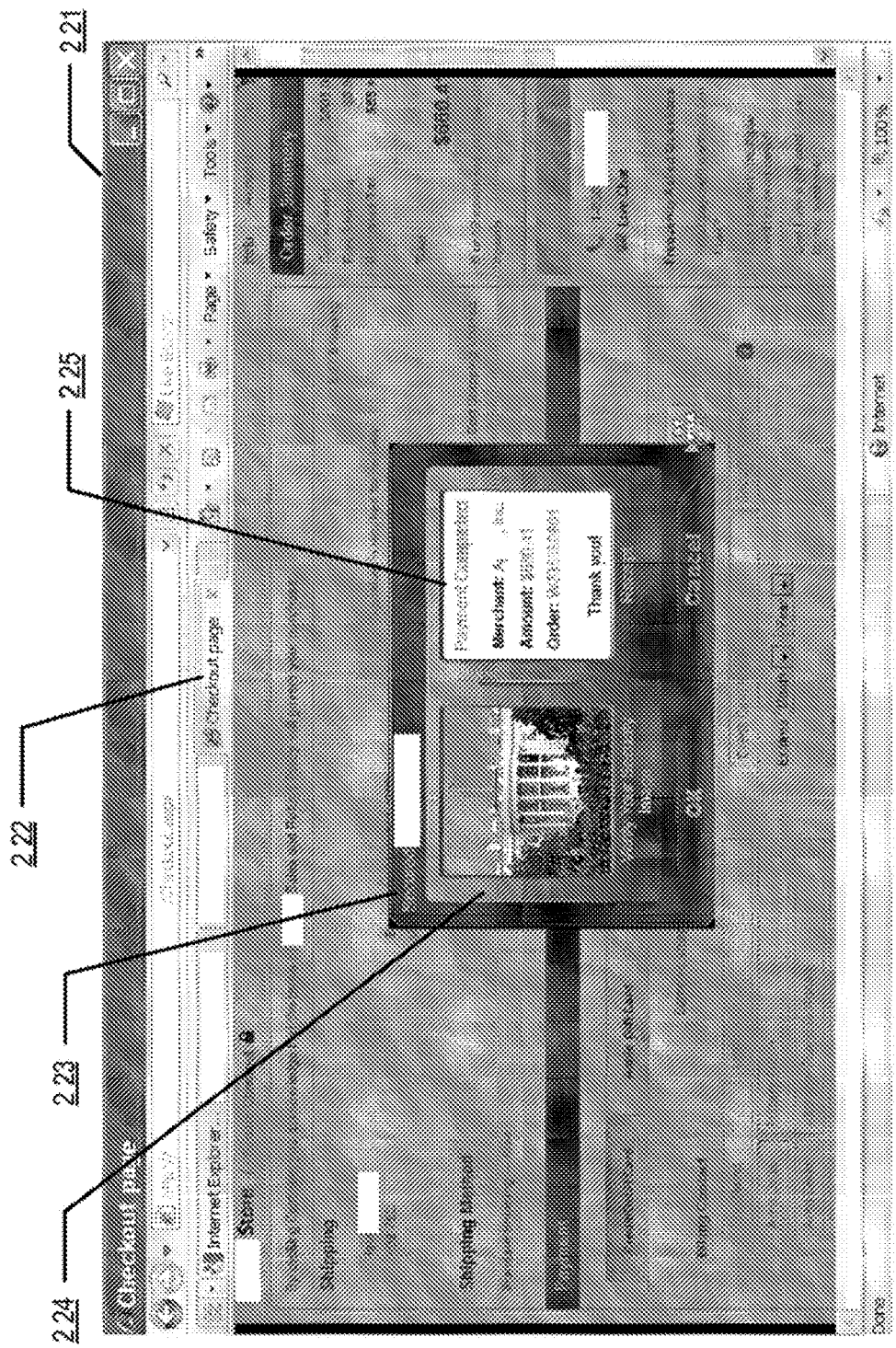
Figure 2F:
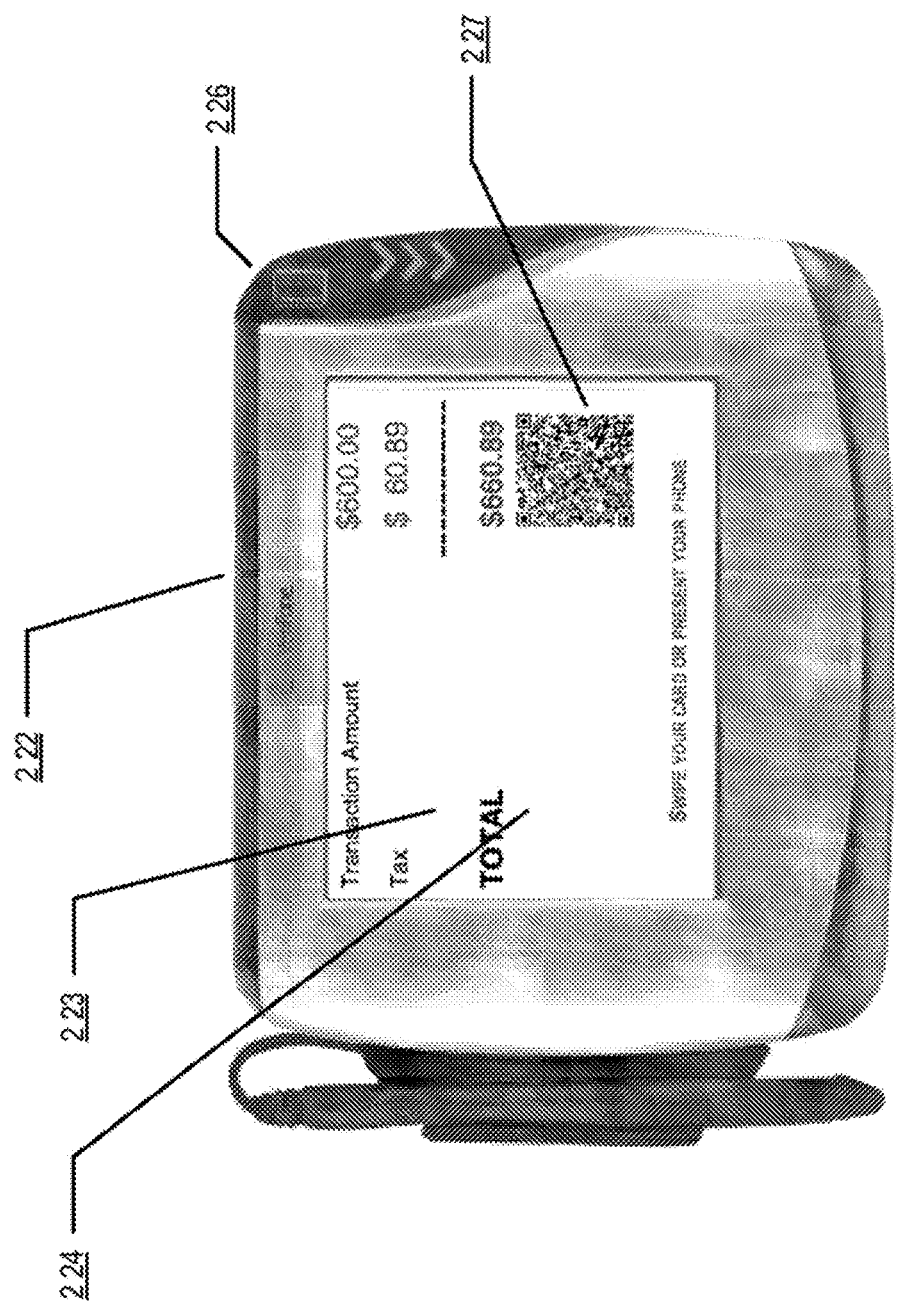

With reference to FIG. 2E, in some implementations, upon obtaining a snapshot of the merchant-product QR code, the user's smartphone may extract the product and merchant data stored within the QR code, and utilize an account for the user's virtual wallet linked to the user's smartphone to generate a purchase transaction request for processing by a payment network. Upon completion of processing of the payment transaction by the payment network using the information provided by the user's smartphone, the merchant website 222 (via the browser application 221) may provide a purchase receipt 225 for the user. With reference to FIG. 2F, in implementations where the user utilizes the snap mobile payment procedure at a brick-and-mortar store, the POS terminal may display a purchase receipt for the user. In some implementations, the payment network may provide a purchaser receipt directly to the smartphone of the user.

Figure 3A:
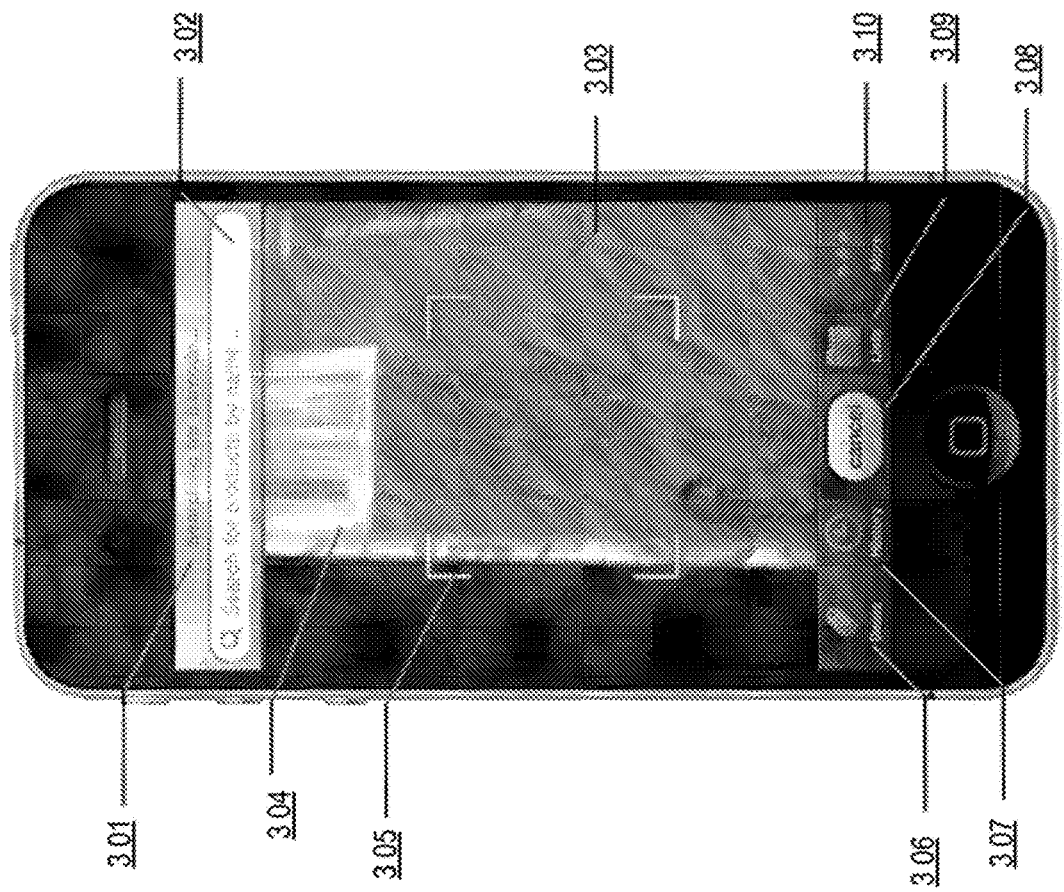
FIGS. 3A-E show application user interface diagrams illustrating example features of a snap mobile payment app for capturing product barcodes, securing user data and preventing fraud in some embodiments of the SNAP.

FIGS. 3A-E show application user interface diagrams illustrating example features of a snap mobile payment app for capturing product barcodes, securing user data and preventing fraud in some embodiments of the SNAP. With reference to FIG. 3A, in some implementations, the app executing on the device of the user may include an app interface providing various features for the user. In some implementations, the app may be configured to recognize product identifiers (e.g., barcodes, QR codes, etc.), e.g., 301. For example, the app may be configured to capture merchant-product QR codes for snap mobile payment processing, as discussed above with reference to FIGS. 2A-F. In some implementations, the user may be required to sign in to the app to enable its features. Once enabled, the camera may provide in-person one tap purchasing features for the user. For example, the client device may have a camera via which the app may acquire images, video data, streaming live video, and/or the like, e.g., 303. The app may be configured to analyze the incoming data, and search, e.g., 301, for a product identifier, e.g., 304, such as QR codes 209, 211a-b, 216a and 227. In some implementations, the app may overlay cross-hairs, target box, and/or like alignment reference markers, e.g., 305, so that a user may align the product identifier using the reference markers so facilitate product identifier recognition and interpretation. In some implementations, the app may include interface elements to allow the user to switch back and forth between the product identification mode and product offer interface display screens (see, e.g., 306), so that a user may accurately study deals available to the user before capturing a product identifier. In some implementations, the app may provide the user with the ability to view prior product identifier captures (see, e.g., 307) so that the user may be able to better decide which product identifier the user desires to capture. In some implementations, the user may desire to cancel product purchasing; the app may provide the user with a user interface element (e.g., 308) to cancel the product identifier recognition procedure and return to the prior interface screen the user was utilizing. In some implementations, the user may be provided with information about products, user settings, merchants, offers, etc. in list form (see, e.g., 309) so that the user may better understand the user's purchasing options. Various other features may be provided for in the app (see, e.g., 310).

Figure 3B:
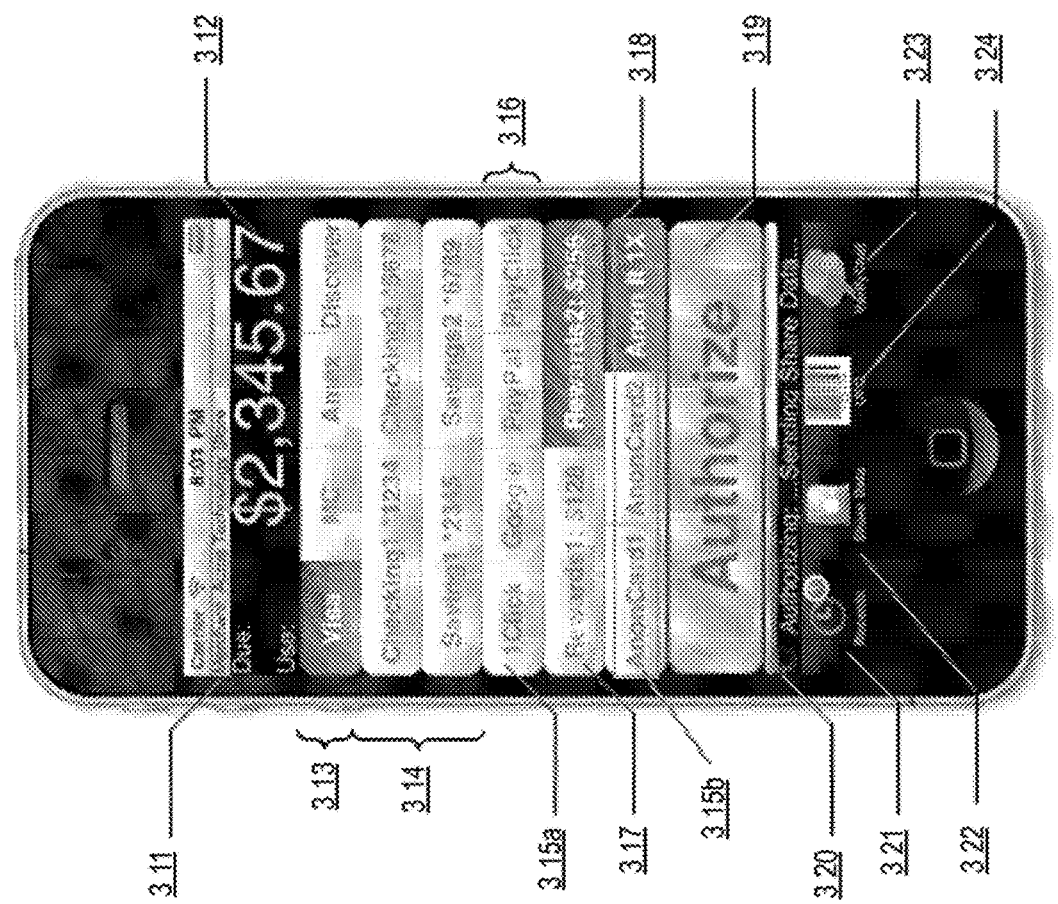

With reference to FIG. 3B, in some implementations, the app may include an indication of the location (e.g., name of the merchant store, geographical location, information about the aisle within the merchant store, etc.) of the user, e.g., 311. The app may provide an indication of a pay amount due for the purchase of the product, e.g., 312. In some implementations, the app may provide various options for the user to pay the amount for purchasing the product(s). For example, the app may utilize the GPS coordinates to determine the merchant store within the user is present, and direct the user to a website of the merchant. In some implementations, the SNAP may provide an API for participating merchants directly to facilitate transaction processing. In some implementations, a merchant-branded SNAP application may be developed with the SNAP functionality, which may directly connect the user into the merchant's transaction processing system. For example, the user may choose from a number of cards (e.g., credit cards, debit cards, prepaid cards, etc.) from various card providers, e.g., 313. In some implementations, the app may provide the user the option to pay the purchase amount using funds included in a bank account of the user, e.g., a checking, savings, money market, current account, etc., e.g., 314. In some implementations, the user may have set default options for which card, bank account, etc. to use for the purchase transactions via the app. In some implementations, such setting of default options may allow the user to initiate the purchase transaction via a single click, tap, swipe, and/or other remedial user input action, e.g., 315*a*. In some implementations, when the user utilizes such an option, the app may utilize the default settings of the user to initiate the purchase transaction. In some implementations, the app may allow the user to utilize other accounts (e.g., Google™ Checkout, Paypal™ account, etc.) to pay for the purchase transaction, e.g., 316. In some implementations, the app may allow the user to utilize rewards points, airline miles, hotel points, electronic coupons, printed coupons (e.g., by capturing the printed coupons similar to the product identifier) etc., to pay for the purchase transaction, e.g., 317-318. In some implementations, the app may provide an option to provide express authorization before initiating the purchase transaction, e.g., 319. In some implementations, the app may provide a progress indicator provide indication on the progress of the transaction after the user has selected an option to initiate the purchase transaction, e.g., 320. In some implementations, the app may provide the user with historical information on the user's prior purchases via the app, e.g., 321. In some implementations, the app may provide the user with an option to share information about the purchase (e.g., via email, SMS, wall posting on Facebook®, tweet on Twitter™, etc.) with other users and/or control information shared with the merchant, acquirer, payment network etc., to process the purchase transaction, e.g., 322. In some implementations the app may provide the user an option to display the product identification information captured by the client device (e.g., in order to show a customer service representative at the exit of a store the product information), e.g., 324. In some implementations, the user, app, device and or SNAP may encounter an error in the processing. In such scenarios, the user may be able to chat with a customer service representative (e.g., VerifyChat 323) to resolve the difficulties in the purchase transaction procedure.

In some implementations, the user may select to conduct the transaction using a one-time anonymized credit card number, see e.g., 315*b*. For example, the SNAP may utilize a pre-designated anonymized set of card details (see, e.g., "AnonCard1," "AnonCard2"). As another example, the SNAP may generate, e.g., in real-time, a one-time anonymous set of card details to securely complete the purchase transaction (e.g., "Anon It 1X"). In such implementations, the app may automatically set the user profile settings such that the any personal identifying information of the user will not be provided to the merchant and/or other entities. In some implementations, the user may be required to enter a user name and password to enable the anonymization features.

Figure 3C:
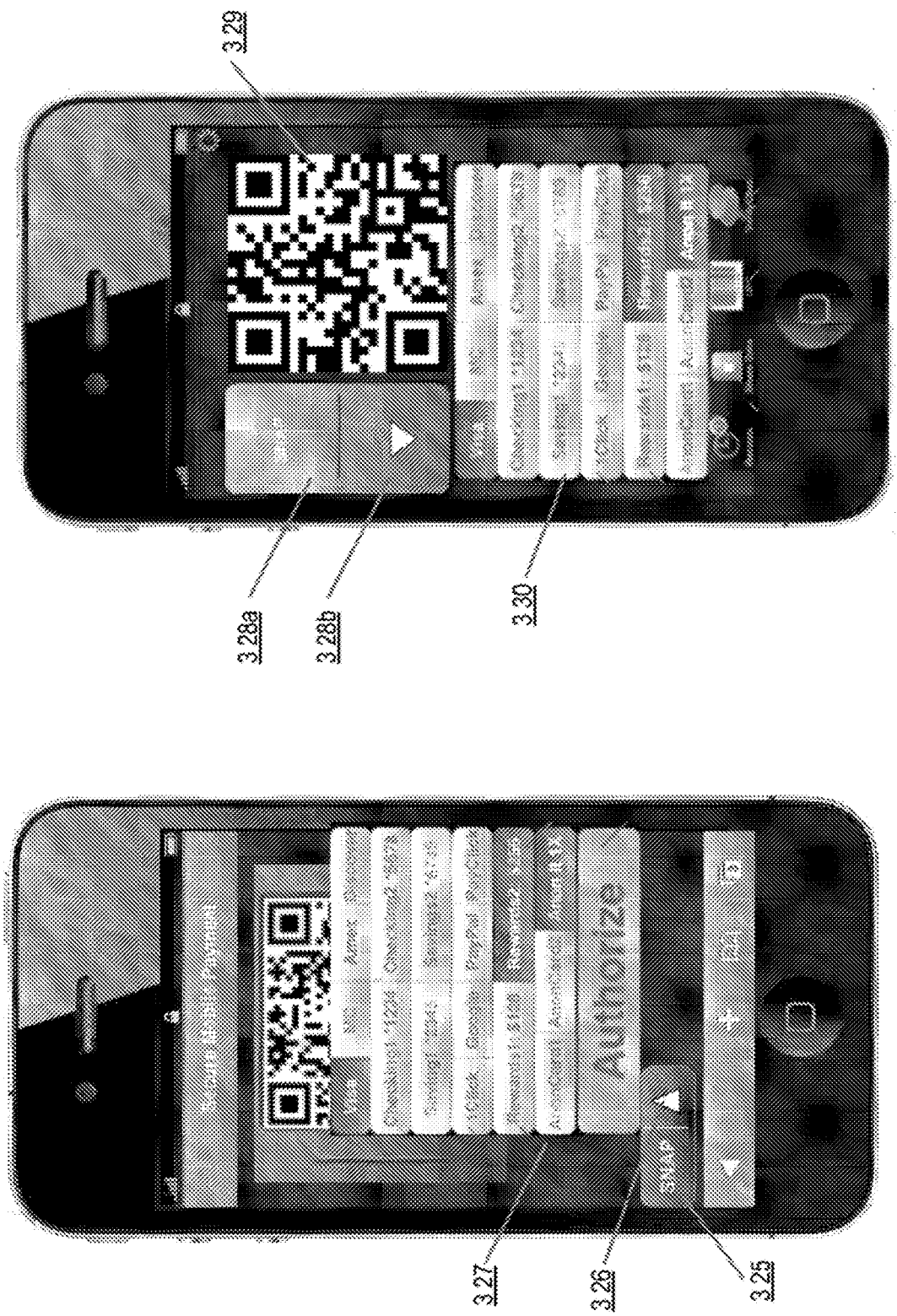

With reference to FIG. 3C, in some implementations, the user interface elements of the snap mobile payment app may be advantageously arranged to provide the user the ability to process a purchase with customized payment parameters with a minimum number of user gestures applied to the user's mobile device. For example, the user may be provided with an overloaded user interface element, e.g., 325-326. For example, if the user has a QR pay code within the viewing angle of a camera included in the user's mobile device, the user may activate element 325 to snap the QR code and utilize predetermined default settings to process the purchase based on the QR code. However, if the user wishes to customize the payment parameters, the user may activate user interface element 326 (e.g., press and continue to hold). Upon doing so, the app may provide a pop-up menu, e.g., 327, providing a variety of payment customization choices, such as those provided previously. The user may, e.g., drag the user's finger to the appropriate settings the user prefers, and release the user's finger from the touchscreen of the user's mobile device to select the setting for payment processing. In alternate implementations, the payment settings options, e.g., 330, and QR capture activation buttons, e.g., 328*a-b* (e.g., 328*b* may provide even more settings that those displayed in the initial screen), may be included in the user interface along with a window, e.g., 329, for capturing the QR code via the mobile device's camera. In alternate implementations, the user's mobile device may generate a hybrid QR code-payment settings graphic, and the POS terminal (or user's trusted computing device) may capture the entire graphic for payment processing.

Figure 3D:
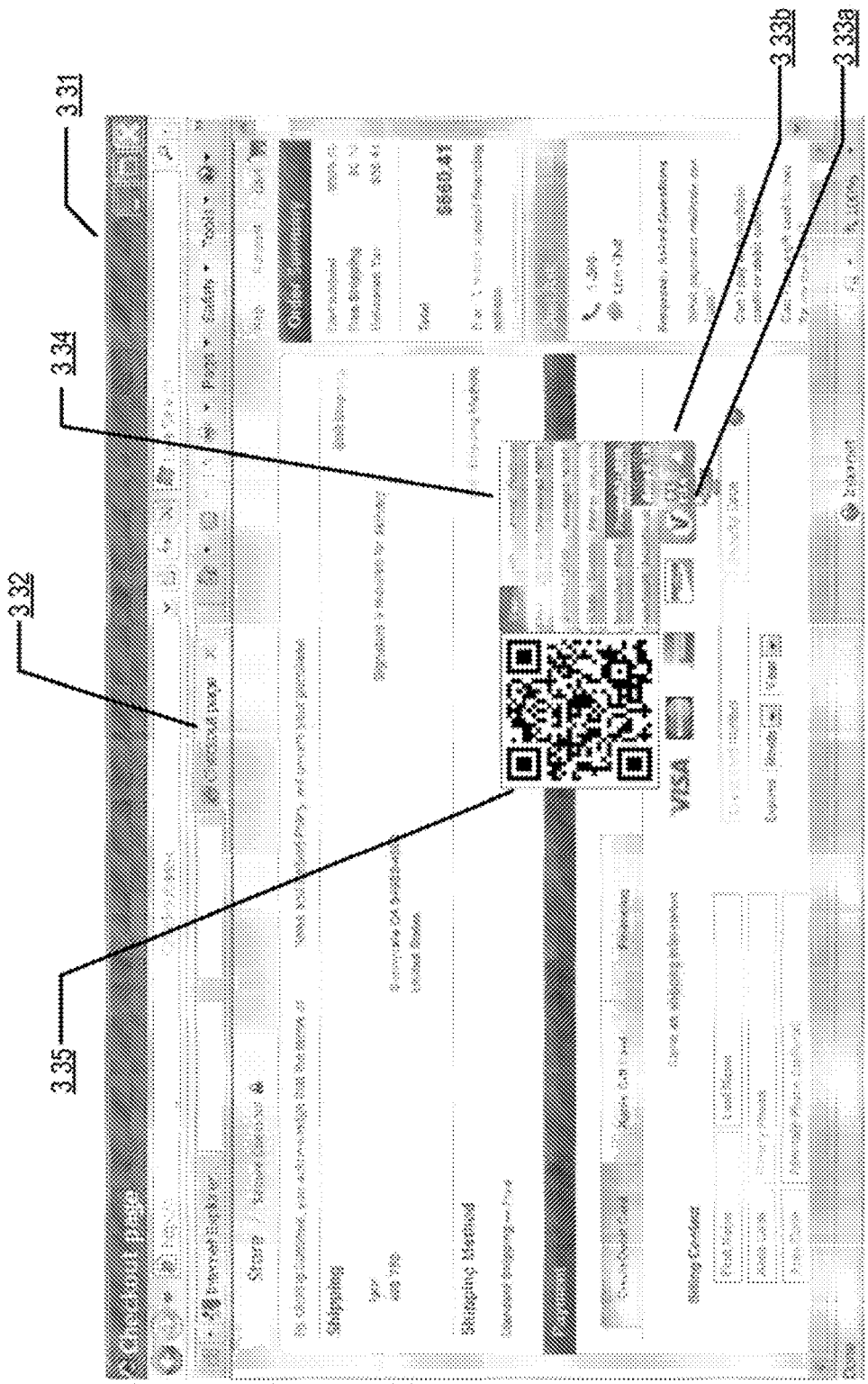

With reference to FIG. 3D, in some implementations, a user may be advantageously able to provide user settings into a device producing a QR code for a purchase transaction, and then capture the QR code using the user's mobile device. For example, a display device of a point-of-sale terminal may be displaying a checkout screen, such as a web browser executing on a client, e.g., 331, displaying a checkout webpage of an online shopping website, e.g., 332. In some implementations, the checkout screen may provide a user interface element, e.g., 333*a-b*, whereby the user can indicate the desire to utilize snap mobile payment. For example, if the user activates element 331*a*, the website may generate a QR code using default settings of the user, and display the QR code, e.g., 335, on the screen of the client for the user to capture using the user's mobile device. In some implementations, the user may be able to activate a user interface element, e.g., 333*b*, whereby the client may display a pop-up menu, e.g., 334, with additional options that the user may select from. For example, the website may provide user selection options similar to those discussed above in the description with reference to FIGS. 3B-C. In some implementations, the website may modify the QR code 335 in real-time as the user modifies settings provided by activating the user interface element 333*b*. Once the user has modified the settings using the pop-up menu, the user may capture a snapshot of the QR code to initiate purchase transaction processing.

Figure 3E:
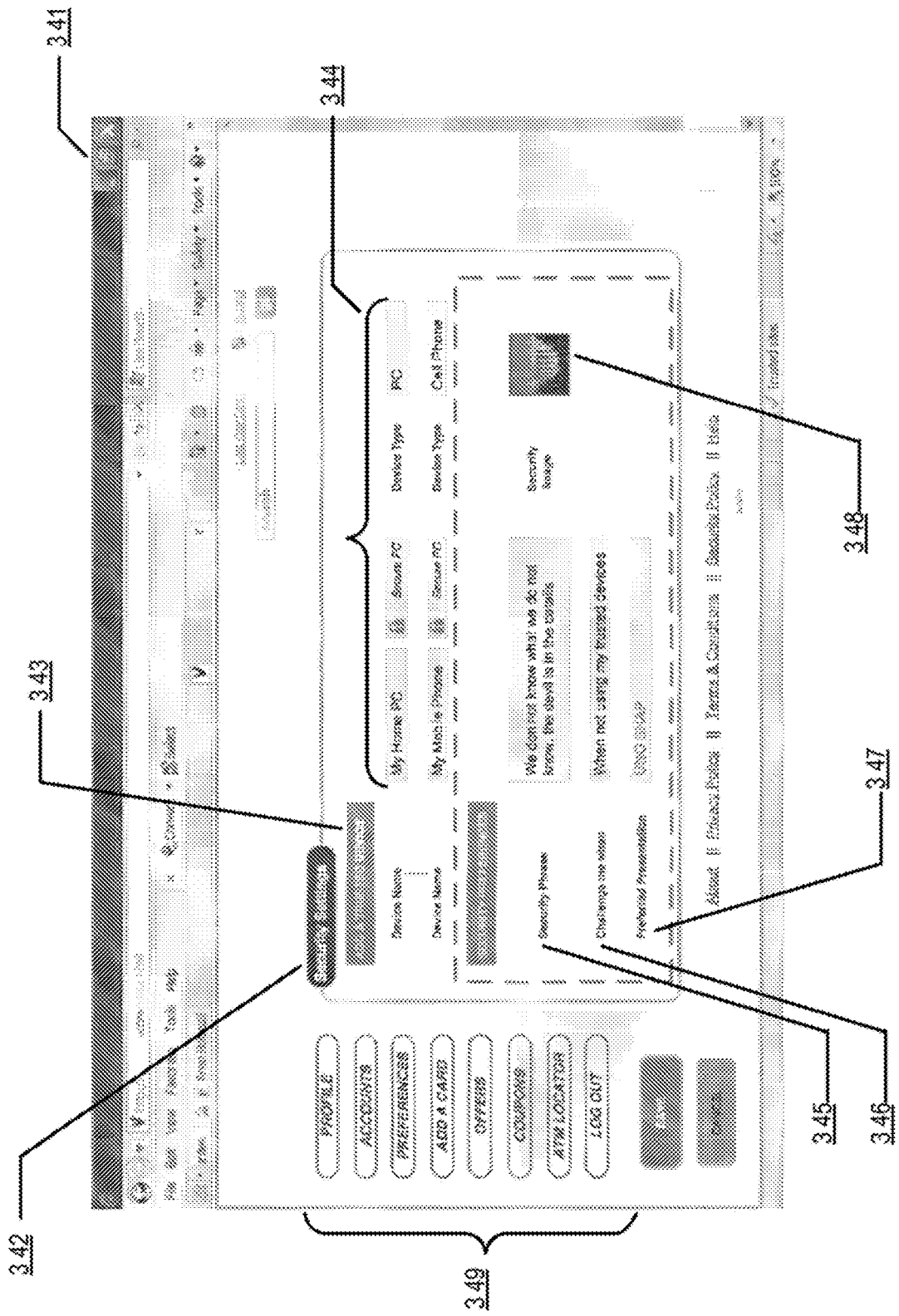

With reference to FIG. 3E, in some implementations, the SNAP may provide the user with a user interface to modify the user's snap mobile payment settings. For example, the SNAP may provide a web interface, e.g., 341. For example, the user may be able to modify security settings of the user's virtual wallet, e.g., 342, using the web interface. For example, the user may review a list of trusted device, e.g., 344, via which the user may access the user's virtual wallet. In some implementations, the web interface may provide a user interface element to add a trusted device, e.g., 343. The web interface may also provide the user with additional security options. For example, the user be able to set a security passphrase, e.g., 345, modify settings for when the user should be challenged before authorizing a purchase transaction, e.g., 346, the type/style of presentation of the security features, e.g., 347, and a security image to be displayed on the terminal utilized in snap mobile payment, e.g., 348. In various implementations, the user may be able to access other services including modifying user profiles, accounts, account preferences, adding cards, obtaining offers and coupons, locating ATM machines, etc.

Figure 4A:
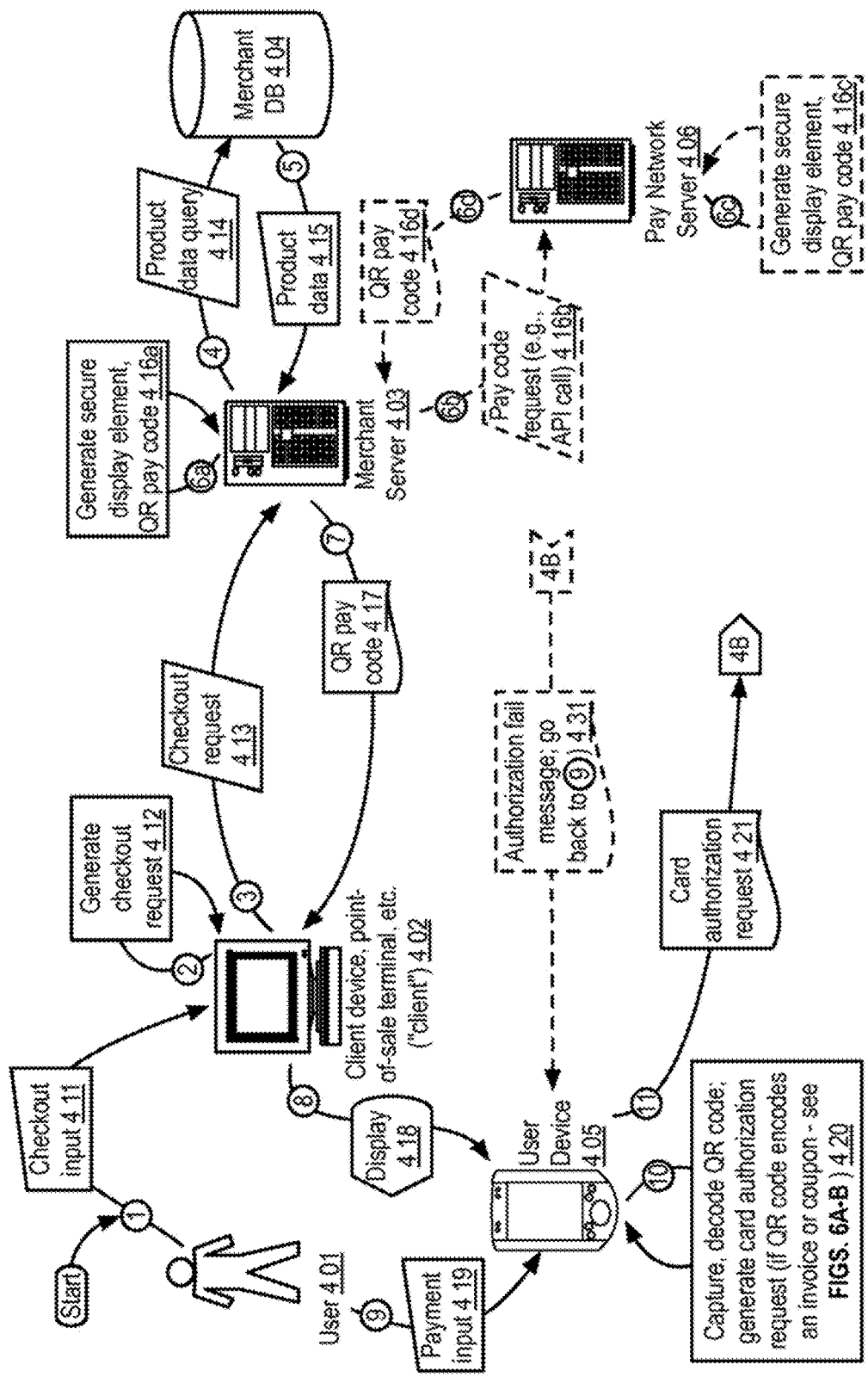
FIGS. 4A-D show data flow diagrams illustrating an example snap mobile payment procedure in some embodiments of the SNAP.

FIGS. 4A-D show data flow diagrams illustrating an example snap mobile payment procedure in some embodiments of the SNAP. With reference to FIG. 4A, in some implementations, a user, e.g., 401, may desire to purchase a product, service, offering, and/or the like ("product"), from a merchant, e.g., 403, via a merchant online site or in the merchant's store. The user may communicate with a merchant server, e.g., 403, via a client such as, but not limited to: a personal computer, mobile device, television, point-of-sale terminal, kiosk, ATM, and/or the like (e.g., 402). For example, the user may provide user input, e.g., checkout input 411, into the client indicating the user's desire to purchase the product. For example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. The client may generate a checkout request, e.g., 412, and provide the checkout request, e.g., 413, to the merchant server. For example, the client may provide a (Secure) Hypertext Transfer Protocol ("HTTP(S)") GET message including the product details for the merchant server in the form of data formatted according to the eXtensible Markup Language ("XML"). Below is an example HTTP(S) GET message including an XML-formatted checkout request for the merchant server:

```
GET /checkout.php HTTP/1.1
Host: www.merchant.com
Content-Type: Application/XML
Content-Length: 718
<?XML version = "1.0" encoding = "UTF-8"?>
<checkout_request>
    <session_ID>4NFU4RG94</session_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
```

-continued

```
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
</checkout_request>
```

In some implementations, the merchant server may obtain the checkout request from the client, and extract the checkout detail (e.g., XML data) from the checkout request. For example, the merchant server may utilize a parser such as the example parsers described below in the discussion with reference to FIG. 14. The merchant server may extract the product data, as well as the client data from the checkout request. In some implementations, the merchant server may query, e.g., 414, a merchant database, e.g., 404, to obtain product data, e.g., 415, such as product pricing, sales tax, offers, discounts, rewards, and/or other information to process the purchase transaction. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("PRODUCTS.SQL"); // select database table to search
//create query
$query = "SELECT product_info product_price tax_linfo_list
    offers_list discounts_list rewards_list FROM ProdTable
    WHERE product LIKE '%' $prod";
$result = mysql_query($query); // perform the search query
mysql_close("PRODUCTS.SQL"); // close database access
?>
```

In some implementations, in response to obtaining the product data, the merchant server may generate, e.g., 416a, a QR pay code, and/or secure display element according to the security settings of the user (see, e.g., 358). The merchant server may provide the QR code to the client, so that the client may display the QR code, and the user may capture the QR code using the user's device to obtain merchant and/or product data for generating a purchase transaction processing request. In alternate implementations, the merchant server may direct the client to communicate the product and/or merchant data required to process the transaction to the user's device via an alternate communication protocol, such as, but not limited to: Wi-Fi™, Bluetooth™, cellular network, SMS, email and/or like communication protocols. For example, the merchant server may direct the client to initiate a plug-in on its system to provide the alternate communication service, and transmit the product and/or merchant data to the user's device via the communication service.

In implementations utilizing a QR code, the merchant server may generate a QR code embodying the product information, as well as merchant information required by a payment network to process the purchase transaction. In some implementations, the QR code may include at least information required by the user device capturing the QR code to generate a purchase transaction processing request, such as a merchant identifier (e.g., a merchant ID number, merchant name, store ID, etc.) and a session identifier for a user shopping session associated with the shopping website/brick-and-mortar store.

In some implementations, the merchant server may generate in real-time, a custom, user-specific merchant-product XML data structure having a time-limited validity period, such as the example 'QR_data' XML data structure provided below:

```
<QR_data>
    <order_ID>4NFU4RG94</order_ID>
    <timestamp>2011-02-22 15:22:43</timestamp>
    <expiry_lapse>00:00:30</expiry_lapse>
    <transaction_cost>$34.78</transaction_cost>
    <alerts_URL>www.merchant.com/shopcarts.php?sessionID=AEBB4356</alerts_URL>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<QR_data>
```

In some implementations, the XML data may include a handle, alias, token, or pointer to information stored on a payment network server, rather than encoding all of the actual data required to initiate the transaction, so that the information encoded into the QR code may be advantageously minimized. In some implementations, the merchant may generate a QR code using the XML data. For example, the merchant server may utilize the PHP QR Code open-source (LGPL) library for generating QR Code, 2-dimensional barcode, available at "phpqrcode.sourceforge.net". For example, the merchant server may issue PHP commands similar to the example commands provided below:

```
<?PHP
    header('Content-Type: text/plain');
    // Create QR code image using data stored in $data variable
    QRcode::png($data, 'qrcodeimg.png');
?>
```

In alternate implementations, the merchant server may provide, e.g., 416b the XML data to a pay network server, e.g., 406, along with a request to generate a QR code. For example, the merchant server may utilize an API call to the pay network server to request generation of the QR code. The pay network server may generate the QR code for the merchant server, e.g., 416c, and provide, e.g., 416d, the QR code to the merchant server. For example, the pay network server may encode the information provided by the merchant into the QR code, and may also advantageously encode security information, time validity information, digital certificate information, anonymous shipping information, QR code generation/processing fee information, etc. into the QR code.

In some implementations, the pay network server may provide the merchant server with an encryption key (e.g., a Rivest-Shamir-Adleman ("RSA") private/public key, digital certificate). The merchant may encrypt the custom, user-specific merchant-product XML data structure using the encryption key to generate encrypted purchase data (e.g., using the RSA algorithm). The merchant server may then encode the encrypted data into the QR code. Such a scheme may be employed advantageously, in various embodiments, by the pay network server to authenticate the merchant for any transaction processing requests related to the user-merchant shopping session.

In some implementations, pre-designed QR codes associated with authenticated with pre-authenticated merchants may be provided to the user device. For example, a user may be browsing an online website on the user's device. The user device may make a HTTP(S) GET request for a webpage from a web server. In some implementations, the web server may, in response to the user device's request for a webpage, generate a query for advertisements to display on the webpage. For example, the web server may search a database, or provide a request to an ad network server (e.g., Akamai) to provide advertisements for embedding into the webpage. In some implementations, the ad network server may utilize keywords, metadata, etc. obtained from the web server (e.g., keywords or metadata associated with the webpage, user profile information, user ID, user browsing history from a cookie stored on the user device, etc.). The ad network may utilize the keywords to generate a query of database(s) for advertisements associated with the keywords, and may obtain advertisements to provide. In some implementations, the ad network server may provide information (e.g., via an API call) on such advertisements (e.g., merchant name, merchant ID, product name, product pricing information, related offers, etc.) to a pay network server. The pay network server may generate a QR code based on the information provide by the ad network server, such that a user device may snap the QR code to initiate a purchase transaction for the goods and/or services associated with the QR code (e.g., as provided by the ad network server to the pay network server). The ad network server may provide the QR as part of the advertisement to the web server, which may in turn embed the advertisement including the QR code into the webpage before providing it to the user device. In alternate implementations, the ad network server/web server may transmit a URL or other identifier of the QR code (ultimately) to the user device, and the user device may make a call (e.g., a HTTP(S) GET request) using the URL of the QR code (e.g., hosted on the pay network server) to obtain the QR code and display it for the user.

In some implementations, the merchant server may provide the QR code to the client, e.g., 417. For example, the merchant server may provide a HyperText Markup Language ("HTML") page including a reference to the QR code image and/or secure element image, such as the example HTML page below:

```
<html>
    <img src="www.merchant.com/securedyn/0394733/qrcodeimg.png"
    alt="Merchant-Product QR code"/>
    <img src=" www.merchant.com/securedyn/0394733/123.png"
    alt="Secure Element"/>
</html>
```

In some implementations, the client may obtain the QR pay code, e.g., 417, and display the QR code, e.g., 418 on a display screen associated with the client device. In some implementations, the user may utilize a user device, e.g., 405, to capture the QR code presented by the client device for payment processing. For example, the user may provide payment input into the user device, e.g., 419. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user device may obtain track 1 data from the user's card (e.g., credit card, debit card, prepaid card, charge card, etc.), such as the example track 1 data provided below:

```
%B123456789012345^PUBLIC/J.Q.^99011200000000000000**901******?*
(wherein '123456789012345' is the card number of 'J.Q. Public' and has a CVV
    number of 901. '990112' is a service code, and *** represents decimal digits
    which change randomly each time the card is used.)
```

In some implementation, the user device may determine whether an image it has captured depicts a QR code. Depending on whether or not a QR code has been captured, and also (optionally) depending on contents of the QR code, the user device may redirect the user (e.g., via a web browser application executing on the user device) to: a product, a merchant website, a product at a merchant website, a website and including a command to add an item to a purchasing cart of the user associated with the website, and/or the like. For example, the user device may execute a component such as the example Quick Response Code Processing ("QRCP") component 600 described below in the discussion with reference to FIGS. 6A-B.

In some implementations, upon obtaining the user payment input and capturing the QR code, the user device may generate a card authorization request 420 (e.g., if the QR code includes a purchasing coupon, offer, invoice, personal payment from another virtual wallet user, etc.), for providing to the pay network server. For example, the user device may provide a card authorization request, e.g., 421, on behalf of the user, a HTTP(S) GET message including the product order details for a pay network server, e.g., 406, in the form of XML-formatted data. Below is an example HTTP(S) GET message including an XML-formatted card authorization request for the pay network server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <alerts_URL>www.merchant.com/shopcarts.php?sessionID=AEBB4356</alerts_URL>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the card authorization request generated by the user device may include a minimum of information required to process the purchase transaction. For example, this may improve the efficiency of communicating the purchase transaction request, and may also advantageously improve the privacy protections provided to the user and/or merchant. For example, in some implementations, the card authorization request may include at least a merchant ID, a session ID for the user's shopping session with the merchant, and a device ID of a device (e.g., smartphone) of the user that is linked to the user's virtual wallet. In some implementations, the QR code and messages sent to/from the QR-code capturing device may include the source ID (e.g., identifier of the device generating the QR code), session ID, merchant ID, item ID (e.g., model number), the charge amount, and/or transacting device ID (e.g., the user's smartphone device).

In some implementations, the card authorization request may be provided by the merchant server or point of sale terminal, instead of the user device. In some implementations, the user, desiring security, may request, via the user device, the pay network server for a dynamically-generated card verification value code (dCVV™) to be utilized along with the user's primary account number ("PAN," e.g., credit card number) in the purchase transaction. In response, the payment network server may generate a dCVV™ code (e.g., using random number generation, MD5 hash of an input key, which may be generated using the user ID, merchant ID, session ID, timestamp, combinations thereof, and/or the like), and provide a session-specific dCVV™ code for the user to utilize along with the user's PAN number. For example, the session-specific dCW™ code may have an expiry time (e.g., expiry in a one minute from issue). The user device may communicate (e.g., via Bluetooth™, NFC, Wi-Fi, cellular, QR code, etc.) the PAN and dCVV to the point-of-sale terminal, which may create the card authorization request. For example, the user device may generate a QR payment code embedding the PAN and dCVV numbers, and the point of sale terminal may snap an image of the user device-generated QR payment code. The point of sale terminal may then generate and provide the card authorization request to the pay network server. The pay network server may then be able to validate the transaction by comparing the dCVV obtained from the merchant with the dCVV it provided to the user device before the purchase transaction was initiated. If the dCVV codes from the two sources (pay network server and merchant) correspond properly to each other, the pay network server may continue processing the purchase transaction.

In some implementations, the card authorization request from a user device may include encrypted data extracted from the QR code, which may have been encrypted by the merchant server as part of a merchant authentication scheme. In some implementations, the pay network server may obtain the encrypted data from the card authorization request provided by the user device, and attempt to decrypt the encrypted data, e.g., using a RSA private/public that is complementary to the key the pay network server initially provided to the merchant server for encrypting the purchase data before embedding it into the QR code. If the pay network server is able to decrypt the purchase data, then the merchant is authenticated as being a valid merchant. In some implementations, the pay network server may compare the purchase data decrypted from the card authorization with data provided by the user/user device, to determine whether the data from these different sources (user/user device, and merchant) correspond properly to each other. Thus, in some implementations, the pay network server may be able to authenticate the merchant, and correlate the merchant to a specific user session or user device before processing the transaction.

In some implementations, the pay network server may provide a notification to the user device that the transaction is authenticated and approved for transacting. In alternate implementations, the pay network server may proceed with transaction processing. In some implementations, upon identifying that the user is in a session with the merchant, the pay network server may communicate with the user device to provide additional features for the user. For example, in some implementations, the pay network server may provide a communication to the user device (e.g., via a HTTP(S) POST message) to provide: a virtual storefront of the merchant; a depiction of an aisle of the merchant associated with the products included in the card authorization request, a listing of related items; and/or the like (see, e.g., FIG. 7E-G and description below of additional embodiments).

Figure 4B:
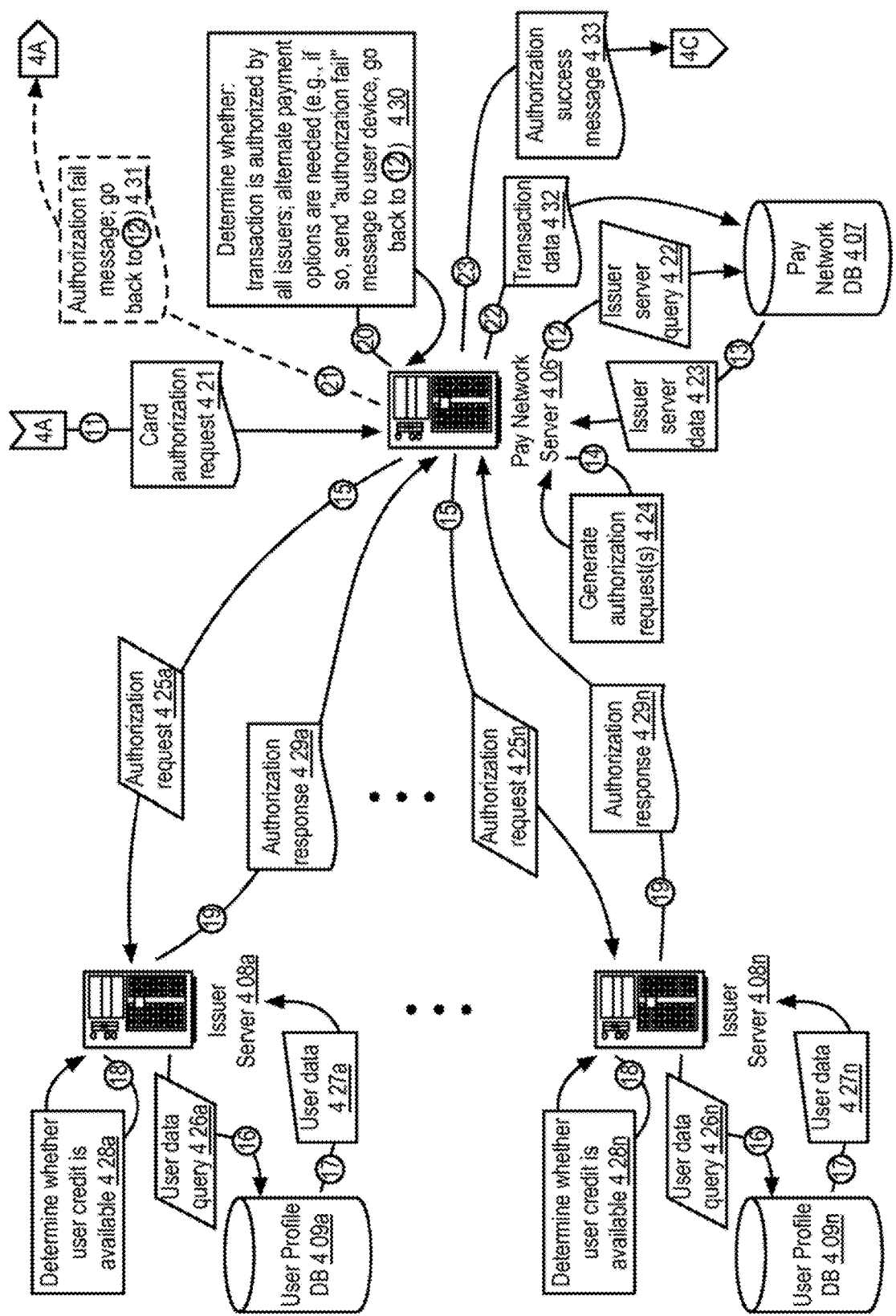

With reference to FIG. 4B, in some implementations, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

In some implementations, the pay network server may generate a query, e.g., 422, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 408a-n, of the issuer(s) may maintain details of the user's account. In some implementations, a database, e.g., pay network database 407, may store details of the issuer server(s) associated with the issuer(s). For example, the database may be a relational database responsive to Structured Query Language ("SQL") commands. The pay network server may query the pay network database for issuer server(s) details. For example, the pay network server may execute a hypertext preprocessor ("PHP") script including SQL commands to query the database for details of the issuer server(s). An example PHP/SQL command listing, illustrating substantive aspects of querying the database, is provided below:

```
<?PHP
header('Content-Type: text/plain');
mysql_connect("254.93.179.112",$DBserver,$password); // access database server
mysql_select_db("ISSUERS.SQL"); // select database table to search
//create query for issuer server data
$query = "SELECT issuer_name issuer_address issuer_id ip_address
    mac_address auth_key port_num security_settings_list FROM
    IssuerTable WHERE account_num LIKE '%' $accountnum";
$result = mysql_query($query); // perform the search query
mysql_close("ISSUERS.SQL"); // close database access
?>
```

In response to obtaining the issuer server query, e.g., 422, the pay network database may provide, e.g., 423, the requested issuer server data to the pay network server. In some implementations, the pay network server may utilize the issuer server data to generate authorization request(s), e.g., 424, for each of the issuer server(s) selected based on the pre-defined payment settings associated with the user's virtual wallet, and/or the user's payment options input, and provide the card authorization request(s), e.g., 425a-n, to the issuer server(s), e.g., 408a-n. In some implementations, the authorization request(s) may include details such as, but not limited to: the costs to the user involved in the transaction, card account details of the user, user billing and/or shipping information, and/or the like. For example, the pay network server may provide a HTTP(S) POST message including an XML-formatted authorization request similar to the example listing provided below:

```
POST /authorization.php HTTP/1.1
Host: www.issuer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
        <num_products>1</num_products>
        <product>
            <product_summary>Book - XML for dummies</product_summary>
```

```
        <product_quantity>1</product_quantity?
    </product>
</purchase_summary>
<transaction_cost>$22.61</transaction_cost>
<account_params>
    <account_type>checking</account_type>
    <account_num>1234567890123456</account_num>
</account_params>
<merchant_params>
    <merchant_id>3FBCR4INC</merchant_id>
    <merchant_name>Books & Things, Inc.</merchant_name>
    <merchant_auth_key>1NNF484MCP59CHB27365</merchant_auth_key>
</merchant_params>
</card_query_request>
```

In some implementations, an issuer server may parse the authorization request(s), and based on the request details may query a database, e.g., user profile database 409a-n, for data associated with an account linked to the user. For example, the issuer server may issue PHP/SQL commands similar to the example provided below:

```
<?PHP
header('Content-Type: text/plain');
mysql_connect("254.93.179.112",$DBserver,$password); // access database server
mysql_select_db("USERS.SQL"); // select database table to search
//create query for user data
$query = "SELECT user_id user_name user_balance account_type
    FROM UserTable WHERE account_num LIKE '%' $accountnum";
$result = mysql_query($query); // perform the search query
mysql_close("USERS.SQL"); // close database access
?>
```

In some implementations, on obtaining the user data, e.g., 427a-n, the issuer server may determine whether the user can pay for the transaction using funds available in the account, e.g., 428a-n. For example, the issuer server may determine whether the user has a sufficient balance remaining in the account, sufficient credit associated with the account, and/or the like. Based on the determination, the issuer server(s) may provide an authorization response, e.g., 429a-n, to the pay network server. For example, the issuer server(s) may provide a HTTP(S) POST message similar to the examples above. In some implementations, if at least one issuer server determines that the user cannot pay for the transaction using the funds available in the account, see e.g., 430-431, the pay network server may request payment options again from the user (e.g., by providing an authorization fail message 431 to the user device and requesting the user device to provide new payment options), and re-attempt authorization for the purchase transaction. In some implementations, if the number of failed authorization attempts exceeds a threshold, the pay network server may abort the authorization process, and provide an "authorization fail" message to the merchant server, user device and/or client.

Figure 4C:
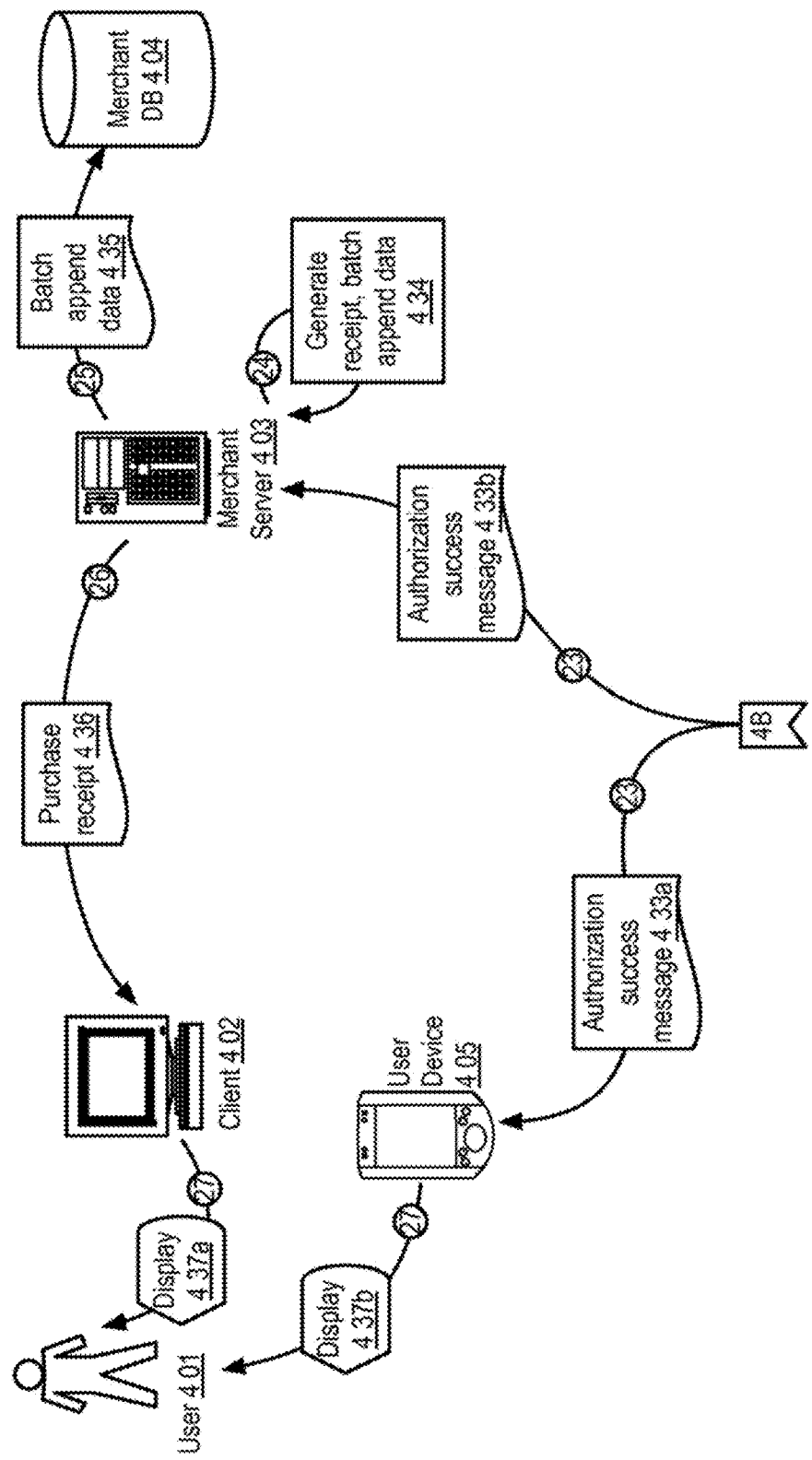

With reference to FIG. 4C, in some implementations, the pay network server may obtain the authorization message including a notification of successful authorization, see e.g., 430, 433, and parse the message to extract authorization details. Upon determining that the user possesses sufficient funds for the transaction, the pay network server may generate a transaction data record, e.g., 432, from the authorization request and/or authorization response, and store the details of the transaction and authorization relating to the transaction in a transactions database. For example, the pay network server may issue PHP/SQL commands similar to the example listing below to store the transaction data in a database:

```
<?PHP
header('Content-Type: text/plain');
mysql_connect("254.92.185.103",$DBserver,$password); //
access database server
mysql_select("TRANSACTIONS.SQL"); // select database to
append
mysql_query("INSERT INTO PurchasesTable (timestamp,
    purchase_summary_list, num_products, product_summary,
    product_quantity, transaction_cost, account_params_list,
    account_name, account_type, account_num, billing_addres,
    zipcode, phone, sign, merchant_params_list, merchant_id,
    merchant_name, merchant_auth_key)
VALUES (time( ), $purchase_summary_list, $num_products,
    $product_summary, $product_quantity, $transaction_cost,
    $account_params_list, $account_name, $account_type,
    $account_num, $billing_addres, $zipcode, $phone, $sign,
    $merchant_params_list, $merchant_id, $merchant_name,
    $merchant_auth_key)"); // add data to table in database
mysql_close("TRANSACTIONS.SQL"); // close connection to
database
?>
```

In some implementations, the pay network server may forward an authorization success message, e.g., 433a-b, to the user device and/or merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 434, and store the XML data file, e.g., 435, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
```

```
        <merchant_auth_key>1NNF484MCP59CHB27365</merchant_auth_key>
        <account_number>123456789</account_number>
    </merchant_data>
    <transaction_data>
        <transaction 1>
            ...
        </transaction 1>
        <transaction 2>
            ...
        </transaction 2>
        .
        .
        .
        <transaction n>
            ...
        </transaction n>
</transaction_data>
```

In some implementations, the server may also generate a purchase receipt, e.g., 434, and provide the purchase receipt to the client, e.g., 436. The client may render and display, e.g., 437a, the purchase receipt for the user. In some implementations, the user device 405 may also provide a notification of successful authorization to the user, e.g., 437b. For example, the client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 4D:
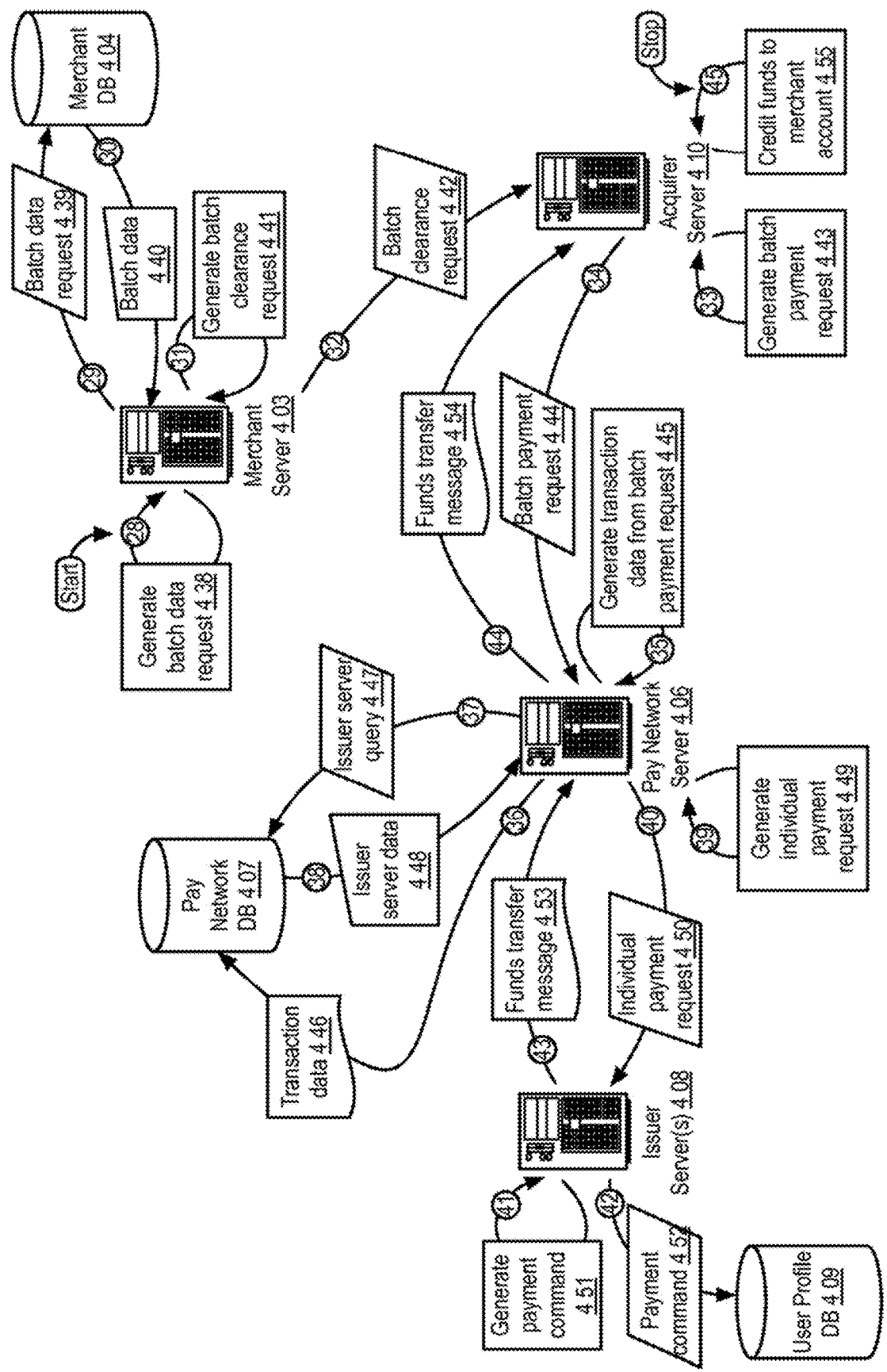

With reference to FIG. 4D, in some implementations, the merchant server may initiate clearance of a batch of authorized transactions. For example, the merchant server may generate a batch data request, e.g., 438, and provide the request, e.g., 439, to a database, e.g., merchant database 404. For example, the merchant server may utilize PHP/SQL commands similar to the examples provided above to query a relational database. In response to the batch data request, the database may provide the requested batch data, e.g., 440. The server may generate a batch clearance request, e.g., 441, using the batch data obtained from the database, and provide, e.g., 442, the batch clearance request to an acquirer server, e.g., 410. For example, the merchant server may provide a HTTP(S) POST message including XML-formatted batch data in the message body for the acquirer server. The acquirer server may generate, e.g., 443, a batch payment request using the obtained batch clearance request, and provide the batch payment request to the pay network server, e.g., 444. The pay network server may parse the batch payment request, and extract the transaction data for each transaction stored in the batch payment request, e.g., 445. The pay network server may store the transaction data, e.g., 446, for each transaction in a database, e.g., pay network database 407. For each extracted transaction, the pay network server may query, e.g., 447-448, a database, e.g., pay network database 407, for an address of an issuer server. For example, the pay network server may utilize PHP/SQL commands similar to the examples provided above. The pay network server may generate an individual payment request, e.g., 449, for each transaction for which it has extracted transaction data, and provide the individual payment request, e.g., 450, to the issuer server, e.g., 408. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
```

```
        </product>
    </purchase_summary>
</pay_request>
```

In some implementations, the issuer server may generate a payment command, e.g., 451. For example, the issuer server may issue a command to deduct funds from the user's account (or add a charge to the user's credit card account). The issuer server may issue a payment command, e.g., 452, to a database storing the user's account information, e.g., user profile database 409. The issuer server may provide a funds transfer message, e.g., 453, to the pay network server, which may forward, e.g., 454, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 455.

FIGS. 5A-E show logic flow diagrams illustrating example aspects of executing a snap mobile payment in some embodiments of the SNAP, e.g., a Snap Mobile Payment Execution ("SMPE") component 500. With reference to FIGURE SA, in some implementations, a user may desire to purchase a product, service, offering, and/or the like ("product"), from a merchant via a merchant online site or in the merchant's store. The user may communicate with a merchant server via a client. For example, the user may provide user input, e.g., 501, into the client indicating the user's desire to checkout shopping items in a (virtual) shopping cart. The client may generate a checkout request, e.g., 502, and provide the checkout request to the merchant server. The merchant server may obtain the checkout request from the client, and extract the checkout detail (e.g., XML data) from the checkout request, e.g., 503. For example, the merchant server may utilize a parser such as the example parsers described below in the discussion with reference to FIG. 14. The merchant server may extract the product data, as well as the client data from the checkout request. In some implementations, the merchant server may query, e.g., 504, a merchant database to obtain product data, e.g., 505, such as product pricing, sales tax, offers, discounts, rewards, and/or other information to process the purchase transaction.

In response to obtaining the product data, the merchant server may generate, e.g., 506, a QR pay code, and/or secure display element according to the security settings of the user (see, e.g., 358). For example, the merchant server may generate a QR code embodying the product information, as well as merchant information required by a payment network to process the purchase transaction. For example, the merchant server may first generate in real-time, a custom, user-specific merchant-product XML data structure having a time-limited validity period, such as the example 'QR_data' XML data structure provided below:

```
<QR_data>
    <session_ID>4NFU4RG94</session_ID>
    <timestamp>2011-02-22 15:22:43</timestamp>
    <expiry_lapse>00:00:30</expiry_lapse>
    <transaction_cost>$34.78</transaction_cost>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
```

```
    <merchant_auth_key>1NNF484MCP59CHB27365</merchant_auth_key>
  </merchant_params>
<QR_data>
```

In some implementations, the merchant may generate QR code using the XML data. For example, the merchant server may utilize the PHP QR Code open-source (LGPL) library for generating QR Code, 2-dimensional barcode, available at "phpqrcode.sourceforge.net". For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

The merchant server may provide the QR pay code to the client, e.g., 506. The client may obtain the QR pay code, and display the QR code, e.g., 507 on a display screen associated with the client device. In some implementations, the user may utilize a user device, e.g., 509, to capture the QR code presented by the client device for payment processing. The client device may decode the QR code to extract the information embedded in the QR code. For example, the client device may utilize an application such as the ZXing multi-format 1D/2D barcode image processing library, available at "code.google.com/p/zxing/" to extract the information from the QR code. In some implementations, the user may provide payment input into the user device, e.g., 508. Upon obtaining the user purchase input, the user device may generate a card authorization request, e.g., 509, and provide the card authorization request to a pay network server.

Figure 5A:
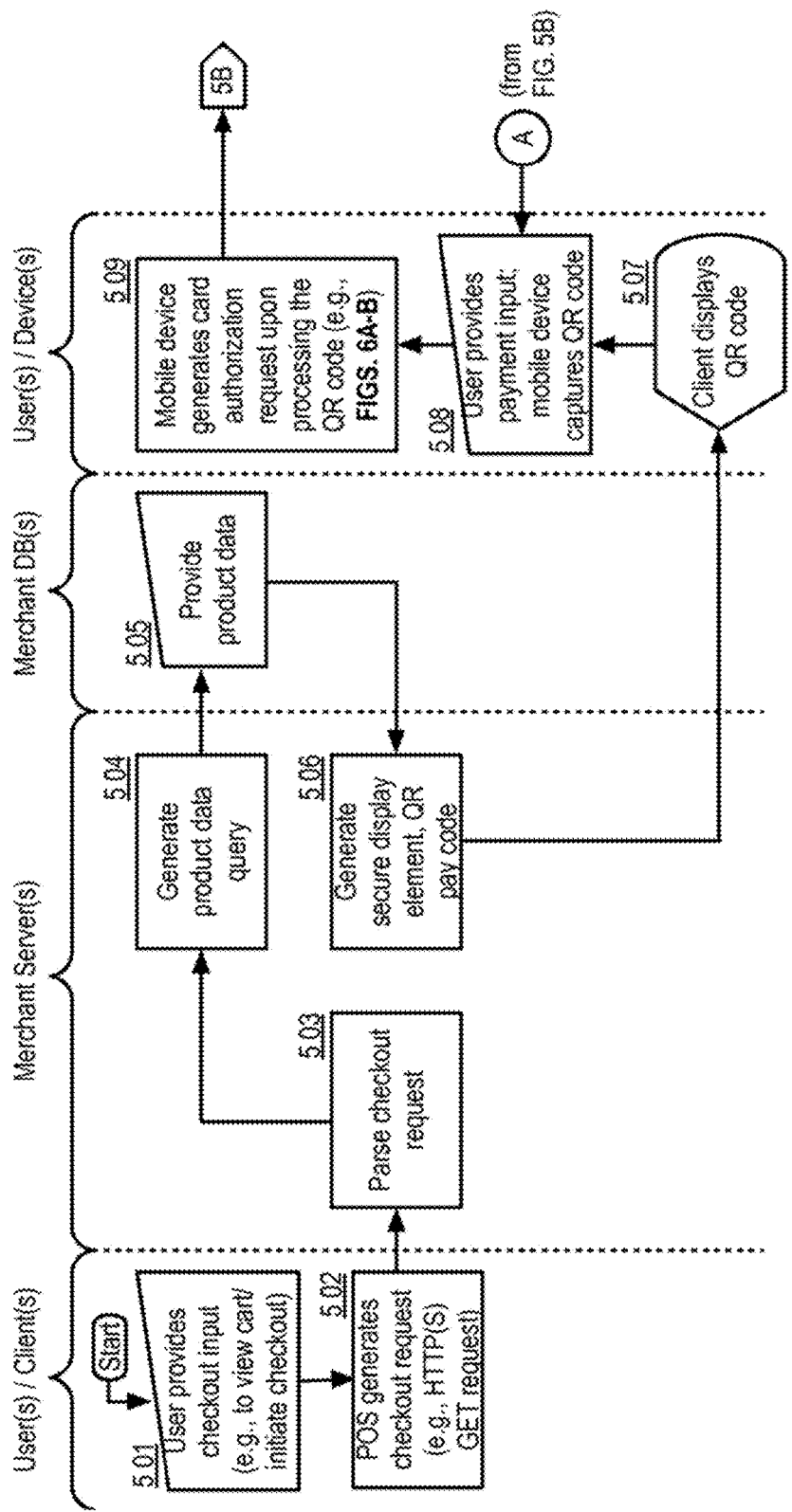
FIGS. 5A-E show logic flow diagrams illustrating example aspects of executing a snap mobile payment in some embodiments of the SNAP, e.g., a Snap Mobile Payment Execution ("SMPE") component 500.
Figure 5B:
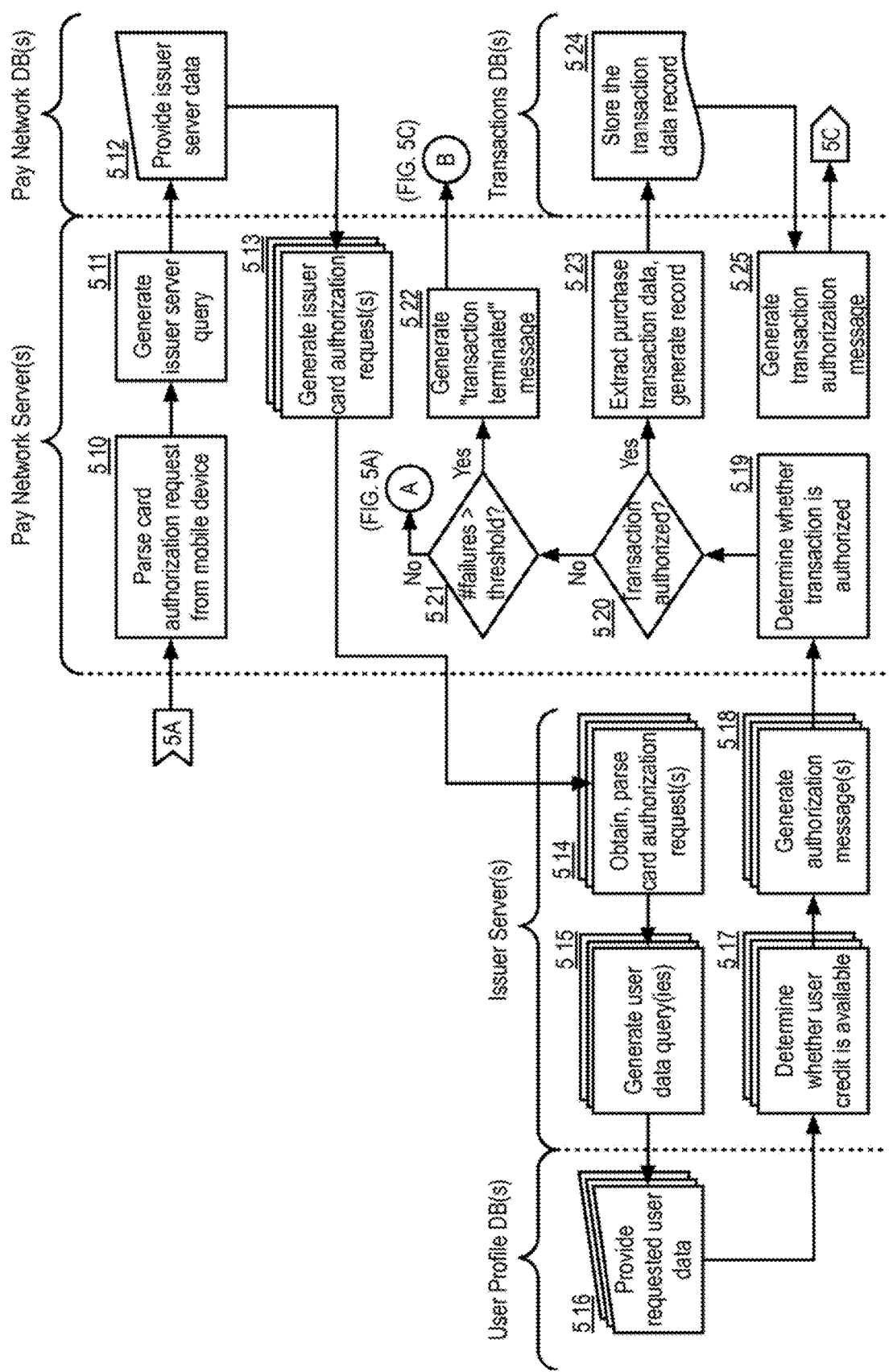

With reference to FIG. 5B, in some implementations, the pay network server may parse the card authorization request, e.g., 510, and generate a query, e.g., 511, for issuer server(s) corresponding to the user-selected payment options. In some implementations, a pay network database may store details of the issuer server(s) associated with the issuer(s). In response to obtaining the issuer server query, the pay network database may provide, e.g., 512, the requested issuer server data to the pay network server. In some implementations, the pay network server may utilize the issuer server data to generate authorization request(s), e.g., 425134, for each of the issuer server(s), and provide the card authorization request(s) to the issuer server(s).

In some implementations, an issuer server may parse the authorization request(s), and based on the request details may query a user profile database for data associated with an account linked to the user. In some implementations, on obtaining the user data, the issuer server may determine whether the user can pay for the transaction using funds available in the account, e.g., 517. For example, the issuer server may determine whether the user has a sufficient balance remaining in the account, sufficient credit associated with the account, and/or the like. Based on the determination, the issuer server(s) may provide an authorization response, e.g., 518, to the pay network server. In some implementations, if at least one issuer server determines, e.g., 519, that the user cannot pay for the transaction using the funds available in the account, see e.g., 520, option "No," the pay network server may request payment options again from the user (see e.g., 521, option "No," by providing an authorization fail message to the user device and requesting the user device to provide new payment options), and re-attempt authorization for the purchase transaction. In some implementations, if the number of failed authorization attempts exceeds a threshold, see, e.g., 521, option "Yes," the pay network server may abort the authorization process, and provide an "authorization fail" message to the merchant server, user device and/or client, e.g., 522.

In some implementations, the pay network server may obtain the authorization message including a notification of successful authorization, see e.g., 520, option "Yes,", and parse the message to extract authorization details. Upon determining that the user possesses sufficient funds for the transaction, the pay network server may generate a transaction data record, e.g., 523, from the authorization request and/or authorization response, and store, e.g., 524, the details of the transaction and authorization relating to the transaction in a transactions database.

Figure 5C:
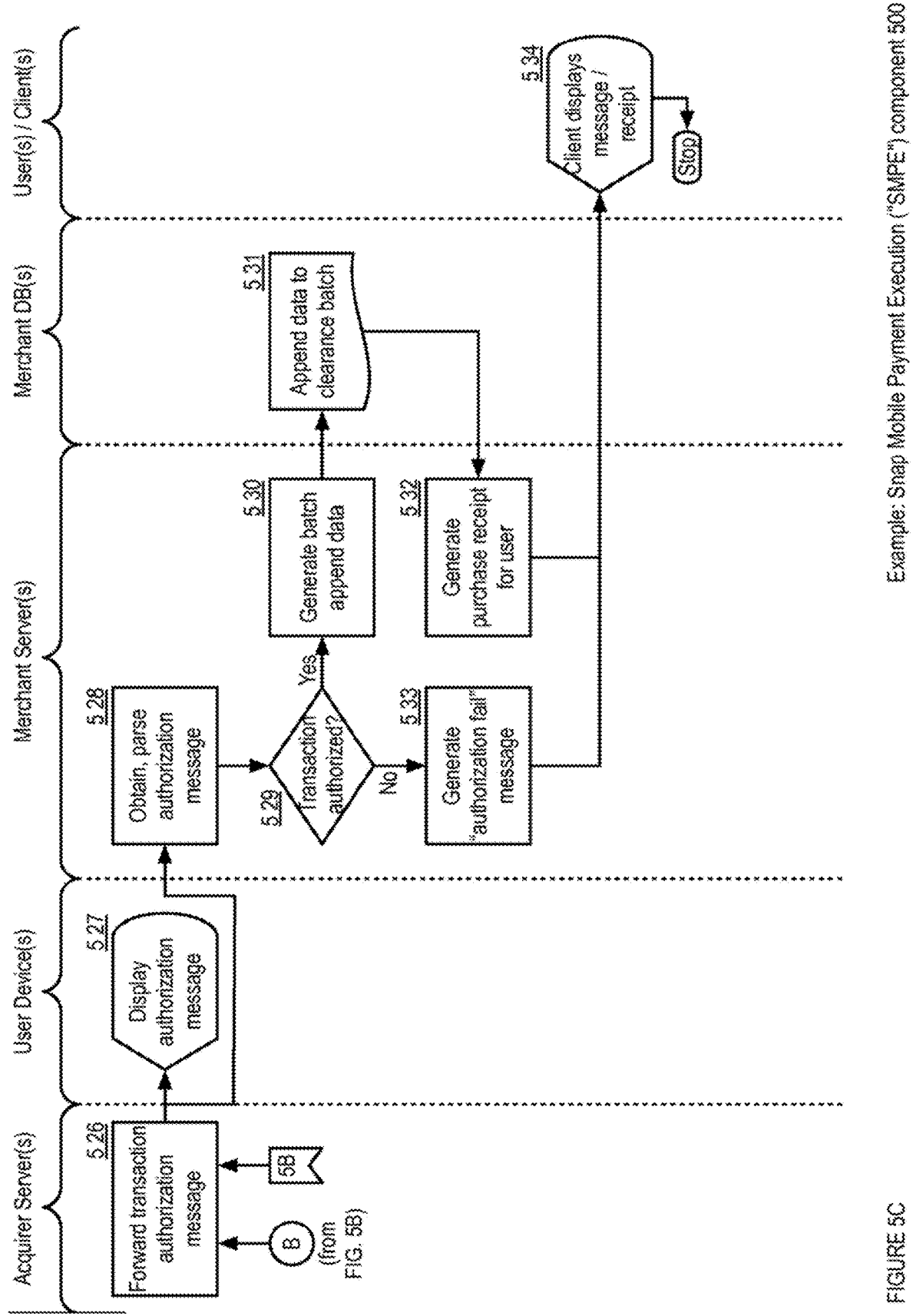

With reference to FIG. 5C, in some implementations, the pay network server may forward an authorization success message, e.g., 525, to the user device and/or merchant server, sometimes via the acquirer server, e.g. 526. The merchant may parse the authorization message, e.g., 528, and determine from it that the user possesses sufficient funds in the card account to conduct the transaction, see, e.g., 529. The merchant server may add a record of the transaction for the user to a batch of transaction data relating to authorized transactions, see, e.g., 530-531. In some implementations, the merchant server may also generate a purchase receipt, e.g., 532, and provide the purchase receipt to the client. The client may render and display, e.g., 534, the purchase receipt for the user. In some implementations, the user device 405 may also provide a notification of successful authorization to the user.

Figure 5D:
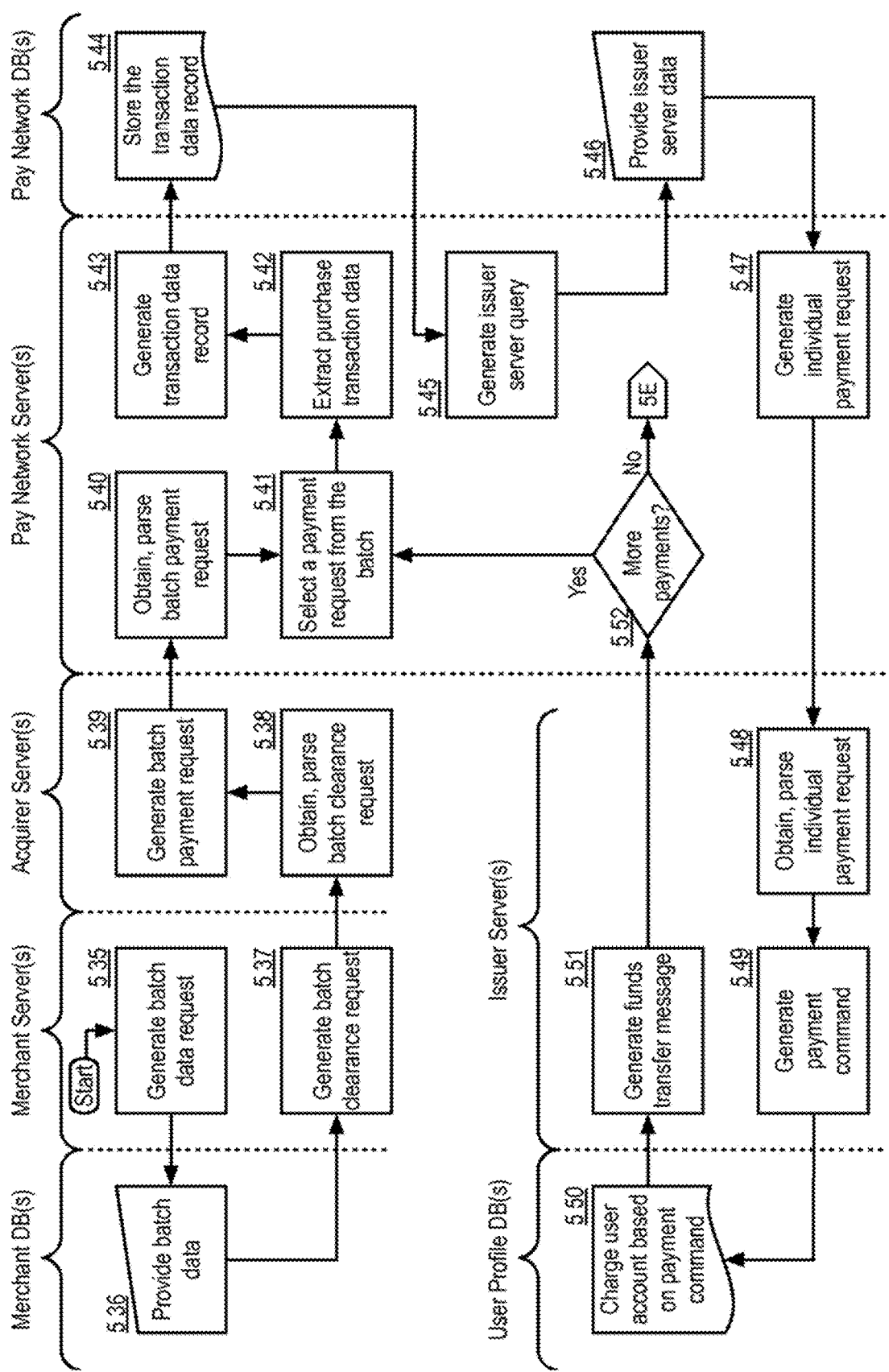
Figure 5E:
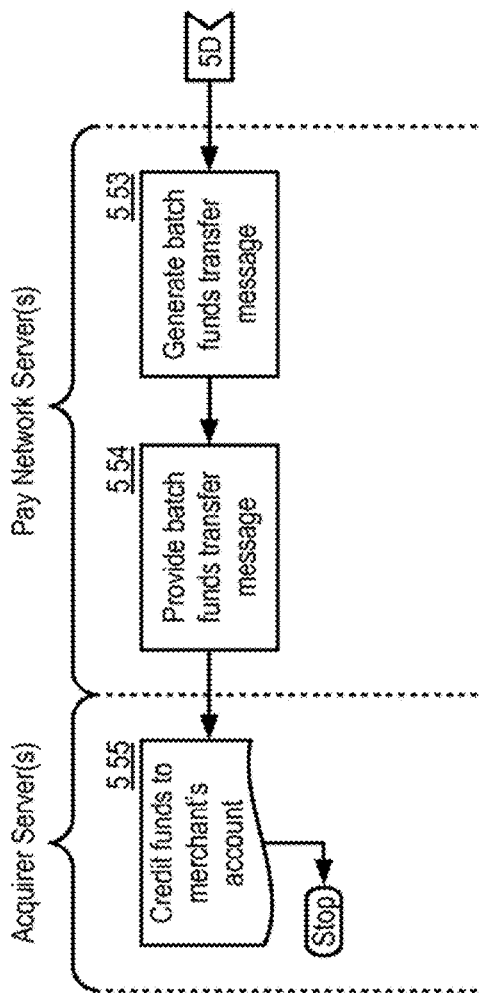

With reference to FIGS. 5D-E, in some implementations, the merchant server may initiate clearance of a batch of authorized transactions. For example, the merchant server may generate a batch data request, e.g., 535, and provide the request, e.g., 536, to a database, e.g., merchant database. In response to the batch data request, the database may provide the requested batch data, e.g., 536. The server may generate a batch clearance request, e.g., 537, using the batch data obtained from the database, and provide the batch clearance request to an acquirer server. The acquirer server may generate, e.g., 539, a batch payment request using the obtained batch clearance request, and provide the batch payment request to the pay network server. The pay network server may parse the batch payment request, and extract the transaction data for each transaction stored in the batch payment request, e.g., 540-542. The pay network server may store the transaction data, e.g., 543-544, for each transaction in a database, e.g., pay network database. For each extracted transaction, the pay network server may query, e.g., 545-546, a database, e.g., pay network database, for an address of an issuer server. The pay network server may generate an individual payment request, e.g., 547, for each transaction for which it has extracted transaction data, and provide the individual payment request to the associated issuer server.

In some implementations, the issuer server may generate a payment command, e.g., 548-549. For example, the issuer server may issue a command to deduct funds from the user's account (or add a charge to the user's credit card account). The issuer server may issue a payment command, e.g., 549, to a database storing the user's account information, e.g., user profile database. The issuer server may provide a funds transfer message, e.g., 551, to the pay network server, which may forward the funds transfer message to the acquirer server. In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 553-555.

Figure 6A:
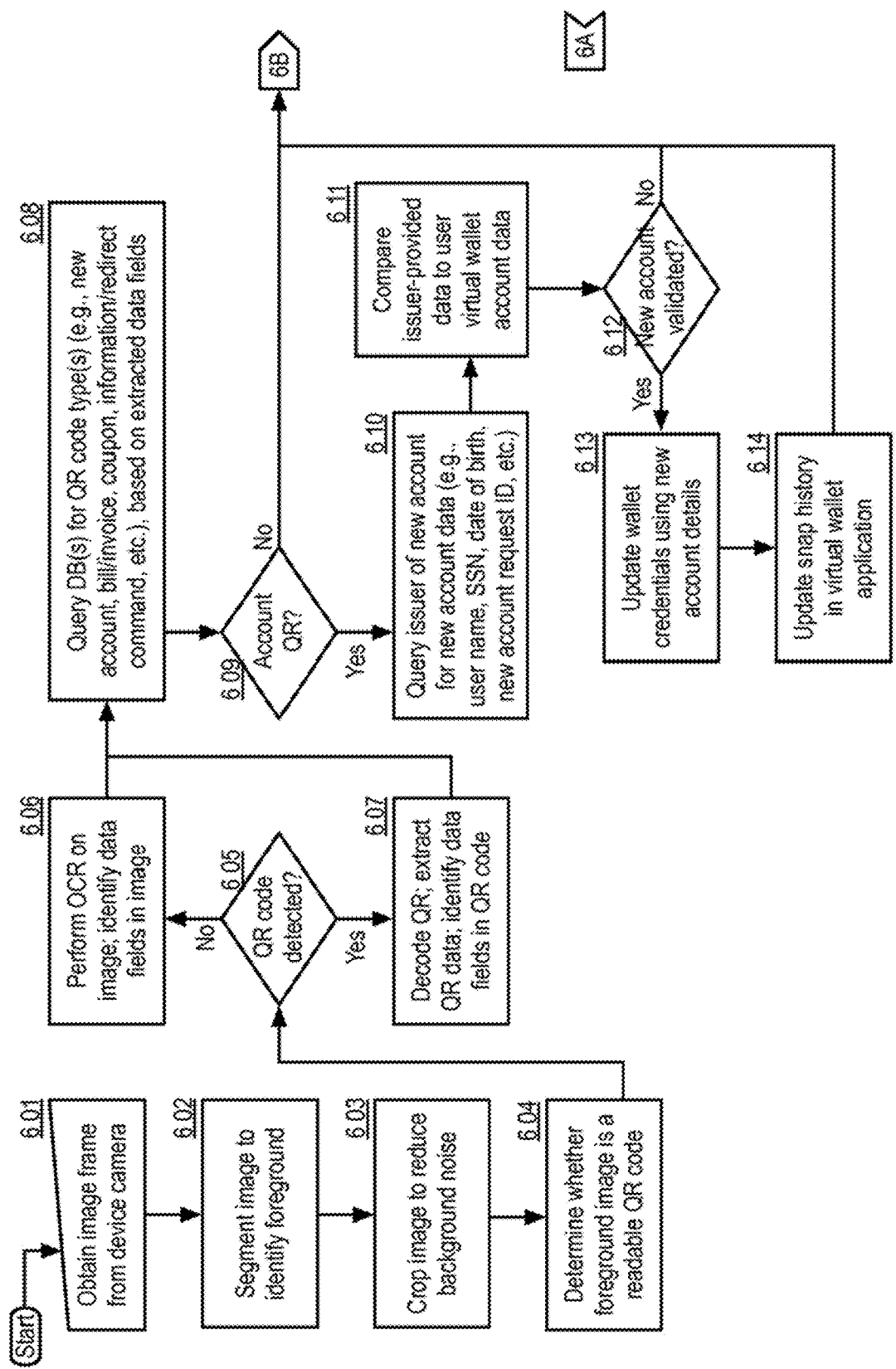
FIGS. 6A-B show logic flow diagrams illustrating example aspects of processing a Quick Response code in some embodiments of the SNAP, e.g., a Quick Response Code Processing ("QRCP") component 600.
Figure 6B:
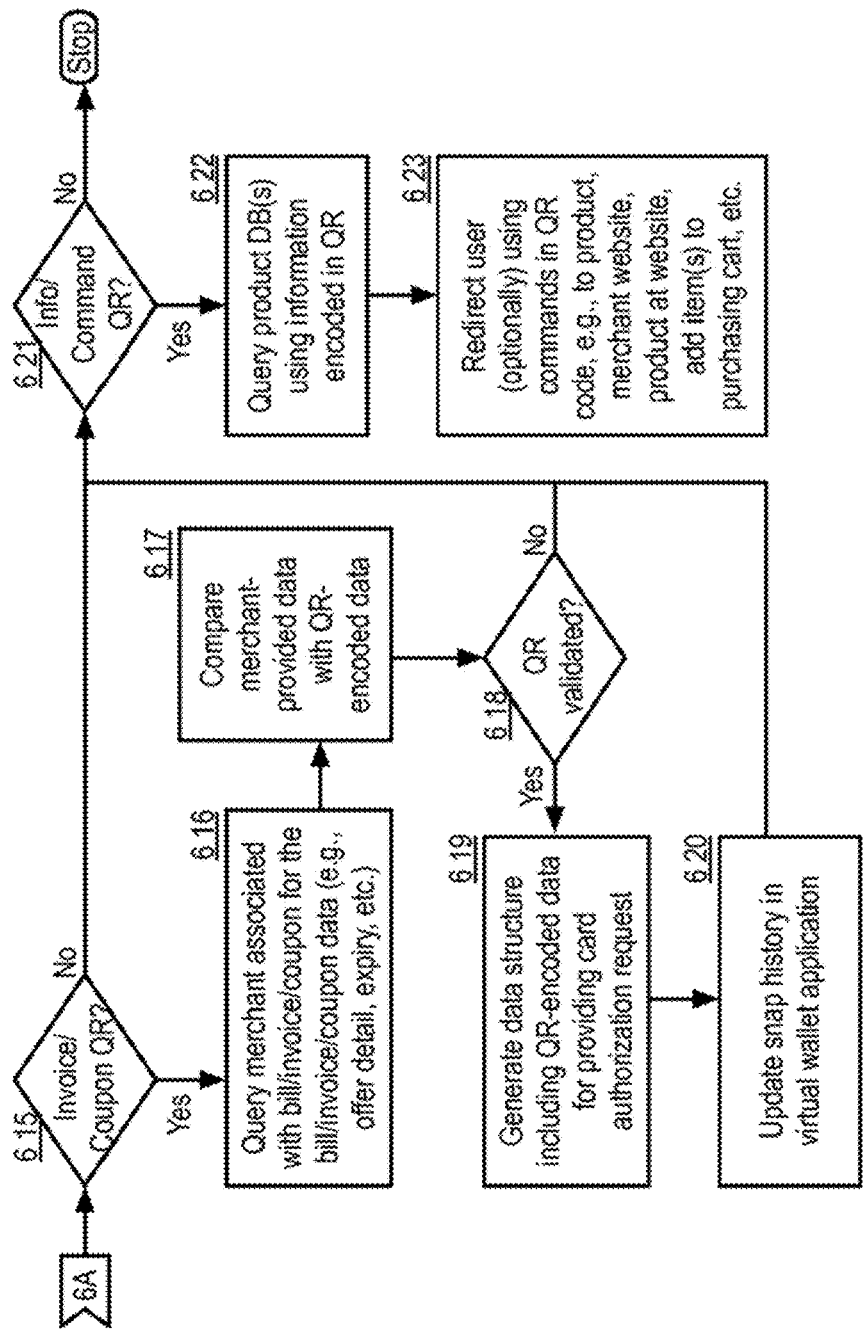

FIGS. 6A-B show logic flow diagrams illustrating example aspects of processing a Quick Response code in some embodiments of the SNAP, e.g., a Quick Response Code Processing ("QRCP") component 600. With reference to FIG. 6A, in some implementations, a virtual wallet application executing on a user device may determine whether a QR code has been captured in an image frame obtained by a camera operatively connected to the user device, and may also determine the type, contents of the QR code. Using such information, the virtual wallet application may redirect the user experience of the user and/or initiating purchases, update aspects of the virtual wallet application, etc. For example, the virtual wallet application may trigger the capture of an image frame by a camera operatively connected to the user device, 601. The virtual wallet application may utilize an image segmentation algorithm to identify a foreground in the image, 602, and may crop the rest of the image to reduce background noise in the image, 603. The virtual wallet application may determine whether the foreground image includes a QR code from which data can be reliably read (e.g., this may not be so if the image does not include a QR code, or the QR code is partially cropped, blurred, etc.), 604. For example, the virtual wallet application may utilize a code library such as the ZXing multi-format 1D/2D barcode image processing library, available at "code.google.com/p/zxing/" to try and extract the information from the QR code. If the virtual wallet application is able to detect a QR code (605, option "Yes"), the virtual wallet application may decode the QR code, and extract data from the QR code. If the virtual wallet application is unable to detect a QR code (605, option "No"), the virtual wallet application may attempt to perform Optical Character Recognition on the image. For example, the virtual wallet application may utilize the Tesseract C++ open source OCR engine, available at www.pixel-technology-.com/freewarw/tessnet2, to perform the optical character recognition, 606. Thus, the virtual wallet application may obtain the data encoded into the image, and may continue if the data can be processed by the virtual wallet application. The virtual wallet application may query a database using fields identified in the extracted data, for a type of the QR code, 608. For example, the QR code could include an invoice/bill, a coupon, a money order (e.g., in a P2P transfer), a new account information packet, product information, purchase commands, URL navigation instructions, browser automation scripts, combinations thereof, and/or the like.

In some embodiments, the QR code may include data on a new account to be added to the virtual wallet application (see 609). The virtual wallet application may query an issuer of the new account (as obtained from the extracted data), for the data associated with the new account, 610. The virtual wallet application may compare the issuer-provided data to the data extracted from the QR code, 611. If the new account is validated (611, option "Yes"), the virtual wallet application may update the wallet credentials with the details of the new account, 613, and update the snap history of the virtual wallet application using the data from the QR code, 614.

With reference to FIG. 6B, in some embodiments, the QR code may include data on a bill, invoice, or coupon for a purchase using the virtual wallet application (see 615). The virtual wallet application may query merchant(s) associated with the purchase (as obtained from the extracted data), for the data associated with the bill, invoice, or coupon for a purchase (e.g., offer details, offer ID, expiry time, etc.), 616. The virtual wallet application may compare the merchant-provided data to the data extracted from the QR code, 617. If the bill, invoice, or coupon for a purchase is validated (618, option "Yes"), the virtual wallet application may generate a data structure (see e.g., XML QR_data structure in description above with reference to FIGS. 4-5) including the QR-encoded data for generating and providing a card authorization request, 619, and update the snap history of the virtual wallet application using the data from the QR code, 620.

In some embodiments, the QR code may include product information, commands, user navigation instructions, etc. for the virtual wallet application (see 621). The virtual wallet application may query a product database using the information encodd in the QR. The virtual wallet application may provide various features including, without limitation, displaying product information, redirecting the user to: a product page, a merchant website, a product page on a merchant website, add item(s) to a user shopping cart at a merchant website, etc. In some implementations, the virtual wallet application may perform a procedure such as described above for any image frame pending to be processed, and/or selected for processing by the user (e.g., from the snap history).

Figure 7:
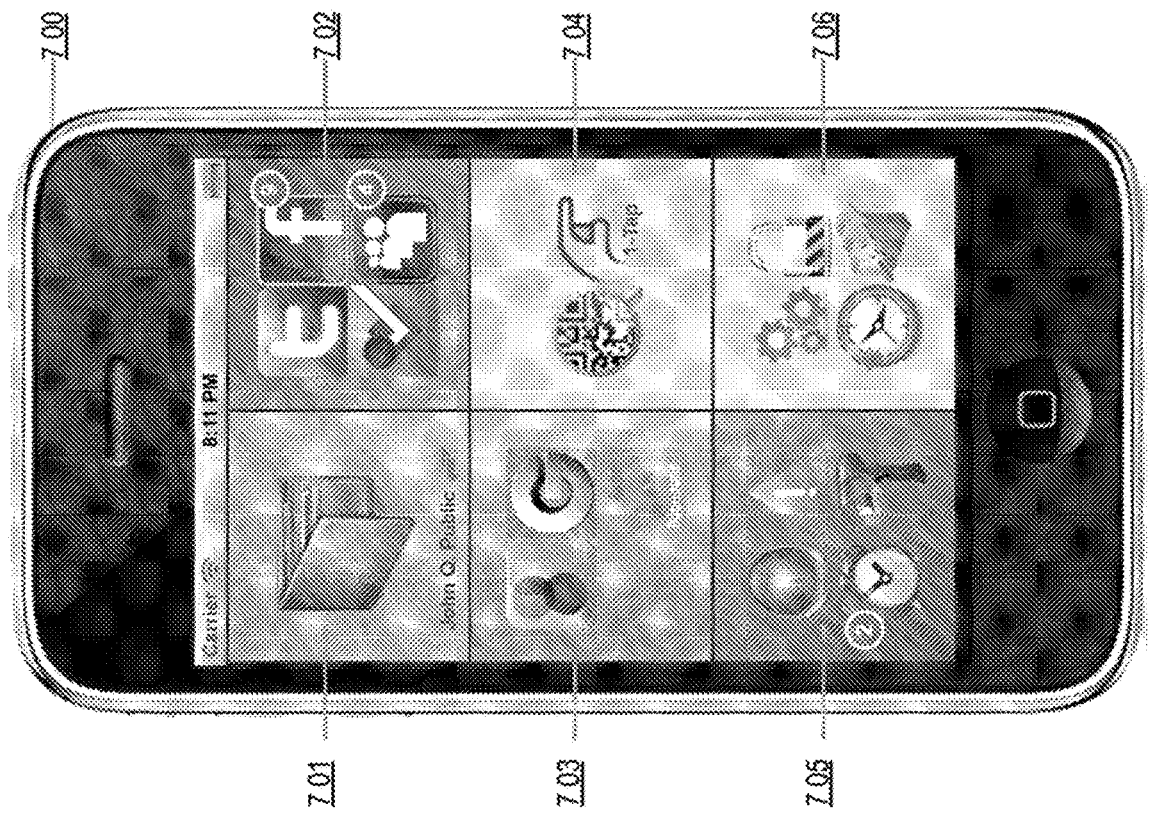
FIG. 7 shows a user interface diagram illustrating an overview of example features of virtual wallet applications in some embodiments of the SNAP.

FIG. 7 shows a user interface diagram illustrating an overview of example features of virtual wallet applications in some embodiments of the SNAP. FIG. 7 shows an illustration of various exemplary features of a virtual wallet mobile application 700. Some of the features displayed include a wallet 701, social integration via TWITTER, FACEBOOK, etc., offers and loyalty 703, snap mobile purchase 704, alerts 705 and security, setting and analytics 796. These features are explored in further detail below.

Figure 8A:
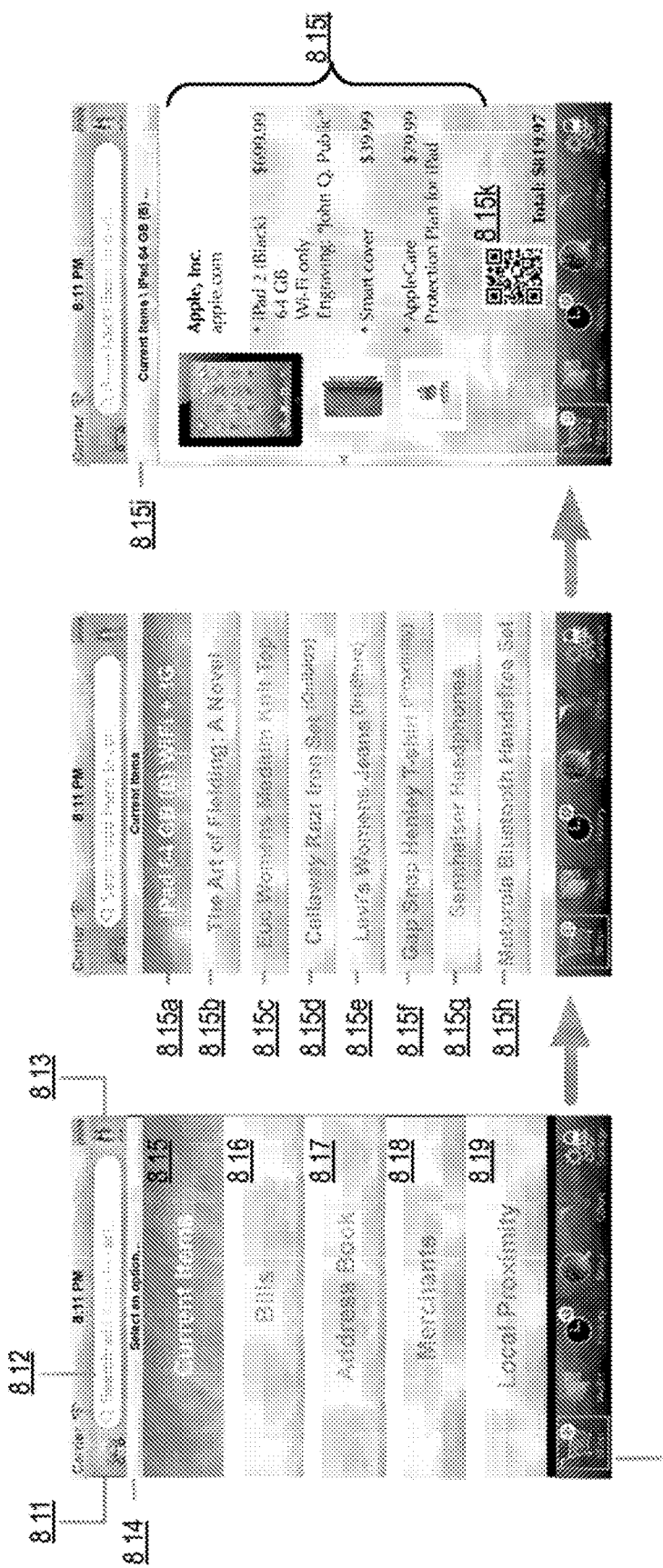

FIGS. 8A-G show user interface diagrams illustrating example features of virtual wallet applications in a shopping mode, in some embodiments of the SNAP. With reference to FIG. 8A, some embodiments of the virtual wallet mobile app facilitate and greatly enhance the shopping experience of consumers. A variety of shopping modes, as shown in FIG. 8A, may be available for a consumer to peruse. In one implementation, for example, a user may launch the shopping mode by selecting the shop icon 810 at the bottom of the user interface. A user may type in an item in the search field 812 to search and/or add an item to a cart 811. A user may also use a voice activated shopping mode by saying the name or description of an item to be searched and/or added to the cart into a microphone 813. In a further implementation, a user may also select other shopping options 814 such as current items 815, bills 816, address book 817, merchants 818 and local proximity 819.

In one embodiment, for example, a user may select the option current items 815, as shown in the left most user interface of FIG. 8A. When the current items 815 option is selected, the middle user interface may be displayed. As shown, the middle user interface may provide a current list of items 815*a-h* in a user's shopping cart 811. A user may select an item, for example item 815*a*, to view product description 815*j* of the selected item and/or other items from the same merchant. The price and total payable information may also be displayed, along with a QR code 815*k* that captures the information necessary to effect a snap mobile purchase transaction.

Figure 8B:
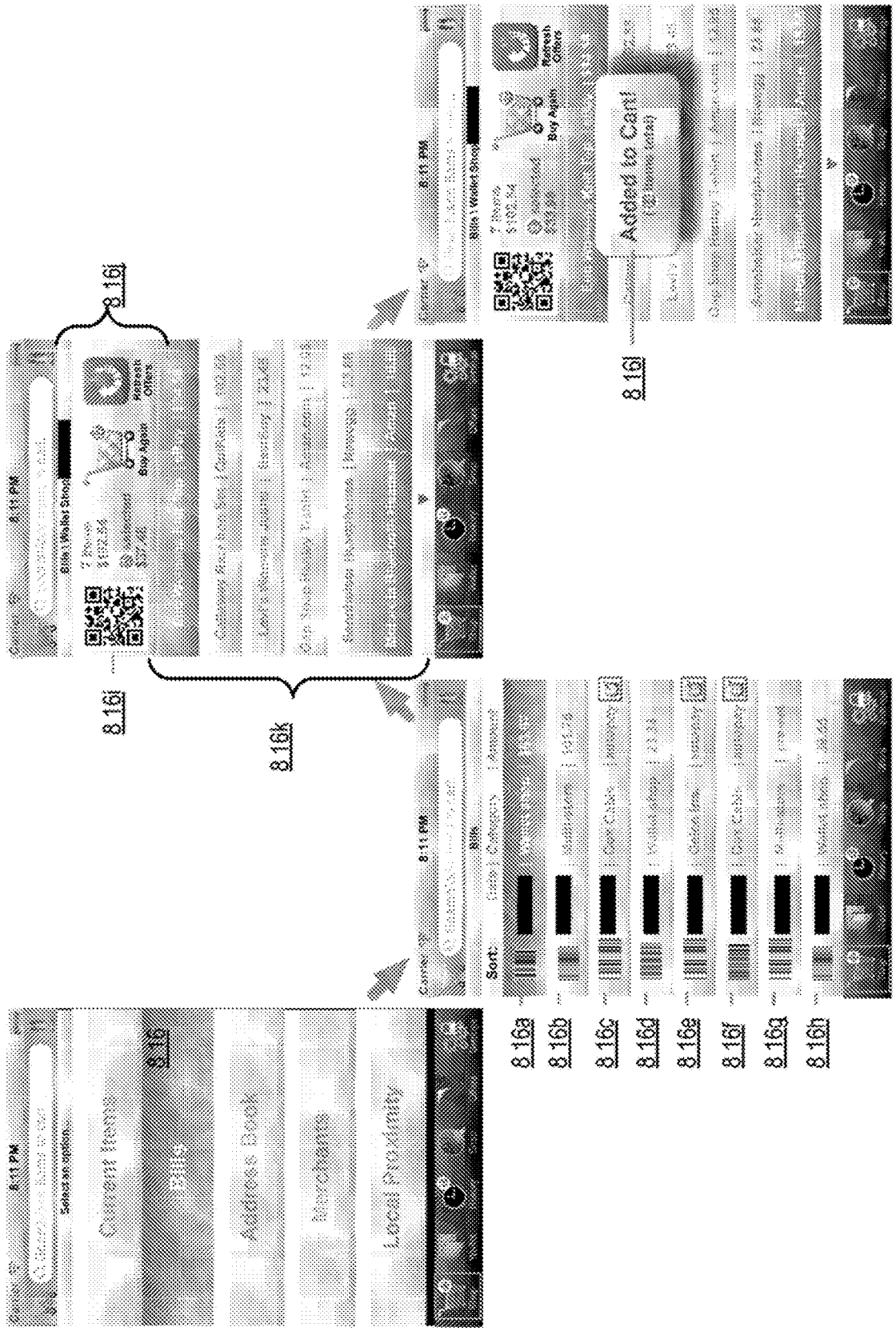

With reference to FIG. 8B, in another embodiment, a user may select the bills 816 option. Upon selecting the bills 816 option, the user interface may display a list of bills and/or receipts 816*a-h* from one or more merchants. Next to each of the bills, additional information such as date of visit, whether items from multiple stores are present, last bill payment date, auto-payment, number of items, and/or the like may be displayed. In one example, the wallet shop bill 816*a* dated Jan. 20, 2011 may be selected. The wallet shop bill selection may display a user interface that provides a variety of information regarding the selected bill. For example, the user interface may display a list of items 816*k* purchased, <<816*i*>>, a total number of items and the corresponding value. For example, 7 items worth $102.54 were in the selected wallet shop bill. A user may now select any of the items and select buy again to add purchase the items. The user may also refresh offers 816*j* to clear any invalid offers from last time and/or search for new offers that may be applicable for the current purchase. As shown in FIG. 8B, a user may select two items for repeat purchase. Upon addition, a message 816*l* may be displayed to confirm the addition of the two items, which makes the total number of items in the cart 14.

Figure 8C:
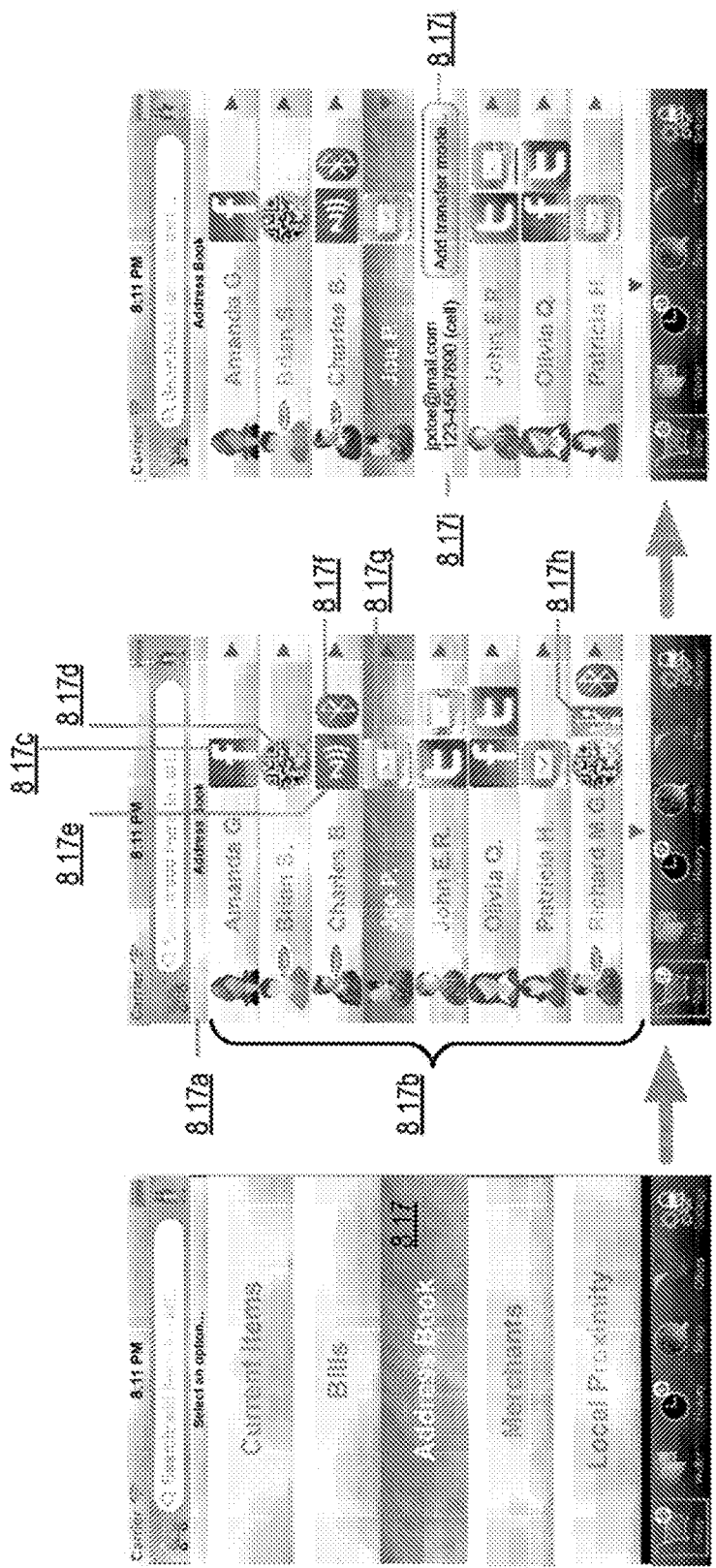

With reference to FIG. 8C, in yet another embodiment, a user may select the address book option 817 to view the address book 817*a* which includes a list of contacts 817*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 817*c*. In another example, money may be transferred to Brian S. via QR code as indicated by the QR code icon 817*d*. In yet another example, Charles B. may accept payment via near field communication 817*e*, Bluetooth 817*f* and email 817*g*. Payment may also be made via USB 817*h* (e.g., by physically connecting two mobile devices) as well as other social channels such as TWITTER.

Figure 8D:
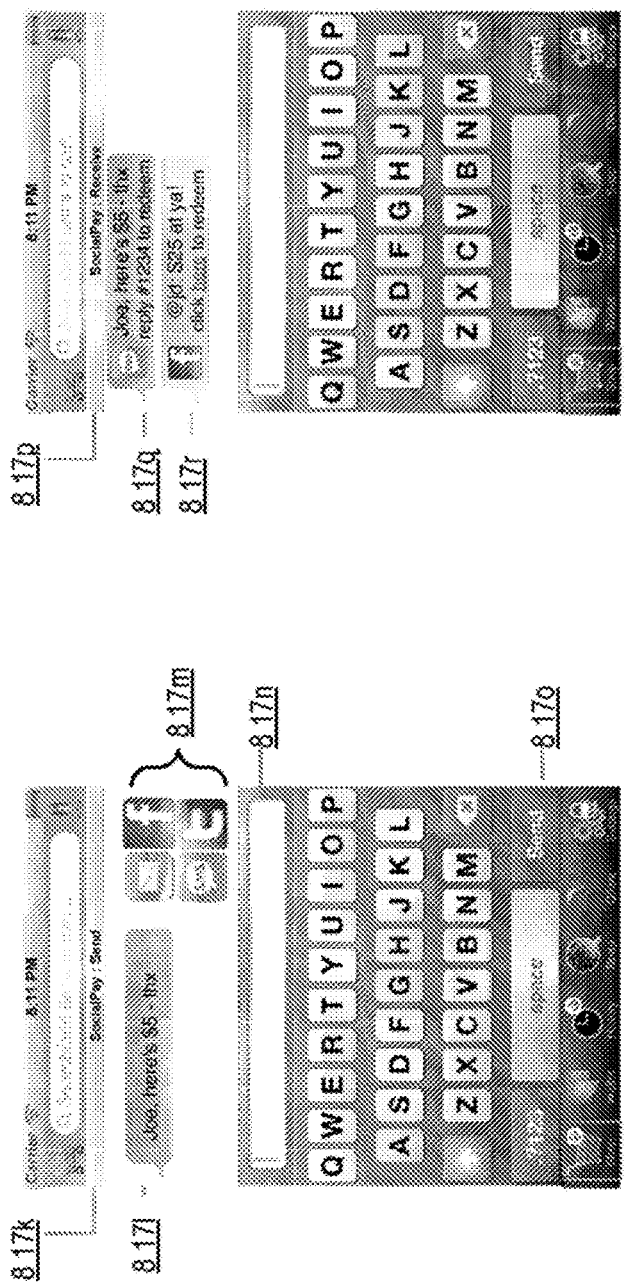

In one implementation, a user may select Joe P. for payment. Joe P., as shown in the user interface, has an email icon 817*g* next to his name indicating that Joe P. accepts payment via email. When his name is selected, the user interface may display his contact information such as email, phone, etc. If a user wishes to make a payment to Joe P. by a method other than email, the user may add another transfer mode 817*j* to his contact information and make a payment transfer. With reference to FIG. 8D, the user may be provided with a screen 817*k* where the user can enter an amount to send Joe, as well as add other text to provide Joe with context for the payment transaction 817*l*. The user can choose modes (e.g., SMS, email, social networking) via which Joe may be contacted via graphical user interface elements, 817*m*. As the user types, the text entered may be provided for review within a GUI element 817*n*. When the user has completed entering in the necessary information, the user can press the send button 8170 to send the social message to Joe. If Joe also has a virtual wallet application, Joe may be able to review 817*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 8D, the SMS 817*q* Joe received indicates that Joe can redeem the $5 obtained via SMS by replying to the SMS and entering the hash tag value '#1234'. In the same illustration, Joe has also received a message 817*r* via Facebook®, which includes a URL link that Joe can activate to initiate redemption of the $25 payment.

Figure 8E:

With reference to FIG. 8E, in some other embodiments, a user may select merchants 818 from the list of options in the shopping mode to view a select list of merchants 818*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 818*a* for example. The user may then navigate through the merchant's listings to find items of interest such as 818*f-j*. Directly through the wallet and without visiting the merchant site from a separate page, the user may make a selection of an item 818*j* from the catalog of Amazon 818*a*. As shown in the right most user interface of FIG. 8D, the selected item may then be added to cart. The message 818*k* indicates that the selected item has been added to the cart, and updated number of items in the cart is now 13.

Figure 8F:

With reference to FIG. 8F, in one embodiment, there may be a local proximity option 819 which may be selected by a user to view a list of merchants that are geographically in close proximity to the user. For example, the list of merchants 819*a-e* may be the merchants that are located close to the user. In one implementation, the mobile application may further identify when the user in a store based on the user's location. For example, position icon 819*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 819*f-j* available on aisle 5 of Walgreens. In one implementation, the user may select corn 819*i* from his or her mobile application to add to cart 819*k*.

Figure 9A:
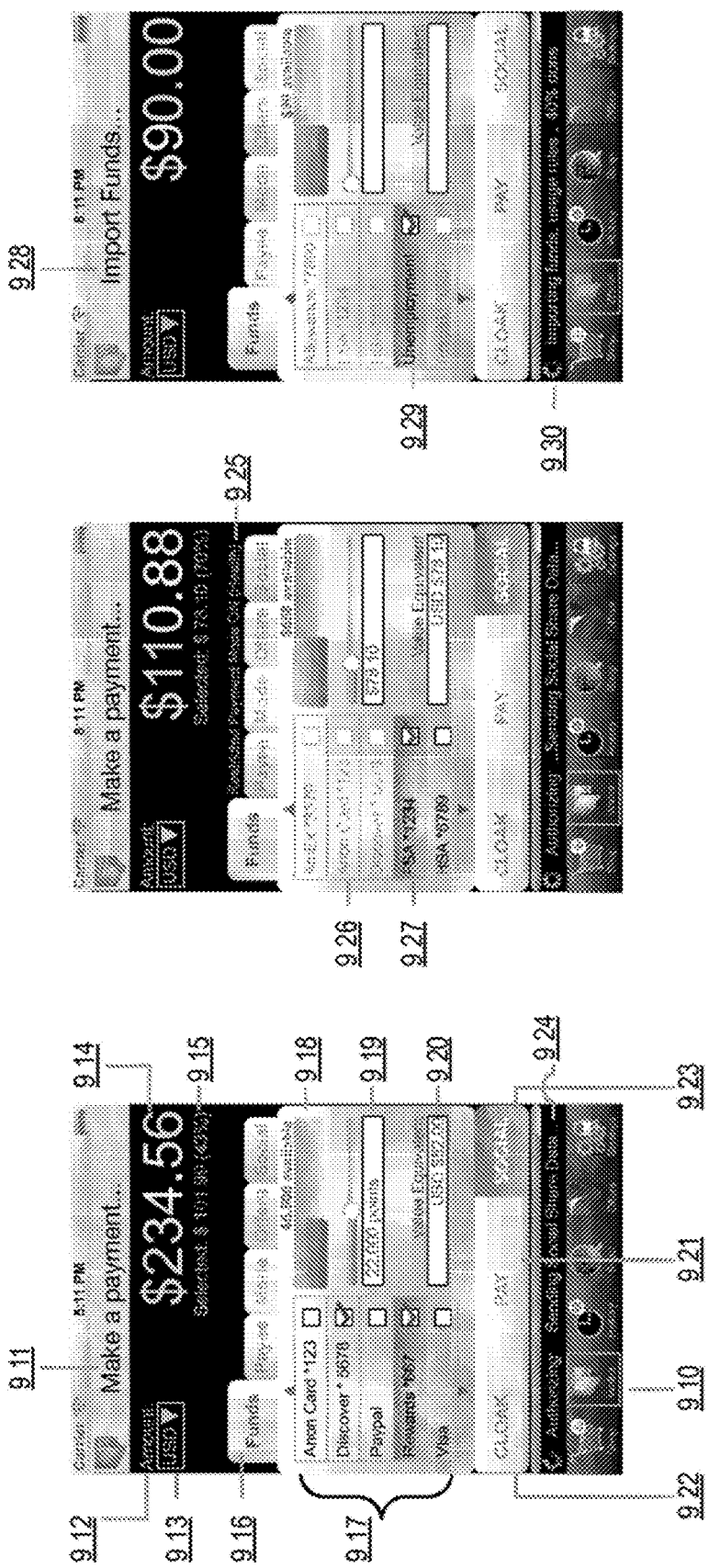
FIGS. 9A-F show user interface diagrams illustrating example features of virtual wallet applications in a payment mode, in some embodiments of the SNAP.

With reference to FIG. 8G, in another embodiment, the local proximity option 819 may include a store map and a real time map features among others. For example, upon selecting the Walgreens store, the user may launch an aisle map 819*l* which displays a map 819*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 819*n* may display images/video of the user's surrounding. For example, if the user is about to enter aisle 5, the store view map may show the view of aisle 5. Further the user may manipulate the orientation of the map using the navigation tool 8190 to move the store view forwards, backwards, right, left as well clockwise and counterclockwise rotation FIGS. 9A-F show user interface diagrams illustrating example features of virtual wallet applications in a payment mode, in some embodiments of the SNAP. With reference to FIG. 9A, in one embodiment, the wallet mobile application may provide a user with a number of options for paying for a transaction via the wallet mode 910. In one implementation, an example user interface 911 for making a payment is shown. The user interface may clearly identify the amount 912 and the currency 913 for the transaction. The amount may be the amount payable and the currency may include real currencies such as dollars and euros, as well as virtual currencies such as reward points. The amount of the transaction 914 may also be prominently displayed on the user interface. The user may select the funds tab 916 to select one or more forms of payment 917, which may include various credit, debit, gift, rewards and/or prepaid cards. The user may also have the option of paying, wholly or in part, with reward points. For example, the graphical indicator 918 on the user interface shows the number of points available, the graphical indicator 919 shows the number of points to be used towards the amount due 234.56 and the equivalent 920 of the number of points in a selected currency (USD, for example).

In one implementation, the user may combine funds from multiple sources to pay for the transaction. The amount 915 displayed on the user interface may provide an indication of the amount of total funds covered so far by the selected forms of payment (e.g., Discover card and rewards points). The user may choose another form of payment or adjust the amount to be debited from one or more forms of payment until the amount 915 matches the amount payable 914. Once the amounts to be debited from one or more forms of payment are finalized by the user, payment authorization may begin.

In one implementation, the user may select a secure authorization of the transaction by selecting the cloak button 922 to effectively cloak or anonymize some (e.g., pre-configured) or all identifying information such that when the user selects pay button 921, the transaction authorization is conducted in a secure and anonymous manner. In another implementation, the user may select the pay button 921 which may use standard authorization techniques for transaction processing. In yet another implementation, when the user selects the social button 923, a message regarding the transaction may be communicated to one of more social networks (set up by the user) which may post or announce the purchase transaction in a social forum such as a wall post or a tweet. In one implementation, the user may select a social payment processing option 923. The indicator 924 may show the authorizing and sending social share data in progress.

In another implementation, a restricted payment mode 925 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 926 under the funds tab to select specialized accounts such as a flexible spending account (FSA) 927, health savings account (HAS), and/or the like and amounts to be debited to the selected accounts. In one implementation, such restricted payment mode 1925 processing may disable social sharing of purchase information.

In one embodiment, the wallet mobile application may facilitate importing of funds via the import funds user interface 928. For example, a user who is unemployed may obtain unemployment benefit fund 929 via the wallet mobile application. In one implementation, the entity providing the funds may also configure rules for using the fund as shown by the processing indicator message 930. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 9B:
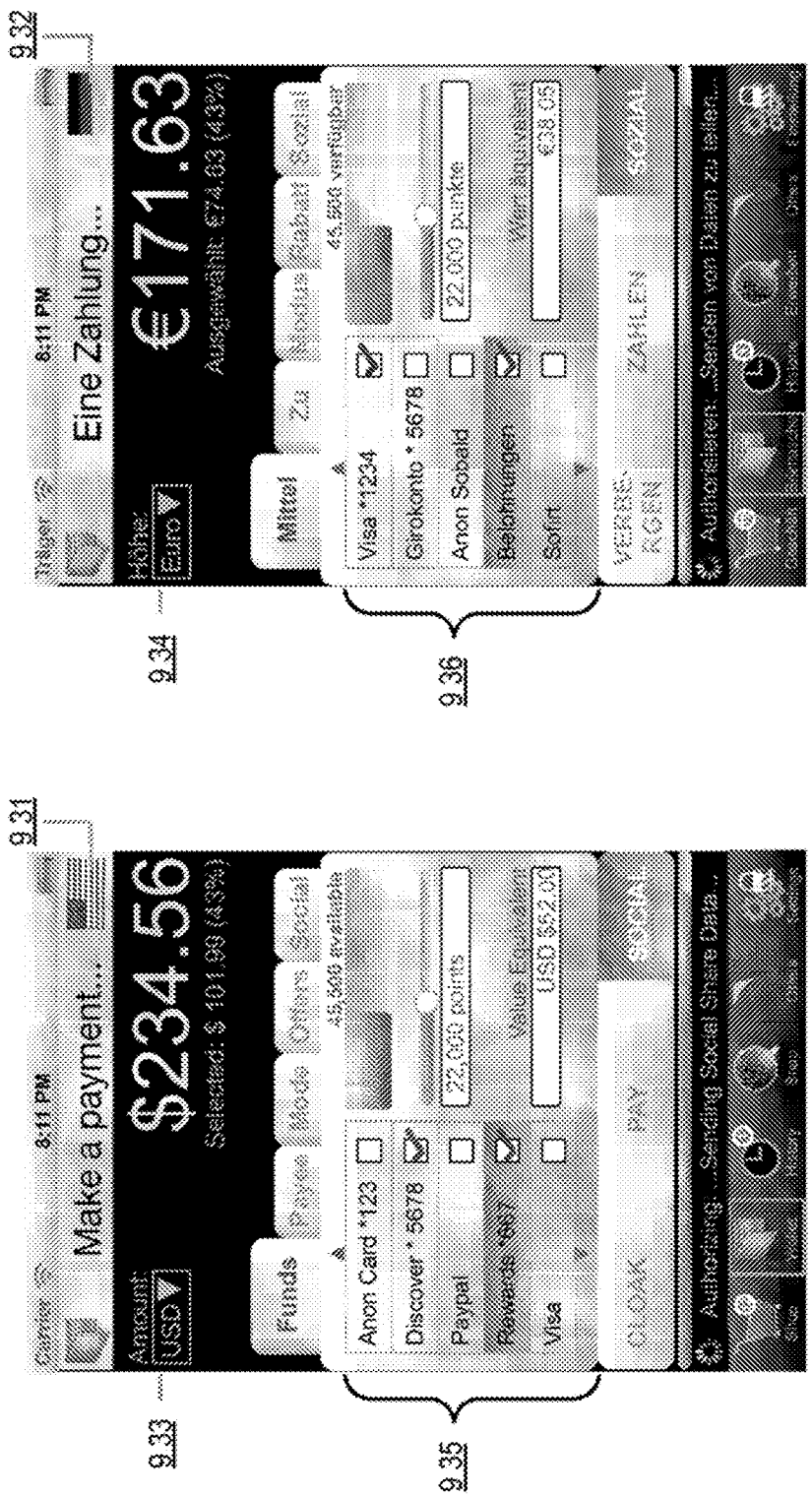

With reference to FIG. 9B, in one embodiment, the wallet mobile application may facilitate dynamic payment optimization based on factors such as user location, preferences and currency value preferences among others. For example, when a user is in the United States, the country indicator 931 may display a flag of the United States and may set the currency 933 to the United States. In a further implementation, the wallet mobile application may automatically rearrange the order in which the forms of payments 935 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 932 and the currency 934. In a further implementation, the wallet application may rearrange the order in which different forms of payment 936 are listed based on their acceptance level in that country. Of course, the order of these forms of payments may be modified by the user to suit his or her own preferences.

Figure 9C:
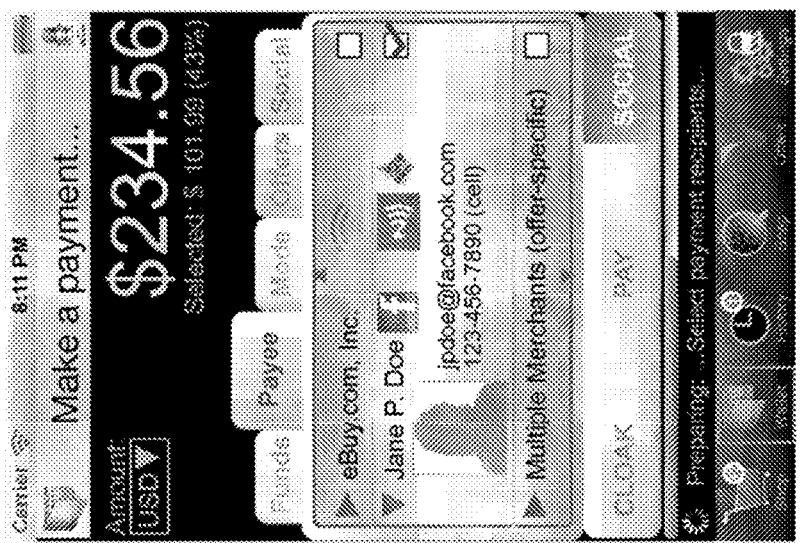
Figure 9C:
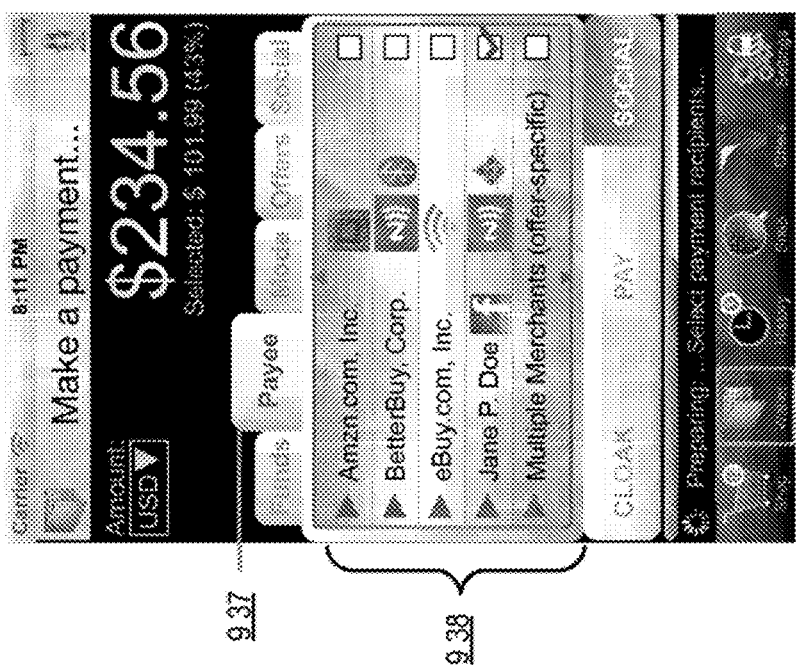

With reference to FIG. 9C, in one embodiment, the payee tab 937 in the wallet mobile application user interface may facilitate user selection of one or more payees receiving the funds selected in the funds tab. In one implementation, the user interface may show a list of all payees 938 with whom the user has previously transacted or available to transact. The user may then select one or more payees. The payees 938 may include larger merchants such as Amazon.com Inc., and individuals such as Jane P. Doe. Next to each payee name, a list of accepted payment modes for the payee may be displayed. In one implementation, the user may select the payee Jane P. Doe 939 for receiving payment. Upon selection, the user interface may display additional identifying information relating to the payee.

Figure 9D:

With reference to FIG. 9D, in one embodiment, the mode tab 1940 may facilitate selection of a payment mode accepted by the payee. A number of payment modes may be available for selection. Example modes include, blue tooth 941, wireless 942, snap mobile by user-obtained QR code 943, secure chip 944, TWITTER 945, near-field communication (NFC) 946, cellular 947, snap mobile by user-provided QR code 948, USB 949 and FACEBOOK 950, among others. In one implementation, only the payment modes that are accepted by the payee may be selectable by the user. Other non-accepted payment modes may be disabled.

Figure 9E:
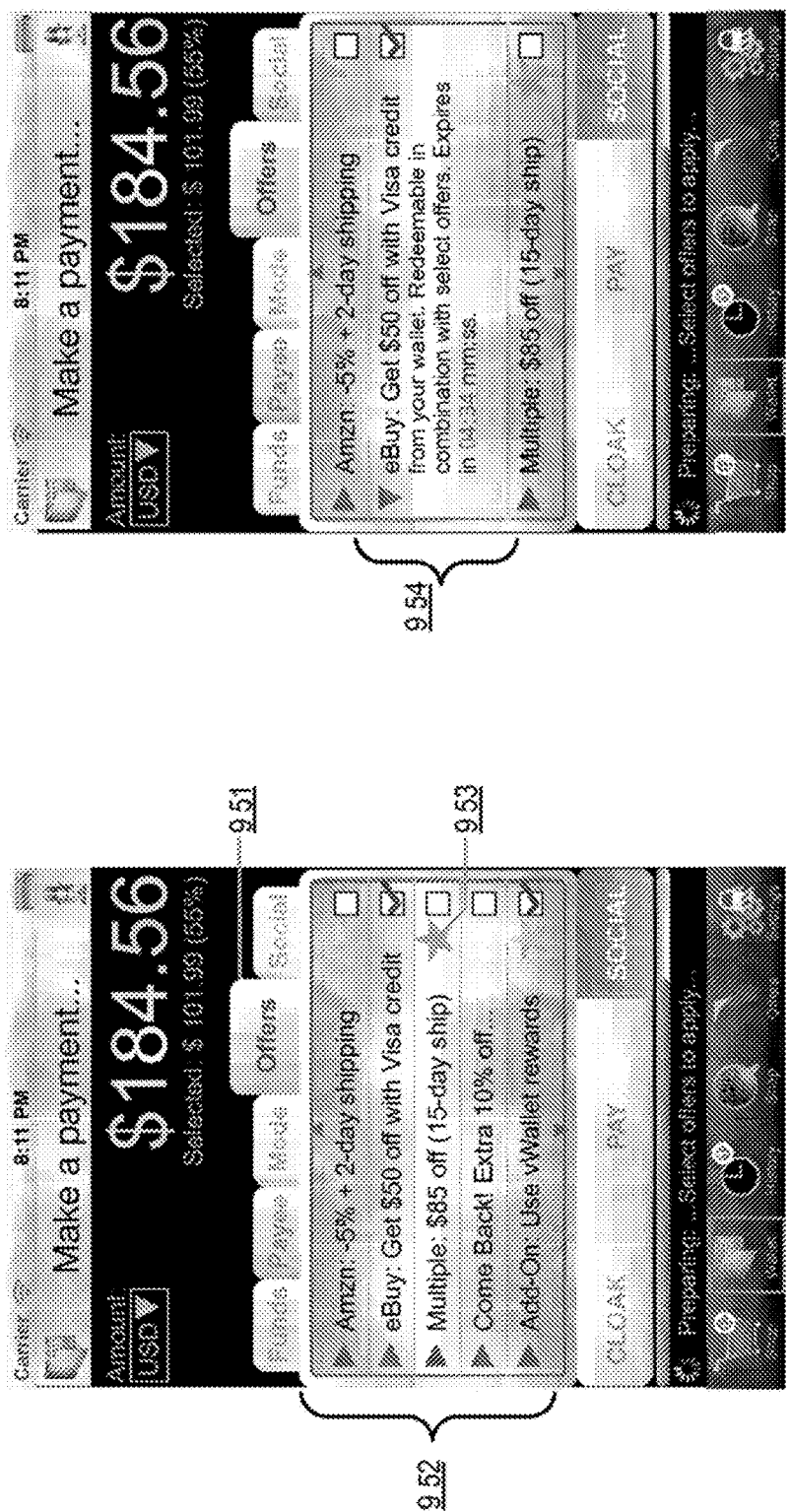

With reference to FIG. 9E, in one embodiment, the offers tab 951 may provide real-time offers that are relevant to items in a user's cart for selection by the user. The user may select one or more offers from the list of applicable offers 952 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 953. In a further implementation, the user may read the details of the offer by expanding the offer row as shown by 954 in the user interface.

Figure 9F:
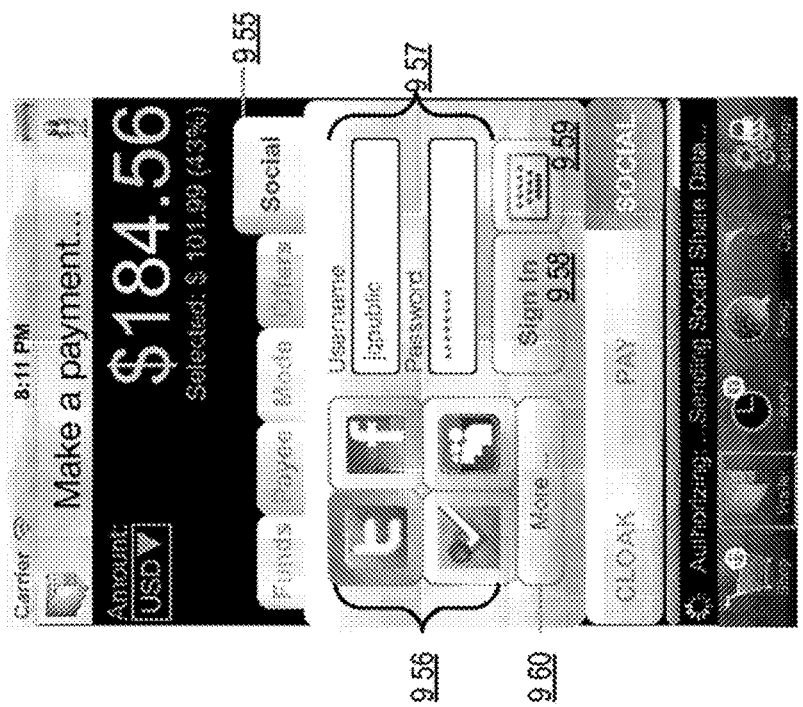

With reference to FIG. 9F, in one embodiment, the social tab 955 may facilitate integration of the wallet application with social channels 956. In one implementation, a user may select one or more social channels 956 and may sign in to the selected social channel from the wallet application by providing to the wallet application the social channel user name and password 957 and signing in 958. The user may then use the social button 959 to send or receive money through the integrated social channels. In a further implementation, the user may send social share data such as purchase information or links through integrated social channels. In another embodiment, the user supplied login credentials may allow SNAP to engage in interception parsing.

Figure 10:
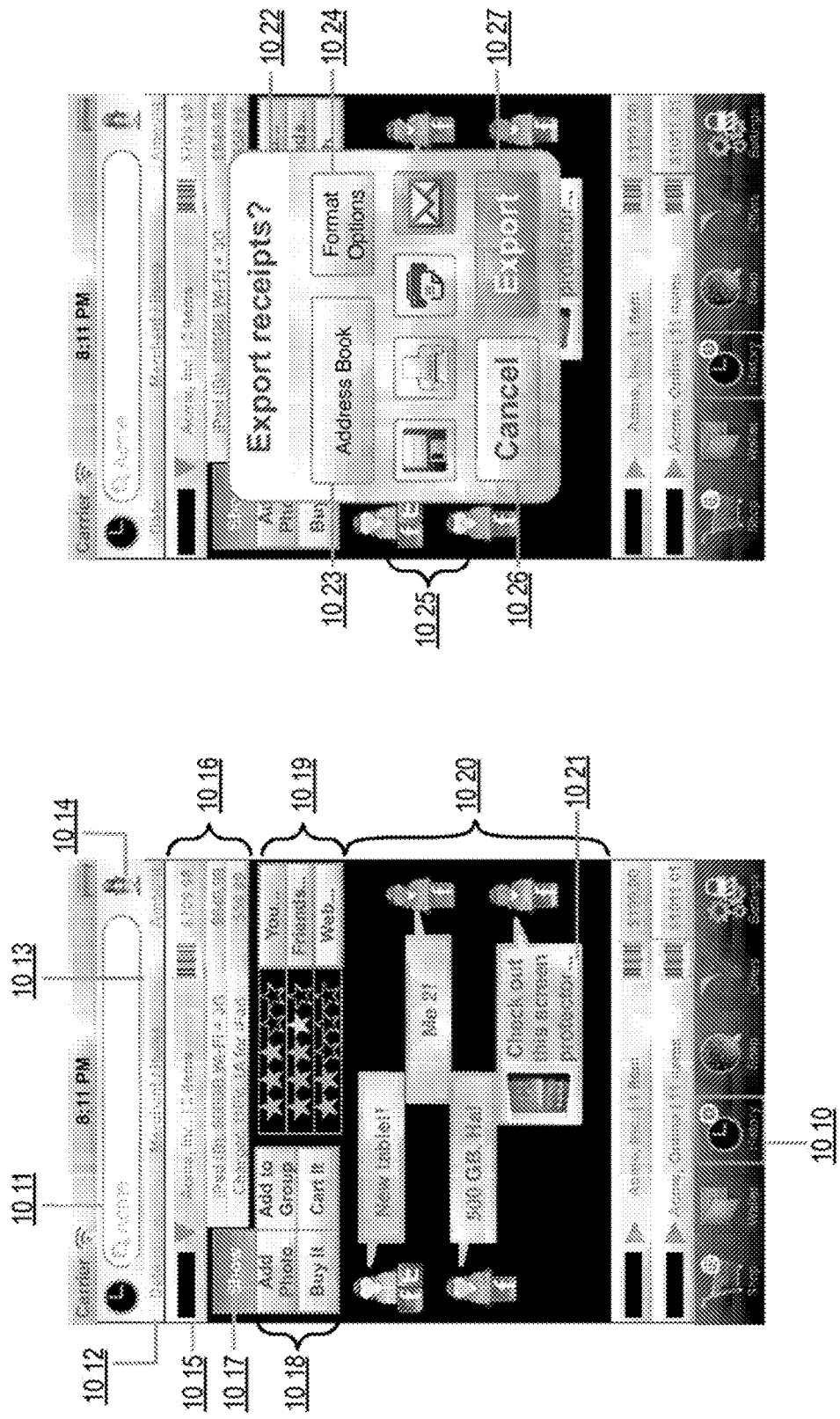
FIG. 10 shows a user interface diagram illustrating example features of virtual wallet applications, in a history mode, in some embodiments of the SNAP.

FIG. 10 shows a user interface diagram illustrating example features of virtual wallet applications, in a history mode, in some embodiments of the SNAP. In one embodiment, a user may select the history mode 1010 to view a history of prior purchases and perform various actions on those prior purchases. For example, a user may enter a merchant identifying information such as name, product, MCC, and/or the like in the search bar 1011. In another implementation, the user may use voice activated search feature by clicking on the microphone icon 1014. The wallet application may query the storage areas in the mobile device or elsewhere (e.g., one or more databases and/or tables remote from the mobile device) for transactions matching the search keywords. The user interface may then display the results of the query such as transaction 1015. The user interface may also identify the date 1012 of the transaction, the merchants and items 1013 relating to the transaction, a barcode of the receipt confirming that a transaction was made, the amount of the transaction and any other relevant information.

In one implementation, the user may select a transaction, for example transaction 1015, to view the details of the transaction. For example, the user may view the details of the items associated with the transaction and the amounts 1016 of each item. In a further implementation, the user may select the show option 1017 to view actions 1018 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1019 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1020 shows FACEBOOK message exchanges between two users. In one implementation, a user may share a link via a message 1021. Selection of such a message having embedded link to a product may allow the user to view a description of the product and/or purchase the product directly from the history mode.

In one embodiment, the history mode may also include facilities for exporting receipts. The export receipts pop up 1022 may provide a number of options for exporting the receipts of transactions in the history. For example, a user may use one or more of the options 1025, which include save (to local mobile memory, to server, to a cloud account, and/or the like), print to a printer, fax, email, and/or the like. The user may utilize his or her address book 1023 to look up email or fax number for exporting. The user may also specify format options 1024 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 1027 to initiate export of receipts.

Figure 11A:
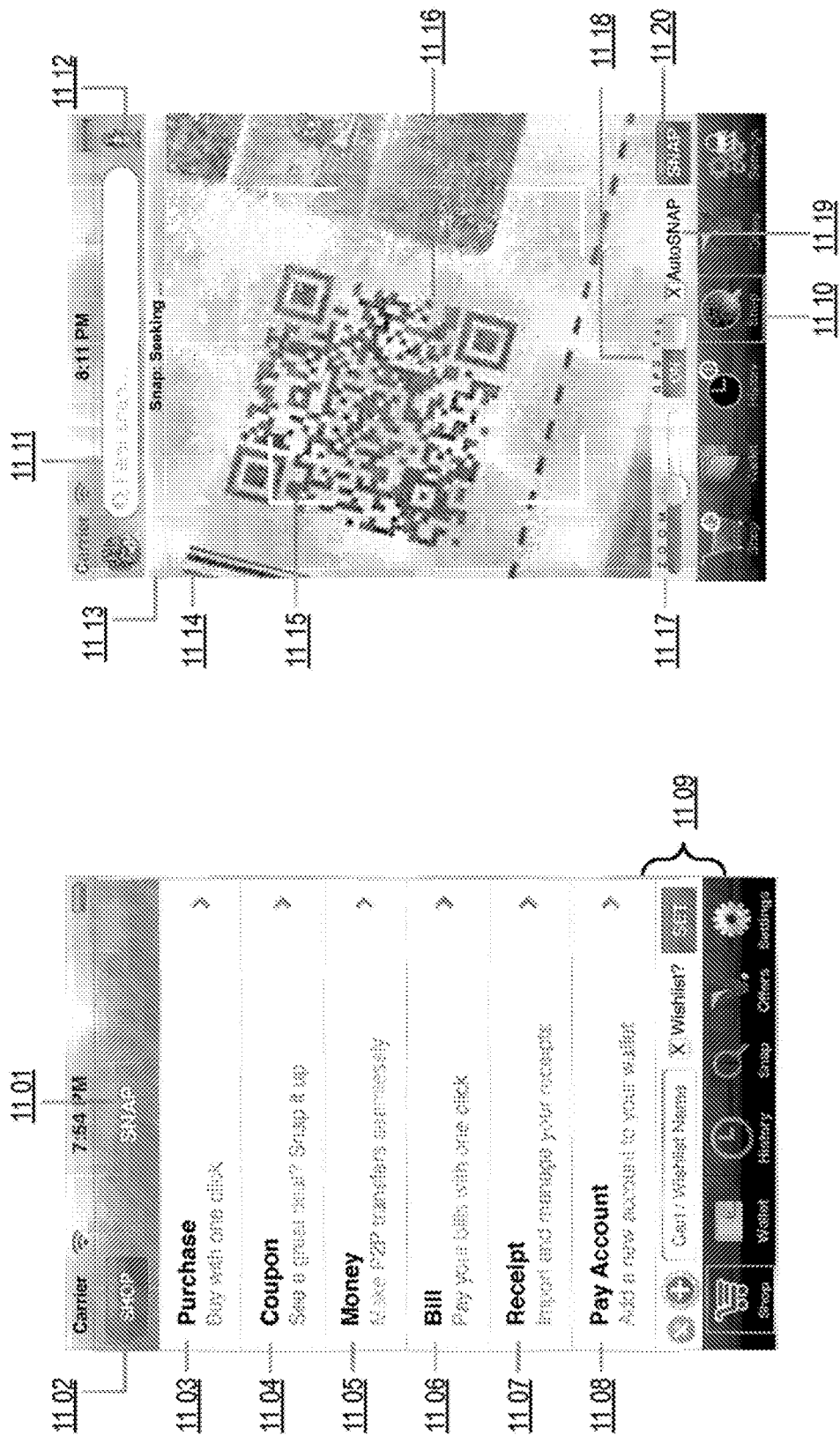
FIGS. 11A-F show user interface diagrams illustrating example features of virtual wallet applications in a snap mode, in some embodiments of the SNAP.

FIGS. 11A-F show user interface diagrams illustrating example features of virtual wallet applications in a snap mode, in some embodiments of the SNAP. With reference to FIG. 11A, in some embodiments, a user may select a snap mode 1101 to access snap features. In various embodiments, the virtual wallet application may able to snap and identify a variety of items. For example, the virtual wallet application may be able to snap and identify a purchase invoice 1103, a coupon 104, money (e.g., sent in a person-to-person transfer) 1105, a bill (e.g., utilities, etc.) 1106, a receipt (e.g., for storing, expense reporting, etc.) 1107, a pay account (e.g., to add a new credit/debit/prepaid card to the virtual wallet application) 1108. The user may be able to return to a shopping screen at any time by activating a graphical user interface element 1102. In some embodiments, the user may be able to set a name of a cart or wishlist stored within the user's virtual wallet application to which the item snapped should be sent (see nog). In some embodiments, the virtual wallet application may allow a user to create a new cart or wishlist to which the snapped items should be added.

In one embodiment, a user may select the snap mode 1110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 11A. A user may use his or her mobile phone to take a picture of a QR code 1115 and/or a barcode 1114. In one implementation, the bar 1113 and snap frame 1115 may assist the user in snapping codes properly. For example, the snap frame 1115, as shown, does not capture the entirety of the code 1116. As such, the code captured in this view may not be resolvable as information in the code may be incomplete. This is indicated by the message on the bar 1113 that indicates that the snap mode is still seeking the code. The user may modify the zoom level 1117 of the camera to facilitate snapping the QR code. When the code 1116 is completely framed by the snap frame 1115, the bar message may be updated to, for example, "snap found." Upon finding the code, in one implementation, the user may initiate code capture using the mobile device camera (see 1120). In another implementation, the snap mode may automatically snap the code using the mobile device camera (see 1119). In some implementations, the virtual wallet application may optionally apply a Global Positioning System tag (see 1118) to the QR code before storing it, or utilizing it in a transaction.

Figure 11B:

With reference to FIG. 11B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1122 the receipt 1123 the user wants to reallocate. Alternatively, the user may directly snap a picture of a barcode on a receipt, and the snap mode may generate and display a receipt 1123 using information from the barcode. The user may now reallocate 1125. In some implementations, the user may also dispute the transaction 1124 or archive the receipt 1126.

In one implementation, when the reallocate button 1125 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1127 may be generated after the completion of the reallocation process. As discussed, the receipt shows that some charges have been moved from the Visa account to the FSA.

Figure 11C:
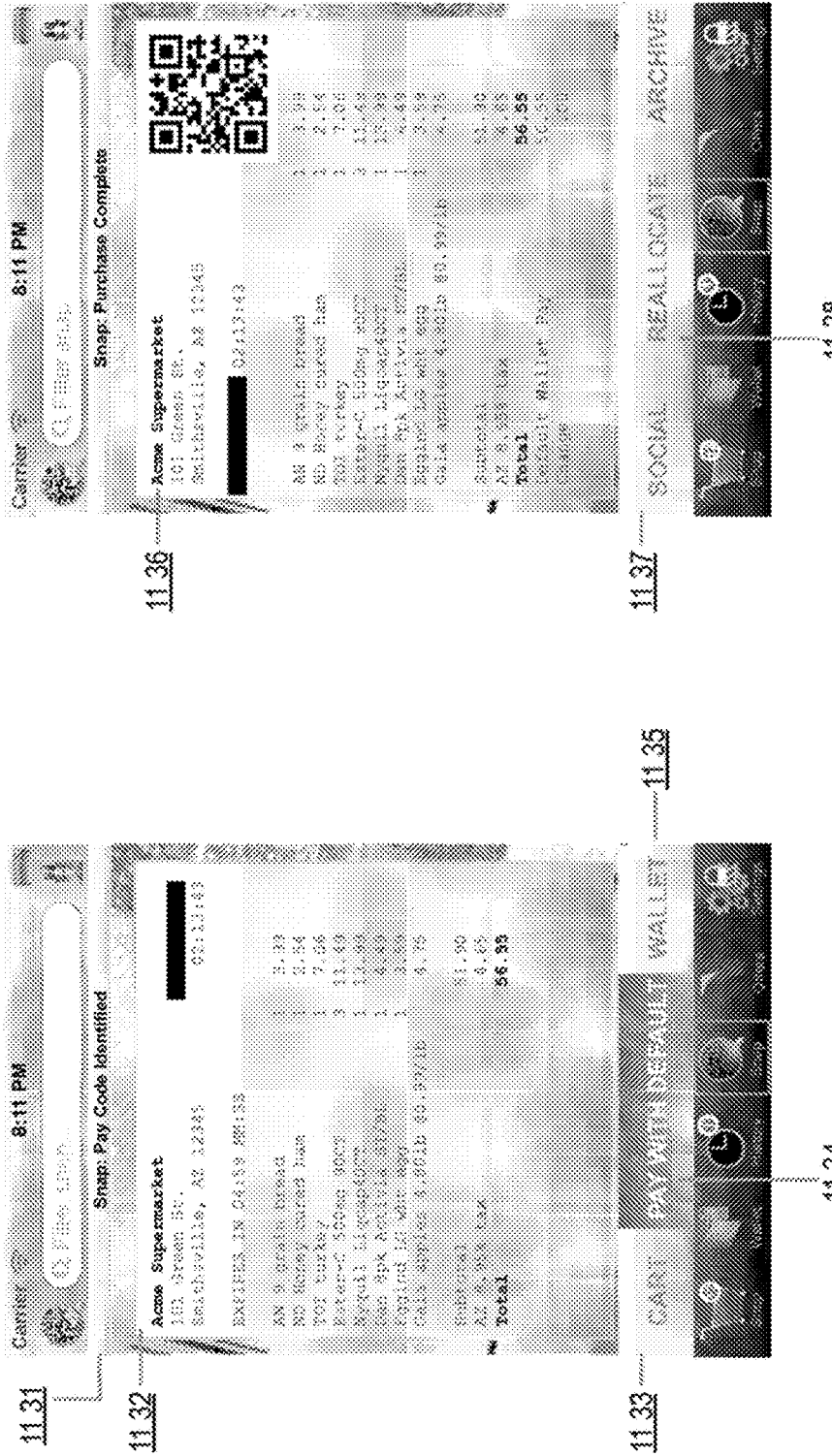

With reference to FIG. 11C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1132. Once the QR code is identified, the navigation bar 1131 may indicate that the pay code is identified. The user may now have an option to add to cart 1133, pay with a default payment account 1134 or pay with wallet 1135.

In one implementation, the user may decide to pay with default 1134. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1137 to share purchase information with others, reallocate 1138 as discussed with regard to FIG. 11B, and archive 1139 to store the receipt.

Figure 11D:

With reference to FIG. 11D, in one embodiment, the snap mode may also facilitate offer identification, application and storage for future use. For example, in one implementation, a user may snap an offer code 1141 (e.g., a bar code, a QR code, and/or the like). The wallet application may then generate an offer text 1142 from the information encoded in the offer code. The user may perform a number of actions on the offer code. For example, the user use the find button 1143 to find all merchants who accept the offer code, merchants in the proximity who accept the offer code, products from merchants that qualify for the offer code, and/or the like. The user may also apply the offer code to items that are currently in the cart using the add to cart button 1144. Furthermore, the user may also save the offer for future use by selecting the save button 1145.

In one implementation, after the offer or coupon 1146 is applied, the user may have the option to find qualifying merchants and/or products using find, the user may go to the wallet using 1148, and the user may also save the offer or coupon 1146 for later use.

Figure 11E:
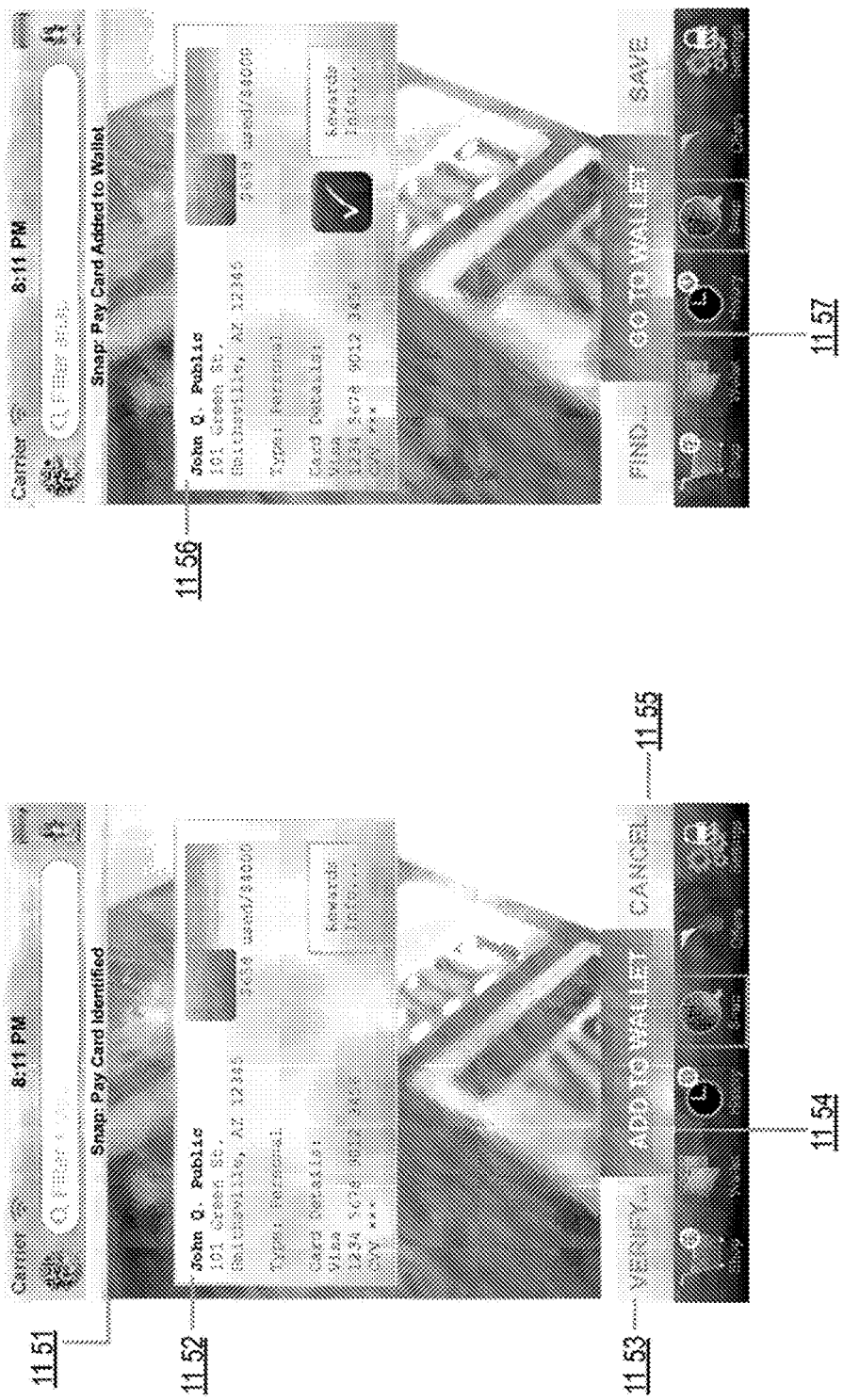

With reference to FIG. 11E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1151 and may display the textual information 1152 encoded in the pay card. The user may then perform verification of the information 1152 by selecting the verify button 1153. In one implementation, the verification may include contacting the issuer of the pay card for confirmation of the decoded information 1152 and any other relevant information. In one implementation, the user may add the pay card to the wallet by selecting the 'add to wallet' button 1154. The instruction to add the pay card to the wallet may cause the pay card to appear as one of the forms of payment under the funds tab 916 discussed in FIG. 9A. The user may also cancel importing of the pay card as a funding source by selecting the cancel button 1155. When the pay card has been added to the wallet, the user interface may be updated to indicate that the importing is complete via the notification display 1156. The user may then access the wallet 1157 to begin using the added pay card as a funding source.

Figure 11F:
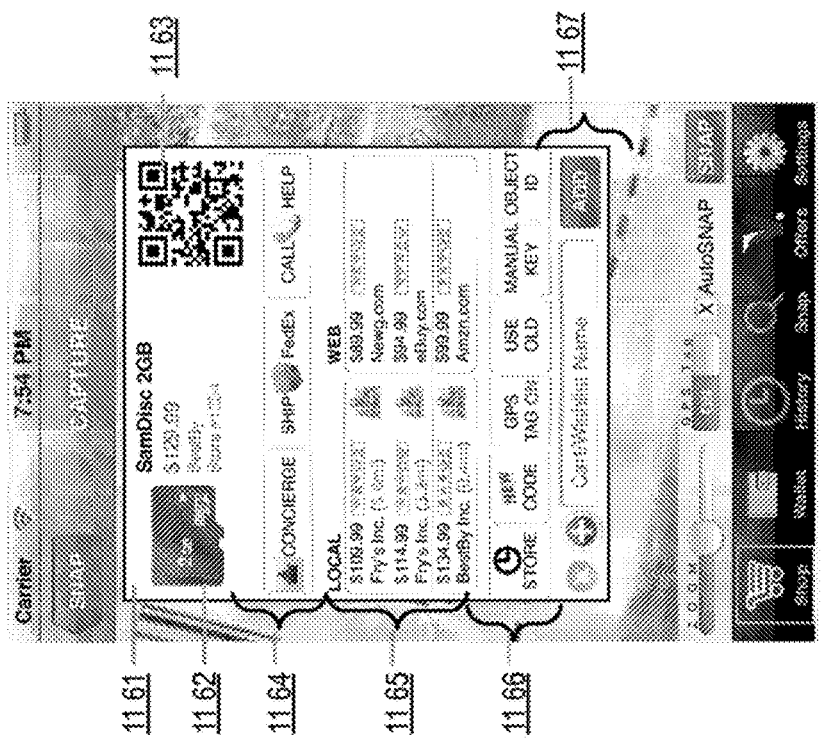

With reference to FIG. 11F, in some implementations, the virtual wallet application may identify a product from processing the QR code, and may provide information about the product, as well as information about options for buying the product, assistive services, and/or the like. For example, the virtual wallet application may provide a window 1161, wherein the virtual wallet application may display images, product specification, prices, merchant information, and/or the like (see 1162). In some implementations, the virtual wallet application may provide a QR code including the displayed information, so that another user may quickly snap the information to import it into another virtual wallet application. In some implementations, the virtual wallet application may provide features so that a user may request concierge services (e.g., assistance while shopping), shipping services (e.g., so the user may leave a store without carrying the items out), 1164. In some implementations, the virtual wallet application may provide competitive prices of local merchants (e.g., using the GPS location of the user device) or merchants on the Internet (see 1165). In some implementations, the virtual wallet application may provide the user with features including, but not limited to: viewing prior snaps, snapping a new code, adding GPS tags to codes, retrieving a previously snapped code for use, entering manual information about a QR code, attribute the QR code to an object (e.g., so that QR codes for home furniture products may be grouped into a "bedroom furniture" object, for organization purposes), etc. (see 1166). In some embodiments, the user may be able to set a name of a cart or wishlist stored within the user's virtual wallet application to which the item snapped should be sent (see 1167). In some embodiments, the virtual wallet application may allow a user to create a new cart or wishlist to which the snapped items should be added.

Figure 12:
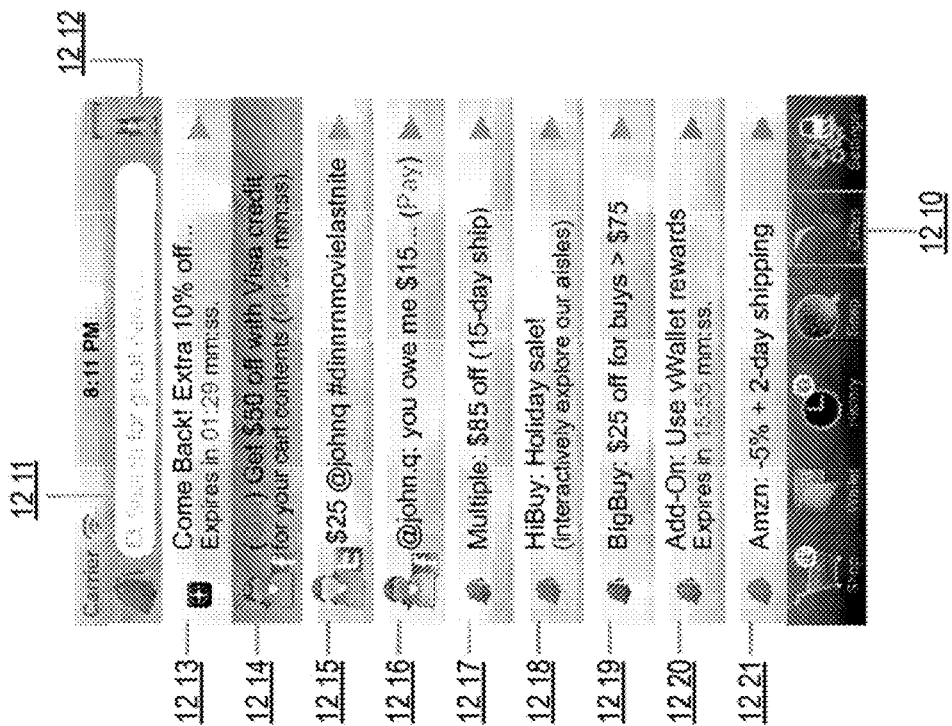
FIG. 12 shows a user interface diagram illustrating example features of virtual wallet applications, in an offers mode, in some embodiments of the SNAP.

FIG. 12 shows a user interface diagram illustrating example features of virtual wallet applications, in an offers mode, in some embodiments of the SNAP. In some implementations, the SNAP may allow a user to search for offers for products and/or services from within the virtual wallet mobile application. For example, the user may enter text into a graphical user interface ("GUI") element 1211, or issue voice commands by activating GUI element 1212 and speaking commands into the device. In some implementations, the SNAP may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 1213. For example, the offer may provide a discount, and may include an expiry time. In some implementations, other users may provide gifts (e.g., 1214) to the user, which the user may redeem. In some implementations, the offers section may include alerts as to payment of funds outstanding to other users (e.g., 1215). In some implementations, the offers section may include alerts as to requesting receipt of funds from other users (e.g., 1216). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the SNAP, e.g., 1217-1219, 1220. These offers may sometimes be assembled using a combination of participating merchants, e.g., 1217. In some implementations, the SNAP itself may provide offers for users contingent on the user utilizing particular payment forms from within the virtual wallet application, e.g., 1220.

Figure 13A:
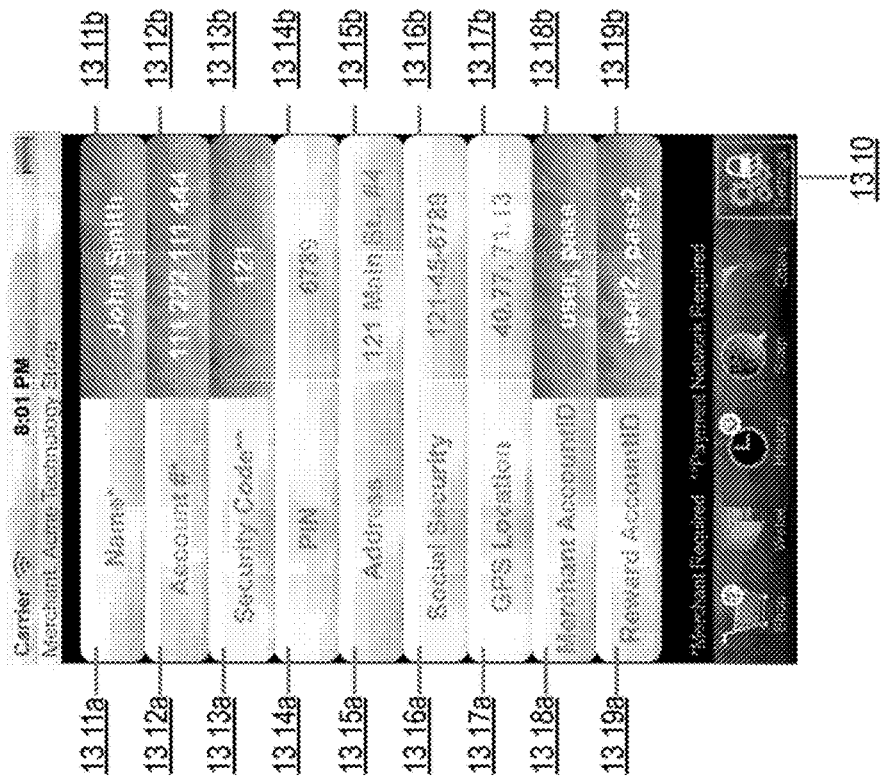
FIGS. 13A-B show user interface diagrams illustrating example features of virtual wallet applications, in a security and privacy mode, in some embodiments of the SNAP.
Figure 13B:
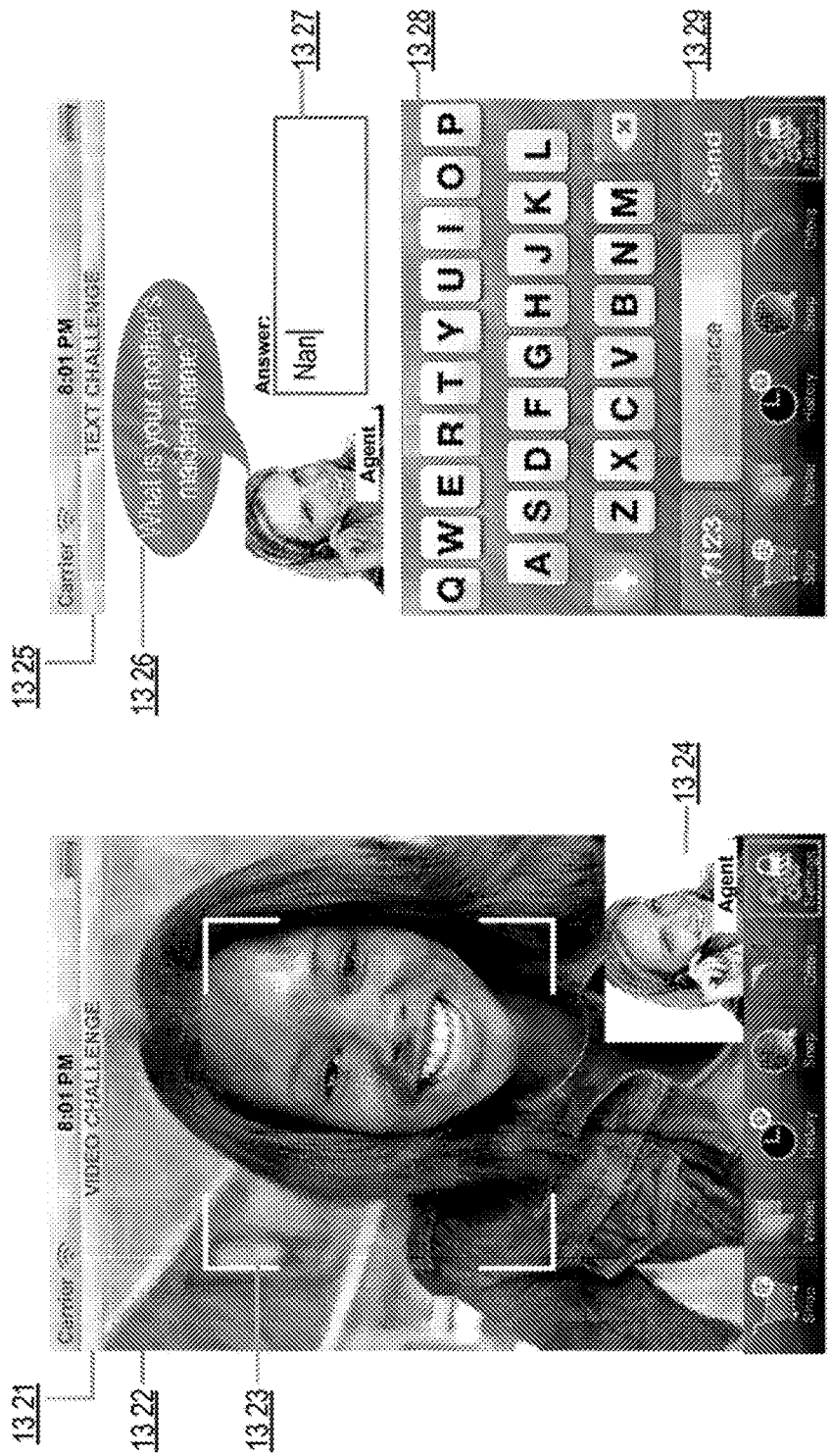

FIGS. 13A-B show user interface diagrams illustrating example features of virtual wallet applications, in a security and privacy mode, in some embodiments of the SNAP. With reference to FIG. 13A, in some implementations, the user may be able to view and/or modify the user profile and/or settings of the user, e.g., by activating a user interface element. For example, the user may be able to view/modify a user name (e.g., 1311*a-b*), account number (e.g., 1312*a-b*), user security access code (e.g., 1313*-b*), user pin (e.g., 1314*-b*), user address (e.g., 1315*-b*), social security number associated with the user (e.g., 1316*-b*), current device GPS location (e.g., 1317*-b*), user account of the merchant in whose store the user currently is (e.g., 1318*-b*), the user's rewards accounts (e.g., 1319*-b*), and/or the like. In some implementations, the user may be able to select which of the data fields and their associated values should be transmitted to facilitate the purchase transaction, thus providing enhanced data security for the user. For example, in the example illustration in FIG. 13A, the user has selected the name 1311*a*, account number 1312*a*, security code 1313*a*, merchant account ID 1318*a* and rewards account ID 1319*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the SNAP with the GPS location of the user. Based on the GPS location of the user, the SNAP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 13B, in some implementations, the app executing on the user's device may provide a "VerifyChat" feature for fraud prevention. For example, the SNAP may detect an unusual and/or suspicious transaction. The SNAP may utilize the VerifyChat feature to communicate with the user, and verify the authenticity of the originator of the purchase transaction. In various implementations, the SNAP may send electronic mail message, text (SMS) messages, Facebook® messages, Twitter™ tweets, text chat, voice chat, video chat (e.g., Apple FaceTime), and/or the like to communicate with the user. For example, the SNAP may initiate a video challenge for the user, e.g., 1321. For example, the user may need to present him/her-self via a video chat, e.g., 1322. In some implementations, a customer service representative, e.g., agent 1324, may manually determine the authenticity of the user using the video of the user. In some implementations, the SNAP may utilize face, biometric and/or like recognition (e.g., using pattern classification techniques) to determine the identity of the user. In some implementations, the app may provide reference marker (e.g., cross-hairs, target box, etc.), e.g., 1323, so that the user may the video to facilitate the SNAP's automated recognition of the user. In some implementations, the user may not have initiated the transaction, e.g., the transaction is fraudulent. In such implementations, the user may cancel the challenge. The SNAP may then cancel the transaction, and/or initiate fraud investigation procedures on behalf of the user.

In some implementations, the SNAP may utilize a text challenge procedure to verify the authenticity of the user, e.g., 1325. For example, the SNAP may communicate with the user via text chat, SMS messages, electronic mail, Facebook® messages, Twitter™ tweets, and/or the like. The SNAP may pose a challenge question, e.g., 1326, for the user. The app may provide a user input interface element(s) (e.g., virtual keyboard 1328) to answer the challenge question posed by the SNAP. In some implementations, the challenge question may be randomly selected by the SNAP automatically; in some implementations, a customer service representative may manually communicate with the user. In some implementations, the user may not have initiated the transaction, e.g., the transaction is fraudulent. In such implementations, the user may cancel the text challenge. The SNAP may cancel the transaction, and/or initiate fraud investigation on behalf of the user.

SNAP Controller

Figure 14:
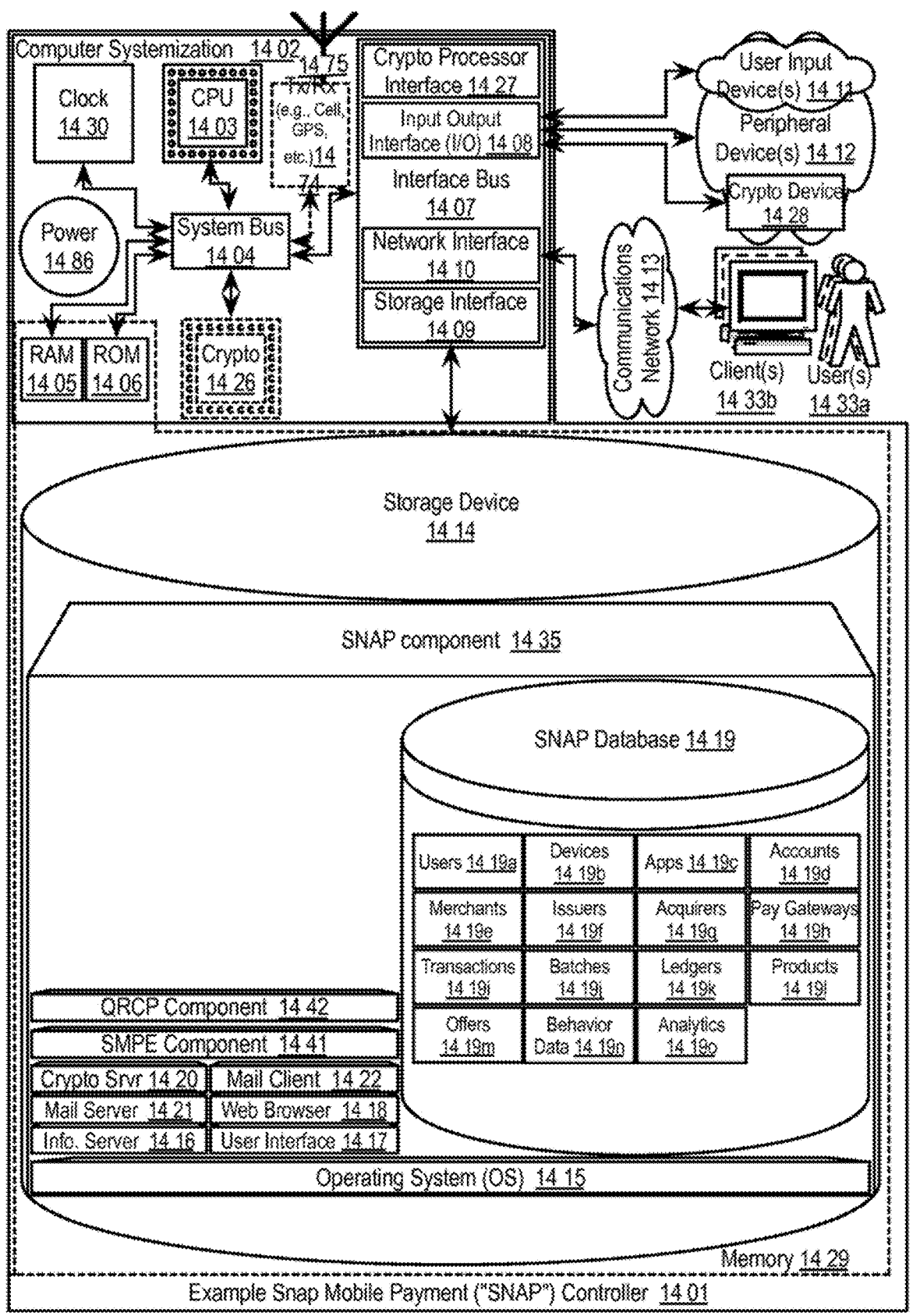
FIG. 14 shows a block diagram illustrating embodiments of a SNAP controller.

FIG. 14 shows a block diagram illustrating embodiments of a SNAP controller 1401. In this embodiment, the SNAP controller 1401 may serve to aggregate, process, store, search, serve, identify, instruct, generate, match, and/or facilitate interactions with a computer through various technologies, and/or other related data.

Typically, users, e.g., 1433*a*, which may be people and/or other systems, may engage information technology systems (e.g., computers) to facilitate information processing. In turn, computers employ processors to process information; such processors 1403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SNAP controller 1401 may be connected to and/or communicate with entities such as, but not limited to: one or more users from user input devices 1411; peripheral devices 1412; an optional cryptographic processor device 1428; and/or a communications network 1413. For example, the SNAP controller 1401 may be connected to and/or communicate with users, e.g., 1433*a*, operating client device(s), e.g., 1433*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SNAP controller 1401 may be based on computer systems that may comprise, but are not limited to, components such as: a computer systemization 1402 connected to memory 1429.

Computer Systemization

A computer systemization 1402 may comprise a clock 1430, central processing unit ("CPU(s)" and/or "processor(s)" (these terms are used interchangeable throughout the disclosure unless noted to the contrary)) 1403, a memory 1429 (e.g., a read only memory (ROM) 1406, a random access memory (RAM) 1405, etc.), and/or an interface bus 1407, and most frequently, although not necessarily, are all interconnected and/or communicating through a system bus 1404 on one or more (mother)board(s) 1402 having conductive and/or otherwise transportive circuit pathways through which instructions (e.g., binary encoded signals) may travel to effectuate communications, operations, storage, etc. The computer systemization may be connected to a power source 1486; e.g., optionally the power source may be internal. Optionally, a cryptographic processor 1426 and/or transceivers (e.g., ICs) 1474 may be connected to the system bus. In another embodiment, the cryptographic processor and/or transceivers may be connected as either internal and/or external peripheral devices 1412 via the interface bus I/O. In turn, the transceivers may be connected to antenna(s) 1475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SNAP controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SNAP controller and beyond through various interfaces. Should processing requirements dictate a greater amount speed and/or capacity, distributed processors (e.g., Distributed SNAP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SNAP may be achieved by implementing a microcontroller such as CAST's R8051XC2 microcontroller; Intel's MCS 51 (i.e., 8051 microcontroller); and/or the like. Also, to implement certain features of the SNAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SNAP component collection (distributed or otherwise) and/or features may be implemented via the microprocessor and/or via embedded components; e.g., via ASIC, coprocessor, DSP, FPGA, and/or the like. Alternately, some implementations of the SNAP may be implemented with embedded components that are configured and used to achieve a variety of features or signal processing.

Depending on the particular implementation, the embedded components may include software solutions, hardware solutions, and/or some combination of both hardware/software solutions. For example, SNAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SNAP features. A hierarchy of programmable interconnects allow logic blocks to be interconnected as needed by the SNAP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the SNAP may be developed on regular FPGAs and then migrated into a fixed version that more resembles ASIC implementations. Alternate or coordinating implementations may migrate SNAP controller features to a final ASIC instead of or in addition to FPGAs. Depending on the implementation all of the aforementioned embedded components and microprocessors may be considered the "CPU" and/or "processor" for the SNAP.

Power Source

The power source 1486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1486 is connected to at least one of the interconnected subsequent components of the SNAP thereby providing an electric current to all subsequent components. In one example, the power source 1486 is connected to the system bus component 1404. In an alternative embodiment, an outside power source 1486 is provided through a connection across the I/O 1408 interface. For example, a USB and/or IEEE 1394 connection carries both data and power across the connection and is therefore a suitable source of power.

Interface Adapters

Interface bus(ses) 1407 may accept, connect, and/or communicate to a number of interface adapters, conventionally although not necessarily in the form of adapter cards, such as but not limited to: input output interfaces (I/O) 1408, storage interfaces 1409, network interfaces 1410, and/or the like. Optionally, cryptographic processor interfaces 1427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1409 may accept, communicate, and/or connect to a number of storage devices such as, but not limited to: storage devices 1414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1410 may accept, communicate, and/or connect to a communications network 1413. Through a communications network 1413, the SNAP controller is accessible through remote clients 1433*b* (e.g., computers with web browsers) by users 1433*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SNAP), architectures may similarly be employed to pool, load balance, and/or otherwise increase the communicative bandwidth required by the SNAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1410 may be used to engage with various communications network types 1413. For example, multiple network interfaces may be employed to allow for the communication over broadcast, multicast, and/or unicast networks.

Input Output interfaces (I/O) 1408 may accept, communicate, and/or connect to user input devices 1411, peripheral devices 1412, cryptographic processor devices 1428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1411 often are a type of peripheral device 1412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1412 may be connected and/or communicate to I/O and/or other facilities of the like such as network interfaces, storage interfaces, directly to the interface bus, system bus, the CPU, and/or the like. Peripheral devices may be external, internal and/or part of the SNAP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1428), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SNAP controller may be embodied as an embedded, dedicated, and/or monitor-less (i.e., headless) device, wherein access would be provided over a network interface connection.

Cryptographic units such as, but not limited to, microcontrollers, processors 1426, interfaces 1427, and/or devices 1428 may be attached, and/or communicate with the SNAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1429. However, memory is a fungible technology and resource, thus, any number of memory embodiments may be employed in lieu of or in concert with one another. It is to be understood that the SNAP controller and/or a computer systemization may employ various forms of memory 1429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1429 will include ROM 1406, RAM 1405, and a storage device 1414. A storage device 1414 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1429 may contain a collection of program and/or database components and/or data such as, but not limited to: operating system component(s) 1415 (operating system); information server component(s) 1416 (information server); user interface component(s) 1417 (user interface); Web browser component(s) 1418 (Web browser); database(s) 1419; mail server component(s) 1421; mail client component(s) 1422; cryptographic server component(s) 1420 (cryptographic server); the SNAP component(s) 1435; and/or the like (i.e., collectively a component collection). These components may be stored and accessed from the storage devices and/or from storage devices accessible through an interface bus. Although non-conventional program components such as those in the component collection, typically, are stored in a local storage device 1414, they may also be loaded and/or stored in memory such as: peripheral devices, RAM, remote storage facilities through a communications network, ROM, various forms of memory, and/or the like.

Operating System

The operating system component 1415 is an executable program component facilitating the operation of the SNAP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SNAP controller to communicate with other entities through a communications network 1413. Various communication protocols may be used by the SNAP controller as a subcarrier transport mechanism for interaction, such as, but not limited to: multicast, TCP/IP, UDP, unicast, and/or the like.

Information Server

An information server component 1416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTIPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SNAP controller based on the remainder of the HTTP request. For example, a request such as "123.124.125.126/myInformation.html" might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SNAP database 1419, operating systems, other program components, user interfaces, Web browsers, and/or the like.

Access to the SNAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SNAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SNAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SNAP enabled nodes. The combined application may be nugatory on systems employing standard Web browsers.

Mail Server

A mail server component 1421 is a stored program component that is executed by a CPU 1403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SNAP.

Access to the SNAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1422 is a stored program component that is executed by a CPU 1403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1420 is a stored program component that is executed by a CPU 1403, cryptographic processor 1426, cryptographic processor interface 1427, cryptographic processor device 1428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SNAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SNAP component to engage in secure transactions if so desired. The cryptographic component facilitates the secure accessing of resources on the SNAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SNAP Database

The SNAP database component 1419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SNAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SNAP database is implemented as a data-structure, the use of the SNAP database 1419 may be integrated into another component such as the SNAP component 1435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1419 includes several tables 1419a-o. A Users table 1419a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a SNAP. A Devices table 1419b may include fields such as, but not limited to: device_ID, device_name, device_IP, device_MAC, device_type, device_model, device_version, device_OS, device_apps_list, device_securekey, wallet_app_installed_flag, and/or the like. An Apps table 1419c may include fields such as, but not limited to: app_ID, app_name, app_type, app_dependencies, and/or the like. An Accounts table 1419d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 1419e may include fields such as, but not limited to: merchant_id, merchant_name, merchant_address, ip_address, mac_address, auth_key, port_num, security_settings_list, and/or the like. An Issuers table 1419f may include fields such as, but not limited to: issuer_id, issuer_name, issuer_address, ip_address, mac_address, auth_key, port_num, security_settings_list, and/or the like. An Acquirers table 1419g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 1419h may include fields such as, but not limited to: gateway_ID, gateway_IP, gateway_MAC, gateway_secure_key, gateway_access_list, gateway_API_call_list, gateway_services_list, and/or the like. A Transactions table 1419i may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 1419j may include fields such as, but not limited to: batch_id, transaction_id_list, timestamp_list, cleared_flag_list, clearance_trigger settings, and/or the like. A Ledgers table 1419k may include fields such as, but not limited to: request_id, timestamp, deposit_amount, batch_id, transaction_id, clear_flag, deposit_account, transaction_summary, payor_name, payor_account, and/or the like. A Products table 14191 may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 1419m may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 1419n may include fields such as, but not limited to: user_id, timestamp, activity_type, activity_location, activity_attribute_list, activity_attribute_values_list, and/or the like. An Analytics table 14190 may include fields such as, but not limited to: report_id, user_id, report_type, report_algorithm_id, report_destination_address, and/or the like.

In one embodiment, the SNAP database may interact with other database systems. For example, employing a distributed database system, queries and data access by search SNAP component may treat the combination of the SNAP database, an integrated data security layer database as a single database entity.

In one embodiment, user programs may contain various user interface primitives, which may serve to update the SNAP. Also, various accounts may require custom database tables depending upon the environments and the types of clients the SNAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1419a-o. The SNAP may be configured to keep track of various settings, inputs, and parameters via database controllers.

The SNAP database may communicate to and/or with other components in a component collection, including itself, and/or facilities of the like. Most frequently, the SNAP database communicates with the SNAP component, other program components, and/or the like. The database may contain, retain, and provide information regarding other nodes and data.

The SNAPs

The SNAP component 1435 is a stored program component that is executed by a CPU. In one embodiment, the SNAP component incorporates any and/or all combinations of the aspects of the SNAP discussed in the previous figures. As such, the SNAP affects accessing, obtaining and the provision of information, services, transactions, and/or the like across various communications networks.

The SNAP component may transform real-time-generated merchant-product Quick Response codes via SNAP components into virtual wallet card-based transaction purchase notifications, and/or the like and use of the SNAP. In one embodiment, the SNAP component 1435 takes inputs (e.g., checkout input 411; product data 414; payment input 419; issuer server data 423; user data 427a-n; and/or the like), and transforms the inputs via SNAP components (e.g., SMPE 1441; QRCP 1442; and/or the like), into outputs (e.g., QR pay code 417; card authorization request 421; authorization response 429a-n; authorization success message 433a-b; batch append data 435; purchase receipt 436; and/or the like).

The SNAP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SNAP server employs a cryptographic server to encrypt and decrypt communications. The SNAP component may communicate to and/or with other components in a component collection, including itself, and/or facilities of the like. Most frequently, the SNAP component communicates with the SNAP database, operating systems, other program components, and/or the like. The SNAP may contain, communicate, generate, obtain, and/or provide program component, system, user, and/or data communications, requests, and/or responses.

Distributed SNAPs

The structure and/or operation of any of the SNAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SNAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SNAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die ('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUED ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

Non-limiting exemplary embodiments highlighting numerous further advantageous aspects include:

1. A visual snap computer-implemented method, comprising:
   obtaining a user visual item information request (VITR);
   extracting a VITR image frame from the VITR obtained via an image acquisition device operatively connected to a user device;
   extracting VITR field attributes from the VITR image frame through a VITR processing component, wherein the VITR processing component may include barcode recognition and optical character recognition;
   querying a database with the extracted VITR field attributes;
   determining a VITR type from results from the querying;
   providing a visual item information response based on the determined VITR type.

2. The method of claim 1, wherein the VITR may be one of a visual coupon addition request, a visual account addition request, a visual bill addition request, a visual purchase request, and a visual purchase information request.

3. The method of claim 2, wherein the VITR and visual item information response are storable for later access and retrieval via a VITR history.

4. The method of claim 1, wherein the VITR is a visual purchase request, and the provided visual item information response is a purchase intake mechanism, and further comprising:
   obtaining the user's indication to purchase a purchase item identified in the provided visual item information response;
   obtaining a purchase transaction request for payment processing of the purchase item; and
   providing a purchase receipt for the purchase transaction.

5. The method of claim 4, wherein the VITR, visual item information response, user's indication, purchase transaction request and purchase receipt are storable for later access and retrieval via a VITR history.

6. The method of claim 1, wherein a server performs VITR activities.

7. The method of claim 1, wherein a user client device performs VITR activities. 8. A snap payment computer-implemented method, comprising:
   obtaining a user visual item information request (VITR);
   acquiring an VITR image frame via an image acquisition device operatively connected to the user device;
   extracting VITR field attributes from the VITR image frame through a VITR processing component, wherein the VITR processing component may include barcode recognition and optical character recognition;
   querying a database with the extracted VITR field attributes;
   determining a VITR type from results from the querying;
   providing a visual item information response based on the determined VITR type.

9. The method of claim 8, wherein the VITR may be one of a visual coupon addition request, a visual account addition request, a visual bill addition request, a visual purchase request, and a visual purchase information request.

10. The method of claim 9, wherein the VITR and visual item information response are storable for later access and retrieval via a VITR history.

11. The method of claim 8, wherein the VITR is a visual purchase request, and the provided visual item information response is a purchase intake mechanism, and further comprising:
   obtaining the user's indication to purchase a purchase item identified in the provided visual item information response;
   providing a purchase transaction request for payment processing of the purchase item; and
   obtaining a purchase receipt for the purchase transaction.

12. The method of claim 11, wherein the VITR, visual item information response, user's indication, purchase transaction request and purchase receipt are storable for later access and retrieval via a VITR history.

13. A snap payment computer-implemented method, comprising:
   obtaining, at a user device, a user input to initiate a purchase transaction;

acquiring an image frame via an image acquisition device operatively connected to the user device;

identifying a payment code depicted within the acquired image frame;

generating, via the user device, a purchase transaction request using the identified payment code;

providing the purchase transaction request for payment processing; and obtaining a purchase receipt for the purchase transaction.

14. The method of claim 13, further comprising:
providing an image of the payment code for purchase transaction processing.

15. The method of claim 13, further comprising:
acquiring video including the image frame via the image acquisition device included in the user mobile device;
extracting the image frame from the acquired video; and
analyzing the image frame to determine whether the image frame includes the depicted payment code.

16. The method of claim 13, wherein the user device is a mobile device.

17. The method of claim 13, wherein the user input is a touchscreen gesture on a touchscreen operatively connected to the user device.

18. The method of claim 13, wherein the payment code is a one-dimensional barcode.

19. The method of claim 13, wherein the payment code is a two-dimensional barcode.

20. The method of claim 19, wherein the payment code is a Quick Response code.

21. The method of claim 13, further comprising:
extracting purchase session data from the payment code; and
wherein the purchase transaction request is generated, via the user mobile device, using the extracted purchase session data.

22. The method of claim 21, wherein the purchase session data varies based on user shopping activity with a merchant.

23. The method of claim 22, wherein the merchant is an online merchant.

24. The method of claim 13, further comprising:
providing a portion of the acquired image frame including the depiction of the payment code to a server; and
obtaining purchase session data from the server in response to providing the portion of the acquired image frame.

25. The method of claim 21, wherein the purchase session data includes a merchant identifier, and a session identifier for a user shopping session with a merchant associated with the merchant identifier.

26. The method of claim 24, wherein the purchase session data includes a merchant identifier, and a session identifier for a user shopping session with a merchant associated with the merchant identifier.

27. The method of claim 25, wherein the session identifier is configured to serve as a token parameter in a uniform resource locator for data on the user shopping session with the merchant.

28. The method of claim 26, wherein the session identifier is configured to serve as a token parameter in a uniform resource locator for data on the user shopping session with the merchant.

29. The method of claim 13, further comprising:
obtaining, for payment processing, payment information associated with a virtual wallet account;
wherein the generated purchase transaction request includes the payment information associated with the virtual wallet account.

30. The method of claim 29, wherein the payment information includes a dynamically generated card verification value code.

31. The method of claim 30, further comprising:
providing a request for the dynamically generated card verification value code to a server; and
obtaining the dynamically generated card verification value code from the server in response to providing the request.

32. The method of claim 31, wherein the dynamically generated card verification value has an expiration time.

33. The method of claim 31, wherein the dynamically generated card verification value is specific to a user shopping session with a merchant.

34. The method of claim 13, wherein the payment code depicted within the acquired image frame is acquired from the display of a media device, and encodes data to purchase on-demand media content.

35. The method of claim 34, wherein the media device is a television.

36. The method of claim 35, wherein the television is part of an in-flight entertainment system.

37. The method of claim 34, wherein the media device is displaying a webpage.

38. A reverse snap payment computer-implemented method, comprising:
obtaining, at a user device, a user input to initiate a purchase transaction with a merchant;
obtaining user payment information for processing the purchase transaction;
generating, via the user device, a payment code image using the payment information for processing the purchase transaction;
displaying the payment code image, via a display operatively connected to the user device, for a point-of-sale terminal to acquire an image of the payment code image; and
obtaining a purchase receipt for the purchase transaction.

39. The method of claim 38, further comprising:
obtaining a notification that the point-of-sale terminal has acquired an image of the payment code image; and
terminating display of the payment code image via the display operatively connected to the user device;

40. The method of claim 38, wherein the user device is a mobile device.

41. The method of claim 38, wherein the user input is a touchscreen gesture on a touchscreen operatively connected to the user device.

42. The method of claim 38, wherein the payment code is a one-dimensional barcode.

43. The method of claim 38, wherein the payment code is a two-dimensional barcode.

44. The method of claim 43, wherein the payment code is a Quick Response code.

45. The method of claim 38, wherein the merchant is an online merchant.

46. The method of claim 38, wherein the purchase receipt includes a merchant identifier, and a session identifier for a user shopping session with a merchant associated with the merchant identifier.

47. The method of claim 46, wherein the session identifier is configured to serve as a token parameter in a uniform resource locator for data on the user shopping session with the merchant.

48. The method of claim 38, wherein the user payment information is associated with a virtual wallet account;

49. The method of claim 48, wherein the payment information includes a dynamically generated card verification value code.

50. The method of claim 49, further comprising:
providing a request for the dynamically generated card verification value code to a server; and
obtaining the dynamically generated card verification value code from the server in response to providing the request.

51. The method of claim 49, wherein the dynamically generated card verification value has an expiration time.

52. The method of claim 49, wherein the dynamically generated card verification value is specific to a user shopping session with a merchant.

53. The method of claim 38, wherein the point-of-sale terminal is a user device.

54. The method of claim 38, wherein the point-of-sale terminal is located at physical merchant store.

55. A group split snap payment computer-implemented method, comprising:
obtaining, at a user device of a user, a user input to initiate a group purchase transaction;
obtaining purchase data for the group purchase transaction;
generating, via the user device, a split-payment code image using the purchase data for the group purchase transaction;
wherein the split-payment code image includes information on a payment amount for another user; and
displaying the split-payment code image, via a display operatively connected to the user device, for another user device of the another user to acquire an image of the split-payment code image.

56. The method of claim 55, further comprising:
generating, via the user device, a purchase transaction request using a payment amount for the user covering a portion of the group purchase transaction;
providing the purchase transaction request for payment processing; and
obtaining a purchase receipt for the payment amount for the user for the group purchase transaction.

57. The method of claim 56, further comprising:
obtaining, for payment processing, payment information associated with a virtual wallet account;
wherein the generated purchase transaction request includes the payment information associated with the virtual wallet account.

58. The method of claim 57, wherein the payment information includes a dynamically generated card verification value code.

59. The method of claim 58, further comprising:
providing a request for the dynamically generated card verification value code to a server; and
obtaining the dynamically generated card verification value code from the server in response to providing the request.

60. The method of claim 58, wherein the dynamically generated card verification value is specific to a user shopping session with a merchant.

61. The method of claim 55, wherein the split-payment code is a Quick Response code.

62. A group split payment computer-implemented method, comprising
obtaining, at a user device of a user, a user input to initiate a group purchase transaction;
acquiring an image frame via an image acquisition device operatively connected to the user device;
identifying a payment code depicted within the acquired image frame, the payment code displayed by another user device of another user;
generating, via the user device, a purchase transaction request for payment covering a portion of the group purchase transaction using the identified payment code;
providing the purchase transaction request for payment processing; and
obtaining a purchase receipt for the purchase transaction.

63. The method of claim 62, further comprising:
extracting purchase session data from the payment code; and
wherein the purchase transaction request is generated, via the user mobile device, using the extracted purchase session data.

64. The method of claim 63, wherein the purchase session data varies based on user shopping activity with a merchant.

65. The method of claim 64, wherein the merchant is an online merchant.

66. The method of claim 62, further comprising:
providing a portion of the acquired image frame including the depiction of the payment code to a server; and
obtaining purchase session data from the server in response to providing the portion of the acquired image frame.

67. The method of claim 63, wherein the purchase session data includes a merchant identifier, and a session identifier for a user shopping session with a merchant associated with the merchant identifier.

68. The method of claim 66, wherein the purchase session data includes a merchant identifier, and a session identifier for a user shopping session with a merchant associated with the merchant identifier.

69. The method of claim 67, wherein the session identifier is configured to serve as a token parameter in a uniform resource locator for data on the user shopping session with the merchant.

70. The method of claim 68, wherein the session identifier is configured to serve as a token parameter in a uniform resource locator for data on the user shopping session with the merchant.

71. The method of claim 62, further comprising:
obtaining, for payment processing, payment information associated with a virtual wallet account;
wherein the generated purchase transaction request includes the payment information associated with the virtual wallet account.

72. The method of claim 71, wherein the payment information includes a dynamically generated card verification value code.

73. The method of claim 72, further comprising:
providing a request for the dynamically generated card verification value code to a server; and
obtaining the dynamically generated card verification value code from the server in response to providing the request.

74. The method of claim 73, wherein the dynamically generated card verification value has an expiration time.

75. The method of claim 73, wherein the dynamically generated card verification value is specific to a user shopping session with a merchant.

76. A person-to-person snap payment computer-implemented method, comprising:
obtaining, at a user device of a user, a user input to initiate a person-to-person transaction;
obtaining a transfer amount for the person-to-person transaction;

generating, via the user device, a payment code image using the transfer amount for the person-to-person transaction;
wherein the payment code image includes information on a transfer amount for another user; and
displaying the payment code image, via a display operatively connected to the user device, for another user device of the another user to acquire an image of the payment code image.

77. The method of claim 76, further comprising:
obtaining, for payment processing, payment information associated with a virtual wallet account;
wherein the generated payment code image encodes information on the payment information associated with the virtual wallet account.

78. The method of claim 77, wherein the payment information includes a dynamically generated card verification value code.

79. The method of claim 78, further comprising:
providing a request for the dynamically generated card verification value code to a server; and
obtaining the dynamically generated card verification value code from the server in response to providing the request.

80. The method of claim 76, wherein the transfer amount is obtained from the another user device of the another user.

81. The method of claim 76, wherein the split-payment code is a Quick Response code.

82. A person-to-person payment computer-implemented method, comprising
obtaining, at a user device of a user, a user input to initiate a person-to-person transaction;
acquiring an image frame via an image acquisition device operatively connected to the user device;
identifying a payment code depicted within the acquired image frame, the payment code displayed by another user device of another user;
generating, via the user device and using the identified payment code, a payment transfer request for payment to the another user;
providing the payment transfer request for payment processing; and
obtaining a transfer confirmation for the person-to-person transaction.

83. The method of claim 82, further comprising:
extracting transfer account data from the payment code; and
wherein the payment transfer request is generated, via the user mobile device, using the extracted transfer account data.

84. The method of claim 83, wherein the transfer account data includes data on a virtual wallet account.

85. The method of claim 82, further comprising:
providing a portion of the acquired image frame including the depiction of the payment code to a server.

86. The method of claim 82, further comprising:
obtaining, for payment processing, payment information associated with a virtual wallet account;
wherein the generated payment transfer request includes the payment information associated with the virtual wallet account.

87. The method of claim 86, wherein the payment information includes a dynamically generated card verification value code.

88. The method of claim 87, further comprising:
providing a request for the dynamically generated card verification value code to a server; and
obtaining the dynamically generated card verification value code from the server in response to providing the request.

89. The method of claim 87, wherein the dynamically generated card verification value has an expiration time.

90. The method of claim 87, wherein the dynamically generated card verification value is specific to a user funds transfer session between the user device and the another user device.

91. A snap mobile sales computer-implemented method, comprising:
obtaining a user checkout request at a point-of-sale device;
obtaining user shopping cart information with a merchant for processing a purchase transaction related to the user checkout request;
generating, via the user device, a payment code image using the user shopping cart information;
displaying the payment code image, via a display operatively connected to the point-of-sale device, for a user device to acquire an image of the payment code image;
and obtaining a notification of authorization of the purchase transaction.

92. The method of claim 91, further comprising:
obtaining a notification that the user device has acquired an image of the payment code image; and
terminating display of the payment code image via the display operatively connected to the point-of-sale device;

93. The method of claim 91, wherein the user checkout request is obtained via a touchscreen gesture on a touchscreen operatively connected to the point-of-sale device.

94. The method of claim 91, wherein the user checkout request is obtained via a communication from the user device.

95. The method of claim 91, wherein the payment code is a one-dimensional barcode.

96. The method of claim 91, wherein the payment code is a two-dimensional barcode.

97. The method of claim 96, wherein the payment code is a Quick Response code.

98. The method of claim 91, wherein the merchant is an online merchant.

99. The method of claim 98, wherein the point-of sale device is another user device.

100. The method of claim 91, wherein the point-of-sale terminal is located at physical merchant store.

101. The method of claim 91, wherein the notification of authorization of the purchase transaction includes a session identifier for a user shopping session with the merchant.

102. The method of claim 101, wherein the session identifier is configured to serve as a token parameter in a uniform resource locator for data on the user shopping session with the merchant.

103. A reverse snap mobile sales computer-implemented method, comprising:
obtaining a user checkout request at a point-of-sale device;
acquiring an image frame via an image acquisition device operatively connected to the point-of-sale device;
identifying a payment code depicted within the acquired image frame;
generating, via the point-of-sale device, a purchase transaction request using the identified payment code;
providing the purchase transaction request for payment processing; and obtaining a notification of authorization of the purchase transaction.

104. The method of claim 103, further comprising:
providing an image of the payment code for purchase transaction processing.

105. The method of claim 103, further comprising:
acquiring video including the image frame via the image acquisition device operatively connected to the point-of-sale device;
extracting the image frame from the acquired video; and
analyzing the image frame to determine whether the image frame includes the depicted payment code.

106. The method of claim 103, wherein the payment code is a one-dimensional barcode.

107. The method of claim 103, wherein the payment code is a two-dimensional barcode.

108. The method of claim 103, wherein the payment code is a Quick Response code.

109. The method of claim 103, further comprising:
extracting purchase payment information from the payment code; and
wherein the purchase transaction request is generated, via the point-of-sale device, using the extracted purchase payment information.

110. The method of claim 109, wherein the purchase payment information includes an expiration time.

111. The method of claim 109, wherein the purchase payment information is associated with a virtual wallet account, and wherein the generated purchase transaction request includes the purchase payment data associated with the virtual wallet account.

112. The method of claim 103, further comprising:
providing a portion of the acquired image frame including the depiction of the payment code to a server; and
obtaining purchase payment information from the server in response to providing the portion of the acquired image frame.

113. The method of claim 112, wherein the purchase payment information includes a session identifier for a user shopping session with a merchant.

114. The method of claim 113, wherein the session identifier is configured to serve as a token parameter in a uniform resource locator for data on the user shopping session with the merchant.

115. A visual snap computer-implemented system, comprising:
a processor; and
a memory disposed in communication with the processor and storing processor-executable instructions to:
obtain a user visual item information request (VITR);
extract a VITR image frame from the VITR obtained via an image acquisition device operatively connected to a user device;
extract VITR field attributes from the VITR image frame through a VITR processing component, wherein the VITR processing component may include barcode recognition and optical character recognition;
query a database with the extracted VITR field attributes;
determine a VITR type from results from the querying;
provide a visual item information response based on the determined VITR type.

116. The system of claim 115, wherein the VITR may be one of a visual coupon addition request, a visual account addition request, a visual bill addition request, a visual purchase request, and a visual purchase information request.

117. The system of claim 116, wherein the VITR and visual item information response are storable for later access and retrieval via a VITR history.

118. The system of claim 115, wherein the VITR is a visual purchase request, and the provided visual item information response is a purchase intake mechanism, and further comprising:
obtain the user's indication to purchase a purchase item identified in the provided visual item information response;
obtain a purchase transaction request for payment processing of the purchase item; and
provide a purchase receipt for the purchase transaction.

119. The system of claim 118, wherein the VITR, visual item information response, user's indication, purchase transaction request and purchase receipt are storable for later access and retrieval via a VITR history.

120. The system of claim 115, wherein a server performs VITR activities.

121. The system of claim 115, wherein a user client device performs VITR activities.

122. A snap payment computer-implemented system, comprising:
a processor; and
a memory disposed in communication with the processor and storing processor-executable instructions to:
obtain a user visual item information request (VITR);
acquire an VITR image frame via an image acquisition device operatively connected to the user device;
extract VITR field attributes from the VITR image frame through a VITR processing component, wherein the VITR processing component may include barcode recognition and optical character recognition;
query a database with the extracted VITR field attributes;
determine a VITR type from results from the querying;
provide a visual item information response based on the determined VITR type.

123. The system of claim 122, wherein the VITR may be one of a visual coupon addition request, a visual account addition request, a visual bill addition request, a visual purchase request, and a visual purchase information request.

124. The system of claim 123, wherein the VITR and visual item information response are storable for later access and retrieval via a VITR history.

125. The system of claim 122, wherein the VITR is a visual purchase request, and the provided visual item information response is a purchase intake mechanism, and further comprising:
obtain the user's indication to purchase a purchase item identified in the provided visual item information response;
provide a purchase transaction request for payment processing of the purchase item; and
obtain a purchase receipt for the purchase transaction.

126. The system of claim 125, wherein the VITR, visual item information response, user's indication, purchase transaction request and purchase receipt are storable for later access and retrieval via a VITR history.

127. A snap payment computer-implemented system, comprising:
a processor; and
a memory disposed in communication with the processor and storing processor-executable instructions to:
obtain, at a user device, a user input to initiate a purchase transaction;

acquire an image frame via an image acquisition device operatively connected to the user device;

identify a payment code depicted within the acquired image frame;

generate, via the user device, a purchase transaction request using the identified payment code;

provide the purchase transaction request for payment processing; and obtain a purchase receipt for the purchase transaction.

128. The system of claim 127, the memory further storing instructions to:

provide an image of the payment code for purchase transaction processing.

129. The system of claim 127, the memory further storing instructions to:

acquire video including the image frame via the image acquisition device included in the user mobile device;

extract the image frame from the acquired video; and analyzing the image frame to determine whether the image frame includes the depicted payment code.

130. The system of claim 127, wherein the user device is a mobile device.

131. The system of claim 127, wherein the user input is a touchscreen gesture on a touchscreen operatively connected to the user device.

132. The system of claim 127, wherein the payment code is a one-dimensional barcode.

133. The system of claim 127, wherein the payment code is a two-dimensional barcode.

134. The system of claim 133, wherein the payment code is a Quick Response code.

135. The system of claim 127, the memory further storing instructions to:

extract purchase session data from the payment code; and wherein the purchase transaction request is generated, via the user mobile device, using the extracted purchase session data.

136. The system of claim 135, wherein the purchase session data varies based on user shopping activity with a merchant.

137. The system of claim 136, wherein the merchant is an online merchant.

138. The system of claim 127, the memory further storing instructions to:

provide a portion of the acquired image frame including the depiction of the payment code to a server; and obtain purchase session data from the server in response to providing the portion of the acquired image frame.

139. The system of claim 135, wherein the purchase session data includes a merchant identifier, and a session identifier for a user shopping session with a merchant associated with the merchant identifier.

140. The system of claim 138, wherein the purchase session data includes a merchant identifier, and a session identifier for a user shopping session with a merchant associated with the merchant identifier.

141. The system of claim 139, wherein the session identifier is configured to serve as a token parameter in a uniform resource locator for data on the user shopping session with the merchant.

142. The system of claim 140, wherein the session identifier is configured to serve as a token parameter in a uniform resource locator for data on the user shopping session with the merchant.

143. The system of claim 127, the memory further storing instructions to:

obtain, for payment processing, payment information associated with a virtual wallet account;

wherein the generated purchase transaction request includes the payment information associated with the virtual wallet account.

144. The system of claim 143, wherein the payment information includes a dynamically generated card verification value code.

145. The system of claim 144, the memory further storing instructions to:

provide a request for the dynamically generated card verification value code to a server; and obtain the dynamically generated card verification value code from the server in response to providing the request.

146. The system of claim 145, wherein the dynamically generated card verification value has an expiration time.

147. The system of claim 145, wherein the dynamically generated card verification value is specific to a user shopping session with a merchant.

148. The system of claim 127, wherein the payment code depicted within the acquired image frame is acquired from the display of a media device, and encodes data to purchase on-demand media content.

149. The system of claim 148, wherein the media device is a television.

150. The system of claim 149, wherein the television is part of an in-flight entertainment system.

151. The system of claim 148, wherein the media device is displaying a webpage.

152. A reverse snap payment computer-implemented system, comprising:

a processor; and a memory disposed in communication with the processor and storing processor-executable instructions to:

obtain, at a user device, a user input to initiate a purchase transaction with a merchant;

obtain user payment information for processing the purchase transaction;

generate, via the user device, a payment code image using the payment information for processing the purchase transaction;

display the payment code image, via a display operatively connected to the user device, for a point-of-sale terminal to acquire an image of the payment code image; and obtain a purchase receipt for the purchase transaction.

153. The system of claim 152, the memory further storing instructions to:

obtain a notification that the point-of-sale terminal has acquired an image of the payment code image; and terminate display of the payment code image via the display operatively connected to the user device;

154. The system of claim 152, wherein the user device is a mobile device.

155. The system of claim 152, wherein the user input is a touchscreen gesture on a touchscreen operatively connected to the user device.

156. The system of claim 152, wherein the payment code is a one-dimensional barcode.

157. The system of claim 152, wherein the payment code is a two-dimensional barcode.

158. The system of claim 157, wherein the payment code is a Quick Response code.

159. The system of claim 152, wherein the merchant is an online merchant.

160. The system of claim 152, wherein the purchase receipt includes a merchant identifier, and a session identifier for a user shopping session with a merchant associated with the merchant identifier.

161. The system of claim 160, wherein the session identifier is configured to serve as a token parameter in a uniform resource locator for data on the user shopping session with the merchant.

162. The system of claim 152, wherein the user payment information is associated with a virtual wallet account;

163. The system of claim 162, wherein the payment information includes a dynamically generated card verification value code.

164. The system of claim 163, the memory further storing instructions to:
provide a request for the dynamically generated card verification value code to a server; and
obtain the dynamically generated card verification value code from the server in response to providing the request.

165. The system of claim 163, wherein the dynamically generated card verification value has an expiration time.

166. The system of claim 163, wherein the dynamically generated card verification value is specific to a user shopping session with a merchant.

167. The system of claim 152, wherein the point-of-sale terminal is a user device.

168. The system of claim 152, wherein the point-of-sale terminal is located at physical merchant store.

169. A group split snap payment computer-implemented system, comprising:
a processor; and
a memory disposed in communication with the processor and storing processor-executable instructions to:
obtain, at a user device of a user, a user input to initiate a group purchase transaction;
obtain purchase data for the group purchase transaction;
generate, via the user device, a split-payment code image using the purchase data for the group purchase transaction;
wherein the split-payment code image includes information on a payment amount for another user; and
display the split-payment code image, via a display operatively connected to the user device, for another user device of the another user to acquire an image of the split-payment code image.

170. The system of claim 169, the memory further storing instructions to:
generate, via the user device, a purchase transaction request using a payment amount for the user covering a portion of the group purchase transaction;
provide the purchase transaction request for payment processing; and
obtain a purchase receipt for the payment amount for the user for the group purchase transaction.

171. The system of claim 170, the memory further storing instructions to:
obtain, for payment processing, payment information associated with a virtual wallet account;
wherein the generated purchase transaction request includes the payment information associated with the virtual wallet account.

172. The system of claim 171, wherein the payment information includes a dynamically generated card verification value code.

173. The system of claim 172, the memory further storing instructions to:
provide a request for the dynamically generated card verification value code to a server; and
obtain the dynamically generated card verification value code from the server in response to providing the request.

174. The system of claim 172, wherein the dynamically generated card verification value is specific to a user shopping session with a merchant.

175. The system of claim 169, wherein the split-payment code is a Quick Response code.

176. A group split payment computer-implemented system, comprising:
a processor; and
a memory disposed in communication with the processor and storing processor-executable instructions to:
obtain, at a user device of a user, a user input to initiate a group purchase transaction;
acquire an image frame via an image acquisition device operatively connected to the user device;
identify a payment code depicted within the acquired image frame, the payment code displayed by another user device of another user;
generate, via the user device, a purchase transaction request for payment covering a portion of the group purchase transaction using the identified payment code;
provide the purchase transaction request for payment processing; and
obtain a purchase receipt for the purchase transaction.

177. The system of claim 176, the memory further storing instructions to:
extract purchase session data from the payment code; and
wherein the purchase transaction request is generated, via the user mobile device, using the extracted purchase session data.

178. The system of claim 177, wherein the purchase session data varies based on user shopping activity with a merchant.

179. The system of claim 178, wherein the merchant is an online merchant.

180. The system of claim 176, the memory further storing instructions to:
provide a portion of the acquired image frame including the depiction of the payment code to a server; and
obtain purchase session data from the server in response to providing the portion of the acquired image frame.

181. The system of claim 177, wherein the purchase session data includes a merchant identifier, and a session identifier for a user shopping session with a merchant associated with the merchant identifier.

182. The system of claim 180, wherein the purchase session data includes a merchant identifier, and a session identifier for a user shopping session with a merchant associated with the merchant identifier.

183. The system of claim 181, wherein the session identifier is configured to serve as a token parameter in a uniform resource locator for data on the user shopping session with the merchant.

184. The system of claim 182, wherein the session identifier is configured to serve as a token parameter in a uniform resource locator for data on the user shopping session with the merchant.

185. The system of claim 176, the memory further storing instructions to:

obtain, for payment processing, payment information associated with a virtual wallet account;

wherein the generated purchase transaction request includes the payment information associated with the virtual wallet account.

186. The system of claim 185, wherein the payment information includes a dynamically generated card verification value code.

187. The system of claim 186, the memory further storing instructions to:

provide a request for the dynamically generated card verification value code to a server; and obtain the dynamically generated card verification value code from the server in response to providing the request.

188. The system of claim 187, wherein the dynamically generated card verification value has an expiration time.

189. The system of claim 187, wherein the dynamically generated card verification value is specific to a user shopping session with a merchant.

190. A person-to-person snap payment computer-implemented system, comprising:

a processor; and a memory disposed in communication with the processor and storing processor-executable instructions to:

obtain, at a user device of a user, a user input to initiate a person-to-person transaction;

obtain a transfer amount for the person-to-person transaction;

generate, via the user device, a payment code image using the transfer amount for the person-to-person transaction;

wherein the payment code image includes information on a transfer amount for another user; and display the payment code image, via a display operatively connected to the user device, for another user device of the another user to acquire an image of the payment code image.

191. The system of claim 190, the memory further storing instructions to:

obtain, for payment processing, payment information associated with a virtual wallet account;

wherein the generated payment code image encodes information on the payment information associated with the virtual wallet account.

192. The system of claim 191, wherein the payment information includes a dynamically generated card verification value code.

193. The system of claim 192, the memory further storing instructions to:

provide a request for the dynamically generated card verification value code to a server; and obtain the dynamically generated card verification value code from the server in response to providing the request.

194. The system of claim 190, wherein the transfer amount is obtained from the another user device of the another user.

195. The system of claim 190, wherein the split-payment code is a Quick Response code.

196. A person-to-person payment computer-implemented system, comprising:

a processor; and a memory disposed in communication with the processor and storing processor-executable instructions to:

obtain, at a user device of a user, a user input to initiate a person-to-person transaction;

acquire an image frame via an image acquisition device operatively connected to the user device;

identify a payment code depicted within the acquired image frame, the payment code displayed by another user device of another user;

generate, via the user device and using the identified payment code, a payment transfer request for payment to the another user;

provide the payment transfer request for payment processing; and obtain a transfer confirmation for the person-to-person transaction.

197. The system of claim 196, the memory further storing instructions to:

extract transfer account data from the payment code; and wherein the payment transfer request is generated, via the user mobile device, using the extracted transfer account data.

198. The system of claim 197, wherein the transfer account data includes data on a virtual wallet account.

199. The system of claim 196, the memory further storing instructions to:

provide a portion of the acquired image frame including the depiction of the payment code to a server.

200. The system of claim 196, the memory further storing instructions to:

obtain, for payment processing, payment information associated with a virtual wallet account;

wherein the generated payment transfer request includes the payment information associated with the virtual wallet account.

201. The system of claim 200, wherein the payment information includes a dynamically generated card verification value code.

202. The system of claim 201, the memory further storing instructions to:

provide a request for the dynamically generated card verification value code to a server; and obtain the dynamically generated card verification value code from the server in response to providing the request.

203. The system of claim 201, wherein the dynamically generated card verification value has an expiration time.

204. The system of claim 201, wherein the dynamically generated card verification value is specific to a user funds transfer session between the user device and the another user device.

205. A snap mobile sales computer-implemented system, comprising:

a processor; and a memory disposed in communication with the processor and storing processor-executable instructions to:

obtain a user checkout request at a point-of-sale device;

obtain user shopping cart information with a merchant for processing a purchase transaction related to the user checkout request;

generating, via the user device, a payment code image using the user shopping cart information;

display the payment code image, via a display operatively connected to the point-of-sale device, for a user device to acquire an image of the payment code image; and obtain a notification of authorization of the purchase transaction.

206. The system of claim 205, the memory further storing instructions to:

obtain a notification that the user device has acquired an image of the payment code image; and terminating display of the payment code image via the display operatively connected to the point-of-sale device;

207. The system of claim 205, wherein the user checkout request is obtained via a touchscreen gesture on a touchscreen operatively connected to the point-of-sale device.

208. The system of claim 205, wherein the user checkout request is obtained via a communication from the user device.

209. The system of claim 205, wherein the payment code is a one-dimensional barcode.

210. The system of claim 205, wherein the payment code is a two-dimensional barcode.

211. The system of claim 210, wherein the payment code is a Quick Response code.

212. The system of claim 205, wherein the merchant is an online merchant.

213. The system of claim 212, wherein the point-of sale device is another user device.

214. The system of claim 205, wherein the point-of-sale terminal is located at physical merchant store.

215. The system of claim 205, wherein the notification of authorization of the purchase transaction includes a session identifier for a user shopping session with the merchant.

216. The system of claim 215, wherein the session identifier is configured to serve as a token parameter in a uniform resource locator for data on the user shopping session with the merchant.

217. A reverse snap mobile sales computer-implemented system, comprising:
  a processor; and
  a memory disposed in communication with the processor and storing processor-executable instructions to:
    obtain a user checkout request at a point-of-sale device;
    acquiring an image frame via an image acquisition device operatively connected to the point-of-sale device;
    identify a payment code depicted within the acquired image frame;
    generating, via the point-of-sale device, a purchase transaction request using the identified payment code;
    providing the purchase transaction request for payment processing; and
    obtain a notification of authorization of the purchase transaction.

218. The system of claim 217, the memory further storing instructions to:
  providing an image of the payment code for purchase transaction processing.

219. The system of claim 217, the memory further storing instructions to:
  acquiring video including the image frame via the image acquisition device operatively connected to the point-of-sale device;
  extract the image frame from the acquired video; and
  analyzing the image frame to determine whether the image frame includes the depicted payment code.

220. The system of claim 217, wherein the payment code is a one-dimensional barcode.

221. The system of claim 217, wherein the payment code is a two-dimensional barcode.

222. The system of claim 217, wherein the payment code is a Quick Response code.

223. The system of claim 217, the memory further storing instructions to:
  extract purchase payment information from the payment code; and
  wherein the purchase transaction request is generated, via the point-of-sale device, using the extracted purchase payment information.

224. The system of claim 223, wherein the purchase payment information includes an expiration time.

225. The system of claim 223, wherein the purchase payment information is associated with a virtual wallet account, and wherein the generated purchase transaction request includes the purchase payment data associated with the virtual wallet account.

226. The system of claim 217, the memory further storing instructions to:
  providing a portion of the acquired image frame including the depiction of the payment code to a server; and
  obtain purchase payment information from the server in response to providing the portion of the acquired image frame.

227. The system of claim 226, wherein the purchase payment information includes a session identifier for a user shopping session with a merchant.

228. The system of claim 227, wherein the session identifier is configured to serve as a token parameter in a uniform resource locator for data on the user shopping session with the merchant.

229. A computer-readable tangible medium storing computer-executable visual snap instructions to:
  obtain a user visual item information request (VITR);
  extract a VITR image frame from the VITR obtained via an image acquisition device operatively connected to a user device;
  extract VITR field attributes from the VITR image frame through a VITR processing component, wherein the VITR processing component may include barcode recognition and optical character recognition;
  query a database with the extracted VITR field attributes;
  determine a VITR type from results from the querying;
  provide a visual item information response based on the determined VITR type.

230. The medium of claim 229, wherein the VITR may be one of a visual coupon addition request, a visual account addition request, a visual bill addition request, a visual purchase request, and a visual purchase information request.

231. The medium of claim 230, wherein the VITR and visual item information response are storable for later access and retrieval via a VITR history.

232. The medium of claim 229, wherein the VITR is a visual purchase request, and the provided visual item information response is a purchase intake mechanism, and further storing instructions to:
  obtain the user's indication to purchase a purchase item identified in the provided visual item information response;
  obtain a purchase transaction request for payment processing of the purchase item; and
  provide a purchase receipt for the purchase transaction.

233. The medium of claim 232, wherein the VITR, visual item information response, user's indication, purchase transaction request and purchase receipt are storable for later access and retrieval via a VITR history.

234. The medium of claim 229, wherein a server performs VITR activities.

235. The medium of claim 229, wherein a user client device performs VITR activities.

236. A computer-readable tangible medium storing computer-executable snap payment instructions to:
- obtain a user visual item information request (VITR);
- acquire an VITR image frame via an image acquisition device operatively connected to the user device;
- extract VITR field attributes from the VITR image frame through a VITR processing component, wherein the VITR processing component may include barcode recognition and optical character recognition;
- query a database with the extracted VITR field attributes;
- determine a VITR type from results from the querying;
- provide a visual item information response based on the determined VITR type.

237. The medium of claim 236, wherein the VITR may be one of a visual coupon addition request, a visual account addition request, a visual bill addition request, a visual purchase request, and a visual purchase information request.

238. The medium of claim 237, wherein the VITR and visual item information response are storable for later access and retrieval via a VITR history.

239. The medium of claim 236, wherein the VITR is a visual purchase request, and the provided visual item information response is a purchase intake mechanism, and further storing instructions to:
- obtain the user's indication to purchase a purchase item identified in the provided visual item information response;
- provide a purchase transaction request for payment processing of the purchase item; and
- obtain a purchase receipt for the purchase transaction.

240. The medium of claim 239, wherein the VITR, visual item information response, user's indication, purchase transaction request and purchase receipt are storable for later access and retrieval via a VITR history.

241. A computer-readable tangible medium storing computer-executable snap payment instructions to:
- obtain, at a user device, a user input to initiate a purchase transaction;
- acquire an image frame via an image acquisition device operatively connected to the user device;
- identify a payment code depicted within the acquired image frame;
- generate, via the user device, a purchase transaction request using the identified payment code;
- provide the purchase transaction request for payment processing; and
- obtain a purchase receipt for the purchase transaction.

242. The medium of claim 241, further storing instructions to:
- provide an image of the payment code for purchase transaction processing.

243. The medium of claim 241, further storing instructions to:
- acquire video including the image frame via the image acquisition device included in the user mobile device;
- extract the image frame from the acquired video; and
- analyze the image frame to determine whether the image frame includes the depicted payment code.

244. The medium of claim 241, wherein the user device is a mobile device.

245. The medium of claim 241, wherein the user input is a touchscreen gesture on a touchscreen operatively connected to the user device.

246. The medium of claim 241, wherein the payment code is a one-dimensional barcode.

247. The medium of claim 241, wherein the payment code is a two-dimensional barcode.

248. The medium of claim 247, wherein the payment code is a Quick Response code.

249. The medium of claim 241, further storing instructions to:
- extract purchase session data from the payment code; and
- wherein the purchase transaction request is generated, via the user mobile device, using the extracted purchase session data.

250. The medium of claim 249, wherein the purchase session data varies based on user shopping activity with a merchant.

251. The medium of claim 250, wherein the merchant is an online merchant.

252. The medium of claim 241, further storing instructions to:
- provide a portion of the acquired image frame including the depiction of the payment code to a server; and
- obtain purchase session data from the server in response to providing the portion of the acquired image frame.

253. The medium of claim 249, wherein the purchase session data includes a merchant identifier, and a session identifier for a user shopping session with a merchant associated with the merchant identifier.

254. The medium of claim 252, wherein the purchase session data includes a merchant identifier, and a session identifier for a user shopping session with a merchant associated with the merchant identifier.

255. The medium of claim 253, wherein the session identifier is configured to serve as a token parameter in a uniform resource locator for data on the user shopping session with the merchant.

256. The medium of claim 254, wherein the session identifier is configured to serve as a token parameter in a uniform resource locator for data on the user shopping session with the merchant.

257. The medium of claim 241, further storing instructions to:
- obtain, for payment processing, payment information associated with a virtual wallet account;
- wherein the generated purchase transaction request includes the payment information associated with the virtual wallet account.

258. The medium of claim 257, wherein the payment information includes a dynamically generated card verification value code.

259. The medium of claim 258, further storing instructions to:
- provide a request for the dynamically generated card verification value code to a server; and
- obtain the dynamically generated card verification value code from the server in response to providing the request.

260. The medium of claim 259, wherein the dynamically generated card verification value has an expiration time.

261. The medium of claim 259, wherein the dynamically generated card verification value is specific to a user shopping session with a merchant.

262. The medium of claim 241, wherein the payment code depicted within the acquired image frame is acquired from the display of a media device, and encodes data to purchase on-demand media content.

263. The medium of claim 262, wherein the media device is a television.

264. The medium of claim 263, wherein the television is part of an in-flight entertainment medium.

265. The medium of claim 262, wherein the media device is displaying a webpage.

266. A computer-readable tangible medium storing computer-executable reverse snap payment instructions to:
obtain, at a user device, a user input to initiate a purchase transaction with a merchant;
obtain user payment information for processing the purchase transaction;
generate, via the user device, a payment code image using the payment information for processing the purchase transaction;
display the payment code image, via a display operatively connected to the user device, for a point-of-sale terminal to acquire an image of the payment code image;
and obtain a purchase receipt for the purchase transaction.

267. The medium of claim 266, further storing instructions to:
obtain a notification that the point-of-sale terminal has acquired an image of the payment code image; and
terminate display of the payment code image via the display operatively connected to the user device;

268. The medium of claim 266, wherein the user device is a mobile device.

269. The medium of claim 266, wherein the user input is a touchscreen gesture on a touchscreen operatively connected to the user device.

270. The medium of claim 266, wherein the payment code is a one-dimensional barcode.

271. The medium of claim 266, wherein the payment code is a two-dimensional barcode.

272. The medium of claim 271, wherein the payment code is a Quick Response code.

273. The medium of claim 266, wherein the merchant is an online merchant.

274. The medium of claim 266, wherein the purchase receipt includes a merchant identifier, and a session identifier for a user shopping session with a merchant associated with the merchant identifier.

275. The medium of claim 274, wherein the session identifier is configured to serve as a token parameter in a uniform resource locator for data on the user shopping session with the merchant.

276. The medium of claim 266, wherein the user payment information is associated with a virtual wallet account;

277. The medium of claim 276, wherein the payment information includes a dynamically generated card verification value code.

278. The medium of claim 277, further storing instructions to:
provide a request for the dynamically generated card verification value code to a server; and
obtain the dynamically generated card verification value code from the server in response to providing the request.

279. The medium of claim 277, wherein the dynamically generated card verification value has an expiration time.

280. The medium of claim 277, wherein the dynamically generated card verification value is specific to a user shopping session with a merchant.

281. The medium of claim 266, wherein the point-of-sale terminal is a user device.

282. The medium of claim 266, wherein the point-of-sale terminal is located at physical merchant store.

283. A computer-readable tangible medium storing computer-executable group split snap payment instructions to:
obtain, at a user device of a user, a user input to initiate a group purchase transaction;
obtain purchase data for the group purchase transaction;
generate, via the user device, a split-payment code image using the purchase data for the group purchase transaction;
wherein the split-payment code image includes information on a payment amount for another user; and
display the split-payment code image, via a display operatively connected to the user device, for another user device of the another user to acquire an image of the split-payment code image.

284. The medium of claim 283, further storing instructions to:
generate, via the user device, a purchase transaction request using a payment amount for the user covering a portion of the group purchase transaction;
provide the purchase transaction request for payment processing; and
obtain a purchase receipt for the payment amount for the user for the group purchase transaction.

285. The medium of claim 284, further storing instructions to:
obtain, for payment processing, payment information associated with a virtual wallet account;
wherein the generated purchase transaction request includes the payment information associated with the virtual wallet account.

286. The medium of claim 285, wherein the payment information includes a dynamically generated card verification value code.

287. The medium of claim 286, further storing instructions to:
provide a request for the dynamically generated card verification value code to a server; and
obtain the dynamically generated card verification value code from the server in response to providing the request.

288. The medium of claim 286, wherein the dynamically generated card verification value is specific to a user shopping session with a merchant.

289. The medium of claim 283, wherein the split-payment code is a Quick Response code.

290. A computer-readable tangible medium storing computer-executable group split payment instructions to:
obtain, at a user device of a user, a user input to initiate a group purchase transaction;
acquire an image frame via an image acquisition device operatively connected to the user device;
identify a payment code depicted within the acquired image frame, the payment code displayed by another user device of another user;
generate, via the user device, a purchase transaction request for payment covering a portion of the group purchase transaction using the identified payment code;
provide the purchase transaction request for payment processing; and
obtain a purchase receipt for the purchase transaction.

291. The medium of claim 290, further storing instructions to:
extract purchase session data from the payment code; and
wherein the purchase transaction request is generated, via the user mobile device, using the extracted purchase session data.

292. The medium of claim 291, wherein the purchase session data varies based on user shopping activity with a merchant.

293. The medium of claim 292, wherein the merchant is an online merchant.

294. The medium of claim 290, further storing instructions to:
provide a portion of the acquired image frame including the depiction of the payment code to a server; and
obtain purchase session data from the server in response to providing the portion of the acquired image frame.

295. The medium of claim 291, wherein the purchase session data includes a merchant identifier, and a session identifier for a user shopping session with a merchant associated with the merchant identifier.

296. The medium of claim 294, wherein the purchase session data includes a merchant identifier, and a session identifier for a user shopping session with a merchant associated with the merchant identifier.

297. The medium of claim 295, wherein the session identifier is configured to serve as a token parameter in a uniform resource locator for data on the user shopping session with the merchant.

298. The medium of claim 296, wherein the session identifier is configured to serve as a token parameter in a uniform resource locator for data on the user shopping session with the merchant.

299. The medium of claim 290, further storing instructions to:
obtain, for payment processing, payment information associated with a virtual wallet account;
wherein the generated purchase transaction request includes the payment information associated with the virtual wallet account.

300. The medium of claim 299, wherein the payment information includes a dynamically generated card verification value code.

301. The medium of claim 300, further storing instructions to:
provide a request for the dynamically generated card verification value code to a server; and
obtain the dynamically generated card verification value code from the server in response to providing the request.

302. The medium of claim 301, wherein the dynamically generated card verification value has an expiration time.

303. The medium of claim 301, wherein the dynamically generated card verification value is specific to a user shopping session with a merchant.

304. A computer-readable tangible medium storing computer-executable person-to-person snap payment instructions to:
obtain, at a user device of a user, a user input to initiate a person-to-person transaction;
obtain a transfer amount for the person-to-person transaction;
generate, via the user device, a payment code image using the transfer amount for the person-to-person transaction;
wherein the payment code image includes information on a transfer amount for another user; and
display the payment code image, via a display operatively connected to the user device, for another user device of the another user to acquire an image of the payment code image.

305. The medium of claim 304, further storing instructions to:
obtain, for payment processing, payment information associated with a virtual wallet account;
wherein the generated payment code image encodes information on the payment information associated with the virtual wallet account.

306. The medium of claim 305, wherein the payment information includes a dynamically generated card verification value code.

307. The medium of claim 306, further storing instructions to:
provide a request for the dynamically generated card verification value code to a server; and
obtain the dynamically generated card verification value code from the server in response to providing the request.

308. The medium of claim 304, wherein the transfer amount is obtained from the another user device of the another user.

309. The medium of claim 304, wherein the split-payment code is a Quick Response code.

310. A computer-readable tangible medium storing computer-executable person-to-person payment instructions to:
obtain, at a user device of a user, a user input to initiate a person-to-person transaction;
acquire an image frame via an image acquisition device operatively connected to the user device;
identify a payment code depicted within the acquired image frame, the payment code displayed by another user device of another user;
generate, via the user device and using the identified payment code, a payment transfer request for payment to the another user;
provide the payment transfer request for payment processing; and
obtain a transfer confirmation for the person-to-person transaction.

311. The medium of claim 310, further storing instructions to:
extract transfer account data from the payment code; and
wherein the payment transfer request is generated, via the user mobile device, using the extracted transfer account data.

312. The medium of claim 311, wherein the transfer account data includes data on a virtual wallet account.

313. The medium of claim 310, further storing instructions to:
provide a portion of the acquired image frame including the depiction of the payment code to a server.

314. The medium of claim 310, further storing instructions to:
obtain, for payment processing, payment information associated with a virtual wallet account;
wherein the generated payment transfer request includes the payment information associated with the virtual wallet account.

315. The medium of claim 314, wherein the payment information includes a dynamically generated card verification value code.

316. The medium of claim 315, further storing instructions to:
provide a request for the dynamically generated card verification value code to a server; and
obtain the dynamically generated card verification value code from the server in response to providing the request.

317. The medium of claim 315, wherein the dynamically generated card verification value has an expiration time.

318. The medium of claim 315, wherein the dynamically generated card verification value is specific to a user funds transfer session between the user device and the another user device.

319. A computer-readable tangible medium storing computer-executable snap mobile sales instructions to:
  obtain a user checkout request at a point-of-sale device;
  obtain user shopping cart information with a merchant for processing a purchase transaction related to the user checkout request;
  generate, via the user device, a payment code image using the user shopping cart information;
  display the payment code image, via a display operatively connected to the point-of-sale device, for a user device to acquire an image of the payment code image; and
  obtain a notification of authorization of the purchase transaction.

320. The medium of claim 319, further storing instructions to:
  obtain a notification that the user device has acquired an image of the payment code image; and
  terminate display of the payment code image via the display operatively connected to the point-of-sale device;

321. The medium of claim 319, wherein the user checkout request is obtained via a touchscreen gesture on a touchscreen operatively connected to the point-of-sale device.

322. The medium of claim 319, wherein the user checkout request is obtained via a communication from the user device.

323. The medium of claim 319, wherein the payment code is a one-dimensional barcode.

324. The medium of claim 319, wherein the payment code is a two-dimensional barcode.

325. The medium of claim 324, wherein the payment code is a Quick Response code.

326. The medium of claim 319, wherein the merchant is an online merchant.

327. The medium of claim 326, wherein the point-of sale device is another user device.

328. The medium of claim 319, wherein the point-of-sale terminal is located at physical merchant store.

329. The medium of claim 319, wherein the notification of authorization of the purchase transaction includes a session identifier for a user shopping session with the merchant.

330. The medium of claim 329, wherein the session identifier is configured to serve as a token parameter in a uniform resource locator for data on the user shopping session with the merchant.

331. A computer-readable tangible medium storing computer-executable reverse snap mobile sales instructions to:
  obtain a user checkout request at a point-of-sale device;
  acquire an image frame via an image acquisition device operatively connected to the point-of-sale device;
  identify a payment code depicted within the acquired image frame;
  generate, via the point-of-sale device, a purchase transaction request using the identified payment code;
  provide the purchase transaction request for payment processing; and
  obtain a notification of authorization of the purchase transaction.

332. The medium of claim 331, further storing instructions to:
  provide an image of the payment code for purchase transaction processing.

333. The medium of claim 331, further storing instructions to:
  acquire video including the image frame via the image acquisition device operatively connected to the point-of-sale device;
  extract the image frame from the acquired video; and
  analyze the image frame to determine whether the image frame includes the depicted payment code.

334. The medium of claim 331, wherein the payment code is a one-dimensional barcode.

335. The medium of claim 331, wherein the payment code is a two-dimensional barcode.

336. The medium of claim 331, wherein the payment code is a Quick Response code.

337. The medium of claim 331, further storing instructions to:
  extract purchase payment information from the payment code; and
  wherein the purchase transaction request is generated, via the point-of-sale device, using the extracted purchase payment information.

338. The medium of claim 337, wherein the purchase payment information includes an expiration time.

339. The medium of claim 337, wherein the purchase payment information is associated with a virtual wallet account, and wherein the generated purchase transaction request includes the purchase payment data associated with the virtual wallet account.

340. The medium of claim 331, further storing instructions to:
  provide a portion of the acquired image frame including the depiction of the payment code to a server; and
  obtain purchase payment information from the server in response to providing the portion of the acquired image frame.

341. The medium of claim 340, wherein the purchase payment information includes a session identifier for a user shopping session with a merchant.

342. The medium of claim 341, wherein the session identifier is configured to serve as a token parameter in a uniform resource locator for data on the user shopping session with the merchant.

343. A visual snap computer-implemented means, comprising means for:
  obtaining a user visual item information request (VITR);
  extracting a VITR image frame from the VITR obtained via an image acquisition device operatively connected to a user device;
  extracting VITR field attributes from the VITR image frame through a VITR processing component, wherein the VITR processing component may include barcode recognition and optical character recognition;
  querying a database with the extracted VITR field attributes;
  determining a VITR type from results from the querying;
  providing a visual item information response based on the determined VITR type.

344. The means of claim 343, wherein the VITR may be one of a visual coupon addition request, a visual account addition request, a visual bill addition request, a visual purchase request, and a visual purchase information request.

345. The means of claim 344, wherein the VITR and visual item information response are storable for later access and retrieval via a VITR history.

346. The means of claim 343, wherein the VITR is a visual purchase request, and the provided visual item information response is a purchase intake mechanism, and further comprising means for:

obtaining the user's indication to purchase a purchase item identified in the provided visual item information response;

obtaining a purchase transaction request for payment processing of the purchase item; and providing a purchase receipt for the purchase transaction.

347. The means of claim 346, wherein the VITR, visual item information response, user's indication, purchase transaction request and purchase receipt are storable for later access and retrieval via a VITR history.

348. The means of claim 343, wherein a server performs VITR activities.

349. The means of claim 343, wherein a user client device performs VITR activities.

350. A snap payment computer-implemented means, comprising means for:

obtaining a user visual item information request (VITR);

acquiring an VITR image frame via an image acquisition device operatively connected to the user device;

extracting VITR field attributes from the VITR image frame through a VITR processing component, wherein the VITR processing component may include barcode recognition and optical character recognition;

querying a database with the extracted VITR field attributes;

determining a VITR type from results from the querying;

providing a visual item information response based on the determined VITR type.

351. The means of claim 350, wherein the VITR may be one of a visual coupon addition request, a visual account addition request, a visual bill addition request, a visual purchase request, and a visual purchase information request.

352. The means of claim 351, wherein the VITR and visual item information response are storable for later access and retrieval via a VITR history.

353. The means of claim 350, wherein the VITR is a visual purchase request, and the provided visual item information response is a purchase intake mechanism, and further comprising means for:

obtaining the user's indication to purchase a purchase item identified in the provided visual item information response;

providing a purchase transaction request for payment processing of the purchase item; and obtaining a purchase receipt for the purchase transaction.

354. The means of claim 353, wherein the VITR, visual item information response, user's indication, purchase transaction request and purchase receipt are storable for later access and retrieval via a VITR history.

355. A snap payment computer-implemented means, comprising means for:

obtaining, at a user device, a user input to initiate a purchase transaction;

acquiring an image frame via an image acquisition device operatively connected to the user device;

identifying a payment code depicted within the acquired image frame;

generating, via the user device, a purchase transaction request using the identified payment code;

providing the purchase transaction request for payment processing; and obtaining a purchase receipt for the purchase transaction.

356. The means of claim 355, further comprising means for:

providing an image of the payment code for purchase transaction processing.

357. The means of claim 355, further comprising means for:

acquiring video including the image frame via the image acquisition device included in the user mobile device;

extracting the image frame from the acquired video; and analyzing the image frame to determine whether the image frame includes the depicted payment code.

358. The means of claim 355, wherein the user device is a mobile device.

359. The means of claim 355, wherein the user input is a touchscreen gesture on a touchscreen operatively connected to the user device.

360. The means of claim 355, wherein the payment code is a one-dimensional barcode.

361. The means of claim 355, wherein the payment code is a two-dimensional barcode.

362. The means of claim 361, wherein the payment code is a Quick Response code.

363. The means of claim 355, further comprising means for:

extracting purchase session data from the payment code; and wherein the purchase transaction request is generated, via the user mobile device, using the extracted purchase session data.

364. The means of claim 363, wherein the purchase session data varies based on user shopping activity with a merchant.

365. The means of claim 364, wherein the merchant is an online merchant.

366. The means of claim 355, further comprising means for:

providing a portion of the acquired image frame including the depiction of the payment code to a server; and obtaining purchase session data from the server in response to providing the portion of the acquired image frame.

367. The means of claim 363, wherein the purchase session data includes a merchant identifier, and a session identifier for a user shopping session with a merchant associated with the merchant identifier.

368. The means of claim 366, wherein the purchase session data includes a merchant identifier, and a session identifier for a user shopping session with a merchant associated with the merchant identifier.

369. The means of claim 367, wherein the session identifier is configured to serve as a token parameter in a uniform resource locator for data on the user shopping session with the merchant.

370. The means of claim 368, wherein the session identifier is configured to serve as a token parameter in a uniform resource locator for data on the user shopping session with the merchant.

371. The means of claim 355, further comprising means for:

obtaining, for payment processing, payment information associated with a virtual wallet account;

wherein the generated purchase transaction request includes the payment information associated with the virtual wallet account.

372. The means of claim 371, wherein the payment information includes a dynamically generated card verification value code.

373. The means of claim 372, further comprising means for:

providing a request for the dynamically generated card verification value code to a server; and obtaining the dynamically generated card verification value code from the server in response to providing the request.

374. The means of claim 373, wherein the dynamically generated card verification value has an expiration time.

375. The means of claim 373, wherein the dynamically generated card verification value is specific to a user shopping session with a merchant.

376. The means of claim 355, wherein the payment code depicted within the acquired image frame is acquired from the display of a media device, and encodes data to purchase on-demand media content.

377. The means of claim 376, wherein the media device is a television.

378. The means of claim 377, wherein the television is part of an in-flight entertainment means.

379. The means of claim 376, wherein the media device is displaying a webpage.

380. A reverse snap payment computer-implemented means, comprising means for:
    obtaining, at a user device, a user input to initiate a purchase transaction with a merchant;
    obtaining user payment information for processing the purchase transaction;
    generating, via the user device, a payment code image using the payment information for processing the purchase transaction;
    displaying the payment code image, via a display operatively connected to the user device, for a point-of-sale terminal to acquire an image of the payment code image; and
    obtaining a purchase receipt for the purchase transaction.

381. The means of claim 380, further comprising means for:
    obtaining a notification that the point-of-sale terminal has acquired an image of the payment code image; and
    terminating display of the payment code image via the display operatively connected to the user device;

382. The means of claim 380, wherein the user device is a mobile device.

383. The means of claim 380, wherein the user input is a touchscreen gesture on a touchscreen operatively connected to the user device.

384. The means of claim 380, wherein the payment code is a one-dimensional barcode.

385. The means of claim 380, wherein the payment code is a two-dimensional barcode.

386. The means of claim 385, wherein the payment code is a Quick Response code.

387. The means of claim 380, wherein the merchant is an online merchant.

388. The means of claim 380, wherein the purchase receipt includes a merchant identifier, and a session identifier for a user shopping session with a merchant associated with the merchant identifier.

389. The means of claim 388, wherein the session identifier is configured to serve as a token parameter in a uniform resource locator for data on the user shopping session with the merchant.

390. The means of claim 380, wherein the user payment information is associated with a virtual wallet account;

391. The means of claim 390, wherein the payment information includes a dynamically generated card verification value code.

392. The means of claim 391, further comprising means for:
    providing a request for the dynamically generated card verification value code to a server; and
    obtaining the dynamically generated card verification value code from the server in response to providing the request.

393. The means of claim 391, wherein the dynamically generated card verification value has an expiration time.

394. The means of claim 391, wherein the dynamically generated card verification value is specific to a user shopping session with a merchant.

395. The means of claim 380, wherein the point-of-sale terminal is a user device.

396. The means of claim 380, wherein the point-of-sale terminal is located at physical merchant store.

397. A group split snap payment computer-implemented means, comprising means for:
    obtaining, at a user device of a user, a user input to initiate a group purchase transaction;
    obtaining purchase data for the group purchase transaction;
    generating, via the user device, a split-payment code image using the purchase data for the group purchase transaction;
    wherein the split-payment code image includes information on a payment amount for another user; and
    displaying the split-payment code image, via a display operatively connected to the user device, for another user device of the another user to acquire an image of the split-payment code image.

398. The means of claim 397, further comprising means for:
    generating, via the user device, a purchase transaction request using a payment amount for the user covering a portion of the group purchase transaction;
    providing the purchase transaction request for payment processing; and
    obtaining a purchase receipt for the payment amount for the user for the group purchase transaction.

399. The means of claim 398, further comprising means for:
    obtaining, for payment processing, payment information associated with a virtual wallet account;
    wherein the generated purchase transaction request includes the payment information associated with the virtual wallet account.

400. The means of claim 399, wherein the payment information includes a dynamically generated card verification value code.

401. The means of claim 400, further comprising means for:
    providing a request for the dynamically generated card verification value code to a server; and
    obtaining the dynamically generated card verification value code from the server in response to providing the request.

402. The means of claim 400, wherein the dynamically generated card verification value is specific to a user shopping session with a merchant.

403. The means of claim 397, wherein the split-payment code is a Quick Response code.

404. A group split payment computer-implemented means, comprising obtaining, at a user device of a user, a user input to initiate a group purchase transaction;
    acquiring an image frame via an image acquisition device operatively connected to the user device;

identifying a payment code depicted within the acquired image frame, the payment code displayed by another user device of another user;

generating, via the user device, a purchase transaction request for payment covering a portion of the group purchase transaction using the identified payment code;

providing the purchase transaction request for payment processing; and obtaining a purchase receipt for the purchase transaction.

405. The means of claim 404, further comprising means for:

extracting purchase session data from the payment code; and wherein the purchase transaction request is generated, via the user mobile device, using the extracted purchase session data.

406. The means of claim 405, wherein the purchase session data varies based on user shopping activity with a merchant.

407. The means of claim 406, wherein the merchant is an online merchant.

408. The means of claim 404, further comprising means for:

providing a portion of the acquired image frame including the depiction of the payment code to a server; and obtaining purchase session data from the server in response to providing the portion of the acquired image frame.

409. The means of claim 405, wherein the purchase session data includes a merchant identifier, and a session identifier for a user shopping session with a merchant associated with the merchant identifier.

410. The means of claim 408, wherein the purchase session data includes a merchant identifier, and a session identifier for a user shopping session with a merchant associated with the merchant identifier.

411. The means of claim 409, wherein the session identifier is configured to serve as a token parameter in a uniform resource locator for data on the user shopping session with the merchant.

412. The means of claim 410, wherein the session identifier is configured to serve as a token parameter in a uniform resource locator for data on the user shopping session with the merchant.

413. The means of claim 404, further comprising means for:

obtaining, for payment processing, payment information associated with a virtual wallet account;

wherein the generated purchase transaction request includes the payment information associated with the virtual wallet account.

414. The means of claim 413, wherein the payment information includes a dynamically generated card verification value code.

415. The means of claim 414, further comprising means for:

providing a request for the dynamically generated card verification value code to a server; and obtaining the dynamically generated card verification value code from the server in response to providing the request.

416. The means of claim 415, wherein the dynamically generated card verification value has an expiration time.

417. The means of claim 415, wherein the dynamically generated card verification value is specific to a user shopping session with a merchant.

418. A person-to-person snap payment computer-implemented means, comprising means for:

obtaining, at a user device of a user, a user input to initiate a person-to-person transaction;

obtaining a transfer amount for the person-to-person transaction;

generating, via the user device, a payment code image using the transfer amount for the person-to-person transaction;

wherein the payment code image includes information on a transfer amount for another user; and displaying the payment code image, via a display operatively connected to the user device, for another user device of the another user to acquire an image of the payment code image.

419. The means of claim 418, further comprising means for:

obtaining, for payment processing, payment information associated with a virtual wallet account;

wherein the generated payment code image encodes information on the payment information associated with the virtual wallet account.

420. The means of claim 419, wherein the payment information includes a dynamically generated card verification value code.

421. The means of claim 420, further comprising means for:

providing a request for the dynamically generated card verification value code to a server; and obtaining the dynamically generated card verification value code from the server in response to providing the request.

422. The means of claim 418, wherein the transfer amount is obtained from the another user device of the another user.

423. The means of claim 418, wherein the split-payment code is a Quick Response code.

424. A person-to-person payment computer-implemented means, comprising obtaining, at a user device of a user, a user input to initiate a person-to-person transaction;

acquiring an image frame via an image acquisition device operatively connected to the user device;

identifying a payment code depicted within the acquired image frame, the payment code displayed by another user device of another user;

generating, via the user device and using the identified payment code, a payment transfer request for payment to the another user;

providing the payment transfer request for payment processing; and obtaining a transfer confirmation for the person-to-person transaction.

425. The means of claim 424, further comprising means for:

extracting transfer account data from the payment code; and wherein the payment transfer request is generated, via the user mobile device, using the extracted transfer account data.

426. The means of claim 425, wherein the transfer account data includes data on a virtual wallet account.

427. The means of claim 424, further comprising means for:

providing a portion of the acquired image frame including the depiction of the payment code to a server.

428. The means of claim 424, further comprising means for:

obtaining, for payment processing, payment information associated with a virtual wallet account;
wherein the generated payment transfer request includes the payment information associated with the virtual wallet account.

429. The means of claim 428, wherein the payment information includes a dynamically generated card verification value code.

430. The means of claim 429, further comprising means for:
providing a request for the dynamically generated card verification value code to a server; and
obtaining the dynamically generated card verification value code from the server in response to providing the request.

431. The means of claim 429, wherein the dynamically generated card verification value has an expiration time.

432. The means of claim 429, wherein the dynamically generated card verification value is specific to a user funds transfer session between the user device and the another user device.

433. A snap mobile sales computer-implemented means, comprising means for:
obtaining a user checkout request at a point-of-sale device;
obtaining user shopping cart information with a merchant for processing a purchase transaction related to the user checkout request;
generating, via the user device, a payment code image using the user shopping cart information;
displaying the payment code image, via a display operatively connected to the point-of-sale device, for a user device to acquire an image of the payment code image; and obtaining a notification of authorization of the purchase transaction.

434. The means of claim 433, further comprising means for:
obtaining a notification that the user device has acquired an image of the payment code image; and
terminating display of the payment code image via the display operatively connected to the point-of-sale device;

435. The means of claim 433, wherein the user checkout request is obtained via a touchscreen gesture on a touchscreen operatively connected to the point-of-sale device.

436. The means of claim 433, wherein the user checkout request is obtained via a communication from the user device.

437. The means of claim 433, wherein the payment code is a one-dimensional barcode.

438. The means of claim 433, wherein the payment code is a two-dimensional barcode.

439. The means of claim 438, wherein the payment code is a Quick Response code.

440. The means of claim 433, wherein the merchant is an online merchant.

441. The means of claim 440, wherein the point-of sale device is another user device.

442. The means of claim 433, wherein the point-of-sale terminal is located at physical merchant store.

443. The means of claim 433, wherein the notification of authorization of the purchase transaction includes a session identifier for a user shopping session with the merchant.

444. The means of claim 443, wherein the session identifier is configured to serve as a token parameter in a uniform resource locator for data on the user shopping session with the merchant.

445. A reverse snap mobile sales computer-implemented means, comprising means for:
obtaining a user checkout request at a point-of-sale device;
acquiring an image frame via an image acquisition device operatively connected to the point-of-sale device;
identifying a payment code depicted within the acquired image frame;
generating, via the point-of-sale device, a purchase transaction request using the identified payment code;
providing the purchase transaction request for payment processing; and
obtaining a notification of authorization of the purchase transaction.

446. The means of claim 445, further comprising means for:
providing an image of the payment code for purchase transaction processing.

447. The means of claim 445, further comprising means for:
acquiring video including the image frame via the image acquisition device operatively connected to the point-of-sale device;
extracting the image frame from the acquired video; and
analyzing the image frame to determine whether the image frame includes the depicted payment code.

448. The means of claim 445, wherein the payment code is a one-dimensional barcode.

449. The means of claim 445, wherein the payment code is a two-dimensional barcode.

450. The means of claim 445, wherein the payment code is a Quick Response code.

451. The means of claim 445, further comprising means for:
extracting purchase payment information from the payment code; and
wherein the purchase transaction request is generated, via the point-of-sale device, using the extracted purchase payment information.

452. The means of claim 451, wherein the purchase payment information includes an expiration time.

453. The means of claim 451, wherein the purchase payment information is associated with a virtual wallet account, and wherein the generated purchase transaction request includes the purchase payment data associated with the virtual wallet account.

454. The means of claim 445, further comprising means for:
providing a portion of the acquired image frame including the depiction of the payment code to a server; and
obtaining purchase payment information from the server in response to providing the portion of the acquired image frame.

455. The means of claim 454, wherein the purchase payment information includes a session identifier for a user shopping session with a merchant.

456. The means of claim 455, wherein the session identifier is configured to serve as a token parameter in a uniform resource locator for data on the user shopping session with the merchant.

In order to address various issues and advance the art, the entirety of this application for SNAP MOBILE PAYMENT APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SNAP individual and/or enterprise user, database configuration and/or relational model, data type, data transmission and/or network framework, syntax structure, and/or the like, various embodiments of the SNAP may be implemented that enable a great deal of flexibility and customization. For example, aspects of the SNAP may be adapted for restaurant dining, online shopping, shopping in brick-and-mortar stores, secure information processing, healthcare information systems, and/or the like. While various embodiments and discussions of the SNAP have been directed to electronic purchase transactions, however, it is to be understood that the embodiments described herein may be readily configured and/or customized for a wide variety of other applications and/or implementations.

What is claimed is:
1. A method comprising:
receiving, at a merchant server and from a user device via a computer network, an HTTP(S) GET message including an XML-formatted checkout request, the checkout request including product data corresponding to a product and client data corresponding to the user device;
extracting, by the merchant server, the product data and the client data from the checkout request;
generating, by a pay network server and in response to extracting the product data and the client data from the checkout request, a first code, wherein the first code embodies the product data and merchant information required by the pay network server to process a card authorization request for a product corresponding to the product data;
providing, to the user device in response to the checkout request, a checkout webpage, wherein the checkout webpage includes the first code;
receiving, by the pay network server via a virtual wallet application executing on a user computing device, the card authorization request in response to a digital camera of the user computing device acquiring the first code from the checkout webpage, the card authorization request including the product data and the merchant information embodied by the first code, account information for a user of the user computing device, and a pay amount for the product; and
sending, by the pay network server, the merchant information, the account information, and the pay amount for the product to an issuer server to deduct the pay amount from an account corresponding to the user at the issuer server.

2. The method of claim 1, further comprising:
receiving a verification value on the user device; and
communicating the verification value from the user device to the pay network server to verify that the checkout request is a valid checkout request from the user device.

3. The method of claim 1, wherein the first code is at least one selected from a group comprising:
a one-dimensional barcode;
a two-dimensional barcode; or
a Quick Response code.

4. The method of claim 1, wherein the card authorization request further includes a dynamically generated card verification value code.

5. The method of claim 4, further comprising:
providing a request for the dynamically generated card verification value code to the pay network server; and
obtaining the dynamically generated card verification value code from the pay network server in response to providing the request.

6. The method of claim 4, wherein the dynamically generated card verification value has an expiration time.

7. The method of claim 4, wherein the dynamically generated card verification value is specific to a user shopping session with a merchant.

8. The method of claim 1, wherein the first code further includes user session data corresponding to a user shopping session between the user device and the merchant server.

9. The method of claim 8, wherein the user session data includes a merchant identifier, and a session identifier for the user shopping session.

10. The method of claim 9, wherein a uniform resource locator for data on the user shopping session with the merchant server includes the session identifier.

* * * * *